US006643765B1

(12) United States Patent
Hansen et al.

(10) Patent No.: US 6,643,765 B1
(45) Date of Patent: Nov. 4, 2003

(54) PROGRAMMABLE PROCESSOR WITH GROUP FLOATING POINT OPERATIONS

(75) Inventors: Craig Hansen, Los Altos, CA (US); John Moussouris, Palo Alto, CA (US)

(73) Assignee: Microunity Systems Engineering, Inc., Sunnyvale, CA (US)

( * ) Notice: Subject to any disclaimer, the term of this patent is extended or adjusted under 35 U.S.C. 154(b) by 0 days.

(21) Appl. No.: 09/534,745

(22) Filed: Mar. 24, 2000

Related U.S. Application Data

(60) Continuation of application No. 09/382,402, filed on Aug. 24, 1999, now Pat. No. 6,295,599, which is a continuation-in-part of application No. 09/169,963, filed on Oct. 13, 1998, now Pat. No. 6,006,318, which is a continuation of application No. 08/754,827, filed on Nov. 22, 1996, now Pat. No. 5,822,603, which is a division of application No. 08/516,036, filed on Aug. 16, 1995, now Pat. No. 5,742,840.

(51) Int. Cl.[7] ............................................. G06F 15/00
(52) U.S. Cl. ........................... 712/32; 712/208; 712/28
(58) Field of Search .............................. 712/32, 28, 34, 712/208, 210

(56) References Cited

U.S. PATENT DOCUMENTS

| | | |
|---|---|---|
| 4,025,772 A | 5/1977 | Constant |
| 4,489,393 A | 12/1984 | Kawahara et al. |
| 4,701,875 A | 10/1987 | Konishi et al. |
| 4,727,505 A | 2/1988 | Konishi et al. |
| 4,876,660 A | 10/1989 | Owen et al. |
| 4,893,267 A | 1/1990 | Alsup et al. |
| 4,956,801 A | 9/1990 | Priem et al. |
| 4,969,118 A | 11/1990 | Montoye et al. |
| 4,975,868 A | 12/1990 | Freerksen |
| 5,032,865 A | 7/1991 | Schlunt |
| 5,157,388 A | 10/1992 | Kohn |
| 5,201,056 A | 4/1993 | Daniel et al. |
| 5,268,855 A | 12/1993 | Mason et al. |
| 5,268,995 A | 12/1993 | Diefendorff et al. |
| 5,408,581 A | 4/1995 | Suzuki et al. |
| 5,423,051 A | 6/1995 | Fuller et al. |
| 5,426,600 A | 6/1995 | Nakagawa et al. |
| 5,500,811 A | 3/1996 | Corry |
| 5,557,724 A | 9/1996 | Sampat et al. |
| 5,588,152 A | 12/1996 | Dapp et al. |

(List continued on next page.)

FOREIGN PATENT DOCUMENTS

| | | |
|---|---|---|
| EP | 0474246 A2 | 9/1991 |
| EP | 0654733 A1 | 7/1994 |

OTHER PUBLICATIONS

K. Diefendorff et al. "Organization of the Motorola 88110 Superscalar RISC Microprocessor" IEEE Micro. Apr. 1992. 40–63.

(List continued on next page.)

*Primary Examiner*—Matthew C. Bella
*Assistant Examiner*—Mackly Monestime
(74) *Attorney, Agent, or Firm*—McDermott, Will & Emery

(57) ABSTRACT

A programmable processor that comprises a general purpose processor architecture, capable of operation independent of another host processor, having a virtual memory addressing unit, an instruction path and a data path; an external interface; a cache operable to retain data communicated between the external interface and the data path; at least one register file configurable to receive and store data from the data path and to communicate the stored data to the data path; and a multi-precision execution unit coupled to the data path. The multi-precision execution unit is configurable to dynamically partition data received from the data path to account for an elemental width of the data and is capable of performing group floating-point operations on multiple operands in partitioned fields of operand registers and returning catenated results. In other embodiments the multi-precision execution unit is additionally configurable to execute group integer and/or group data handling operations.

30 Claims, 148 Drawing Sheets

U.S. PATENT DOCUMENTS

| | | |
|---|---|---|
| 5,592,405 A | 1/1997 | Gove et al. |
| 5,640,543 A | 6/1997 | Farrell et al. |
| 5,642,306 A | 6/1997 | Mennemeier et al. |
| 5,666,298 A | 9/1997 | Peleg et al. |
| 5,669,010 A | 9/1997 | Duluk, Jr. |
| 5,673,407 A | 9/1997 | Poland et al. |
| 5,675,526 A | 10/1997 | Peleg et al. |
| 5,680,338 A | 10/1997 | Agarwal et al. |
| 5,757,432 A | 5/1998 | Dulong et al. |
| 5,802,336 A | 9/1998 | Peleg et al. |
| 5,809,292 A | 9/1998 | Wilkinson et al. |
| 5,818,739 A | 10/1998 | Peleg et al. |
| 5,825,677 A | 10/1998 | Agarwal et al. |
| 5,835,782 A | 11/1998 | Lin et al. |
| 5,886,732 A | 3/1999 | Humpleman |
| 5,922,066 A | 7/1999 | Cho et al. |
| 5,983,257 A | 11/1999 | Dulong et al. |
| 6,016,538 A | 1/2000 | Guttag et al. |
| 6,092,094 A | 7/2000 | Ireton |
| 6,401,194 B1 | 6/2002 | Nguyen et al. |

OTHER PUBLICATIONS

L. Gwennap. "IBM Regains Performance Lead with Power2" Microprocessor Report. Oct. 4, 1993. vol. 7. No. 13. 1,6–10.

L. Gwennap. "IBM Creates Power PC Processors for AS/400" Microprocessor Report. Jul. 31, 1995. 15–16.

L. Kohn et al. "The Visual Instruction Set (VIS) in UltraSPARC" IEEE. 1995. 462–469.

D. Shaver. "A General–Purpose Array Processor for Seismic Processing" (Nov.–Dec. 1984). Jan.–Mar.1998. 15th Anniversary Issue. 5–26.

R. Lee. "Accelerating Multimedia with Enhanced Microprocessors" IEEE Micro. Apr. 1995. 22–32.

N. Margulis, "i860 Microprocessor Architecture" 1990. 8–10, 171–175, 182–183.

A. Levinthal et al. "Parallel Computers for Graphics Applications" 1987. 193–198.

☐ wmc.c contents
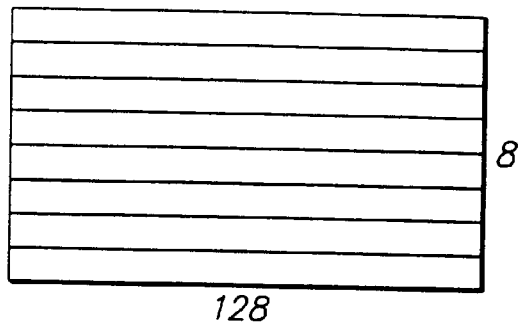
128　8
☐ wmc.pa-physical address
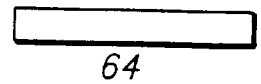
64
☐ wmc.size-size of contents
10
☐ wmc.cv-contents valid
1
☐ wmc.th-thread last used
2
☐ wmc.reg-register last used
6
☐ wmc.rtv-register & thread valid
1
*FIG. 9*

← 210

Operation codes

| W.SWITCH.B | Wide switch big-endian |
| W.SWITCH.L | Wide switch little-endian |

Selection

| class | op | order |
| Wide switch | W.SWITCH | B  L |

Format

W.op.order ra=rc,rd,rb ra=woporder(rc,rd,rb)

1250

Definition
defWideSwitch(op,rd,rc,rb,ra)
 d ← RegRead(rd, 128)
 c ← RegRead(rc, 64)
 b ← RegRead(rb, 128)
 if $c_{1..0} \neq 0$ then
  raise AccessDisallowedByVirtual Address
 elseif $c_{6..0} \neq 0$ then
  VirtAddr ← c and (c-1)
  w ← wsize ← (c and (0-c)) $\|$ $0^1$
 else
  VirAddr ← c
  w ← wsize ← 128
 endif
 msize ← 8*wsize
 lwsize ← log(wsize)
 case op of
  W.SWITCH.B:
   order ← B
  W.SWITCH.L:
   order ← L
 endcase
 m ← LoadMemory(c, VirtAddr,msize,order)
 db ← d $\|$ b
 for i ← 0 to 127
  j ← 0 $\|$ $i_{lwsize-1..0}$
  k ← $m_{7*w+j} \| m_{6*w+j} \| m_{5*w+j} \| m_{4*w+j} \| m_{3*w+j} \| m_{2*w+j} \| m_{w+j} \| m_j$
  l ← $i_{7..lwsize} \| j_{lwsize-1..0}$
  $a_i$ ← $db_l$
 endfor
 RegWrite(ra, 128, a)
enddef

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

Operation codes

| | |
|---|---|
| W.TRANSLATE.8.B | Wide translate bytes big-endian |
| W.TRANSLATE.16.B | Wide translate doublets bit-endian |
| W.TRANSLATE.32.B | Wide translate quadlets bit-endian |
| W.TRANSLATE.64.B | Wide translate octlets big-endian |
| W.TRANSLATE.8.L | Wide translate bytes little-endian |
| W.TRANSLATE.16.L | Wide translate doublets little-endian |
| W.TRANSLATE.32.L | Wide translate quadlets little-endian |
| W.TRANSLATE.64.L | Wide translate octlets little-endian |

Selection

| class | size | order |
|---|---|---|
| Wide translate | 8  16  32  64 | B  L |

Format

W.TRANSLATE.size.order rd=rc,rb rd=wtranslatesizeorder(rc,rb)

| 31 | 2434 | 1817 | 1211 | 65 | 21  0 |
|---|---|---|---|---|---|
| W.TRANSLATE.order | rd | rc | rb | 0 | sz |
| 6 | 6 | 6 | 6 | 4 | 2 | sz ← log(size) = 3

*FIG. 13A*

Definition

```
def Wide Translate(op,gsize,rd,rc,rb)
    c ← RegRead(rc, 64)
    b ← RegRead(rb, 128)
    lgsize ← log(gsize)
    if c_{lgsize-4..0} ≠ 0 then
        raise AccessDisallowedByVirtual Address
    endif
    if c_{4..lgsize-3} ≠ 0 then
        wsize ← (c and (0-c)) || 0³
        t ← c and (c-1)
    else
        wsize ← 128
        t ← c
    endif
    lwsize ← log(wsize)
    if t_{lwsize+4..lwsize-2} ≠ 0 then
        msize ← (t and (0-t)) || 0⁴
        VirtAddr ← t and (t-1)
    else
        msize ← 256*wsize
        VirtAddr ← t
    endif
    case op of
        W.TRANSLATE.B:
            order ← B
        W.TRANSLATE.L:
            order ← L
    endcase
    m ← LoadMemory(c,VirtAddr,msize,order)
    vsize ← msize/wsize
    lvsize ← log(vsize)
    for i ← 0 to 128-gsize by gsize
        j ← ((order=B)^{lvsize})^(b_{lvsize-1+i..i}))*wsize+i_{lwsize-1..0}
        a_{gsize-1+i..i} ← m_{j+gsize-1..j}
    endfor
    RegWrite(rd, 128, a)
enddef
```

FIG. 13C

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

*FIG. 13D*

Operation codes

— 1410

| W.MUL.MAT.8.B | Wide multiply matrix signed byte big-endian |
|---|---|
| W.MUL.MAT.8.L | Wide multiply matrix signed byte little-endian |
| W.MUL.MAT.16.B | Wide multiply matrix signed doublet big-endian |
| W.MUL.MAT.16.L | Wide multiply matrix signed doublet little-endian |
| W.MUL.MAT.32.B | Wide multiply matrix signed quadlet big-endian |
| W.MUL.MAT.32.L | Wide multiply matrix signed quadlet little-endian |
| W.MUL.MAT.C.8.B | Wide multiply matrix signed complex byte big-endian |
| W.MUL.MAT.C.8.L | Wide multiply matrix signed complex byte little-endian |
| W.MUL.MAT.C.16.B | Wide multiply matrix signed complex doublet big-endian |
| W.MUL.MAT.C.16.L | Wide multiply matrix signed complex doublet little-endian |
| W.MUL.MAT.M.8.B | Wide multiply matrix mixed-signed byte big-endian |
| W.MUL.MAT.M.8.L | Wide multiply matrix mixed-signed byte little-endian |
| W.MUL.MAT.M.16.B | Wide multiply matrix mixed-signed doublet big-endian |
| W.MUL.MAT.M.16.L | Wide multiply matrix mixed-signed doublet little-endian |
| W.MUL.MAT.M.32.B | Wide multiply matrix mixed-signed quadlet big-endian |
| W.MUL.MAT.M.32.L | Wide multiply matrix mixed-signed quadlet little-endian |
| W.MUL.MAT.P.8.B | Wide multiply matrix polynomial byte big-endian |
| W.MUL.MAT.P.8.L | Wide multiply matrix polynomial byte little-endian |
| W.MUL.MAT.P.16.B | Wide multtply matrix polynomial doublet big-endian |
| W.MUL.MAT.P.16.L | Wide multiply matrix polynomial doublet little-endian |
| W.MUL.MAT.P.32.B | Wide multiply matrix polynomial quadlet big-endian |
| W.MUL.MAT.P.32.L | Wide multiply matrix polynomial quadlet little-endian |
| W.MUL.MAT.U.8.B | Wide multiply matrix unsigned byte big-endian |
| W.MUL.MAT.U.8.L | Wide multiply matrix unsigned byte little-endian |
| W.MUL.MAT.U.16.B | Wide multiply matrix unsigned doublet big-endian |
| W.MUL.MAT.U.16.L | Wide multiply matrix unsigned doublet little-endian |
| W.MUL.MAT.U.32.B | Wide multiply matrix unsigned quadlet big-endian |
| W.MUL.MAT.U.32.L | Wide multiply matrix unsigned quadlet little-endian |

Selection

| class | op | type | size | order |
|---|---|---|---|---|
| multiply | W.MUL.MAT | NONE MUP | 8  16  32 | B |
|  |  |  |  | L |
|  |  | C | 8  16 | B |
|  |  |  |  | L |

Format

W.op.size.order rd=rc,rb rd=wopsizeorder(rc,rb)

| 31 | 2423 | 1817 | 1211 | 65 | 21 | 0 |
|---|---|---|---|---|---|---|
| W.MINOR.order | rd | rc | rb | W.op | sz | |
| 8 | 6 | 6 | 6 | 4 | 2 | | sz ← log(size) - 3

FIG. 14A

Definition

1480

```
def mul(size,h,vs,v,i,ws,j) as
    mul ← ((vs&v_{size-1+i})^{h-size} ‖ v_{size-1+i..i}) * ((ws&w_{size-1+j})^{h-size} ‖ w_{size-1+j..j})
enddef def c ← PolyMultiply(size,a,b) as
    p[0] ← 0^{2*size}
    for k ← 0 to size-1
        p[k+1] ← p[k] ^ a_k ? (0^{size-k} ‖ b ‖ 0^k) : 0^{2*size}
    endfor
    c ← p[size]
enddef def WideMultiplyMatrix(major,op,gsize,rd,rc,rb)
    d ← RegRead(rd, 128)
    c ← RegRead(rc, 64)
    b ← RegRead(rb, 128)
    lgsize ← log(gsize)
    if c_{lgsize-4..0} ≠ 0 then
        raise AccessDisallowedByVirtualAddress
    endif
    if c_{2..lgsize-3} ≠ 0 then
        wsize ← (c and (0-c)) ‖ 0^4
        t ← c and (c-1)
    else
        wsize ← 64
        t ← a
    endif
    lwsize ← log(wsize)
    if t_{lwsize+6-lgsize..lwsize-3} ≠ 0 then
        msize ← (t and (0-t)) ‖ 0^4
        VirtAddr ← t and (t-1)
    else
        msize ← 128*wsize/gsize
        VirtAddr ← t
    endif
    case major of
        W.MINOR.B:
            order ← B
        W.MINOR.L:
            order ← L
    endcase
```

FIG. 14D-1

```
case op of
    M.MUL.MAT.U.8, W.MUL.MAT.U.16, W.MUL.MAT.U.32,
    W.MUL.MAT.U.64:
        ms ← bs ← 0
    W.MUL.MAT.M.8, W.MUL.MAT.M.16, W.MUL.MAT.M.32,
    W.MUL.MAT.M.64
        ms ← 0
        bs ← 1
    W.MUL.MAT.8, W.MUL.MAT.16, W.MUL.MAT.32,
    W.MUL.MAT.64, W.MUL.MAT.C.8, W.MUL.MAT.C.16,
    W.MUL.MAT.C.32, W.MUL.MAT.C.64:
        ms ← bs ← 1
    W.MUL.MAT.P.8, W.MUL.MAT.P.16, W.MUL.MAT.P.32,
    W.MUL.MAT.P.64:
endcase
m ← LoadMemory(c,VirtAddr,msize,order)
h ← 2*gsize for i ← 0 to wsize-gsize by gsize
    q[0] ← 0^(2*gsize)
    for j ← 0 to vsize-gsize by gsize
        case op of
            W.MUL.MAT.P.8, W.MUL.MAT.P.16,
            W.MUL.MAT.P.32, W.MUL.MAT.P.64:
                k ← i+wsize*j_{8..lgsize}
                q[j+gsize] ← q[j] ^ PolyMultiply(gsize,m_{k+gsize-1..k},
                             b_{j+gsize-1..j})
            W.MUL.MAT.C.8, W.MUL.MAT.C.16, W.MUL.MAT.C.32,
            W.MUL.MAT.C.64:
                if (~i) & gsize = 0 then
                    k ← i-(j&gsize)+wsize*j_{8..lgsize+1}
                    q[j+gsize] ← q[i] + mul(gsize,h,ms,m,k,bs,b,j)
                else
                    k ← i+gsize+wsize*j_{8..lgsize+1}
                    q[i+gsize] ← q[i] = mul(gsize,h,ms,m,k,bs,b,j)
                endif
```

*FIG. 14D-2*

W.MUL.MAT.8, W.MUL.MAT.16, W.MUL.MAT.32,
W.MUL.MAT.64, W.MUL.MAT.M.8, W.MUL.MAT.M.16,
W.MUL.MAT.M.32, W.MUL.MAT.M.64, W.MUL.MAT.U.8,
W.MUL.MAT.U.16, W.MUL.MAT.U.32, W.MUL.MAT.U.64
$$q[i+gsize] \leftarrow q[i] + mul(gsize, h, ms, m, i+wsize*$$
$$j_{8..lgsize}, bs, b, j)$$
endfor
$$a_{2*gsize-1+2*i..2*i} \leftarrow q[vsize]$$
endfor
$$a_{127..2*wsize} \leftarrow 0$$
RegWrite(rd, 128, a)
enddef

FIG. 14D-3

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

Operation codes

| W.MUL.MAT.X.B | Wide multiply matrix extract big-endian |
| --- | --- |
| W.MUL.MAT.X.L | Wide multiply matrix extract little-indian |

Selection

| class | op | order |
| --- | --- | --- |
| Multiply matrix extract | W.MUL.MAT.X | B    L |

Format

W.op.order ra=rc,rd,rb ra=wop(rc,rd,rb)

| 31 | 2423 | | 161514131211109 8 | | 0 |
|---|---|---|---|---|---|
| fsize | dpos | x | s | n | m | l | rnd | gssp |
| 8 | 8 | 1 1 1 1 1 2 | 9 |

Definition     1580
def mul(size,h,vs,v,i,ws,w,j) as
      mul ← $((vs \& v_{size-1+i})^{h-size} || v_{size-1+i..i}) * ((ws \& w_{size-1+j})^{h-size} || w_{size-1+j..j})$
enddef def WideMultiplyMatrixExtract(op,ra,rb,rc,rd)
      d ← RegRead(rd, 128)
      c ← RegRead(rc, 64)
      b ← RegRead(rb, 128)
      case $b_{8..0}$ of
          0..255:
              sgsize ← 128
          256..383:
              sgsize ← 64
          384..447:
              sgsize ← 32
          448..479:
              sgsize ← 16
          480..495:
              sgsize ← 8
          496..503:
              sgsize ← 4
          504..507:
              sgsize ← 2
          508..511:
              sgsize ← 1
      endcase
      l ← $b_{11}$
      m ← $b_{12}$
      n ← $b_{13}$
      signed ← $b_{14}$
      if $c_{3..0}$ ≠ 0 then
          wsize ← (c and (0-c)) || $0^4$
          t ← c and (c-1)
      else
          wsize ← 128
          t ← c
      endif
      if sgsize < 8 then
          gsize ← 8
      elseif sgsize > wsize/2 then
          gsize ← wsize/2
      else

*FIG. 15E-1*

```
        gsize ← sgsize
endif
lgsize ← log(gsize)
lwsize ← log(wsize)
if t_{lwsize+6-n-lgsize..lwsize-3} ≠ 0 then
        msize ← (t and (0-t)) || 0^4
        VirtAddr ← t and (t-1)
else
        msize ← 64*(2-n)*wsize/gsize
        VirtAddr ← t
endif
vsize ← (1+n)*msize*gsize/wsize
mm ← LoadMemory(c,VirtAddr,msize,order)
lmsize ← log(msize)
if (VirtAddr_{lmsize-4..0} ≠ 0 then
        raise AccessDisallowedByVirtualAddress
endif
case op of
        W.MUL.MAT.X.B:
                order ← B
        W.MUL.MAT.X.L:
                order ← L
endcase
ms ← signed
ds ← signed ^ m
as ← signed or m
spos ← (b_{8..0}) and (2*gsize-1)
dpos ← (0 || b_{23..16}) and (gsize-1)
r ← spos
sfsize ← (0 || b_{31..24}) and (gsize-1)
tfsize ← (sfsize = 0) or ((sfsize+dpos) > gsize) ? gsize-dpos : sfsize
fsize ← (tfsize + spos > h) ? h - spos : tfsize
if (b_{10..9} = Z) & ~signed then
        rnd ← F
else
        rnd ← b_{10..9}
endif
```

```
for i ← 0 to wsize-gsize by gsize
    q[0] ← 0^(2*gsize+7-lgsize)
    for j ← 0 to vsize-gsize by gsize
        if n then
            if (~) & j & gsize = 0 then
                k ← i-(j&gsize)+wsize*j_{8..lgsize+1}
                q[i+gsize] ← q[i] + mul(gsize,h,ms,mm,k,ds,d,j)
            else
                k ← i+gsize+wsize*j_{8..lgsize+1}
                q[i+gsize] ← q[i] - mul(gsize,h,ms,mm,k,ds,d,j)
            endif
        else
            q[i+gsize] ← q[i] = mul(gsize,h,ms,mm,i+j*wsize/gsize,ds,d,j)
        endif
    endfor
    p ← q[128]
    case rnd of
        none, N:
            s ← 0^{h-r} || ~p_r || p_r^{r-1}
        Z:
            s ← 0^{h-r} || p_{h-1}^r
        F:
            s ← 0^h
        C:
            s ← 0^{h-r} || 1^r
    endcase
    v ← ((ds & p^{h-1}) || p) + (0 || s)

if (v_{h..r+fsize} = (as & v_{r+fsize-1})^{h+1-r-fsize}) or not I then
        w ← (as & v_{r+fsize-1})^{gsize-fsize-dpos} || v_{fsize-1+r..r} || 0^{dpos}
    else
        w ← (s ? (v_h || ~v_h^{gsize-dpos-1}) : 1^{gsize-dpos}) || 0^{dpos}
    endif
    a_{size-1+i..i} ← w
endfor
a_{127..wsize} ← 0
RegWrite(ra, 128, a)
enddef
```

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

Operation codes

| | |
|---|---|
| W.MUL.MAT.X.I.8.B | Wide multiply matrix extract immediate signed byte big-endian |
| W.MUL.MAT.X.I.8.L | Wide multiply matrix extract immediate signed byte little-endian |
| W.MUL.MAT.X.I.16.B | Wide multiply matrix extract immediate signed doublet big-endian |
| W.MUL.MAT.X.I.16.L | Wide multiply matrix extract immediate signed doublet little-endian |
| W.MUL.MAT.X.I.32.B | Wide multiply matrix extract immediate signed quadlet big-endian |
| W.MUL.MAT.X.I.32.L | Wide multiply matrix extract immediate signed quadlet little-endian |
| W.MUL.MAT.X.I.64.B | Wide multiply matrix extract immediate signed octlets big-endian |
| W.MUL.MAT.X.I.64.L | Wide multiply matrix extract immediate signed octlets little-endian |
| W.MUL.MAT.X.I.C.8.B | Wide multiply matrix extract immediate complex bytes big-endian |
| W.MUL.MAT.X.I.C.8.L | Wide multiply matrix extract immediate complex bytes little-endian |
| W.MUL.MAT.X.I.C.16.B | Wide multiply matrix extract immediate complex doublets big-endian |
| W.MUL.MAT.X.I.C.16.L | Wide multiply matrix extract immediate complex doublets little-endian |
| W.MUL.MAT.X.I.C.32.B | Wide multiply matrix extract immediate complex quadlets big-endian |
| W.MUL.MAT.X.I.C.32.L | Wide multiply matrix extract immediate complex quadlets little-endian |

Selection

| class | op | type | size | order |
|---|---|---|---|---|
| wide multiply extract immediate | W.MUL.MAT.X.I | NONE | 8 16 32 64 | L B |
| | | C | 8 16 32 | L B |

Format

W.op.tsize.order rd=rc,rb, i
rd=woptsizeorder(rc,rb,i)

| 31 | 24 23 | 18 17 | 12 11 | 6 5 4 | 3 2 | 0 |
|---|---|---|---|---|---|---|
| W.op.order | rd | rc | rb | t | sz | sh |
| 8 | 6 | 6 | 6 | 1 | 2 | 3 | sz ← log(size) - 3
assert size+3 ≥ i ≥ size-4
sh ← i - size

*FIG. 16A*

Wide multiply matrix extract immediate complex doublets

Definition

1680 def mul(size,h,vs,v,i,ws,w,j) as
    mul ← ((vs&$v_{size-1+i}$)$^{h-size}$ || $v_{size-1+i..i}$) * ((ws&$w_{size-1+j}$)$^{h-size}$ || $w_{size-1+j..j}$ )
enddef def WideMultiplyMatrixExtractimmediate(op,type,gsize,rd,rc,rb,sh)
    c ← RegRead(rc, 64)
    b ← RegRead(rb, 128)
    lgsize ← log(gsize)
    case type of
        NONE:
            if $c_{lgsize-4..0}$ ≠ 0 then
                raise AccessDisallowedBy VirtualAddress
            endif
            if $c_{3..lgsize-3}$ ≠ 0 then
                wsize ← (c and (0-c)) || $0^4$
                t ← c and (c-1)
            else
                wsize ← 128
                t ← c
            endif
            lwsize ← log(wsize)
            if $t_{lwsize+6-lgsize..lwsize-3}$ ≠ 0 then
                msize ← (t and (0-t)) || $0^4$
                VirtAddr ← t and (t-1)
            else
                msize ← 128*wsize/gsize
                VirtAddr ← t
        C:
            if $c_{lgsize-4..0}$ ≠ 0 then
                raise AccessDisallowedByVirtualAddress
            endif
            if $c_{3..lgsize-3}$ ≠ 0 then
                wsize ← (c and (0-c)) || $0^4$
                t ← c and (c-1)
            else
                wsize ← 128
                t ← c
            endif
            lwsize ← log(wsize)
            if $t_{lwsize+5-lgsize..lwsize-3}$ ≠ 0 then
                msize ← (t and (0-t)) || $0^4$

*FIG. 16D-1*

```
                    VirtAddr ← t and (t-1)                    ⟵ 1680
            else
                    msize ← 64*wsize/gsize
                    VirtAddr ← t
            endif
            vsize ← 2*msize*gsize/wsize
    endcase
    case of of
        W.MUL.MAT.X.I.B:
            order ← B
        W.MUL.MAT.X.I.L:
            order ← L
    endcase
    as ← ms ← bs ← 1
    m ← LoadMemory(c,VirtAddr,msize,order)
    h ← (2*gsize) + 7 - lgsize-(ms and bs)
    r ← gsize + (sh₂⁵||sh)
    for ← 0 to wsize-gsize by gsize
        q[0] ← 0²*gsize+7-lgsize
        for j ← 0 to vsize-gsize by gsize
            case type of
                NONE:
                    q[j+gsize] ← q[i] + mul(gsize,h,ms,m,i+wsize*
                                j₈..lgsize,bs,b,j)
                C:
                    if (~i) & j & gsize = 0 then
                        k ← i-(j&gsize)+wsize*j₈..lgsize+1
                        q[j+gsize] ← q[i] + mul(gsize,h,ms,m,k,bs,b,j)
                    else
                        k ← i+gsize+wsize*j₈..lgsize+1
                        q[j+gsize] ← q[j] - mul(gsize,h,ms,m,k,bs,b,j)
                    endif
            endcase
        endfor
        p ← q[vsize]
        s ← 0^(h-r) || ~p_r || p_r^(r-1)
        v ← ((as & p_{h-1})||p) + (0||s)
        if (v_{h..r+gsize} = (as & v_{r+gsize-1})^{h+1-r-gsize} then
            a_{gsize-1+i..i} ← v_{gsize-1+r..r}
        else
            a_{gsize-1+i..i} ← as ? (v_h||~v_h^{gsize-1}) : 1gsize
        endif
    endfor
    a_{127..wsize} ← 0
    RegWrite(rd, 128, a)
enddef
```

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

*FIG. 16E*

Operation codes

| | |
|---|---|
| W.MUL.MAT.C.F.16.B | Wide multiply matrix complex floating-point half big-endian |
| W.MUL.MAT.C.F.16.L | Wide multiply matrix complex floating-point little-endian |
| W.MUL.MAT.C.F.32.B | Wide multiply matrix complex floating-point single big-endian |
| W.MUL.MAT.C.F.32.L | Wide multiply matrix complex floating-point single little-endian |
| W.MUL.MAT.F.16.B | Wide multiply matrix floating-point half big-endian |
| W.MUL.MAT.F.16.L | Wide multiply matrix floating-point half little-endian |
| W.MUL.MAT.F.32.B | Wide multiply matrix floating-point single big-endian |
| W.MUL.MAT.F.32.L | Wide multiply matrix floating-point single little-endian |
| W.MUL.MAT.F.64.B | Wide multiply matrix floating-point double big-endian |
| W.MUL.MAT.F.64.L | Wide multiply matrix floating-point double little-endian |

Selection

| class | op | type | prec | order |
|---|---|---|---|---|
| wide multiply matrix | W.MUL.MAT | F | 16 32 64 | L B |
| | | C.F | 16 32 | L B |

Format

W.op.prec.order rd=rc,rb rd=wopprecorder(rc,rb)

| 31 | 24 23 | 18 17 | 12 11 | 6 5 | 2 1 0 |
|---|---|---|---|---|---|
| W.MINOR.order | rd | rc | rb | W.op | pr |
| 8 | 6 | 6 | 6 | 4 | 2 |

Pr ← log(prec) - 3

*FIG. 17A*

Definition

1780 def mul(size,v,i,w,j) as
    mul ← fmul(F(size,$v_{size-1+i..i}$),F(size,$w_{size-1+j..j}$))
enddef def WideMultiplyMatrixFloatingPoint(major,op,gsize,rd,rc,rb)
    c ← RegRead(rc, 64)
    b ← RegRead(rb, 128)
    lgsize ← log(gsize)
    switch op of
        W.MUL.MAT.F.16, W.MUL.MAT.F.32, W.MUL.MAT.F.64:
            if $c_{lgsize-4..0}$ ≠ 0 then
                raise AccessDisallowedByVirtualAddress
            endif
            if $c_{3..lgsize-3}$ ≠ 0 then
                wsize ← (c and (0-c)) || $0^4$
                t ← c and (c-1)
            else
                wsize ← 128
                t ← c
            endif
            lwsize ← log(wsize)
            if $t_{lwsize+6-lgsize..lwsize-3}$ ≠ 0 then
                msize ← (t and (0-t)) || $0^4$
                VirtAddr ← t and (t-1)
            else
                msize ← 128*wsize/gsize
                VirtAddr ← t
            endif
            vsize ← msize*gsize/wsize
        W.MUL.MAT.C.F.16, W.MUL.MAT.C.F.32, W.MUL.MAT.C.F.64:
            if $c_{lgsize-4..0}$ ≠ 0 then
                raise AccessDisallowedByVirtualAddress
            endif
            if $c_{3..lgsize-3}$ ≠ 0 then
                wsize ← (c and (0-c)) || $0^4$
                t ← c and (c-1)
            else
                wsize ← 128
                t ← c
            endif
            lwsize ← log(wsize)
            if $t_{lwsize+5-lgsize..lwsize-3}$ ≠ 0 then

FIG. 17D-1

```
                    msize ← (t and (0-t))|| 0⁴                          ╱─1780
                    VirtAddr ← t and (t-1)
                else
                    msize ← 64*wsize/gsize
                    VirtAddr ← t
                endif
                vsize ← 2*msize*gsize/wsize
        endcase
        case major of
            M.MINOR.B:
                order ← B
            M.MINOR.L:
                order ← L
        endcase
        m ← LoadMemory(c,VirtAddr,msize,order)
        for i ← 0 to wsize-gsize by gsize
            q[0].t ← NULL
            for j ← 0 to vsize-gsize by gsize
                case op of
                    W.MUL.MAT.F.16, W.MUL.MAT.F.32, W.MUL.MAT.F.64:
                        q[j+gsize] ← faddq[j], mul(gsize,m,i+wsize*
                            j₈..lgsize+1,b,j))
                    W.MUL.MAT.C.F.16, W.MUL.MAT.C.F.32,
                    W.MUL.MAT.C.F.64:
                        if (~i) & j & gsize = 0 then
                            k ← i-(j&gsize)+wsize*j₈..lgsize+1
                            q[j+gsize] ← faqq[j], mul(gsize,m,k,b,j))
                        else
                            k ← i+gsize+wsize*j₈..lgsize+1
                            q[j+gsize] ← fsubq[j], mul(gsize,m,k,b,j))
                        endif
                endcase
            endfor
            a_{gsize-1+i..i} ← q[vsize]
        endfor
        a_{127..wsize} ← 0
        RegWrite(rd, 128, a)
enddef
```

*FIG. 17D-2*

Exceptions

Floating-point arithmetic
Access disallowed by virtual address
Access disallowed by tag
Access disallowed by global TB
Access disallowed by local TB
Access detail required by tag
Access detail required by local TB
Access detail required by global TB
Local TB miss
Global TB miss

*FIG. 17E*

Operation codes

| W.MUL.MAT.G.8.B | Wide multiply matrix Galois bytes big-endian |
|---|---|
| W.MUL.MAT.G.8.L | Wide multiply matrix Galois bytes little-endian |

Selection

| class | op | size | order |
|---|---|---|---|
| Multiply matrix Galois | W.MUL.MAT.G | 8 | B   L |

Format

W.op.order ra=rc,rd,rb ra=woporder(rc,rd,rb)

| 31 | 24 | 23 | 18 | 17 | 12 | 11 | 6 | 5 | 0 |
|---|---|---|---|---|---|---|---|---|---|
| W.op.order | | rd | | rc | | rb | | ra | |
| 8 | | 6 | | 6 | | 6 | | 6 | |

FIG. 18A

Definition
```
def c ← PolyMultiply(size,a,b) as
    p[0] ← 0^(2*size)
    for k ← 0 to size-1
        p[k+1] ← p[k] ^ a_k ? (0^(size-k) || b || 0^k) : 0^(2*size)
    endfor
    c ← p[size]
enddef def c ← PolyResidue(size,a,b) as
    p[0] ← a
    for k ← size-1 to 0 by -1
        p[k-1] ← p[k] ^ p[0]_(size+k) ?(0^(size-k) || 1^1 || b || 0^k) : 0^(2*size)
    endfor
    c ← p[size]_(size-1..0)
enddef def WideMultiplyMatrixGalois(op,gsize,rd,rc,rb,ra)
    d ← RegRead(rd, 128)
    c ← RegRead(rc, 64)
    b ← RegRead(rb, 128)
    lgsize ← log(gsize)
    if c_(lgsize-4..0) ≠ 0 then
        raise AccessDisallowedByVirtualAddress
    endif
    if c_(3..lgsize-3) ≠ 0 then
        wsize ← (c and (0-c)) || 0^4
        t ← c and (c-1)
    else
        wsize ← 128
        t ← c
    endif
    lwsize ← log(wsize)
    if t_(lwsize+6-lgsize..lwsize-3) ≠ 0 then
        msize ← (t and (0-t)) || 0^4
        VirtAddr ← t and (t-1)
    else
        msize ← 128*wsize/gsize
        VirtAddr ← t
    endif
    case op of
        W.MUL.MAT.G.8.B:
            order ← B
        W.MUL.MAT.G.8.L:
            order ← L
    endcase
```

```
m ← LoadMemory(c, VirtAddr,msize,order)
for i ← 0 wsize-gsize by gsize
     q[0] ← 0^(2*gsize)
     for j ← 0 to vsize-gsize by gsize
          k ← i+wsize*j_{8..lgsize}
          q[j+gsize] ← q[j] ^ PolyMultiply(gsize,m_{k+gsize-1..k} ,d_{j+gsize-1..j} )
     endfor a_{gsize-1+i..i} ← PolyResidue(gsize,q[vsize],b_{gsize-1..0} )
endfor
a_{127..wsize} ← 0
RegWrite(ra,128, a)
enddef
```

Exceptions

Access disallowed by virtual address
Access disallowed by tag
Access disallowed by global TB
Access disallowed by local TB
Access detail required by tag
Access detail required by local TB
Access detail required by global TB
Local TB miss
Global TB miss

*FIG. 18D*

Operation codes

| E.MUL.ADD.X | Ensemble multiply add extract |
|---|---|
| E.CON.X | Ensemble convolve extract |

Format

E.op rd@rc,rb,ra rd=gop(rd,rc,rb,ra)

Figures 19B and 20B has blank fields: should be.

| fsize | dpos | x | s | n | m | l | rnd | gssp |
|---|---|---|---|---|---|---|---|---|

*FIG. 19B*

Ensemble complex multiply add extract doublets

This ensemble-multiply-add-extract instructions (E.MUL.ADD.X), when the x bit is set, multiply the low-order 64 bits of each of the rc and rb registers and produce extended (double-size) results.

Definition

```
def mul(size,h,vs,v,i,ws,w,j) as
    mul ← ((vs&v_{size-1+i})^{h-size} || v_{size-1+i..i}) * ((ws&w_{size-1+j})^{h-size} || w_{size-1+j..j})
enddef def EnsembleExtractInplace(op,ra,rb,rc,rd) as
    d ← RegRead(rd, 128)
    c ← RegRead(rc, 128)
    b ← RegRead(rb, 128)
    case b_{8..0} of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← a_{11}
    m ← a_{12}
    n ← a_{13}
    signed ← a_{14}
    x ← a_{15}
    case op of
        E.CON.X:
            if (sgsize < 8) then
                gsize ← 8
            elseif (sgsize*(n-1)*(x+1) > 128) then
                gsize ← 128/(n-1)/(x+1)
            else
                gsize ← sgsize
            endif
            lgsize ← log(gsize)
            wsize ← 128/(x+1)
```

```
        vsize ← 128                                    ⎯1990
        ds ← cs ← signed
        bs ← signed ^ m
        zs ← signed or m or n
        zsize ← gsize*(x+1)
        h ← (2*gsize) + log(vsize) - lgsize
        spos ← ($a_{8..0}$) and (2*gsize-1)

E.MUL.ADD.X:
    if(sgsize < 9) then
        gsize ← 8
    elseif (sgsize*(n+1)*(x+1) > 128) then
        gsize ← 128/(n+1)/(x+1)
    else
        gsize ← sgsize
    endif
    ds ← signed
    cs ← signed ^ m
    zs ← signed or m or n
    zsize ← gsize*(x+1)
    h ← (2*gsize) + n
    spos ← ($a_{8..0}$) and (2*gssize-1)
endcase
dpos ← (0|| $a_{23..16}$) and (zsize-1)
r ← spos
sfsize ← (0|| $a_{31..24}$) and (zsize-1)
tfsize ← (sfsize = 0) or ((sfsize+dpos) > zsize) ? zsize-dpos : sfsize
fsize ← (tfsize + spos > h) ? h - spos : tfsize
if ($b_{10..9}$ = Z) and not as then
    rnd ← F
else
    rnd ← $b_{10..9}$
endif
```

```
for k ← 0 to wsize-zsize by zsize
    i ← k*gsize/zsize
    case op of
        E.CON.X:
            q[0] ← 0
            for j ← 0 to vsize-gsize by gsize
                if n then
                    if(~) & j & gsize = 0 then
                        q[j+gsize] ← q[j] + mul(gsize,h,ms,m,i+
                            128-j,bs,b,j)
                    else
                        q[j+gsize] ← q[j] - mul(gsize,h,ms,i+
                            128-j+2*gsize,bs,b,j)
                    endif
                else
                    q[j+gsize] ← q[j] + mul(gsize,h,ms,m,i+
                        128-j,bs,b,j)
                endif
            endfor
            p ← q[vsize]
        E.MUL.ADD.X:
```

$di \leftarrow ((ds \text{ and } d_{k+zize-1})^{h-zsize-r} \| (d_{k+zsize-1..k}) \| 0^r)$

```
            if n then
                if ( i and gsize) = 0 then
                    p ← mul(gsize,h,ds,d,i,cs,c,i)-
mul(gsize,h,ds,d,i+gsize,cs,c,i+gsize)+di
                else
``` p ← mul(gsize,h,ds,d,i,cs,c,i+gsize)+mul(gsize,h,ds,d,i,cs,c,i+gsize)+di

```
                endif
            else
                p ← mul(gsize,h,ds,d,i,cs,c,i) + di
            endif
    endcase
```

```
case rnd of
    N:
        s ← 0^(h-r) || ~p_r || p_r^(r-1)
    Z:
        s ← 0^(h-r) || p_(h-1)^r
    F:
        s ← 0^h
    C:
        s ← 0^(h-r) || 1^r
endcase
v ← ((zs & p_(h-1)) || p) + (0 || s)
if (v_(h..r+fsize) = (zs & v_(r+fsize-1))^(h+1-r-fsize)) or not (I and (op = EXTRACT)) then
    w ← (zs & v_(r+fsize-1))^(zsize-fsize-dpos) || v_(fsize-1+r..r) || 0^dpos
else
    w ← (zs ? (v_h || ~v_h^(zsize-dpos-1)) : 1^(zsize-dpos)) || 0^dpos
endif
z_(zsize-1_k..k) ← w
endfor
RegWrite(rd, 128, z)
enddef
```

FIG. 19G-4

Operation codes

| E.MUL.X | Ensemble multiply extract |
|---|---|
| E.EXTRACT | Ensemble extract |
| E.SCAL.ADD.X | Ensemble scale and extract |

Format

E.op ra=rd,rc,rb ra=eop(rd,rc,rb)

Figures 19B and 20B has blank fields: should be.

| fsize | dpos | x | s | n | m | l | rnd | gssp |

Ensemble complex multiply extract doublets

This ensemble-multiply-extract instructions (E.MUL.X), when the x bit is set, multiply the low-order 64 bits of each of the rc and rb registers and produce extended (double-size) results.

Ensemble complex scale add extract doublets

The ensemble-scale-add-extract instructions (E.SCLADD.X), when the x bit is set, multiply the low-order 64 bits of each of the rd and re registers by the rb register fields and produce extended (double-size) results.

Ensemble expand extract

Definition 2090 def mul(size,h,vs,v,i,ws,w,j) as
    mul ← $((vs\&v_{size-1+i})^{h-size} || v_{size-1+i..i}) * ((ws\&w_{size-1+j})^{h-size} || w_{size-1+j..j})$
enddef def EnsembleExtract(op,ra,rb,rc,rd) as
    d ← RegRead(rd, 128)
    c ← RegRead(rc, 128)
    b ← RegRead(rb, 128)
    case $b_{8..0}$ of
        0..255:
            sgsize ← 128
        256..383:
            sgsize ← 64
        384..447:
            sgsize ← 32
        448..479:
            sgsize ← 16
        480..495:
            sgsize ← 8
        496..503:
            sgsize ← 4
        504..507:
            sgsize ← 2
        508..511:
            sgsize ← 1
    endcase
    l ← $b_{11}$
    m ← $b_{12}$
    n ← $b_{13}$
    signed ← $b_{14}$
    x ← $b_{15}$
    case op of
        E.EXTRACT:
            gsize ← sgsize*2(2-(m or x))
            zsize ← sgsize
            h ← gsize
            as ← signed
            spos ← ($b_{8..0}$) and (gsize-1)

FIG. 20J-1

E.SCAL.ADD.X:  ╱—2090
    if (sgsize < 8) then
        gsize ← 8
    elseif (sgsize*(n+1) > 32) then
        gsize ← 32/(n+1)
    else
        gsize ← sgsize
    endif
    ds ← cs ← signed
    bs ← signed ^ m
    as ← signed or m or n
    zsize ← gsize*(x+1)
    h ← (2*gsize) + 1 + n
    spos ← ($b_{8..0}$) and (2*gsize-1)
E.MUL.X:
    if (sgsize < 8) then
        gsize ← 8
    elseif (sgsize*(n+1)*(x+1) > 128) then
        gsize ← 128/(n+1)/(x+1)
    else
        gsize ← sgsize
    endif
    ds ← signed
    cs ← signed ^ m
    as ← signed or m or n
    zsize ← gsize*(x+1)
    h ← (2*gsize) + n
    spos ← ($b_{8..0}$) and (2*gsize-1)
endcase
dpos ← (0|| $b_{23..16}$) and (zsize-1)
r ← spos
sfsize ← (0|| $b_{31..24}$) and (zsize-1)
tfsize ← (sfsize =0) or ((sfsize+dpos) > zsize) ? zsize-dpos : sfsize
fsize ← (tfsize + spos > h) ? h - spos : tfsize
if ($b_{10..9}$=Z) and not as then
    rnd ← F
else
    rnd ← b
endif

FIG. 20J-2

```
for j ← 0 to 128-zsize by zsize                           ← 2090
    i ← j*gsize/zsize
    case op of
        E.EXTRACT:
            if m or x then
                p ← d<sub>gsize+i-1..i</sub>
```
$p \leftarrow d_{gsize+i-1..i}$
```
            else
                p ← (d || c)gsize+i-1..i
            endif
        E.MUL.X:
            if n then
                if (i and gsize) = 0 then
                    p ← mul(gsize,h,ds,d,i,cs,c,i)-
mul(gsize,h,ds,d,i+gsize,cs,c,i+gsize)
                else
                    p ←
mul(gsize,h,ds,d,i,cs,c,i+gsize)+mul(gsize,h,ds,d,i,cs,c,i+gsize)
                endif
            else
                p ← mul(gsize,h,ds,d,i,cs,c,i)
            endif
        E.SCAL.ADD.X:
            if n then
                if (i and gsize) = 0 then
                    p ← mul(gsize,h,ds,d,i,bs,b,64+2*gsize)
                        + mul(gsize,h,cs,c,i,bs,b,64)
                        - mul(gsize,h,ds,d,i+gsize,bs,b,64+3*gsize)
                        - mul(gsize,h,cs,c,i+gsize,bs,b,64+gsize)
                else
                    p ← mul(gsize,h,ds,d,i,bs,b,64+3*gsize)
                        + mul(gsize,h,cs,c,i,bs,b,64+gsize)
                        + mul(gsize,h,ds,d,i+gsize,bs,b,64+2*gsize)
                        + mul(gsize,h,cs,c,i+gsize,bs,b,64)
                endif
            else
                p ← mul(gsize,h,ds,d,i,bs,b,64+gsize) + mul(gsize
                    ,h,cs,c,i,bs,b,64)
            endif
    endcase
```

FIG. 20J-3

```
        case rnd of                                          ← 2090
            N:
                s ← 0^(h-r) || ~p_r || p_r^(r-1)
            Z:
                s ← 0^(h-r) || p_(h-1)^r
            F:
                s ← 0^h
            C:
                s ← 0^(h-r) || 1^r
        endcase
        v ← ((as & p_(h-1))||p) + (0||s)
        if (v_(h..r+fsize) = (as & v_(r+fsize-1))^(h+1-r-fsize)) or not (l and (op =
                    E.EXTRACT)) then
            w ← (as & v_(r+fsize=1))^(zsize-fsize-dpos) || v_(fsize-1+r..r) || 0^dpos
        else
            w ← (s ? (v_h || ~v_h^(zsize-dpos-1)) : 1^(zsize-dpos)) || 0^dpos
        endif
        if m and (op = E.EXTRACT) then
            z_(zsize-1+j..j) ← c_(asize-1+j..dpos+fsize+j) || w_(dpos+fsize-1..dpos) ||
                        c_(dpos-1+j..j)
        else
            z_(zsize-1+j..j) ← w
        endif
    endfor
    RegWrite(ra, 128, z)
enddef
```

FIG. 20J-4

Typical dynamic-linked, inter-gateway calling sequence:
caller:

| | | | |
|---|---|---|---|
| caller | AA.DDI | sp@-size | // allocate caller stack frame |
| | S.I.64.A | lp,sp,off | |
| | S.I.64.A | dp,sp,off | |
| | ... | | |
| | L.I.64.A | lp=dp,off | // load lp |
| | L.I.64.A | dp=dp,off | // load dp |
| | B.GATE | | |
| | L.I.64.A | dp,sp,off | |
| | ...(code using dp) | | |
| | L.I.64.A | lp=sp,off | // restore original lp register |
| | A.ADDI | sp=size | // deallocate caller stack frame |
| | B | lp | // return | callee (non-leaf):

| | | | |
|---|---|---|---|
| calee: | L.I.64.A | dp=dp,off | // load dp with data pointer |
| | S.I.64.A | sp,dp,off | |
| | L.I.64.A | sp=dp,off | // new stack pointer |
| | S.I.64.A | lp,sp,off | |
| | S.I.64.A | dp,sp,off | |
| | ...(using dp) | | |
| | L.I.64.A | dp,sp,off | |
| | ...(code using dp) | | |
| | L.I.64.A | lp=sp,off | // restore original lp register |
| | L.I.64.A | sp=sp,off | // restore original sp register |
| | B.DOWN | lp | | callee (leak, no stack):

| | | | |
|---|---|---|---|
| callee: | ...(using dp) | | |
| | B.DOWN | lp | |

Operation codes

| B.GATE | Branch gateway |

Equivalencies

| B.GATE | ← B.GATE 0 |

Format

B.GATE    rb bgate(rb)

| 31 | 24 23 | 18 17 | 12 11 | 6 5 | 0 |
|---|---|---|---|---|---|
| B.MINOR | 0 | 1 | rb | B.GATE |
| 8 | 6 | 6 | 6 | 6 |

Definition

```
def BranchGateway(rd,rc,rb) as
      c ← RegRead(rc, 64)
      b ← RegRead(rb, 64)
      if (rd ≠ 0) or (rc ≠ 1) then
            raise ReservedInstruction
      endif
      if c_{2..0} ≠ 0 then
            raise AccessDisallowedByVirtualAddress
      endif
      d ← ProgramCounter_{63..2}+1 || PrivilegeLevel
      if PrivilegeLevel < b_{1..0} then
            m ← LoadMemoryG(c,c,64,L)
            if b ≠ m then
                  raise GatewayDisallowed
            endif
            PrivilegeLevel ← b_{1..0}
      endif
      ProgramCounter ← b_{63..2} || 0^2
      RegWrite(rd, 64, d)
      raise TakenBranch
enddef
```

Exceptions

Reserved Instruction
Gateway disallowed
Access disallowed by virtual address
Access disallowed by tag
Access disallowed by global TB
Access disallowed by local TB
Access detail required by tag
Access detail required by local TB
Access detail required by global TB
Local TB miss
Global TB miss

Operation codes

| E.SCAL.ADD.F.16 | Ensemble scale add floating-point half |
| E.SCAL.ADD.F.32 | Ensemble scale add floating-point single |
| E.SCAL.ADD.F.64 | Ensemble scale add floating-point double |

Selection

| class | op | prec | | |
|---|---|---|---|---|
| scale add | E.SCAL.ADD.F | 16 | 32 | 64 |

Format

E.op.prec ra=rd,rc,rb ra=eopprec(rd,rc,rb)

| 31 | 24 23 | 18 17 | 12 11 | 6 5 | 0 |
|---|---|---|---|---|---|
| E.op.prec | rd | rc | rb | ra | |
| 8 | 6 | 6 | 6 | 6 | |

FIG. 22A

Definition

```
def EnsembleFloatingPointTernary(op,prec,rd,rc,rb,ra) as
    d ← RegRead(rd, 128)
    c ← RegRead(rc, 128)
    b ← RegRead(rb, 128)
    for i ← 0 to 128-prec by prec
        di ← F(prec,d_{i+prec-1..i})
        ci ← F(prec,c_{i+prec-1..i})
        ai ← fadd(fmul(di, F(prec,b_{prec-1..0})), fmul(ci, F(prec,b_{2*prec-1..prec})))
        a_{i+prec-1..i} ← PackF(prec, ai, none)
    endfor
    RegWrite(ra, 128, a)
enddef
```

← 2310

Operation codes

| G.BOOLEAN | Group boolean |
|---|---|

Selection

| operation | function (binary) | function (decimal) |
|---|---|---|
| d | 11110000 | 240 |
| c | 11001100 | 204 |
| b | 10101010 | 176 |
| d&c&b | 10000000 | 128 |
| (d&c)|b | 11101010 | 234 |
| d|c|b | 11111110 | 254 |
| d?c:b | 11001010 | 202 |
| d^c^b | 10010110 | 150 |
| ~d^c^b | 01101001 | 105 |
| 0 | 00000000 | 0 |

Format

G.BOOLEAN rd@trc,trb,f rd=gbooleani(rd,rc,rb,f)

| 31 | 25 24 23 | 18 17 | 12 11 | 6 5 | 0 |
|---|---|---|---|---|---|
| G.BOOLEAN | ih | rd | rc | rb | il |
| 7 | 1 | 6 | 6 | 6 | 6 |

```
if f₆=f₅ then
    if f₂=f₁ then
        if f₂ then
            rc ← max(trc,trb)
            rb ← min(trc,trb)
        else
            rc ← min(trc,trb)
            rb ← max(trc,trb)
        endif
        ih ← 0
        il ← 0 || f₆ || f₇ || f₄ || f₃ || f₀
    else
        if f₂ then
            rc ← trb
            rb ← trc
        else
            rc ← trc
            rb ← trb
        endif
        ih ← 0
        il ← 1 || f₆ || f₇ || f₄ || f₃ || f₀
    endif
else
    ih ← 1
    if f₆ then
        rc ← trb
        rb ← trc
        il ← f₁ || f₂ || f₇ || f₄ || f₃ || f₀
    else
        rc ← trc
        rb ← trb
        il ← f₂ || f₁ || f₇ || f₄ || f₃ || f₀
    endif
endif
```

Definition

```
def GroupBoolean (ih,rd,rc,rb,il)
    d ← RegRead(rd, 128)
    c ← RegRead(rc, 128)
    b ← RegRead(rb, 128)
    if ih=0 then
        if il₅=0 then
```
$$f \leftarrow il_3 \parallel il_4 \parallel il_4 \parallel il_2 \parallel il_1 \parallel (rc>rb)^2 \parallel il_0$$
```
        else
```
$$f \leftarrow il_3 \parallel il_4 \parallel il_4 \parallel il_2 \parallel il_1 \parallel 0 \parallel 1 \parallel il_0$$
```
        endif
    else
```
$$f \leftarrow il_3 \parallel 0 \parallel 1 \parallel il_2 \parallel il_1 \parallel il_5 \parallel il_4 \parallel il_0$$
```
    endif
    for i ← 0 to 127 by size
```
$$a_i \leftarrow f_{(d_i \parallel c_i \parallel b_i)}$$
```
    endfor
    RegWrite(rd, 128, a)
enddef
```

Operation codes

| B.HINT | Branch Hint |
|---|---|

Format

B.HINT    badd,count,rd bhint(badd,count,rd)

| 31          24 | 23     18 | 17     12 | 11     6 | 5     0 |
|---|---|---|---|---|
| B.MINOR | rd | count | simm | B.HINT |
| 8 | 6 | 6 | 6 | 6 | simm ← badd-pc-4

Definition def BranchHint(rd,count,simm) as
    d ← RegRead(rd, 64)
    if ($d_{1..0}$) ≠ 0 then
        raise AccessDisallowedByVirtualAddress
    endif
    FetchHint(ProgramCounter +4 + (0 || simm || $0^2$), $d_{63..2}$ || $0^2$, count)
enddef

Exceptions

Access disallowed by virtual address

FIG. 24C

Operation codes

| | |
|---|---|
| E.SINK.F.16 | Ensemble convert floating-point doublets from half nearest default |
| E.SINK.F.16C | Ensemble convert floating-point doublets from half ceiling |
| E.SINK.F.16.C.D | Ensemble convert floating-point doublets from half ceiling default |
| E.SINK.F.16.F | Ensemble convert floating-point doublets from half floor |
| E.SINK.F.16.F.D | Ensemble convert floating-point doublets from half floor default |
| E.SINK.F.16.N | Ensemble convert floating-point doublets from half nearest |
| E.SINK.F.16.X | Ensemble convert floating-point doublets from half exact |
| E.SINK.F.16.Z | Ensemble convert floating-point doublets from half zero |
| E.SINK.F.16.Z.D | Ensemble convert floating-point doublets from half zero default |
| E.SINK.F.32 | Ensemble convert floating-point quadlets from single nearest default |
| E.SINK.F.32.C | Ensemble convert floating-point quadlets from single ceiling |
| E.SINK.F.32.C.D | Ensemble convert floating-point quadlets from single ceiling default |
| E.SINK.F.32.F | Ensemble convert floating-point quadlets from single floor |
| E.SINK.F.32.F.D | Ensemble convert floating-point quadlets from single floor default |
| E.SINK.F.32.N | Ensemble convert floating-point quadlets from single nearest |
| E.SINK.F.32.X | Ensemble convert floating-point quadlets from single exact |
| E.SINK.F.32.Z | Ensemble convert floating-point quadlets from single zero |
| E.SINK.F.32.Z.D | Ensemble convert floating-point quadlets from single zero default |
| E.SINK.F.64 | Ensemble convert floating-point octlets from double nearest default |
| E.SINK.F.64.C | Ensemble convert floating-point octlets from double ceiling |
| E.SINK.F.64.C.D | Ensemble convert floating-point octlets from double ceiling default |
| E.SINK.F.64.F | Ensemble convert floating-point octlets from double floor |
| E.SINK.F.64.F.D | Ensemble convert floating-point octlets from double floor default |
| E.SINK.F.64.N | Ensemble convert floating-point octlets from double nearest |
| E.SINK.F.64.X | Ensemble convert floating-point octlets from double exact |
| E.SINK.F.64.Z | Ensemble convert floating-point octlets from double zero |
| E.SINK.F.64.Z.D | Ensemble convert floating-point octlets from double zero default |
| E.SINK.F.128 | Ensemble convert floating-point hexlet from quad nearest default |
| E.SINK.F.128.C | Ensemble convert floating-point hexlet from quad ceiling |
| E.SINK.F.128.C.D | Ensemble convert floating-point hexlet from quad ceiling default |
| E.SINK.F.128.F | Ensemble convert floating-point hexlet from quad floor |
| E.SINK.F.128.F.D | Ensemble convert floating-point hexlet from quad floor default |
| E.SINK.F.128.N | Ensemble convert floating-point hexlet from quad nearest |
| E.SINK.F.128.X | Ensemble convert floating-point hexlet from quad exact |
| E.SINK.F.128.Z | Ensemble convert floating-point hexlet from quad zero |
| E.SINK.F.128.Z.D | Ensemble convert floating-point hexlet from quad zero default |

*FIG. 25A-1*

Selection

|  | op | prec |  |  |  | round/trap |
|---|---|---|---|---|---|---|
| integer from float | SINK | 16 | 32 | 64 | 128 | NONE C F N X Z C.D F.D Z.D |

Format

E.SINK.F.prec.rnd rd=rc rd=esinkfprecrnd(rc)

| 31      24 23    18 17   12 11    6 5      0 |
|---|
| E.prec | rd | rc | E.SINK.F.rnd | E.UNARY |
| 8 | 6 | 6 | 6 | 6 |

← 2530

Definition
def EnsemleSinkFloatingPoint(prec,round,rd,rc) as
    c ← RegRead(rc, 128)
    for i ← 0 to 128-prec by prec
        $ci ← F(prec, c_{i+prec-1..i})$
        $a_{i+prec-1..i}$ ← fsinkr(prec, ci, round)
    endfor
    RegWrite[rd, 128, a]
enddef

Exceptions

Floating-point arithmetic

*FIG. 25C*

```
Definition                                    ⎯2570
def eb ← ebits(prec) as
    case pref of
        16:
            eb ← 5
        32:
            eb ← 8
        64:
            eb ← 11
        128:
            eb ← 15
    endcase
enddef def eb ← ebias(prec) as
    eb ← 0 || 1$^{ebits(prec)-1}$
enddef def fb ← fbits(prec) as
    fb ← prec - 1 - eb
enddef def a ← F(prec, ai) as
    a.s ← ai$_{prec-1}$
    ae ← ai$_{prec-2..fbits(prec)}$
    af ← ai$_{fbits(prec)-1..0}$
    if ae = 1$^{ebits(prec)}$ then
        if af = 0 then
            a.t ← INFINITY
        elseif af$_{fbits(prec)-1}$ then
            a.t ← SNaN
            a.e ← -fbits(prec)
            a.f ← 1 || af$_{fbits(prec)-1..0}$
        else
            a.t ← QNaN
            a.e ← -fbits(prec)
            a.f ← af
        endif
    elseif ae = 0 then
        if af = 0 then
            a.t ← ZERO
```

FIG. 25D-1

```
        else
            a.t ← NORM
            a.e ← 1-ebias(pec)-fbits(prec)
            a.f ← 0|| af
        endif
    else
        a.t ← NORM
        a.e ← ae-ebias(prec)-fbits(prec)
        a.f ← 1|| af
    endif
enddef def a ← DEFAULTQNAN as
    a.s ← 0
    a.t ← QNAN
    a.e ← -1
    a.f ← 1
endder def a ← DEFAULTSNAN as
    a.s ← 0
    a.t ← SNAN
    a.e ← -1
    a.f ← 1
enddef
```

```
def fadd(a,b) as faddr(a,b,N) endder def c ← faddr(a,b,round) as
    if a.t=NORM and b.t=NORM then
        // d,e are a,b with exponent aligned and fraction adjusted
        if a.e > b.e then
            d ← a
            e.t ← b.t
            e.s ← b.s
            e.e ← a.e
            e.f ← b.f || 0^(a.e-b.e)
        else if a.e < b.e then
            d.t ← a.t
            d.s ← a.s
            d.e ← b.e
            d.f ← a.f || 0^(b.e-a.e)
            e ← b
        endif
        c.t ← d.t
        c.e ← d.e
        if d.s = e.s then
            c.s ← d.s
            c.f ← d.f + e.f
        elseif d.f > e.f then
            c.s ← d.s
            c.f ← d.f - e.f
        elseif d.f < e.f then
            c.s ← e.s
            c.f ← e.f - d.f
        else
            c.s ← r=F
            c.t ← ZERO
        endif
```

FIG. 25D-3

// priority is given to be operand for NaN propagation  ⟵ 2570
elseif (b.t=SNAN) or (b.t=QNAN) then
    c ⟵ b
elseif (a.t=SNAN) or (a.t=QNAN) then
    c ⟵ a
elseif a.t=ZERO and b.t=ZERO then
    c.t ⟵ ZERO
    c.s ⟵ (a.s and b.s) or (round=F and (a.s or b.s))
// NULL values are like zero, but do not combine with ZERO to alter sign
elseif a.t=ZERO or a.t=NULL then
    c ⟵ b
elseif b.t=ZERO or b.t=NULL then
    c ⟵ a
elseif a.t=INFINITY and b.t=INFINITY then
    if a.s ≠ b.s then
        c ⟵ DEFAULTSNAN // Invalid
    else
        c ⟵ a
    endif
elseif a.t=INFINITY then
    c ⟵ a
elseif b.t=INFINITY then
    c ⟵ b
else
    assert FALSE // should have covered all the cases above
endif
enddef def b ⟵ fneg(a) as
    b.s ⟵ ~a.s
    b.t ⟵ a.t
    b.e ⟵ a.e
    b.f ⟵ a.f
enddef def fsub(a,b) as fsubr(a,b,N) enddef def fsubr(a,b,round) as faddr(a,fneg(b),round) enddef def frsub(a,b) as frsubr(a,b,N) enddef def frsubr(a,b,round) as faddr(fneg(a),b,round) enddef

```
def c ← fcom(a,b) as
    if (a.t-SNAN) or (a.t=QNAN) or (b.t=SNAN) or (b.t=QNAN) then
        c ← U
    elseif a.t=INFINITY and b.t=INFINITY then
        if a.s ≠ b.s then
            c ← (a.s=0) ? G: L
        else
            c ← E
        endif
    elseif a.t=INFINITY then
        c ← (a.s=0) ? G: L
    elseif b.t=INFINITY then
        c ← (b.s=0) ? L
    elseif a.t=NORM and b.t=NORM then
        if a.s ≠ b.s then
            c ← (a.s=0) ? G: L
        else
            if a.e > b.e then
                af ← a.f
                bf ← b.f || $0^{a.e-b.e}$
            else
                af ← a.f || $0^{b.e-a.e}$
                bf ← b.f
            endif
            if af = bf then
                c ← E
            else
                c ← ((a.s=0) ^ (af > bf)) ? G : L
            endif
        endif
    elseif a.t=NORM then
        c ← (a.s=0) ? G: L
    elseif b.t=NORM then
        c ← (b.s=0) ? G: L
    elseif a.t=ZERO and b.t=ZERO then
        c ← E
    else
        assert FALSE // should have covered al the cases above
    endif
enddef
```

FIG. 25D-5

```
def c ← fmul(a,b) as
    if a.t=NORM and b.t=NORM then
        c.s ← a.s ^ b.s
        c.t ← NORM
        c.e ← a.e + b.e
        c.f ← a.f * b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
    elseif a.t=ZERO and b.t=INFINITY then
        c ← DEFAULTSNAN // Invalid
    elseif a.t=INFINITY and b.t=ZERO then
        c ← DEFAULTSNAN // Invalid
    elseif a.t=ZERO or b.t=ZERO then
        c.s ← a.s ^ b.s
        c.t ← ZERO
    else
        assert FALSE // should have covered al the cases above
    endif
enddef
```

```
def c   fdivr(a,b) as
    if a.t=NORM and b.t=NORM then
        c.s ← a.s ^ b.s
        c.t ← NORM
        c.e ← a.e - b.e + 256
        c.f ← (a.f   0   ) / b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
    elseif a.t=ZERO and b.t=INFINITY then
        c ← DEFAULTSNAN // Invalid
    elseif a.t=INFINITY and b.t=INFINITY then
        c ← DEFAULTSNAN // Invalid
    elseif a.t=ZERO then
        c.s ← a.s ^ b.s
        c.t ← ZERO
    elseif a.t=INFINITY then
        c.s ← a.s ^ b.s
        c.t ← INFINITY
    else
        assert FALSE // should have covered al the cases above
    endif
enddef def msb ← findmsb(a) as
    MAXF ← 2^18 // Largest possible f value after matrix multiply
    for j ← 0 to MAXF
        if a_{MAXF-1..j} = (0^{MAXF-1-j} || 1) then
            msb ← j
        endif
    endfor
enddef
```

```
Def ai ← PackF(prec,a,round) as
    case a.t of
        NORM:
            msb ← findmsb(a.f)
            m ← msb-1-fbits(prec)  //1sb for normal
            rdn ← -ebias(prec)-a.e-1-fbits(prec)  // 1sb if a denormal
            rb ← (m > rdn) ? rn : rdn
            if rb < 0 then
                aifr ← a.f$_{msb-1..0}$||0$^{-rb}$
                eadj ← 0
            else
                case round of
                    C:
                        s ← 0$^{msb-rb}$|| (~a.s)$^{rb}$
                    F:
                        s ← 0$^{msb-rb}$|| (a.s)$^{rb}$
                    N, NONE:
                        s ← 0$^{msb-rb}$|| ~a.f$_{rb}$|| a.f$_{rb}^{rb-1}$
                    X:
                        if a.f$_{rb-1..0}$ ≠ 0 then
                            raise FloatingPointArithmetic // Inexact
                        endif
                        s ← 0
                    Z:
                        s ← 0
                endcase
                v ← (0|| a.f$_{msb..0}$ ) + (0|| s)
                if v$_{msb}$=1 then
                    aifr ← v$_{msb-1..rb}$
                    eadj ← 0
                else
                    aifr ← 0$^{fbits(prec)}$
                    eadj ← 1
                endif
            endif
            aien ← a.e + msb - 1 + eadj + ebias(prec)
            if aien ≤ 0 then
                if round = NONE then
                    ai ← a.s||0$^{ebits(prec)}$||aifr
                else
                    raise FloatingPointArithmetic //Underflow
```

FIG. 25D-8

```
            endif
    elseif aien ≥ 1^ebits(prec) then
        if round = NONE then
            //default: round-to-nearest overflow handling
            ai ← a.s || 1^ebits(prec) || 0^fbits(prec)
        else
            raise FloatingPointArithmetic // Overflow
        endif
    else
        ai ← a.s || aien_ebits(prec)-1..0 || aifr
    endif SNAN:
    if round ≠ NONE then
        raise FloatingPointArithmetic //Invalid
    endif
    if -a.e < fbits(prec) then
        ai ← a.s || 1^ebits(prec) || a.f_-a.e-1..0 || 0^fbits(prec)+a.e
    else
        lsb ← a.f_-a.e-1-fbits(prec)+1..0 ≠ 0
        ai ← a.s || 1^ebits(prec) || a.f_-a.e-1..-a.e-1-fbits(prec)+2 || 1sb
    endif
QNAN:
    if -a.e < fbits(prec) then
        ai ← a.s || 1^ebits(prec) || a.f_-a.e-1..0 || 0^fbits(prec)+a.e
    else
        1sb ← a.f_-a.e-1-fbits(prec)+1..0 ≠ 0
        ai ← a.s || 1^ebits(prec) || a.f_-a.e-1..-a.e-1-fbits(prec)+2 || 1sb
    endif
ZERO:
    ai ← a.s || 0^ebits(prec) || 0^fbits(prec)
INFINITY:
    ai ← a.s || 1^ebits(prec) || 0^fbits(prec)
    endcase
defdef
```

```
Def ai ← fsinkr(prec, a, round) as
    case a.t of
        NORM:
            msb ← findmsb(a.f)
            rb ← -a.e
            if rb ≤ 0 then
                aifr ← a.f_{msb..0}||0^{-rb}
                aims ← msb - rb
            else
                case round of
                    C,C.D:
                        s ← 0^{msb-rb} || (~ai.s)^{rb}
                    F,F.D:
                        s ← 0^{msb-rb} || (ai.s)^{rb}
                    N, NONE:
                        s ← 0^{msb-rb} || ~ai.f_{rb} || ai.f_{rb}^{rb-1}
                    X:
                        if ai.f_{rb-1..0} ≠ 0 then
                            raise FloatingPointArithmetic // Inexact
                        endif
                        s ← 0
                    Z, Z.D:
                        s ← 0
                endcase
                v ← (0||a.f_{msb..0}) + (0||s)
                if v_{msb}=1 then
                    aims ← msb + 1 - rb
                else
                    aims ← msb - rb
                endif
                aifr ← v_{aims..rb}
            endif
            if aims > prec then
                case round of
                    C.D, F.D, NONE, Z.D:
                        ai ← a.s||(~as)^{prec-1}
                    C,F,N,X,Z:
                        raise FloatingPointArithmetic // Overflow
                endcase
```

FIG. 25D-10

```
                elseif a.s = 0 then
                        ai ← aifr
                else
                        ai ← -aifr
                endif
        ZERO:
                ai ← 0^prec
        SNAN, QNAN:
                case round of
                        C.D, F.D, NONE, Z.D:
                                ai ← 0^prec
                        C, F, N, X, Z:
                                raise FloatingPoint Arithmetic // Invalid endcase
        INFINITY:
                case round of
                        C.D, F.D, NONE, Z.D:
                                ai ← a.s || (~as)^{prec-1}
                        C, F, N, X, Z:
                                raise FloatingPointArithmetic // Invalid
                endcase
        endcase
enddef def c ← frecrest(a) as
        b.s ← 0
        b.t ← NORM
        b.e ← 0
        b.f ← 1
        c ← fest(fdiv(b,a))
enddef def c ← frsqrest(a) as
        b.s ← 0
        b.t ← NORM
        b.e ← 0
        b.f ← 1
        c ← fest(fsqr(fdiv(b,a)))
enddef
```

```
def c ← fest(a) as
    if (a.t=NORM) then
        msb ← findmsb(a.f)
        a.e ← a.e + msb - 13
        a.f ← a.f_msb..msb-12 || 1
    else
        c ← a
    endif
enddef def ← fsqr(a) as
    if (a.t=NORM) and (a.s=0) then
        c.s ← 0
        c.t ← NORM
        if (a.e_0 =1) then
            c.e ← (a.e-127) / 2
            c.f ← sqr(a.f || 0^127 )
        else
            c.e ← (a.e-128) / 2
            c.f ← sqr(a.f || 0^128 )
        endif
    elseif (a.t=SNAN) or (a.t-QNAN) or a.t=ZERO or ((a.t=INFINITY) and
        (a.s=0)) then
        c ← a
    elseir ((a.t=NORM) or (a.t=INFINITY)) and (a.s=1) then
        c ← DEFAULTSNAN // Invalid
    else
        assert FALSE // should have covered a1 the cases above
    endif
enddef
```

FIG. 25D-12

Operation codes

| | |
|---|---|
| G.ADD.8 | Group add bytes |
| G.ADD.16 | Group add doublets |
| G.ADD.32 | Group add quadlets |
| G.ADD.64 | Group add octlets |
| G.ADD.128 | Group add hexlet |
| G.ADD.L.8 | Group add limit signed bytes |
| G.ADD.L.16 | Group add limit signed doublets |
| G.ADD.L.32 | Group add limit signed quadlets |
| G.ADD.L.64 | Group add limit signed octlets |
| G.ADD.L.128 | Group add limit signed hexlet |
| G.ADD.L.U.8 | Group add limit unsigned bytes |
| G.ADD.L.U.16 | Group add limit unsigned doublets |
| G.ADD.L.U.32 | Group add limit unsigned quadlets |
| G.ADD.L.U.64 | Group add limit unsigned octlets |
| G.ADD.L.U.128 | Group add limit unsigned hexlet |
| G.ADD.8.O | Group add signed bytes check overflow |
| G.ADD.16.O | Group add signed doublets check overflow |
| G.ADD.32.O | Group add signed quadlets check overflow |
| G.ADD.64.O | Group add signed octlets check overflow |
| G.ADD.128.O | Group add signed hexlet check overflow |
| G.ADD.U.8.O | Group add unsigned bytes check overflow |
| G.ADD.U.16.O | Group add unsigned doublets check overflow |
| G.ADD.U.32.O | Group add unsigned quadlets check overflow |
| G.ADD.U.64.O | Group add unsigned octlets check overflow |
| G.ADD.U.128.O | Group add unsigned hexlet check overflow |

*FIG. 26A*

Format

G.op.size    rd=rc,rb rd=gopsize(rc,rb)

| G.size | rd | rc | rb | op |
|---|---|---|---|---|
| 8 | 6 | 6 | 6 | 6 |

Bits: 31 — 24 23 — 18 17 — 12 11 — 6 5 — 0

*FIG. 26B*

Definition

```
def Group(op,size,rd,rc,rb)
    c ← RegRead(rc, 128)
    b ← RegRead(rb, 128)
    case op of
        G.ADD:
            for i ← 0 to 128-size by size
                a_{i+size-1..i} ← c_{i+size-1..i} + b_{i+size-1..i}
            endfor
        G.ADD.L:
            for i ← 0 to 128-size by size
                t ← (c_{i+size-1} || c_{i+size-1..i}) + (b_{i+size-1} || b_{i+size-1..i})
                a_{i+size-1..i} ← (t_size ≠ t_{size-1}) ? (t_size || t_{size-1}) : t_{size-1..0}
            endfor
        G.ADD.L.U:
            for i ← 0 to 128-size by size
                t ← (0^1 || c_{i+size-1..i}) + (0^1 || b_{i+size-1..i})
                a_{i+size-1..i} ← (t_size ≠ 0) ? (1^{size}) : t_{size-1..0}
            endfor
        G.ADD.O:
            for i ← 0 to 128-size by size
                t ← (c_{i+size-1} || c_{i+size-1..i}) + (b_{i+size-1} || b_{i+size-1..i})
                if t_size ≠ t_{size-1} then
                    raise FixedPointArithmetic
                endif
                a_{i+size-1..i} ← t_{size-1..0}
            endfor
        G.ADD.U.O:
            for i ← 0 to 128-size by size
                t ← (0^1 || c_{i+size-1..i}) + (0^1 || b_{i+size-1..i})
                if t_size ≠ 0 then
                    raise FixedPointArithmetic
                endif
                a_{i+size-1..i} ← t_{size-1..0}
            endfor
    endcase
    RegWrite(rd, 128, a)
enddef
```

FIG. 26C

Operation codes

| | |
|---|---|
| G.SET.AND.E.8 | Group set and equal zero bytes |
| G.SET.AND.E.16 | Group set and equal zero doublets |
| G.SET.AND.E.32 | Group set and equal zero quadlets |
| G.SET.AND.E.64 | Group set and equal zero octlets |
| G.SET.AND.E.128 | Group set and equal zero hexlet |
| G.SET.AND.NE.8 | Group set and not equal zero bytes |
| G.SET.AND.NE.16 | Group set and not equal zero doublets |
| G.SET.AND.NE.32 | Group set and not equal zero quadlets |
| G.SET.AND.NE.64 | Group set and not equal zero octlets |
| G.SET.AND.NE.128 | Group set and not equal zero hexlet |
| G.SET.E.8 | Group set equal bytes |
| G.SET.E.16 | Group set equal doublets |
| G.SET.E.32 | Group set equal quadlets |
| G.SET.E.64 | Group set equal octlets |
| G.SET.E.128 | Group set equal hexlet |
| G.SET.GE.8 | Group set greater equal signed bytes |
| G.SET.GE.16 | Group set greater equal signed doublets |
| G.SET.GE.32 | Group set greater equal signed quadlets |
| G.SET.GE.64 | Group set greater equal signed octlets |
| G.SET.GE.128 | Group set greater equal signed hexlet |
| G.SET.GE.U.8 | Group set greater equal unsigned bytes |
| G.SET.GE.U.16 | Group set greater equal unsigned doublets |
| G.SET.GE.U.32 | Group set greater equal unsigned quadlets |
| G.SET.GE.U.64 | Group set greater equal unsigned octlets |
| G.SET.GE.U.128 | Group set greater equal unsigned hexlet |
| G.SET.L.8 | Group set signed less bytes |
| G.SET.L.16 | Group set signed less doublets |
| G.SET.L.32 | Group set signed less quadlets |
| G.SET.L.64 | Group set signed less octlets |
| G.SET.L.128 | Group set signed less hexlet |
| G.SET.L.U.8 | Group set less unsigned bytes |
| G.SET.L.U.16 | Group set less unsigned doublets |
| G.SET.L.U.32 | Group set less unsigned quadlets |
| G.SET.L.U.64 | Group set less unsigned octlets |
| G.SET.L.U.128 | Group set less unsigned hexlet |
| G.SET.NE.8 | Group set not equal bytes |
| G.SET.NE.16 | Group set not equal doublets |
| G.SET.NE.32 | Group set not equal quadlets |
| G.SET.NE.64 | Group set not equal octlets |
| G.SET.NE.128 | Group set not equal hexlet |
| G.SUB.8 | Group subtract bytes |
| G.SUB.8.O | Group subtract signed bytes check overflow |

FIG. 27A-1

| G.SUB.16 | Group subtract doublets |
|---|---|
| G.SUB.16.O | Group subtract signed doublets check overflow |
| G.SUB.32 | Group subtract quadlets |
| G.SUB.32.O | Group subtract signed quadlets check overflow |
| G.SUB.64 | Group subtract octlets |
| G.SUB.64.O | Group subtract signed octlets check overflow |
| G.SUB.128 | Group subtract hexlet |
| G.SUB.128.O | Group subtract signed hexlet check overflow |
| G.SUB.L.8 | Group subtract limit signed bytes |
| G.SUB.L.16 | Group subtract limit signed doublets |
| G.SUB.L.32 | Group subtract limit signed quadlets |
| G.SUB.L.64 | Group subtract limit signed octlets |
| G.SUB.L.128 | Group subtract limit signed hexlet |
| G.SUB.L.U.8 | Group subtract limit unsigned bytes |
| G.SUB.L.U.16 | Group subtract limit unsigned doublets |
| G.SUB.L.U.32 | Group subtract limit unsigned quadlets |
| G.SUB.L.U.64 | Group subtract limit unsigned octlets |
| G.SUB.L.U.128 | Group subtract limit unsigned hexlet |
| G.SUB.U.8.O | Group subtract unsigned bytes check overflow |
| G.SUB.U.16.O | Group subtract unsigned doublets check overflow |
| G.SUB.U.32.O | Group subtract unsigned quadlets check overflow |
| G.SUB.U.64.O | Group subtract unsigned octlets check overflow |
| G.SUB.U.128.O | Group subtract unsigned hexlet check overflow |

FIG. 27A-2

Format

G.op.size    rd=rb,rc rd=gopsize(rb,rc)

Definition def GroupReversed(op,size,rd,rc,rb)
    c ← RegRead(rc, 128)
    b ← RegRead(rb, 128)
    case op of
        G.SUB:
            for i ← 0 to 128-size by size
                $a_{i+size-1..i}$ ← $b_{i+size-1..i}$ - $c_{i+size-1..i}$
            endfor
        G.SUB.L:
            for i ← 0 to 128-size by size
                t ← ($b_{i+size-1}$ ∥ $b_{i+size-1..i}$) - ($c_{i+size-1}$ ∥ $c_{i+size-1..i}$)
                $a_{i+size-1..i}$ ← ($t_{size}$ ≠ $t_{size-1}$) ? ($t_{size}$ ∥ $t_{size-1}^{size-1}$) : $t_{size-1..0}$
            endfor
        G.SUB.LU:
            for i ← 0 to 128-size by size
                t ← ($0^1$ ∥ $b_{i+size-1..i}$) - ($0^1$ ∥ $c_{i+size-1..i}$)
                $a_{i+size-1..i}$ ← ($t_{size}$ ≠ 0) ? $0^{size}$ : $t_{size-1..0}$
            endfor
        G.SUB.O:
            for i ← 0 to 128-size by size
                t ← ($b_{i+size-1}$ ∥ $b_{i+size-1..i}$) - ($c_{i+size-1}$ ∥ $c_{i+size-1..i}$)
                if ($t_{size}$ ≠ $t_{size-1}$) then
                      raise FixedPointArithmetic
                endif
                $a_{i+size-1..i}$ ← $t_{size-1..0}$
            endfor
        G.SUB.U.O:
            for i ← 0 to 128-size by size
                t ← ($0^1$ ∥ $b_{i+size-1..i}$) - ($0^1$ ∥ $c_{i+size-1..i}$)
                if ($t_{size}$ ≠ 0) then
                      raise FixedPointArithmetic
                endif
                $a_{i+size-1..i}$ ← $t_{size-1..0}$
            endfor
        G.SET.E:
            for i ← 0 to 128-size by size
                $a_{i+size-1..i}$ ← ($b_{i+size-1..i}$ = $c_{i+size-1..i}$)$^{size}$
            endfor
        G.SET.NE:
            for i ← 0 to 128-size by size
                $a_{i+size-1..i}$ ← ($b_{i+size-1..i}$ ≠ $c_{i+size-1..i}$)$^{size}$
            endfor
        G.SET.AND.E:
            for i ← 0 to 128-size by size
                $a_{i+size-1..i}$ ← (($b_{i+size-1..i}$ and $c_{i+size-1..i}$) = 0)$^{size}$
            endfor

FIG. 27C-1

G.SET.AND.NE:
    for i ← 0 to 128-size by size
        $a_{i+size-1..i}$ ← $((b_{i+size-1..i}$ and $c_{i+size-1..i}) \neq 0)^{size}$
    endfor
G.SET.L:
    for i ← 0 to 128-size by size
        $a_{i+size-1..i}$ ← $((rc = rb)$ ? $(b_{i+size-1..i} < 0)$ : $(b_{i+size-1..i} < c_{i+size-1..i}))^{size}$
    endfor
G.SET.GE:
    for i ← 0 to 128-size by size
        $a_{i+size-1..i}$ ← $((rc = rb)$ ? $(b_{i+size-1..i} \geq 0)$ : $(b_{i+size-1..i} \geq c_{i+size-1..i}))^{size}$
    endfor
G.SET.L.U:
    for i ← 0 to 128-size by size
        $a_{i+size-1..i}$ ← $((rc = rb)$ ? $(b_{i+size-1..i} > 0)$ :
            $((0 \parallel b_{i+size-1..i}) < (0 \parallel c_{i+size-1..i})))^{size}$
    endfor
G.SET.GE.U:
    for i ← 0 to 128-size by size
        $a_{i+size-1..i}$ ← $((rc = rb)$ ? $(b_{i+size-1..i} \leq 0)$ :
            $((0 \parallel b_{i+size-1..i}) \geq (0 \parallel c_{i+size-1..i})))^{size}$
    endfor
  endcase
  RegWrite(rd, 128, a)
enddef

*FIG. 27C-2*

Operation codes

| | |
|---|---|
| E.CON.8 | Ensemble convolve signed bytes |
| E.CON.16 | Ensemble convolve signed doublets |
| E.CON.32 | Ensemble convolve signed quadlets |
| E.CON.64 | Ensemble convolve signed octlets |
| E.CON.C.8 | Ensemble convolve complex bytes |
| E.CON.C.16 | Ensemble convolve complex doublets |
| E.CON.C.32 | Ensemble convolve complex quadlets |
| E.CON.M.8 | Ensemble convolve mixed-signed bytes |
| E.CON.M.16 | Ensemble convolve mixed-signed doublets |
| E.CON.M.32 | Ensemble convolve mixed-signed quadlets |
| E.CON.M.64 | Ensemble convolve mixed-signed octlets |
| E.CON.U.8 | Ensemble convolve unsigned bytes |
| E.CON.U.16 | Ensemble convolve unsigned doublets |
| E.CON.U.32 | Ensemble convolve unsigned quadlets |
| E.CON.U.64 | Ensemble convolve unsigned octlets |
| E.DIV.64 | Ensemble divide signed octlets |
| E.DIV.U.64 | Ensemble divide unsigned octlets |
| E.MUL.8 | Ensemble multiply signed bytes |
| E.MUL.16 | Ensemble multiply signed doublets |
| E.MUL.32 | Ensemble multiply signed quadlets |
| E.MUL.64 | Ensemble multiply signed octlets |
| E.MUL.SUM.8 | Ensemble multiply sum signed bytes |
| E.MUL.SUM.16 | Ensemble multiply sum signed doublets |
| E.MUL.SUM.32 | Ensemble multiply sum signed quadlets |
| E.MUL.SUM.64 | Ensemble multiply sum signed octlets |
| E.MUL.C.8 | Ensemble complex multiply bytes |
| E.MUL.C.16 | Ensemble complex multiply doublets |
| E.MUL.C.32 | Ensemble complex multiply quadlets |
| E.MUL.M.8 | Ensemble multiply mixed-signed bytes |
| E.MUL.M.16 | Ensemble multiply mixed-signed doublets |
| E.MUL.M.32 | Ensemble multiply mixed-signed quadlets |
| E.MUL.M.64 | Ensemble multiply mixed-signed octlets |
| E.MUL.P.8 | Ensemble multiply polynomial bytes |
| E.MUL.P.16 | Ensemble multiply polynomial doublets |
| E.MUL.P.32 | Ensemble multiply polynomial quadlets |
| E.MUL.P.64 | Ensemble multiply polynomial octlets |
| E.MUL.SUM.C.8 | Ensemble multiply sum complex bytes |
| E.MUL.SUM.C.16 | Ensemble multiply sum complex doublets |
| E.MUL.SUM.C.32 | Ensemble multiply sum complex quadlets |
| E.MUL.SUM.M.8 | Ensemble multiply sum mixed-signed bytes |
| E.MUL.SUM.M.16 | Ensemble multiply sum mixed-signed doublets |
| E.MUL.SUM.M.32 | Ensemble multiply sum mixed-signed quadlets |
| E.MUL.SUM.M.64 | Ensemble multiply sum mixed-signed octlets |

FIG. 28A-1

| | |
|---|---|
| E.MUL.SUM.U.8 | Ensemble multiply sum unsigned bytes |
| E.MUL.SUM.U.16 | Ensemble multiply sum unsigned doublets |
| E.MUL.SUM.U.32 | Ensemble multiply sum unsigned quadlets |
| E.MUL.SUM.U.64 | Ensemble multiply sum unsigned octlets |
| E.MUL.U.8 | Ensemble multiply unsigned bytes |
| E.MUL.U.16 | Ensemble multiply unsigned doublets |
| E.MUL.U.32 | Ensemble multiply unsigned quadlets |
| E.MUL.U.64 | Ensemble multiply unsigned octlets |

*FIG. 28A-2*

Format

E.op.size  rd=rc,rb rd=eopsize(rc,rb)

| 31 | 24 23 | 18 17 | 12 11 | 6 5 | 0 |
|---|---|---|---|---|---|
| E.size | rd | rc | rb | op |
| 8 | 6 | 6 | 6 | 6 |

FIG. 28B

Definition def mul(size,h,vs,v,i,ws,w,j) as
    mul ← ((vs&$v_{size-1+i}$)$^{h-size}$ ∥ $v_{size-1+i..i}$) * ((ws&$w_{size-1+j}$)$^{h-size}$ ∥ $w_{size-1+j..j}$)
enddef def c ← PolyMultiply(size,a,b) as
    p[0] ← $0^{2*size}$
    for k ← 0 to size-1
        p[k+1] ← p[k] ^ $a_k$ ? ($0^{size-k}$ ∥ b ∥ $0^k$) : $0^{2*size}$
    endfor
    c ← p[size]
enddef def Ensemble(op,size,rd,rc,rb)
    c ← RegRead(rc, 128)
    b ← RegRead(rb, 128)
    case op of
        E.MUL:, E.MUL.C:, EMUL.SUM, E.MUL.SUM.C, E.CON, E.CON.C, E.DIV:
            cs ← bs ← 1
        E.MUL.M:, EMUL.SUM.M, E.CON.M:
            cs ← 0
            bs ← 1
        E.MUL.U:, EMUL.SUM.U, E.CON.U, E.DIV.U, E.MUL.P:
            cs ← bs ← 0
    endcase
    case op of
        E.MUL, E.MUL.U, E.MUL.M:
            for i ← 0 to 64-size by size
                $d_{2*(i+size)-1..2*i}$ ← mul(size,2*size,cs,c,i,bs,b,i)
            endfor
        E.MUL.P:
            for i ← 0 to 64-size by size
                $d_{2*(i+size)-1..2*i}$ ← PolyMultiply(size,$c_{size-1+i..i}$,$b_{size-1+i..i}$)
            endfor
        E.MUL.C:
            for i ← 0 to 64-size by size
                if (i and size) = 0 then
                    p ← mul(size,2*size,1,c,i,1,b,i) - mul(size,2*size,1,c,i+size,1,b,i+size)
                else
                    p ← mul(size,2*size,1,c,i,1,b,i+size) + mul(size,2*size,1,c,i,1,b,i+size)
                endif
                $d_{2*(i+size)-1..2*i}$ ← p
            endfor
        E.MUL.SUM, E.MUL.SUM.U, E.MUL.SUM.M:
            p[0] ← $0^{128}$
            for i ← 0 to 128-size by size
                p[i+size] ← p[i] + mul(size,128,cs,c,i,bs,b,i)
            endfor

*FIG. 28C-1* a ← p[128]
E.MUL.SUM.C:
    p[0] ← $0^{64}$
    p[size] ← $0^{64}$
    for i ← 0 to 128-size by size
        if (i and size) = 0 then
            p[i+2*size] ← p[i] + mul(size,64,1,c,i,1,b,i)
                      - mul(size,64,1,c,i+size,1,b,i+size)
        else
            p[i+2*size] ← p[i] + mul(size,64,1,c,i,1,b,i+size)
                      + mul(size,64,1,c,i+size,1,b,i)
        endif
    endfor
    a ← p[128+size] ∥ p[128]

E.CON, E.CON.U, E.CON.M:
    p[0] ← $0^{128}$
    for j ← 0 to 64-size by size
        for i ← 0 to 64-size by size
            p[j+size]2*(i+size)-1..2*i ← p[j]2*(i+size)-1..2*i +
                mul(size,2*size,cs,c,i+64-j,bs,b,j)
        endfor
    endfor
    a ← p[64]

E.CON.C:
    p[0] ← $0^{128}$
    for j ← 0 to 64-size by size
        for i ← 0 to 64-size by size
            if ((~i) and j and size) = 0 then
                p[j+size]2*(i+size)-1..2*i ← p[j]2*(i+size)-1..2*i +
                      mul(size,2*size,1,c,i+64-j,1,b,j)
            else
                p[j+size]2*(i+size)-1..2*i ← p[j]2*(i+size)-1..2*i -
                      mul(size,2*size,1,c,i+64-j+2*size,1,b,j)
            endif
        endfor
    endfor
    a ← p[64]

E.DIV:
    if (b = 0) or ( (c = (1∥$0^{63}$)) and (b = $1^{64}$) ) then
        a ← undefined

FIG. 28C-2

```
        else
                    q ← c / b
                    r ← c - q*b
                    a ← r63..0 ‖ q63..0
            endif
    E.DIV.U:
            if b = 0 then
                    a ← undefined
            else
                    q ← (0 ‖ c) / (0 ‖ b)
                    r ← c - (0 ‖ q)*(0 ‖ b)
                    a ← r63..0 ‖ q63..0
            endif
    endcase
    RegWrite(rd, 128, a)
enddef
```

FIG. 28C-3

Floating-point function Definitions

```
def eb ← ebits(prec) as
    case pref of
        16:
            eb ← 5
        32:
            eb ← 8
        64:
            eb ← 11
        128:
            eb ← 15
    endcase
enddef def eb ← ebias(prec) as
    eb ← 0 || 1ebits(prec)-1
enddef def fb ← fbits(prec) as
    fb ← prec - 1 - eb
enddef def a ← F(prec, ai) as
    a.s ← ai_{prec-1}
    ae ← ai_{prec-2..fbits(prec)}
    af ← ai_{fbits(prec)-1..0}
    if ae = 1^{ebits(prec)} then
        if af = 0 then
            a.t ← INFINITY
        elseif af_{fbits(prec)-1} then
            a.t ← SNaN
            a.e ← -fbits(prec)
            a.f ← 1 || af_{fbits(prec)-2..0}
        else
            a.t ← QNaN
            a.e ← -fbits(prec)
            a.f ← af
        endif
```

FIG. 29-1

```
        elseif ae = 0 then
                if af = 0 then
                        a.t ← ZERO
                else
                        a.t ← NORM
                        a.e ← 1-ebias(prec)-fbits(prec)
                        a.f ← 0 || af
                endif
        else
                a.t ← NORM
                a.e ← ae-ebias(prec)-fbits(prec)
                a.f ← 1 || af
        endif
enddef def a ← DEFAULTQNAN as
        a.s ← 0
        a.t ← QNAN
        a.e ← -1
        a.f ← 1
enddef def a ← DEFAULTSNAN as
        a.s ← 0
        a.t ← SNAN
        a.e ← -1
        a.f ← 1
enddef def fadd(a,b) as faddr(a,b,N) enddef def c ← faddr(a,b,round) as
        if a.t=NORM and b.t=NORM then
                // d,e are a,b with exponent aligned and fraction adjusted
                if a.e > b.e then
                        d ← a
                        e.t ← b.t
                        e.s ← b.s
                        e.e ← a.e
                        e.f ← b.f || 0$^{a.e-b.e}$
                else if a.e < b.e then
                        d.t ← a.t
                        d.s ← a.s
                        d.e ← b.e
                        d.f ← a.f || 0$^{b.e-a.e}$
                        e ← b
```

FIG. 29-2

```
            endif
        c.t ← d.t
        c.e ← d.e
        if d.s = e.s then
                c.s ← d.s
                c.f ← d.f + e.f
        elseif d.f > e.f then
                c.s ← d.s
                c.f ← d.f - e.f
        elseif d.f < e.f then
                c.s ← e.s
                c.f ← e.f - d.f
        else
                c.s ← r=F
                c.t ← ZERO
        endif
    // priority is given to b operand for NaN propagation
    elseif (b.t=SNAN) or (b.t=QNAN) then
        c ← b
    elseif (a.t=SNAN) or (a.t=QNAN) then
        c ← a
    elseif a.t=ZERO and b.t=ZERO then
        c.t ← ZERO
        c.s ← (a.s and b.s) or (round=F and (a.s or b.s))
    // NULL values are like zero, but do not combine with ZERO to alter sign
    elseif a.t=ZERO or a.t=NULL then
        c ← b
    elseif b.t=ZERO or b.t=NULL then
        c ← a
    elseif a.t=INFINITY and b.t=INFINITY then
        if a.s ≠ b.s then
                c ← DEFAULTSNAN // Invalid
        else
                c ← a
        endif
    elseif a.t=INFINITY then
        c ← a
    elseif b.t=INFINITY then
        c ← b
    else
        assert FALSE // should have covered al the cases above
    endif
enddef def b ← fneg(a) as
    b.s ← ~a.s
    b.t ← a.t
    b.e ← a.e
    b.f ← a.f
enddef
```

FIG. 29-3 def fsubr(a,b,round) as faddr(a,fneg(b),round) enddef def frsub(a,b) as frsubr(a,b,N) enddef def frsubr(a,b,round) as faddr(fneg(a),b,round) enddef

```
def c ← fcom(a,b) as
    if (a.t=SNAN) or (a.t=QNAN) or (b.t=SNAN) or (b.t=QNAN) then
        c ← U
    elseif a.t=INFINITY and b.t=INFINITY then
        if a.s ≠ b.s then
            c ← (a.s=0) ? G: L else
                c ← E
        endif
    elseif a.t=INFINITY then
        c ← (a.s=0) ? G: L
    elseif b.t=INFINITY then
        c ← (b.s=0) ? G: L
    elseif a.t=NORM and b.t=NORM then
        if a.s ≠ b.s then
            c ← (a.s=0) ? G: L
        else
            if a.e > b.e then
                af ← a.f
                bf ← b.f || 0^(a.e-b.e)
            else
                af ← a.f || 0^(b.e-a.e)
                bf ← b.f
            endif
            if af = bf then
                c ← E
            else
                c ← ((a.s=0) ^ (af > bf)) ? G : L
            endif
        endif
    elseif a.t=NORM then
        c ← (a.s=0) ? G: L
    elseif b.t=NORM then
        c ← (b.s=0) ? G: L
    elseif a.t=ZERO and b.t=ZERO then
        c ← E
    else
            assert FALSE // should have covered al the cases above
    endif
enddef
```

*FIG. 29-4*

```
def c ← fmul(a,b) as
    if a.t=NORM and b.t=NORM then
        c.s ← a.s ^ b.s
        c.t ← NORM
        c.e ← a.e + b.e
        c.f ← a.f * b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
    elseif a.t=ZERO and b.t=INFINITY then
        c ← DEFAULTSNAN // Invalid
    elseif a.t=INFINITY and b.t=ZERO then
        c ← DEFAULTSNAN // Invalid
    elseif a.t=ZERO or b.t=ZERO then
        c.s ← a.s ^ b.s
        c.t ← ZERO
    else
        assert FALSE // should have covered al the cases above
    endif
enddef def c ← fdivr(a,b) as
    if a.t=NORM and b.t=NORM then
        c.s ← a.s ^ b.s
        c.t ← NORM
        c.e ← a.e - b.e + 256
        c.f ← (a.f || 0$^{256}$) / b.f
    // priority is given to b operand for NaN propagation
    elseif (b.t=SNAN) or (b.t=QNAN) then
        c.s ← a.s ^ b.s
        c.t ← b.t
        c.e ← b.e
        c.f ← b.f
    elseif (a.t=SNAN) or (a.t=QNAN) then
        c.s ← a.s ^ b.s
        c.t ← a.t
        c.e ← a.e
        c.f ← a.f
```

FIG. 29-5

```
        elseif a.t=ZERO and b.t=ZERO then
                c ← DEFAULTSNAN // Invalid
        elseif a.t=INFINITY and b.t=INFINITY then
                c ← DEFAULTSNAN // Invalid
        elseif a.t=ZERO then
                c.s ← a.s ^ b.s
                c.t ← ZERO
        elseif a.t=INFINITY then
                c.s ← a.s ^ b.s
                c.t ← INFINITY
        else
                assert FALSE // should have covered al the cases above
        endif
enddef def msb ← findmsb(a) as
        MAXF ← 2^18 // Largest possible f value after matrix multiply
        for j ← 0 to MAXF
                if a_{MAXF-1..j} = (0^{MAXF-1-j} || 1) then
                        msb ← j
                endif
        endfor
enddef def ai ← PackF(prec,a,round) as
        case a.t of
                NORM:
                        msb ← findmsb(a.f)
                        m ← msb-1-fbits(prec) // lsb for normal
                        rdn ← -ebias(prec)-a.e-1-fbits(prec) // lsb if a denormal
                        rb ← (m > rdn) ? m : rdn
```

FIG. 29-6

```
if rb ≤ 0 then
    aifr ← a.f_{msb-1..0} || 0^{-rb}
    eadj ← 0
else
    case round of
        C:
            s ← 0^{msb-rb} || (~a.s)^{rb}
        F:
            s ← 0^{msb-rb} || (a.s)^{rb}
        N, NONE:
            s ← 0^{msb-rb} || ~a.f_{rb} || a.f_{rb}^{-1}
        X:
            if a.f_{rb-1..0} ≠ 0 then
                raise FloatingPointArithmetic // Inexact
            endif
            s ← 0
        Z:
            s ← 0
    endcase
    v ← (0||a.f_{msb..0}) + (0||s)
    if v_{msb} = 1 then
        aifr ← v_{msb-1..rb}
        eadj ← 0
    else
        aifr ← 0^{fbits(prec)}
        eadj ← 1
    endif
endif
aien ← a.e + msb − 1 + eadj + ebias(prec)
if aien ≤ 0 then
    if round = NONE then
        ai ← a.s || 0^{ebits(prec)} || aifr
    else
        raise FloatingPointArithmetic //Underflow
    endif
elseif aien ≥ 1^{ebits(prec)} then
    if round = NONE then
        //default: round-to-nearest overflow handling
        ai ← a.s || 1^{ebits(prec)} || 0^{fbits(prec)}
    else
        raise FloatingPointArithmetic //Underflow
    endif
else
    ai ← a.s || aien_{ebits(prec)-1..0} || aifr
endif
```

*FIG. 29-7*

```
SNAN:
    if round ≠ NONE then
        raise FloatingPointArithmetic //Invalid
    endif
    if -a.e < fbits(prec) then
        ai ← a.s || 1^ebits(prec) || a.f_{-a.e-1..0} || 0^{fbits(prec)+a.e}
    else
        lsb ← a.f_{-a.e-1-fbits(prec)+1..0} ≠ 0
        ai ← a.s || 1^ebits(prec) || a.f_{-a.e-1..-a.e-1-fbits(prec)+2} || lsb
    endif
QNAN:
    if -a.e < fbits(prec) then
        ai ← a.s || 1^ebits(prec) || a.f_{-a.e-1..0} || 0^{fbits(prec)+a.e}
    else
        lsb ← a.f_{-a.e-1-fbits(prec)+1..0} ≠ 0
        ai ← a.s || 1^ebits(prec) || a.f_{-a.e-1..-a.e-1-fbits(prec)+2} || lsb
    endif
ZERO:
    ai ← a.s || 0^ebits(prec) || 0^fbits(prec)
INFINITY:
    ai ← a.s || 1^ebits(prec) || 0^fbits(prec)
endcase
defdef def ai ← fsinkr(prec, a, round) as
    case a.t of
        NORM:
            msb ← findmsb(a.f)
            rb ← -a.e
            if rb ≤ 0 then
                ai.fr ← a.f_{msb..0} || 0^{-rb}
                ai.ms ← msb - rb
            else
                case round of
                    C, C.D:
                        s ← 0^{msb-rb} || (~ai.s)^{rb}
                    F, F.D:
                        s ← 0^{msb-rb} || (ai.s)^{rb}
                    N, NONE:
                        s ← 0^{msb-rb} || ~ai.f_{rb} || ai.f_{rb}^{rb-1}
                    X:
                        if ai.f_{rb-1..0} ≠ 0 then
                            raise FloatingPointArithmetic // Inexact
                        endif
                        s ← 0
                    Z, Z.D:
                        s ← 0
```

FIG. 29-8

```
                    · endcase
                v ← (0||a.f_msb..0) + (0||s)
                if v_msb = 1 then
                        aims ← msb + 1 - rb
                else
                        aims ← msb - rb
                endif
                aifr ← v_aims..rb
        endif
        if aims > prec then
                case round of
                        C.D, F.D, NONE, Z.D:
                                ai ← a.s || (~as)^{prec-1}

C, F, N, X, Z:
                                raise FloatingPointArithmetic // Overflow
                endcase
        elseif a.s = 0 then
                ai ← aifr
        else
                ai ← -aifr
        endif
ZERO:
        ai ← 0^{prec}
SNAN, QNAN:
        case round of
                C.D, F.D, NONE, Z.D:
                        ai ← 0^{prec}
                C, F, N, X, Z:
                        raise FloatingPointArithmetic // Invalid
        endcase
INFINITY:
        case round of
                C.D, F.D, NONE, Z.D:
                        ai ← a.s || (~as)^{prec-1}
                C, F, N, X, Z:
                        raise FloatingPointArithmetic // Invalid
        endcase
    endcase
enddef def c ← frecrest(a) as
    b.s ← 0
    b.t ← NORM
    b.e ← 0
    b.f ← 1
    c ← fest(fdiv(b,a))
enddef
```

FIG. 29-9

```
def c ← frsqrest(a) as
    b.s ← 0
    b.t ← NORM
    b.e ← 0
    b.f ← 1
    c ← fest(fsqr(fdiv(b,a)))
enddef def c ← fest(a) as
    if (a.t=NORM) then
        msb ← findmsb(a.f)
        a.e ← a.e + msb - 13
        a.f ← a.f_{msb..msb-12} ∥ 1
    else
        c ← a
    endif
enddef def c ← fsqr(a) as
    if (a.t=NORM) and (a.s=0) then
        c.s ← 0
        c.t ← NORM
        if (a.e_0 = 1) then
            c.e ← (a.e-127) / 2
            c.f ← sqr(a.f ∥ 0^{127})
        else
            c.e ← (a.e-128) / 2
            c.f ← sqr(a.f ∥ 0^{128})
        endif
    elseif (a.t=SNAN) or (a.t=QNAN) or a.t=ZERO or ((a.t=INFINITY) and (a.s=0)) then
        c ← a
    elseif ((a.t=NORM) or (a.t=INFINITY)) and (a.s=1) then
        c ← DEFAULTSNAN // Invalid
    else
        assert FALSE // should have covered al the cases above
    endif
enddef
```

*FIG. 29-10*

Operation codes

| | |
|---|---|
| E.ADD.F.16 | Ensemble add floating-point half |
| E.ADD.F.16.C | Ensemble add floating-point half ceiling |
| E.ADD.F.16.F | Ensemble add floating-point half floor |
| E.ADD.F.16.N | Ensemble add floating-point half nearest |
| E.ADD.F.16.X | Ensemble add floating-point half exact |
| E.ADD.F.16.Z | Ensemble add floating-point half zero |
| E.ADD.F.32 | Ensemble add floating-point single |
| E.ADD.F.32.C | Ensemble add floating-point single ceiling |
| E.ADD.F.32.F | Ensemble add floating-point single floor |
| E.ADD.F.32.N | Ensemble add floating-point single nearest |
| E.ADD.F.32.X | Ensemble add floating-point single exact |
| E.ADD.F.32.Z | Ensemble add floating-point single zero |
| E.ADD.F.64 | Ensemble add floating-point double |
| E.ADD.F.64.C | Ensemble add floating-point double ceiling |
| E.ADD.F.64.F | Ensemble add floating-point double floor |
| E.ADD.F.64.N | Ensemble add floating-point double nearest |
| E.ADD.F.64.X | Ensemble add floating-point double exact |
| E.ADD.F.64.Z | Ensemble add floating-point double zero |
| E.ADD.F.128 | Ensemble add floating-point quad |
| E.ADD.F.128.C | Ensemble add floating-point quad ceiling |
| E.ADD.F.128.F | Ensemble add floating-point quad floor |
| E.ADD.F.128.N | Ensemble add floating-point quad nearest |
| E.ADD.F.128.X | Ensemble add floating-point quad exact |
| E.ADD.F.128.Z | Ensemble add floating-point quad zero |
| E.DIV.F.16 | Ensemble divide floating-point half |
| E.DIV.F.16.C | Ensemble divide floating-point half ceiling |
| E.DIV.F.16.F | Ensemble divide floating-point half floor |
| E.DIV.F.16.N | Ensemble divide floating-point half nearest |
| E.DIV.F.16.X | Ensemble divide floating-point half exact |
| E.DIV.F.16.Z | Ensemble divide floating-point half zero |
| E.DIV.F.32 | Ensemble divide floating-point single |
| E.DIV.F.32.C | Ensemble divide floating-point single ceiling |
| E.DIV.F.32.F | Ensemble divide floating-point single floor |
| E.DIV.F.32.N | Ensemble divide floating-point single nearest |
| E.DIV.F.32.X | Ensemble divide floating-point single exact |
| E.DIV.F.32.Z | Ensemble divide floating-point single zero |
| E.DIV.F.64 | Ensemble divide floating-point double |

*FIG. 30A-1*

| | |
|---|---|
| E.DIV.F.64.C | Ensemble divide floating-point double ceiling |
| E.DIV.F.64.F | Ensemble divide floating-point double floor |
| E.DIV.F.64.N | Ensemble divide floating-point double nearest |
| E.DIV.F.64.X | Ensemble divide floating-point double exact |
| E.DIV.F.64.Z | Ensemble divide floating-point double zero |
| E.DIV.F.128 | Ensemble divide floating-point quad |
| E.DIV.F.128.C | Ensemble divide floating-point quad ceiling |
| E.DIV.F.128.F | Ensemble divide floating-point quad floor |
| E.DIV.F.128.N | Ensemble divide floating-point quad nearest |
| E.DIV.F.128.X | Ensemble divide floating-point quad exact |
| E.DIV.F.128.Z | Ensemble divide floating-point quad zero |
| E.MUL.C.F.16 | Ensemble multiply complex floating-point half |
| E.MUL.C.F.32 | Ensemble multiply complex floating-point single |
| E.MUL.C.F.64 | Ensemble multiply complex floating-point double |
| E.MUL.F.16 | Ensemble multiply floating-point half |
| E.MUL.F.16.C | Ensemble multiply floating-point half ceiling |
| E.MUL.F.16.F | Ensemble multiply floating-point half floor |
| E.MUL.F.16.N | Ensemble multiply floating-point half nearest |
| E.MUL.F.16.X | Ensemble multiply floating-point half exact |
| E.MUL.F.16.Z | Ensemble multiply floating-point half zero |
| E.MUL.F.32 | Ensemble multiply floating-point single |
| E.MUL.F.32.C | Ensemble multiply floating-point single ceiling |
| E.MUL.F.32.F | Ensemble multiply floating-point single floor |
| E.MUL.F.32.N | Ensemble multiply floating-point single nearest |
| E.MUL.F.32.X | Ensemble multiply floating-point single exact |
| E.MUL.F.32.Z | Ensemble multiply floating-point single zero |
| E.MUL.F.64 | Ensemble multiply floating-point double |
| E.MUL.F.64.C | Ensemble multiply floating-point double ceiling |
| E.MUL.F.64.F | Ensemble multiply floating-point double floor |
| E.MUL.F.64.N | Ensemble multiply floating-point double nearest |
| E.MUL.F.64.X | Ensemble multiply floating-point double exact |
| E.MUL.F.64.Z | Ensemble multiply floating-point double zero |
| E.MUL.F.128 | Ensemble multiply floating-point quad |
| E.MUL.F.128.C | Ensemble multiply floating-point quad ceiling |
| E.MUL.F.128.F | Ensemble multiply floating-point quad floor |
| E.MUL.F.128.N | Ensemble multiply floating-point quad nearest |
| E.MUL.F.128.X | Ensemble multiply floating-point quad exact |
| E.MUL.F.128.Z | Ensemble multiply floating-point quad zero |

FIG. 30A-2

Selection

| class | op | prec | | | | round/trap |
|---|---|---|---|---|---|---|
| add | EADDF | 16 | 32 | 64 | 128 | NONE C F N X Z |
| divide | EDIVF | 16 | 32 | 64 | 128 | NONE C F N X Z |
| multiply | EMULF | 16 | 32 | 64 | 128 | NONE C F N X Z |
| complex multiply | EMUL.CF | 16 | 32 | 64 | | NONE |

Format

E.op.prec.round      rd=rc,rb rd=eopprecround(rc,rb)

Definition def mul(size,v,i,w,j) as
      mul ← fmul(F(size,$v_{size-1+i..i}$),F(size,$w_{size-1+j..j}$))
enddef def EnsembleFloatingPoint(op,prec,round,ra,rb,rc) as
      c ← RegRead(rc, 128)
      b ← RegRead(rb, 128)
      for i ← 0 to 128-prec by prec
            ci ← F(prec,$c_{i+prec-1..i}$)
            bi ← F(prec,$b_{i+prec-1..i}$)
            case op of
                  E.ADD.F:
                        ai ← faddr(ci,bi,round)
                  E.MUL.F:
                        ai ← fmul(ci,bi)
                  E.MUL.C.F:
                        if (i and prec) then
                              ai ← fadd(mul(prec,c,i,b,i-prec), mul(prec,c,i-prec,b,i))
                        else
                              ai ← fsub(mul(prec,c,I,b,I), mul(prec,c,i+prec,b,i+prec))
                        endif
                  E.DIV.F.:
                        ai ← fdiv(ci,bi)
            endcase
            $a_{i+prec-1..i}$ ← PackF(prec, ai, round)
      endfor
      RegWrite(rd, 128, a)
enddef

FIG. 30C

Operation codes

| | |
|---|---|
| E.SUB.F.16 | Ensemble subtract floating-point half |
| E.SUB.F.16.C | Ensemble subtract floating-point half ceiling |
| E.SUB.F.16.F | Ensemble subtract floating-point half floor |
| E.SUB.F.16.N | Ensemble subtract floating-point half nearest |
| E.SUB.F.16.Z | Ensemble subtract floating-point half zero |
| E.SUB.F.16.X | Ensemble subtract floating-point half exact |
| E.SUB.F.32 | Ensemble subtract floating-point single |
| E.SUB.F.32.C | Ensemble subtract floating-point single ceiling |
| E.SUB.F.32.F | Ensemble subtract floating-point single floor |
| E.SUB.F.32.N | Ensemble subtract floating-point single nearest |
| E.SUB.F.32.Z | Ensemble subtract floating-point single zero |
| E.SUB.F.32.X | Ensemble subtract floating-point single exact |
| E.SUB.F.64 | Ensemble subtract floating-point double |
| E.SUB.F.64.C | Ensemble subtract floating-point double ceiling |
| E.SUB.F.64.F | Ensemble subtract floating-point double floor |
| E.SUB.F.64.N | Ensemble subtract floating-point double nearest |
| E.SUB.F.64.Z | Ensemble subtract floating-point double zero |
| E.SUB.F.64.X | Ensemble subtract floating-point double exact |
| E.SUB.F.128 | Ensemble subtract floating-point quad |
| E.SUB.F.128.C | Ensemble subtract floating-point quad ceiling |
| E.SUB.F.128.F | Ensemble subtract floating-point quad floor |
| E.SUB.F.128.N | Ensemble subtract floating-point quad nearest |
| E.SUB.F.128.Z | Ensemble subtract floating-point quad zero |
| E.SUB.F.128.X | Ensemble subtract floating-point quad exact |

*FIG. 31A*

Selection

| class | op | prec | | | | round/trap |
|---|---|---|---|---|---|---|
| set | SET. E LG L GE | 16 | 32 | 64 | 128 | NONE X |
| subtract | SUB | 16 | 32 | 64 | 128 | NONE C F N X Z |

Format

E.op.prec.round      rd=rb,rc rd=eopprecround(rb,rc)

| 31                  24 | 23        18 | 17        12 | 11        6 | 5        0 |
|---|---|---|---|---|
| E.prec | rd | rc | rb | op.round |
| 8 | 6 | 6 | 6 | 6 |

*FIG. 31B*

Definition

```
def EnsembleReversedFloatingPoint(op,prec,round,rd,rc,rb) as
     c ← RegRead(rc, 128)
     b ← RegRead(rb, 128)
     for i ← 0 to 128-prec by prec
          ci ← F(prec,c_{i+prec-1..i})
          bi ← F(prec,b_{i+prec-1..i})
          ai ← frsubr(ci,-bi, round)
          a_{i+prec-1..i} ← PackF(prec, ai, round)
     endfor
     RegWrite(rd, 128, a)
enddef
```

FIG. 31C

Operation codes

| | |
|---|---|
| X.COMPRESS.2 | Crossbar compress signed pecks |
| X.COMPRESS.4 | Crossbar compress signed nibbles |
| X.COMPRESS.8 | Crossbar compress signed bytes |
| X.COMPRESS.16 | Crossbar compress signed doublets |
| X.COMPRESS.32 | Crossbar compress signed quadlets |
| X.COMPRESS.64 | Crossbar compress signed octlets |
| X.COMPRESS.128 | Crossbar compress signed hexlet |
| X.COMPRESS.U.2 | Crossbar compress unsigned pecks |
| X.COMPRESS.U.4 | Crossbar compress unsigned nibbles |
| X.COMPRESS.U.8 | Crossbar compress unsigned bytes |
| X.COMPRESS.U.16 | Crossbar compress unsigned doublets |
| X.COMPRESS.U.32 | Crossbar compress unsigned quadlets |
| X.COMPRESS.U.64 | Crossbar compress unsigned octlets |
| X.COMPRESS.U.128 | Crossbar compress unsigned hexlet |
| X.EXPAND.2 | Crossbar expand signed pecks |
| X.EXPAND.4 | Crossbar expand signed nibbles |
| X.EXPAND.8 | Crossbar expand signed bytes |
| X.EXPAND.16 | Crossbar expand signed doublets |
| X.EXPAND.32 | Crossbar expand signed quadlets |
| X.EXPAND.64 | Crossbar expand signed octlets |
| X.EXPAND.128 | Crossbar expand signed hexlet |
| X.EXPAND.U.2 | Crossbar expand unsigned pecks |
| X.EXPAND.U.4 | Crossbar expand unsigned nibbles |
| X.EXPAND.U.8 | Crossbar expand unsigned bytes |
| X.EXPAND.U.16 | Crossbar expand unsigned doublets |
| X.EXPAND.U.32 | Crossbar expand unsigned quadlets |
| X.EXPAND.U.64 | Crossbar expand unsigned octlets |
| X.EXPAND.U.128 | Crossbar expand unsigned hexlet |
| X.ROTL.2 | Crossbar rotate left pecks |
| X.ROTL.4 | Crossbar rotate left nibbles |
| X.ROTL.8 | Crossbar rotate left bytes |
| X.ROTL.16 | Crossbar rotate left doublets |
| X.ROTL.32 | Crossbar rotate left quadlets |
| X.ROTL.64 | Crossbar rotate left octlets |
| X.ROTL.128 | Crossbar rotate left hexlet |
| X.ROTR.2 | Crossbar rotate right pecks |
| X.ROTR.4 | Crossbar rotate right nibbles |
| X.ROTR.8 | Crossbar rotate right bytes |
| X.ROTR.16 | Crossbar rotate right doublets |

FIG. 32A-1

| | |
|---|---|
| X.ROTR.32 | Crossbar rotate right quadlets |
| X.ROTR.64 | Crossbar rotate right octlets |
| X.ROTR.128 | Crossbar rotate right hexlet |
| X.SHL.2 | Crossbar shift left pecks |
| X.SHL.2.O | Crossbar shift left signed pecks check overflow |
| X.SHL.4 | Crossbar shift left nibbles |
| X.SHL.4.O | Crossbar shift left signed nibbles check overflow |
| X.SHL.8 | Crossbar shift left bytes |
| X.SHL.8.O | Crossbar shift left signed bytes check overflow |
| X.SHL.16 | Crossbar shift left doublets |
| X.SHL.16.O | Crossbar shift left signed doublets check overflow |
| X.SHL.32 | Crossbar shift left quadlets |
| X.SHL.32.O | Crossbar shift left signed quadlets check overflow |
| X.SHL.64 | Crossbar shift left octlets |
| X.SHL.64.O | Crossbar shift left signed octlets check overflow |
| X.SHL.128 | Crossbar shift left hexlet |
| X.SHL.128.O | Crossbar shift left signed hexlet check overflow |
| X.SHL.U.2.O | Crossbar shift left unsigned pecks check overflow |
| X.SHL.U.4.O | Crossbar shift left unsigned nibbles check overflow |
| X.SHL.U.8.O | Crossbar shift left unsigned bytes check overflow |
| X.SHL.U.16.O | Crossbar shift left unsigned doublets check overflow |
| X.SHL.U.32.O | Crossbar shift left unsigned quadlets check overflow |
| X.SHL.U.64.O | Crossbar shift left unsigned octlets check overflow |
| X.SHL.U.128.O | Crossbar shift left unsigned hexlet check overflow |
| X.SHR.2 | Crossbar signed shift right pecks |
| X.SHR.4 | Crossbar signed shift right nibbles |
| X.SHR.8 | Crossbar signed shift right bytes |
| X.SHR.16 | Crossbar signed shift right doublets |
| X.SHR.32 | Crossbar signed shift right quadlets |
| X.SHR.64 | Crossbar signed shift right octlets |
| X.SHR.128 | Crossbar signed shift right hexlet |
| X.SHR.U.2 | Crossbar shift right unsigned pecks |
| X.SHR.U.4 | Crossbar shift right unsigned nibbles |
| X.SHR.U.8 | Crossbar shift right unsigned bytes |
| X.SHR.U.16 | Crossbar shift right unsigned doublets |
| X.SHR.U.32 | Crossbar shift right unsigned quadlets |
| X.SHR.U.64 | Crossbar shift right unsigned octlets |
| X.SHR.U.128 | Crossbar shift right unsigned hexlet |

FIG. 32A-2

Selection

| class | op | size |
|---|---|---|
| precision | EXPAND   EXPAND.U<br>COMPRESS   COMPRESS.U | 2 4 8 16 32 64 128 |
| shift | ROTR   ROTL   SHR   SHL<br>SHL.O   SHL.U.O SHR.U | 2 4 8 16 32 64 128 |

Format

X.op.size     rd=rc,rb rd=xopsize(rc,rb)

| 31 | 2 24 23 | 18 17 | 12 11 | 6 5 | 1 |
|---|---|---|---|---|---|
| XSHIFT | s | rd | rc | rb | op | sz |
| 7 | 1 | 6 | 6 | 6 | 4 | 2 | lsize ← log(size)
s ← lsize$_2$
sz ← lsize$_{1..0}$

FIG. 32B

Definition

```
def Crossbar(op,size,rd,rc,rb)
    c ← RegRead(rc, 128)
    b ← RegRead(rb, 128)
    shift ← b and (size-1)
    case op5..2 || 0² of
```
X.COMPRESS:
$$hsize \leftarrow size/2$$
$$\text{for } i \leftarrow 0 \text{ to } 64-hsize \text{ by } hsize$$
$$\quad \text{if } shift \leq hsize \text{ then}$$
$$\qquad a_{i+hsize-1..i} \leftarrow c_{i+i+shift+hsize-1..i+i+shift}$$
$$\quad \text{else}$$
$$\qquad a_{i+hsize-1..i} \leftarrow c_{i+i+size-1..i+i+size-f}^{shift-hsize} \;\|\; c_{i+i+size-1..i+i+shift}$$
$$\quad \text{endif}$$
$$\text{endfor}$$
$$a_{127..64} \leftarrow 0$$

X.COMPRESS.U:
$$hsize \leftarrow size/2$$
$$\text{for } i \leftarrow 0 \text{ to } 64-hsize \text{ by } hsize$$
$$\quad \text{if } shift \leq hsize \text{ then}$$
$$\qquad a_{i+hsize-1..i} \leftarrow c_{i+i+shift+hsize-1..i+i+shift}$$
$$\quad \text{else}$$
$$\qquad a_{i+hsize-1..i} \leftarrow 0^{shift-hsize} \;\|\; c_{i+i+size-1..i+i+shift}$$
$$\quad \text{endif}$$
$$\text{endfor}$$
$$a_{127..64} \leftarrow 0$$

X.EXPAND:
$$hsize \leftarrow size/2$$
$$\text{for } i \leftarrow 0 \text{ to } 64-hsize \text{ by } hsize$$
$$\quad \text{if } shift \leq hsize \text{ then}$$
$$\qquad a_{i+i+size-1..i+i} \leftarrow c_{i+hsize-1}^{hsize-shift} \;\|\; c_{i+hsize-1..i} \;\|\; 0^{shift}$$
$$\quad \text{else}$$
$$\qquad a_{i+i+size-1..i+i} \leftarrow c_{i+size-shift-1..i} \;\|\; 0^{shift}$$
$$\quad \text{endif}$$
$$\text{endfor}$$

FIG. 32C-1

X.EXPAND.U:
    hsize ← size/2
    for i ← 0 to 64-hsize by hsize
        if shift ≤ hsize then
            $a_{i+i+size-1..i+i} \leftarrow 0^{hsize-shift} \parallel c_{i+hsize-1..i} \parallel 0^{shift}$
        else
            $a_{i+i+size-1..i+i} \leftarrow c_{i+size-shift-1..i} \parallel 0^{shift}$
        endif
    endfor X.ROTL:
    for i ← 0 to 128-size by size
        $a_{i+size-1..i} \leftarrow c_{i+size-1-shift..i} \parallel c_{i+size-1..i+size-1-shift}$
    endfor X.ROTR:
    for i ← 0 to 128-size by size
        $a_{i+size-1..i} \leftarrow c_{i+shift-1..i} \parallel c_{i+size-1..i+shift}$
    endfor X.SHL:
    for i ← 0 to 128-size by size
        $a_{i+size-1..i} \leftarrow c_{i+size-1-shift..i} \parallel 0^{shift}$
    endfor X.SHL.O:
    for i ← 0 to 128-size by size
        if $c_{i+size-1..i+size-1-shift} \neq c_{i+size-1-shift}^{shift+1}$ then
            raise FixedPointArithmetic
        endif
        $a_{i+size-1..i} \leftarrow c_{i+size-1-shift..i} \parallel 0^{shift}$
    endfor

FIG. 32C-2

X.SHL.U.O:
    for $i \leftarrow 0$ to 128-size by size
        if $c_{i+size-1..i+size-shift} \neq 0^{shift}$ then
            raise FixedPointArithmetic
        endif
        $a_{i+size-1..i} \leftarrow c_{i+size-1-shift..i} \| 0^{shift}$
    endfor
X.SHR:
    for $i \leftarrow 0$ to 128-size by size
        $a_{i+size-1..i} \leftarrow c_{i+size-1}^{shift} \| c_{i+size-1..i+shift}$
    endfor
X.SHR.U:
    for $i \leftarrow 0$ to 128-size by size
        $a_{i+size-1..i} \leftarrow 0^{shift} \| c_{i+size-1..i+shift}$
    endfor
  endcase
  RegWrite(rd, 128, a)
enddef

FIG. 32C -3

Compress 32 bits to 16, with 4-bit right shift

Format

X.EXTRACT ra=rd,rc,rb ra=xextract(rd,rc,rb)

| 31 | 24 23 | 18 17 | 12 11 | 6 5 | 0 |
|---|---|---|---|---|---|
| op | rd | rc | rb | ra |
| 8 | 6 | 6 | 6 | 6 |

*FIG. 33A*

Definition

```
def CrossbarExtract(op,ra,rb,rc,rd) as
    d ← RegRead(rd, 128)
    c ← RegRead(rc, 128)
    b ← RegRead(rb, 128)
    case b_{8..0} of
        0..255:
            gsize ← 128
        256..383:
            gsize ← 64
        384..447:
            gsize ← 32
        448..479:
            gsize ← 16
        480..495:
            gsize ← 8
        496..503:
            gsize ← 4
        504..507:
            gsize ← 2
        508..511:
            gsize ← 1
    endcase
    m ← b_{12}
    as ← signed ← b_{14}
    h ← (2-m)*gsize
    spos ← (b_{8..0}) and ((2-m)*gsize-1)
    dpos ← (0 || b_{23..16}) and (gsize-1)
    sfsize ← (0 || b_{31..24}) and (gsize-1)
    tfsize ← (sfsize = 0) or ((sfsize+dpos) > gsize) ? gsize-dpos : sfsize
    fsize ← (tfsize + spos > h) ? h - spos : tfsize
    for i ← 0 to 128-gsize by gsize
        case op of
            X.EXTRACT:
                if m then
                    p ← d_{gsize+i-1..i}
                else
                    p ← (d || c)_{2*(gsize+i)-1..2*i}
                endif
        endcase
        v ← (as & p_{h-1})||p
        w ← (as & v_{spos+fsize-1})^{gsize-fsize-dpos} || v_{fsize-1+spos..spos} || 0^{dpos}
        if m then
            a_{size-1+i..i} ← c_{gsize-1+i..dpos+fsize+i} || w_{dpos+fsize-1..dpos} || c_{dpos-1+1..i}
        else
            a_{size-1+i..i} ← w
        endif
    endfor
    RegWrite(ra, 128, a)
enddef
```

FIG. 33B

Crossbar extract

Crossbar merge extract

| | |
|---|---|
| X.SHUFFLE.4 | Crossbar shuffle within pecks |
| X.SHUFFLE.8 | Crossbar shuffle within bytes |
| X.SHUFFLE.16 | Crossbar shuffle within doublets |
| X.SHUFFLE.32 | Crossbar shuffle within quadlets |
| X.SHUFFLE.64 | Crossbar shuffle within octlets |
| X.SHUFFLE.128 | Crossbar shuffle within hexlet |
| X.SHUFFLE.256 | Crossbar shuffle within triclet |

*FIG. 34A*

Format

X.SHUFFLE.256    rd=rc,rb,v,w,h
X.SHUFFLE.size rd=rcb,v,w rd=xshuffle256(rc,rb,v,w,h)
rd=xshufflesize(rcb,v,w)

| 31 | 24 | 23 | 18 | 17 | 12 | 11 | 6 | 5 | 0 |
|---|---|---|---|---|---|---|---|---|---|
| X.SHUFFLE | | rd | | rc | | rb | | op | |
| 8 | | 6 | | 6 | | 6 | | 6 | | rc ← rb ← rcb
x←log2(size)
y←log2(v)
z←log2(w)
op ← ((x*x*x-3*x*x-4*x)/6-(z*z-z)/2+x*z+y) + (size=256)*(h*32-56)

*FIG. 34B*

Definition

```
def CrossbarShuffle(major,rd,rc,rb,op)
      c ← RegRead(rc, 128)
      b ← RegRead(rb, 128)
      if rc=rb then
            case op of
                  0..55:
                        for x ← 2 to 7; for y ← 0 to x-2; for z ← 1 to x-y-1
                              if op = ((x*x*x-3*x*x-4*x)/6-(z*z-z)/2+x*z+y) then
                                    for i ← 0 to 127
```
$$a_i \leftarrow c_{(i_{6..x} \| i_{y+z-1..y} \| i_{x-1..y+z} \| i_{y-1..0})}$$
```
                                    end
                              endif
                        endfor; endfor; endfor
                  56..63:
                        raise ReservedInstruction
            endcase
      elseif
            case op4..0 of
                  0..27:
                        cb ← c ∥ b
                        x ← 8
                        h ← op5
                        for y ← 0 to x-2; for z ← 1 to x-y-1
                              if op4..0 = ((17*z-z*z)/2-8+y) then
                                    for i ← h*128 to 127+h*128
```
$$a_{i-h*128} \leftarrow cb_{(i_{y+z-1..y} \| i_{x-1..y+z} \| i_{y-1..0})}$$
```
                                    end
                              endif
                        endfor; endfor
                  28..31:
                        raise ReservedInstruction
            endcase
      endif
      RegWrite(rd, 128, a)
enddef
```

FIG. 34C

4-way shuffle bytes within hexlet 4-way shuffle bytes within triclet

PROGRAMMABLE PROCESSOR WITH GROUP FLOATING POINT OPERATIONS

RELATED APPLICATIONS

This application is a continuation of U.S. patent application Ser. No. 09/382,402, filed Aug. 24, 1999, now U.S. Pat. No. 6,295,599, which is a continuation-in-part of U.S. patent application Ser. No. 09/169,963, filed Oct. 13, 1998, now U.S. Pat. No. 6,006,318, which is a continuation of U.S. patent application Ser. No. 08/754,827, filed Nov. 22, 1996 now U.S. Pat. No. 5,822,603, which is a divisional of U.S. patent application Ser. No. 08/516,036, filed Aug. 16, 1995 now U.S. Pat. No. 5,742,840. The contents of U.S. patent application Ser. No. 09/382,402 are hereby incorporated by reference.

FIELD OF THE INVENTION

The present invention relates to general purpose processor architectures, and particularly relates to wide operand architectures.

REFERENCE TO A "SEQUENCE LISTING," A TABLE, OR A COMPUTER PROGRAM LISTING APPENDIX SUBMITTED ON A COMPACT DISK

This application includes an appendix, submitted herewith in duplicate on compact disks labeled as "Copy 1" and "Copy 2." The contents of the compact disks are hereby incorporated by reference.

BACKGROUND OF THE INVENTION

The performance level of a processor, and particularly a general purpose processor, can be estimated from the multiple of a plurality of interdependent factors: clock rate, gates per clock, number of operands, operand and data path width, and operand and data path partitioning. Clock rate is largely influenced by the choice of circuit and logic technology, but is also influenced by the number of gates per clock. Gates per clock is how many gates in a pipeline may change state in a single clock cycle. This can be reduced by inserting latches into the data path: when the number of gates between latches is reduced, a higher clock is possible. However, the additional latches produce a longer pipeline length, and thus come at a cost of increased instruction latency. The number of operands is straightforward; for example, by adding with carry-save techniques, three values may be added together with little more delay than is required for adding two values. Operand and data path width defines how much data can be processed at once; wider data paths can perform more complex functions, but generally this comes at a higher implementation cost. Operand and data path partitioning refers to the efficient use of the data path as width is increased, with the objective of maintaining substantially peak usage.

The last factor, operand and data path partitioning, is treated extensively in commonly-assigned U.S. Pat. No.'s 5,742,840, 5,794,060, 5,794,061, 5,809,321, and 5,822,603, which describe systems and methods for enhancing the utilization of a general purpose processor by adding classes of instructions. These classes of instructions use the contents of general purpose registers as data path sources, partition the operands into symbols of a specified size, perform operations in parallel, catenate the results and place the catenated results into a general-purpose register. These patents, all of which are assigned to the same assignee as the present invention, teach a general purpose microprocessor which has been optimized for processing and transmitting media data streams through significant parallelism.

While the foregoing patents offered significant improvements in utilization and performance of a general purpose microprocessor, particularly for handling broadband communications such as media data streams, other improvements are possible.

Many general purpose processors have general registers to store operands for instructions, with the register width matched to the size of the data path. Processor designs generally limit the number of accessible registers per instruction because the hardware to access these registers is relatively expensive in power and area. While the number of accessible registers varies among processor designs, it is often limited to two, three or four registers per instruction when such instructions are designed to operate in a single processor clock cycle or a single pipeline flow. Some processors, such as the Motorola 68000 have instructions to save and restore an unlimited number of registers, but require multiple cycles to perform such an instruction.

The Motorola 68000 also attempts to overcome a narrow data path combined with a narrow register file by taking multiple cycles or pipeline flows to perform an instruction, and thus emulating a wider data path. However, such multiple precision techniques offer only marginal improvement in view of the additional clock cycles required. The width and accessible number of the general purpose registers thus fundamentally limits the amount of processing that can be performed by a single instruction in a register-based machine.

Existing processors may provide instructions that accept operands for which one or more operands are read from a general purpose processor's memory system. However, as these memory operands are generally specified by register operands, and the memory system data path is no wider than the processor data path, the width and accessible number of general purpose operands per instruction per cycle or pipeline flow is not enhanced.

The number of general purpose register operands accessible per instruction is generally limited by logical complexity and instruction size. For example, it might be possible to implement certain desirable but complex functions by specifying a large number of general purpose registers, but substantial additional logic would have to be added to a conventional design to permit simultaneous reading and bypassing of the register values. While dedicated registers have been used in some prior art designs to increase the number or size of source operands or results, explicit instructions load or store values into these dedicated registers, and additional instructions are required to save and restore these registers upon a change of processor context.

There has therefore been a need for a processor system capable of efficient handling of operands of greater width than either the memory system or any accessible general purpose register.

SUMMARY OF THE INVENTION

The present invention provides a system and method for improving the performance of general purpose processors by expanding at least one source operand to a width greater than the width of either the general purpose register or the data path width. In addition, several classes of instructions will be provided which cannot be performed efficiently if the operands are limited to the width and accessible number of general purpose registers.

In the present invention, operands are provided which are substantially larger than the data path width of the processor. This is achieved, in part, by using a general purpose register to specify a memory address from which at least more than one, but typically several data path widths of data can be read. To permit such a wide operand to be performed in a single cycle, the data path functional unit is augmented with dedicated storage to which the memory operand is copied on an initial execution of the instruction. Further execution of the instruction or other similar instructions that specify the same memory address can read the dedicated storage to obtain the operand value. However, such reads are subject to conditions to verify that the memory operand has not been altered by intervening instructions. If the memory operand remains current—that is, the conditions are met—the memory operand fetch can be combined with one or more register operands in the functional unit, producing a result. The size of the result is, typically, constrained to that of a general register so that no dedicated or other special storage is required for the result.

Exemplary instructions using wide operations include wide instructions that perform bit level switching (Wide Switch), byte or larger table-lookup (Wide Translate), Wide Multiply Matrix, Wide Multiply Matrix Extract, Wide Multiply Matrix Extract Immediate, Wide Multiply Matrix Floating point, and Wide Multiply Matrix Galois.

Another aspect of the present invention addresses efficient usage of a multiplier array that is fully used for high precision arithmetic, but is only partly used for other, lower precision operations. This can be accomplished by extracting the high-order portion of the multiplier product or sum of products, adjusted by a dynamic shift amount from a general register or an adjustment specified as part of the instruction, and rounded by a control value from a register or instruction portion. The rounding may be any of several types, including round-to-nearest/even, toward zero, floor, or ceiling. Overflows are typically handled by limiting the result to the largest and smallest values that can be accurately represented in the output result.

When an extract is controlled by a register, the size of the result can be specified, allowing rounding and limiting to a smaller number of bits than can fit in the result. This permits the result to be scaled for use in subsequent operations without concern of overflow or rounding. As a result, performance is enhanced. In those instances where the extract is controlled by a register, a single register value defines the size of the operands, the shift amount and size of the result, and the rounding control. By placing such control information in a single register, the size of the instruction is reduced over the number of bits that such an instruction would otherwise require, again improving performance and enhancing processor flexibility. Exemplary instructions are Ensemble Convolve Extract, Ensemble Multiply Extract, Ensemble Multiply Add Extract, and Ensemble Scale Add Extract. With particular regard to the Ensemble Scale Add Extract Instruction, the extract control information is combined in a register with two values used as scalar multipliers to the contents of two vector multiplicands. This combination reduces the number of registers otherwise required, thus reducing the number of bits required for the instruction.

THE FIGURES

FIG. 9 illustrates Wide Microcache data structures in accordance with an exemplary embodiment of the present invention.

FIGS. 12A–12D illustrate a Wide Switch instruction in accordance with an exemplary embodiment of the present invention.

FIGS. 13A–13D illustrate a Wide Translate instruction in accordance with an exemplary embodiment of the present invention.

FIGS. 14A–14E illustrate a Wide Multiply Matrix instruction in accordance with an exemplary embodiment of the present invention.

FIGS. 15A–15F illustrate a Wide Multiply Matrix Extract instruction in accordance with an exemplary embodiment of the present invention.

FIGS. 16A–16E illustrate a Wide Multiply Matrix Extract Immediate instruction in accordance with an exemplary embodiment of the present invention.

FIGS. 17A–17E illustrate a Wide Multiply Matrix Floating point instruction in accordance with an exemplary embodiment of the present invention.

FIGS. 18A–18D illustrate a Wide Multiply Matrix Galois instruction in accordance with an exemplary embodiment of the present invention.

FIGS. 19A–19G illustrate an Ensemble Extract Inplace instruction in accordance with an exemplary embodiment of the present invention.

FIGS. 20A–20J illustrate an Ensemble Extract instruction in accordance with an exemplary embodiment of the present invention.

FIGS. 21A–21F illustrate a System and Privileged Library Calls in accordance with an exemplary embodiment of the present invention.

FIGS. 22A–22B illustrate an Ensemble Scale-Add Floating-point instruction in accordance with an exemplary embodiment of the present invention.

FIGS. 23A–23C illustrate a Group Boolean instruction in accordance with an exemplary embodiment of the present invention.

FIGS. 24A–24C illustrate a Branch Hint instruction in accordance with an exemplary embodiment of the present invention.

FIGS. 25A–25D illustrate an Ensemble Sink Floating-point instruction in accordance with an exemplary embodiment of the present invention.

FIGS. 26A–26C illustrate Group Add instructions in accordance with an exemplary embodiment of the present invention.

FIGS. 27A–27C illustrate Group Set instructions and Group Subtract instructions in accordance with an exemplary embodiment of the present invention.

FIGS. 28A–28C illustrate Ensemble Convolve, Ensemble Divide, Ensemble Multiply, and Ensemble Multiply Sum instructions in accordance with an exemplary embodiment of the present invention.

FIG. 29 illustrates exemplary functions that are defined for use within the detailed instruction definitions in other sections.

FIGS. 30A–30C illustrate Ensemble Floating-Point Add, Ensemble Floating-Point Divide, and Ensemble Floating-Point Multiply instructions in accordance with an exemplary embodiment of the present invention.

FIGS. 31A–31C illustrate Ensemble Floating-Point Subtract instructions in accordance with an exemplary embodiment of the present invention.

FIGS. 32A–32D illustrate Crossbar Compress, Expand, Rotate, and Shift instructions in accordance with an exemplary embodiment of the present invention.

FIGS. 33A–33D illustrate Extract instructions in accordance with an exemplary embodiment of the present invention.

FIGS. 34A–34E illustrate Shuffle instructions in accordance with an exemplary embodiment of the present invention.

DETAILED DESCRIPTION OF THE INVENTION

Processor Layout

Figure 1:
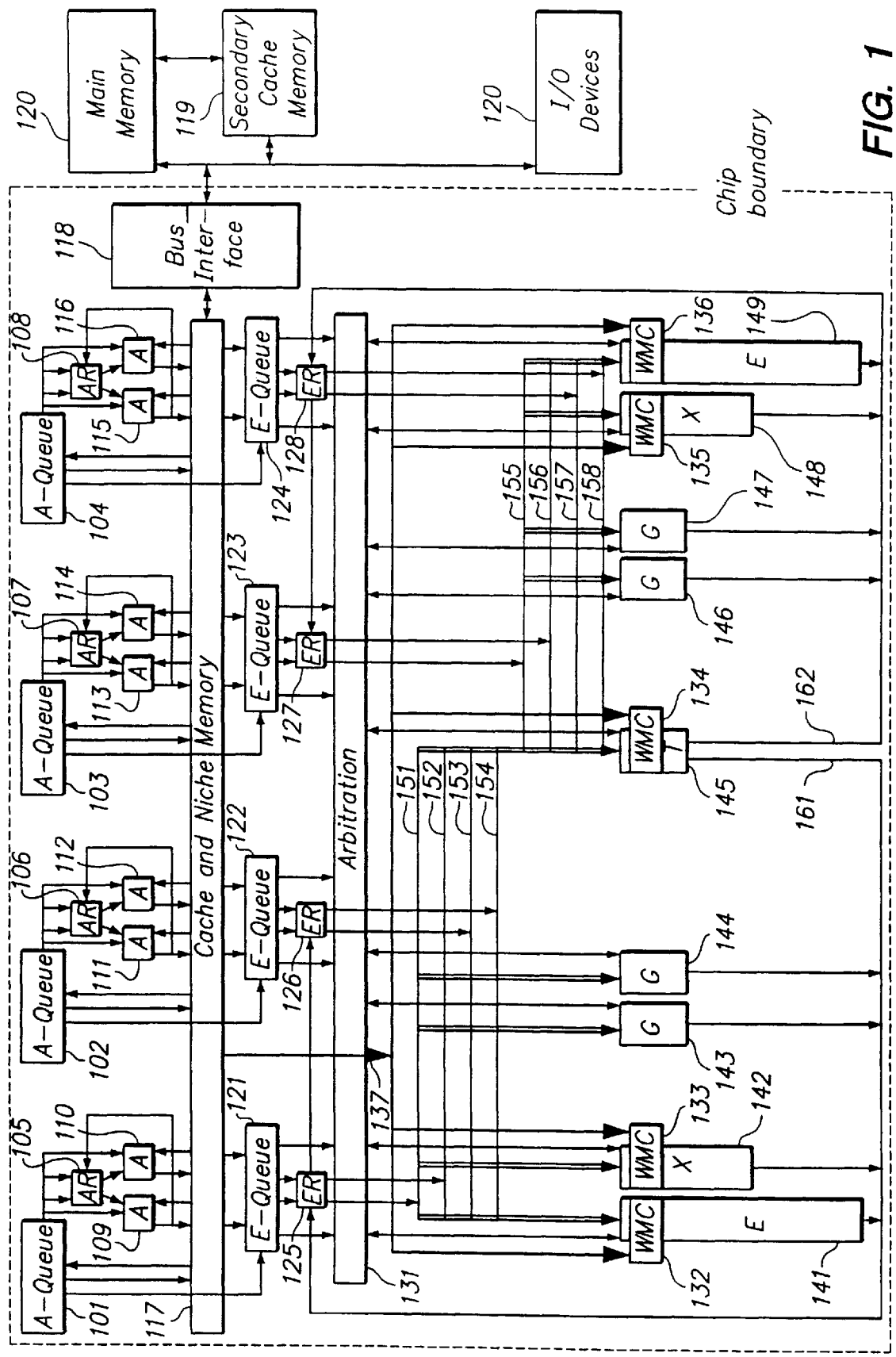
FIG. 1 is a system level diagram showing the functional blocks of a system in accordance with an exemplary embodiment of the present invention.

Referring first to FIG. 1, a general purpose processor is illustrated therein in block diagram form. In FIG. 1, four copies of an access unit are shown, each with an access instruction fetch queue A-Queue 101–104. Each access instruction fetch queue A-Queue 101–104 is coupled to an access register file AR 105–108, which are each coupled to two access functional units A 109–116. In a typical embodiment, each thread of the processor may have on the order of sixty-four general purpose registers (e.g., the AR's 105–108 and ER's 125–128). The access units function independently for four simultaneous threads of execution, and each compute program control flow by performing arithmetic and branch instructions and access memory by performing load and store instructions. These access units also provide wide operand specifiers for wide operand instructions. These eight access functional units A 109–116 produce results for access register files AR 105–108 and memory addresses to a shared memory system 117–120.

In one embodiment, the memory hierarchy includes on-chip instruction and data memories, instruction and data caches, a virtual memory facility, and interfaces to external devices. In FIG. 1, the memory system is comprised of a combined cache and niche memory 117, an external bus interface 118, and, externally to the device, a secondary cache 119 and main memory system with I/O devices 120. The memory contents fetched from memory system 117–120 are combined with execute instructions not performed by the access unit, and entered into the four execute instruction queues E-Queue 121–124. For wide instructions, memory contents fetched from memory system 117–120 are also provided to wide operand microcaches 132–136 by bus 137. Instructions and memory data from E-queue 121–124 are presented to execution register files 125–128, which fetch execution register file source operands. The instructions are coupled to the execution unit arbitration unit Arbitration 131, that selects which instructions from the four threads are to be routed to the available execution functional units E 141 and 149, X 142 and 148, G 143–144 and 146–147, and T 145. The execution functional units E 141 and 149, the execution functional units X 142 and 148, and the execution functional unit T 145 each contain a wide operand microcache 132–136, which are each coupled to the memory system 117 by bus 137.

The execution functional units G 143–144 and 146–147 are group arithmetic and logical units that perform simple arithmetic and logical instructions, including group operations wherein the source and result operands represent a group of values of a specified symbol size, which are partitioned and operated on separately, with results catenated together. In a presently preferred embodiment the data path is 128 bits wide, although the present invention is not intended to be limited to any specific size of data path.

The execution functional units X 142 and 148 are crossbar switch units that perform crossbar switch instructions. The crossbar switch units 142 and 148 perform data handling operations on the data stream provided over the data path source operand buses 151–158, including deals, shuffles, shifts, expands, compresses, swizzles, permutes and reverses, plus the wide operations discussed hereinafter. In a key element of a first aspect of the invention, at least one such operation will be expanded to a width greater than the general register and data path width.

The execution functional units E 141 and 149 are ensemble units that perform ensemble instructions using a large array multiplier, including group or vector multiply and matrix multiply of operands partitioned from data path source operand buses 151–158 and treated as integer, floating point, polynomial or Galois field values. Matrix multiply instructions and other operations utilize a wide operand loaded into the wide operand microcache 132 and 136.

The execution functional unit T 145 is a translate unit that performs table-look-up operations on a group of operands partitioned from a register operand, and catenates the result. The Wide Translate instruction utilizes a wide operand loaded into the wide operand microcache 134.

The execution functional units E 141, 149, execution functional units X—142, 148, and execution functional unit T each contain dedicated storage to permit storage of source operands including wide operands as discussed hereinafter. The dedicated storage 132–136, which may be thought of as a wide microcache, typically has a width which is a multiple of the width of the data path operands related to the data path source operand buses 151–158. Thus, if the width of the data path 151–158 is 128 bits, the dedicated storage 132–136 may have a width of 256, 512, 1024 or 2048 bits. Operands which utilize the full width of the dedicated storage are referred to herein as wide operands, although it is not necessary in all instances that a wide operand use the entirety of the width of the dedicated storage; it is sufficient that the wide operand use a portion greater than the width of the memory data path of the output of the memory system 117–120 and the functional unit data path of the input of the execution functional units 141–149, though not necessarily greater than the width of the two combined. Because the width of the dedicated storage 132–136 is greater than the width of the memory operand bus 137, portions of wide operands are loaded sequentially into the dedicated storage 132–136. However, once loaded, the wide operands may then be used at substantially the same time. It can be seen that functional units 141–149 and associated execution registers 125–128 form a data functional unit, the exact elements of which may vary with implementation.

The execution register file ER 125–128 source operands are coupled to the execution units 141–145 using source operand buses 151–154 and to the execution units 145–149 using source operand buses 155–158. The function unit result operands from execution units 141–145 are coupled to the execution register file ER 125–128 using result bus 161 and the function units result operands from execution units 145–149 are coupled to the execution register file using result bus 162.

Wide Multiply Matrix

Figure 2:
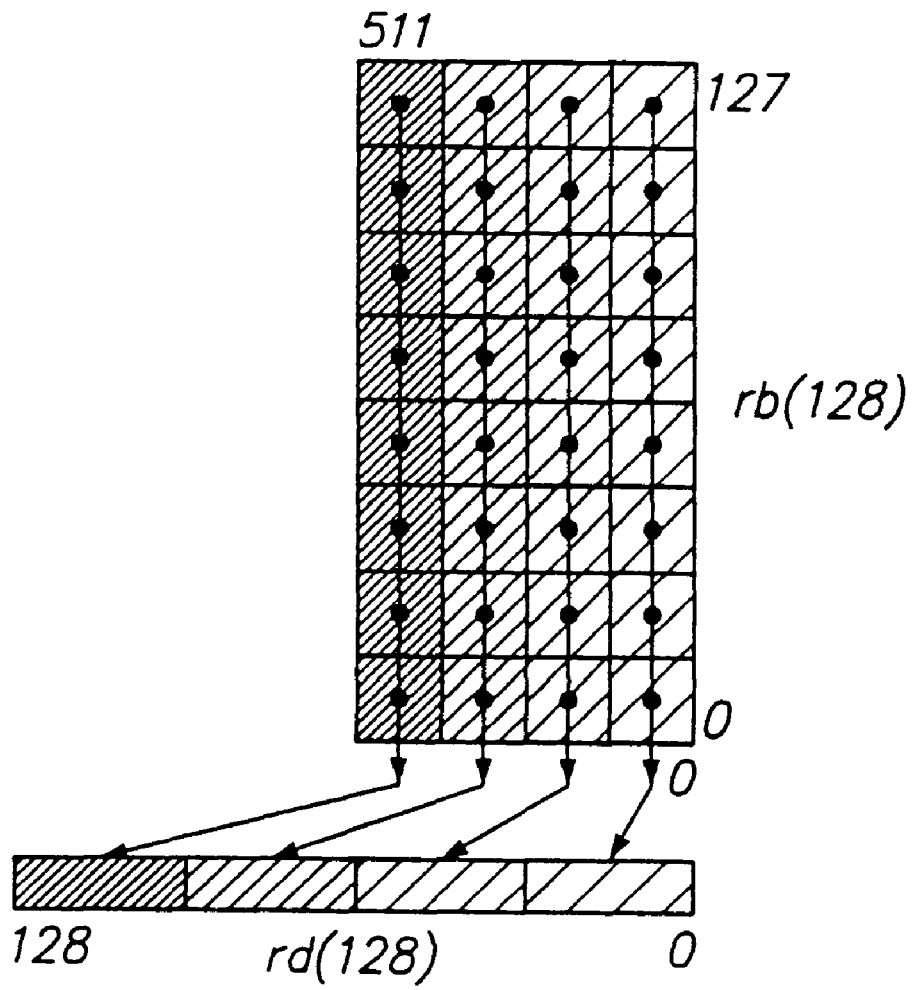
FIG. 2 is a matrix representation of a wide matrix multiply in accordance with an exemplary embodiment of the present invention.
Figure 3:
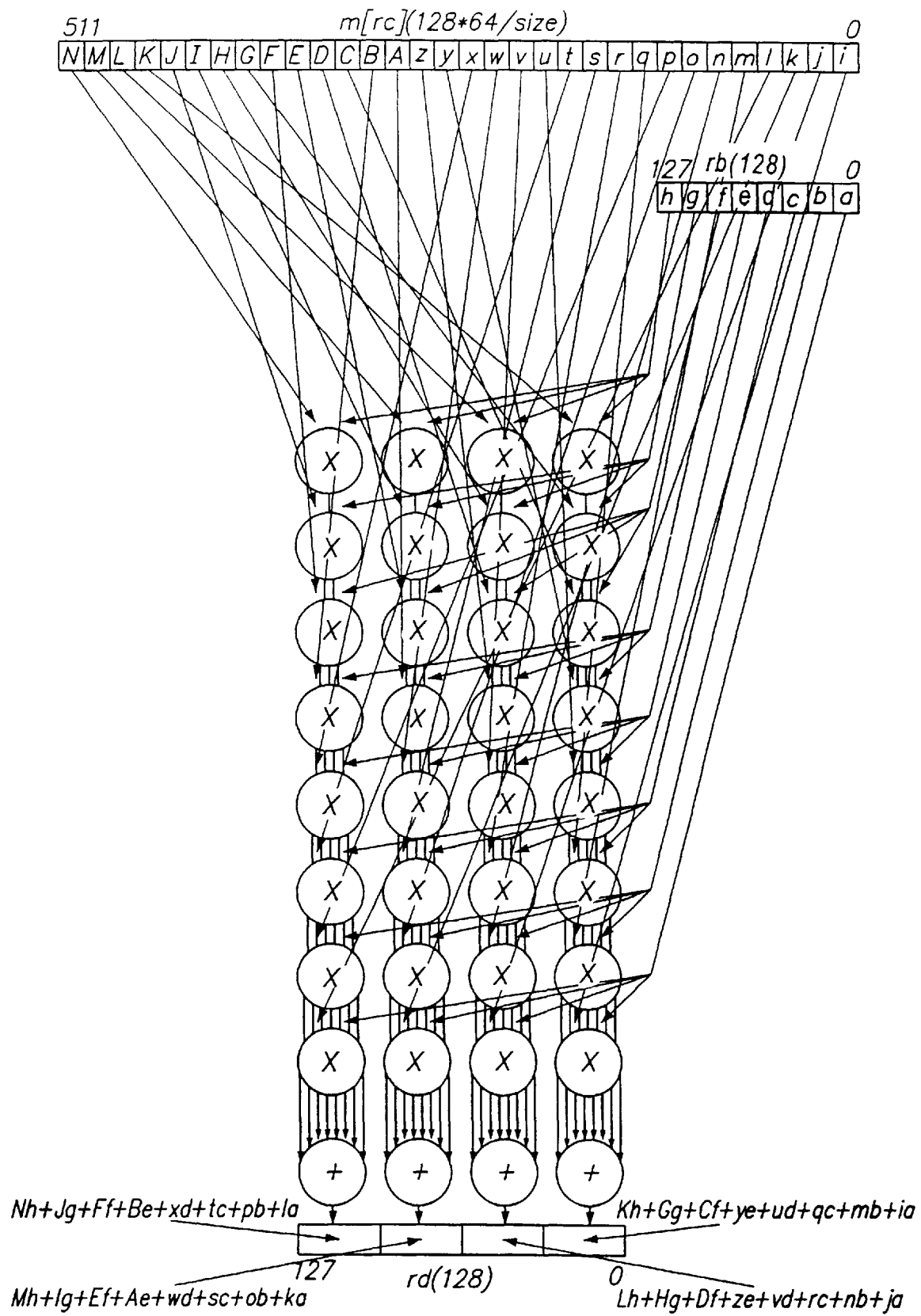
FIG. 3 is a further representation of a wide matrix multiple in accordance with an exemplary embodiment of the present invention.

The wide operands of the present invention provide the ability to execute complex instructions such as the wide multiply matrix instruction shown in FIG. 2, which can be appreciated in an alternative form, as well, from FIG. 3. As can be appreciated from FIGS. 2 and 3, a wide operand permits, for example, the matrix multiplication of various sizes and shapes which exceed the data path width. The example of FIG. 2 involves a matrix specified by register rc having 128*64/size bits (512 bits for this example) multiplied by a vector contained in register rb having 128 bits, to yield a result, placed in register rd, of 128 bits.

The notation used in FIG. 2 and following similar figures illustrates a multiplication as a shaded area at the intersection of two operands projected in the horizontal and vertical dimensions. A summing node is illustrated as a line segment connecting a darkened dots at the location of multiplier products that are summed. Products that are subtracted at the summing node are indicated with a minus symbol within the shaded area.

When the instruction operates on floating-point values, the multiplications and summations illustrated are floating point multiplications and summations. An exemplary embodiment may perform these operations without rounding the intermediate results, thus computing the final result as if computed to infinite precision and then rounded only once.

It can be appreciated that an exemplary embodiment of the multipliers may compute the product in carry-save form and may encode the multiplier rb using Booth encoding to minimize circuit area and delay. It can be appreciated that an exemplary embodiment of such summing nodes may perform the summation of the products in any order, with particular attention to minimizing computation delay, such as by performing the additions in a binary or higher-radix tree, and may use carry-save adders to perform the addition to minimize the summation delay. It can also be appreciated that an exemplary embodiment may perform the summation using sufficient intermediate precision that no fixed-point or floating-point overflows occur on intermediate results.

A comparison of FIGS. 2 and 3 can be used to clarify the relation between the notation used in FIG. 2 and the more conventional schematic notation in FIG. 3, as the same operation is illustrated in these two figures.

Wide Operand

Figure 5:
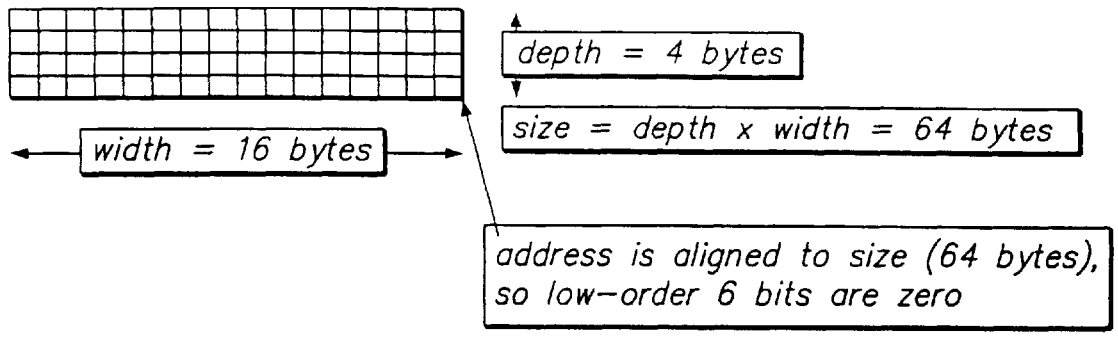
FIG. 5 illustrates a wide operand in accordance with an exemplary embodiment of the present invention.

The operands that are substantially larger than the data path width of the processor are provided by using a general-purpose register to specify a memory specifier from which more than one but in some embodiments several data path widths of data can be read into the dedicated storage. The memory specifier typically includes the memory address together with the size and shape of the matrix of data being operated on. The memory specifier or wide operand specifier can be better appreciated from FIG. 5, in which a specifier 500 is seen to be an address, plus a field representative of the size/2 and a further field representative of width/2, where size is the product of the depth and width of the data. The address is aligned to a specified size, for example sixty four bytes, so that a plurality of low order bits (for example, six bits) are zero. The specifier 500 can thus be seen to comprise a first field 505 for the address, plus two field indicia 510 within the low order six bits to indicate size and width.

Specifier Decoding

Figure 6:
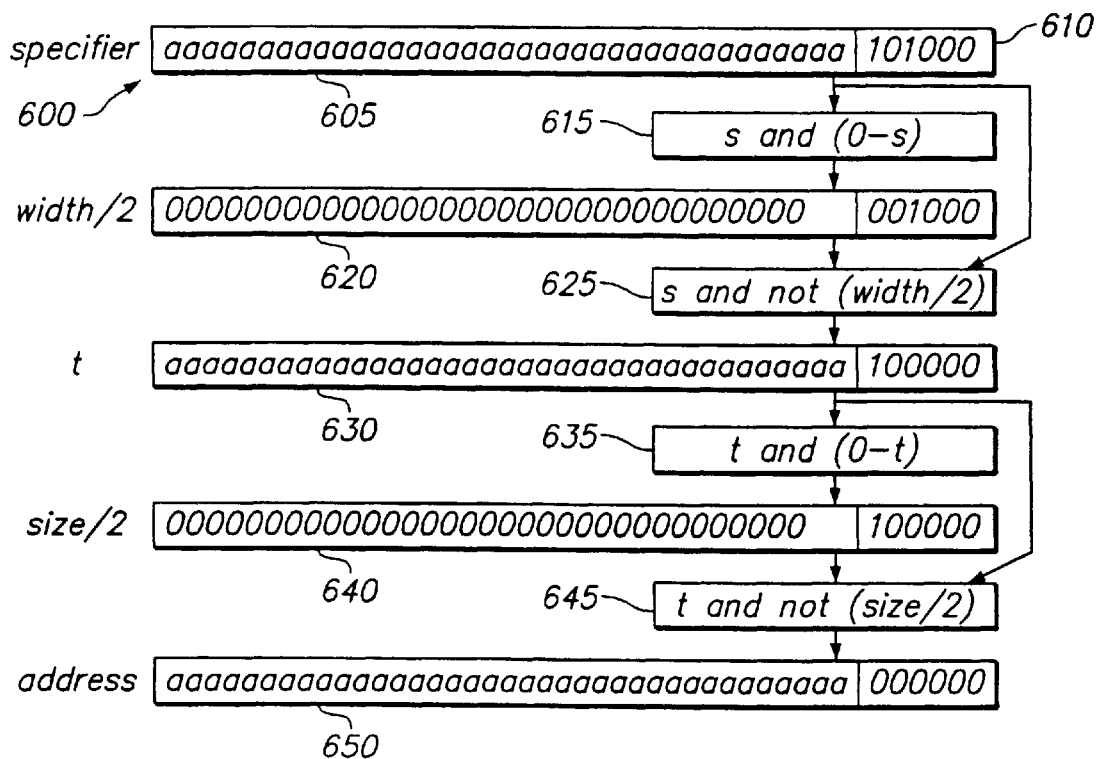
FIG. 6 illustrates an approach to specifier decoding in accordance with an exemplary embodiment of the present invention.

The decoding of the specifier 500 may be further appreciated from FIG. 6 where, for a given specifier 600 made up of an address field 605 together with a field 610 comprising plurality of low order bits. By a series of arithmetic operations shown at steps 615 and 620, the portion of the field 610 representative of width/2 is developed. In a similar series of steps shown at 625 and 630, the value of t is decoded, which can then be used to decode both size and address. The portion of the field 610 representative of size/2 is decoded as shown at steps 635 and 640, while the address is decoded in a similar way at steps 645 and 650.

Wide Function Unit

Figure 7:
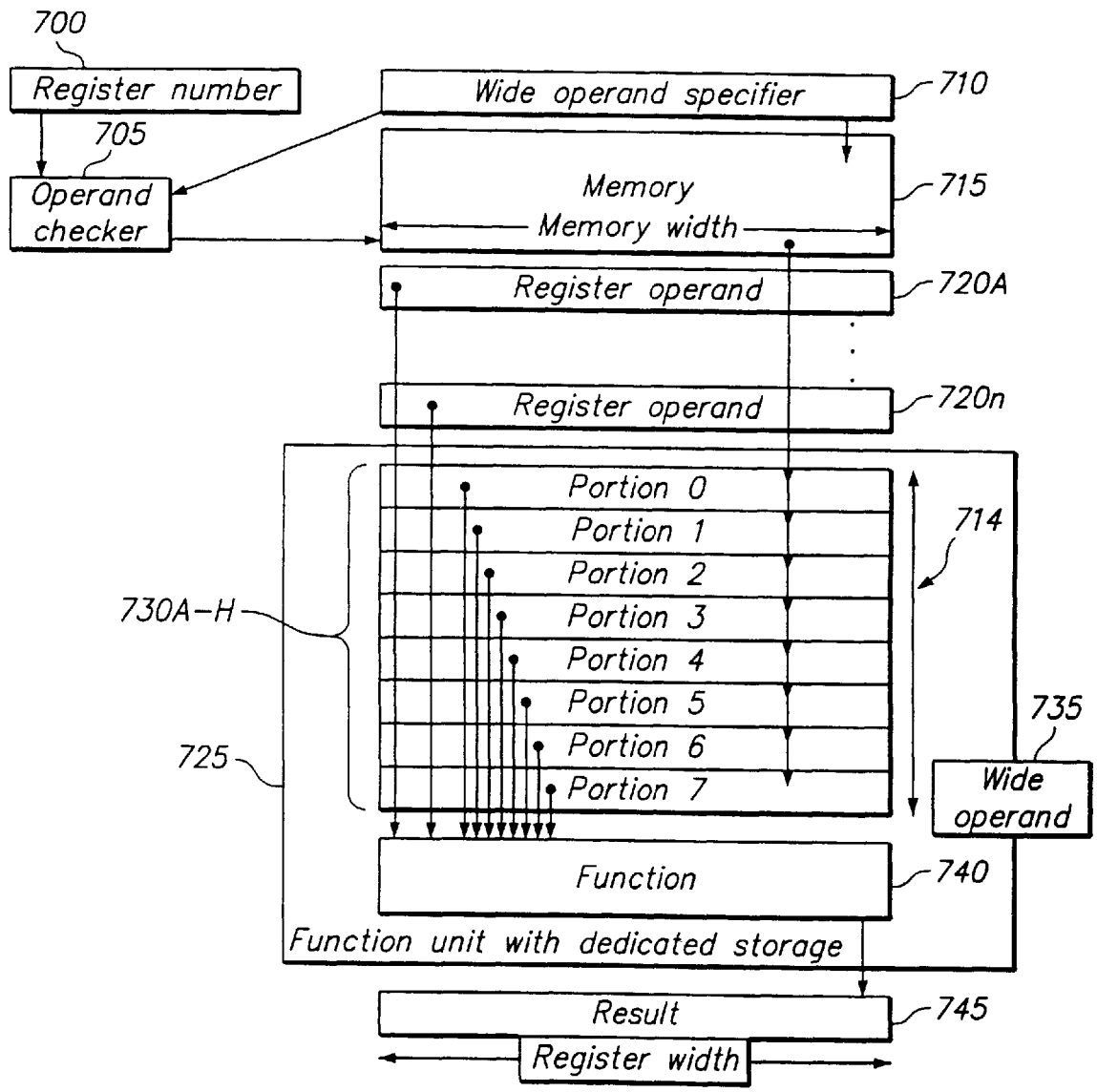
FIG. 7 illustrates in operational block form a Wide Function Unit in accordance with an exemplary embodiment of the present invention.

The wide function unit may be better appreciated from FIG. 7, in which a register number 700 is provided to an operand checker 705. Wide operand specifier 710 communicates with the operand checker 705 and also addresses memory 715 having a defined memory width. The memory address includes a plurality of register operands 720A n, which are accumulated in a dedicated storage portion 714 of a data functional unit 725. In the exemplary embodiment shown in FIG. 7, the dedicated storage 71.4 can be seen to have a width equal to eight data path widths, such that eight wide operand portions 730A–H are sequentially loaded into the dedicated storage to form the wide operand. Although eight portions are shown in FIG. 7, the present invention is not limited to eight or any other specific multiple of data path widths. Once the wide operand portions 730A–H are sequentially loaded, they may be used as a single wide operand 735 by the functional element 740, which may be any element(s) from FIG. 1 connected thereto. The result of the wide operand is then provided to a result register 745, which in a presently preferred embodiment is of the same width as the memory width.

Once the wide operand is successfully loaded into the dedicated storage 714, a second aspect of the present invention may be appreciated. Further execution of this instruction or other similar instructions that specify the same memory address can read the dedicated storage to obtain the operand value under specific conditions that determine whether the memory operand has been altered by intervening instructions. Assuming that these conditions are met, the memory operand fetch from the dedicated storage is combined with one or more register operands in the functional unit, producing a result. In some embodiments, the size of the result is limited to that of a general register, so that no similar dedicated storage is required for the result. However, in some different embodiments, the result may be a wide operand, to further enhance performance.

To permit the wide operand value to be addressed by subsequent instructions specifying the same memory address, various conditions must be checked and confirmed:

Those conditions include:

1. Each memory store instruction checks the memory address against the memory addresses recorded for the dedicated storage. Any match causes the storage to be marked invalid, since a memory store instruction directed to any of the memory addresses stored in dedicated storage 714 means that data has been overwritten.

2. The register number used to address the storage is recorded. If no intervening instructions have written to the register, and the same register is used on the subsequent instruction, the storage is valid (unless marked invalid by rule #1).
3. If the register has been modified or a different register number is used, the value of the register is read and compared against the address recorded for the dedicated storage. This uses more resources than #1 because of the need to fetch the register contents and because the width of the register is greater than that of the register number itself. If the address matches, the storage is valid. The new register number is recorded for the dedicated storage.
4. If conditions #2 or #3 are not met, the register contents are used to address the general-purpose processor's memory and load the dedicated storage. If dedicated storage is already fully loaded, a portion of the dedicated storage must be discarded (victimized) to make room for the new value. The instruction is then performed using the newly updated dedicated storage. The address and register number is recorded for the dedicated storage.

By checking the above conditions, the need for saving and restoring the dedicated storage is eliminated. In addition, if the context of the processor is changed and the new context does not employ Wide instructions that reference the same dedicated storage, when the original context is restored, the contents of the dedicated storage are allowed to be used without refreshing the value from memory, using checking rule #3. Because the values in the dedicated storage are read from memory and not modified directly by performing wide operations, the values can be discarded at any time without saving the results into general memory. This property simplifies the implementation of rule #4 above.

An alternate embodiment of the present invention can replace rule #1 above with the following rule:
1a. Each memory store instruction checks the memory address against the memory addresses recorded for the dedicated storage. Any match causes the dedicated storage to be updated, as well as the general memory.

By use of the above rule 1.a, memory store instructions can modify the dedicated storage, updating just the piece of the dedicated storage that has been changed, leaving the remainder intact. By continuing to update the general memory, it is still true that the contents of the dedicated memory can be discarded at any time without saving the results into general memory. Thus rule #4 is not made more complicated by this choice. The advantage of this alternate embodiment is that the dedicated storage need not be discarded (invalidated) by memory store operations.

Wide Microcache Data Structures

Referring next to FIG. 9, an exemplary arrangement of the data structures of the wide microcache or dedicated storage 114 may be better appreciated. The wide microcache contents, wmc.c, can be seen to form a plurality of data path widths 900A–n, although in the example shown the number is eight. The physical address, wmc.pa, is shown as 64 bits in the example shown, although the invention is not limited to a specific width. The size of the contents, wmc.size, is also provided in a field which is shown as 10 bits in an exemplary embodiment. A "contents valid" flag, wmc.cv, of one bit is also included in the data structure, together with a two bit field for thread last used, or wmc.th. In addition, a six bit field for register last used, wmc.reg, is provided in an exemplary embodiment. Further, a one bit flag for register and thread valid, or wmc.rtv, may be provided.

Wide Microcache Control—Software

Figure 8:
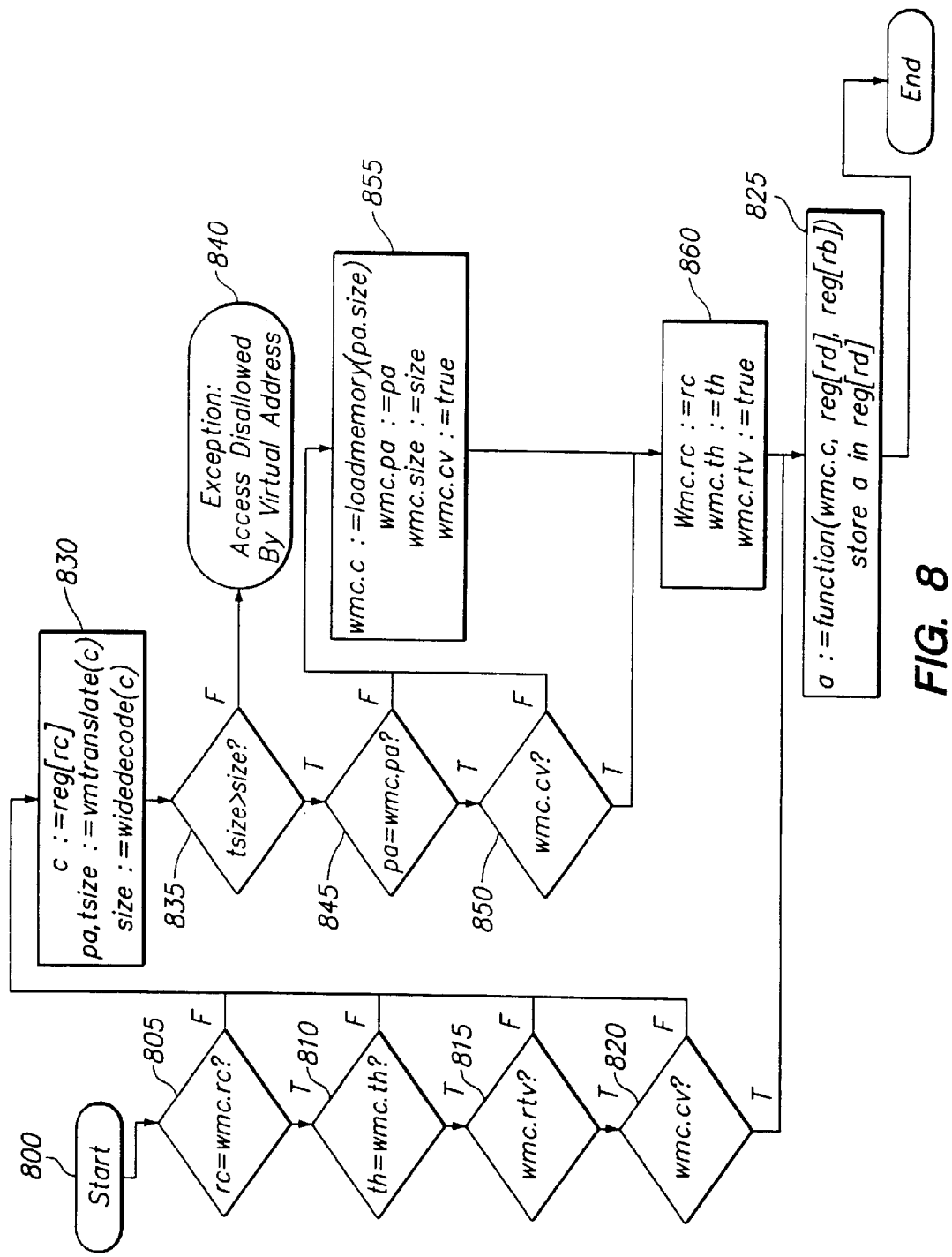
FIG. 8 illustrates in flow diagram form the Wide Microcache control function in accordance with an exemplary embodiment of the present invention.

The process by which the microcache is initially written with a wide operand, and thereafter verified as valid for fast subsequent operations, may be better appreciated from FIG. 8. The process begins at 800, and progresses to step 805 where a check of the register contents is made against the stored value wmc.rc. If true, a check is made at step 810 to verify the thread. If true, the process then advances to step 815 to verify whether the register and thread are valid. If step 815 reports as true, a check is made at step 820 to verify whether the contents are valid. If all of steps 805 through 820 return as true, the subsequent instruction is able to utilize the existing wide operand as shown at step 825, after which the process ends. However, if any of steps 805 through 820 return as false, the process branches to step 830, where content, physical address and size are set. Because steps 805 through 820 all lead to either step 825 or 830, steps 805 through 820 may be performed in any order or simultaneously without altering the process. The process then advances to step 835 where size is checked. This check basically ensures that the size of the translation unit is greater than or equal to the size of the wide operand, so that a physical address can directly replace the use of a virtual address. The concern is that, in some embodiments, the wide operands may be larger than the minimum region that the virtual memory system is capable of mapping. As a result, it would be possible for a single contiguous virtual address range to be mapped into multiple, disjoint physical address ranges, complicating the task of comparing physical addresses. By determining the size of the wide operand and comparing that size against the size of the virtual address mapping region which is referenced, the instruction is aborted with an exception trap if the wide operand is larger than the mapping region. This ensures secure operation of the processor. Software can then re-map the region using a larger size map to continue execution if desired. Thus, if size is reported as unacceptable at step 835, an exception is generated at step 840. If size is acceptable, the process advances to step 845 where physical address is checked. If the check reports as met, the process advances to step 850, where a check of the contents valid flag is made. If either check at step 845 or 850 reports as false, the process branches and new content is written into the dedicated storage 114, with the fields thereof being set accordingly. Whether the check at step 850 reported true, or whether new content was written at step 855, the process advances to step 860 where appropriate fields are set to indicate the validity of the data, after which the requested function can be performed at step 825. The process then ends.

Wide Microcache Control—Hardware

Figure 10:
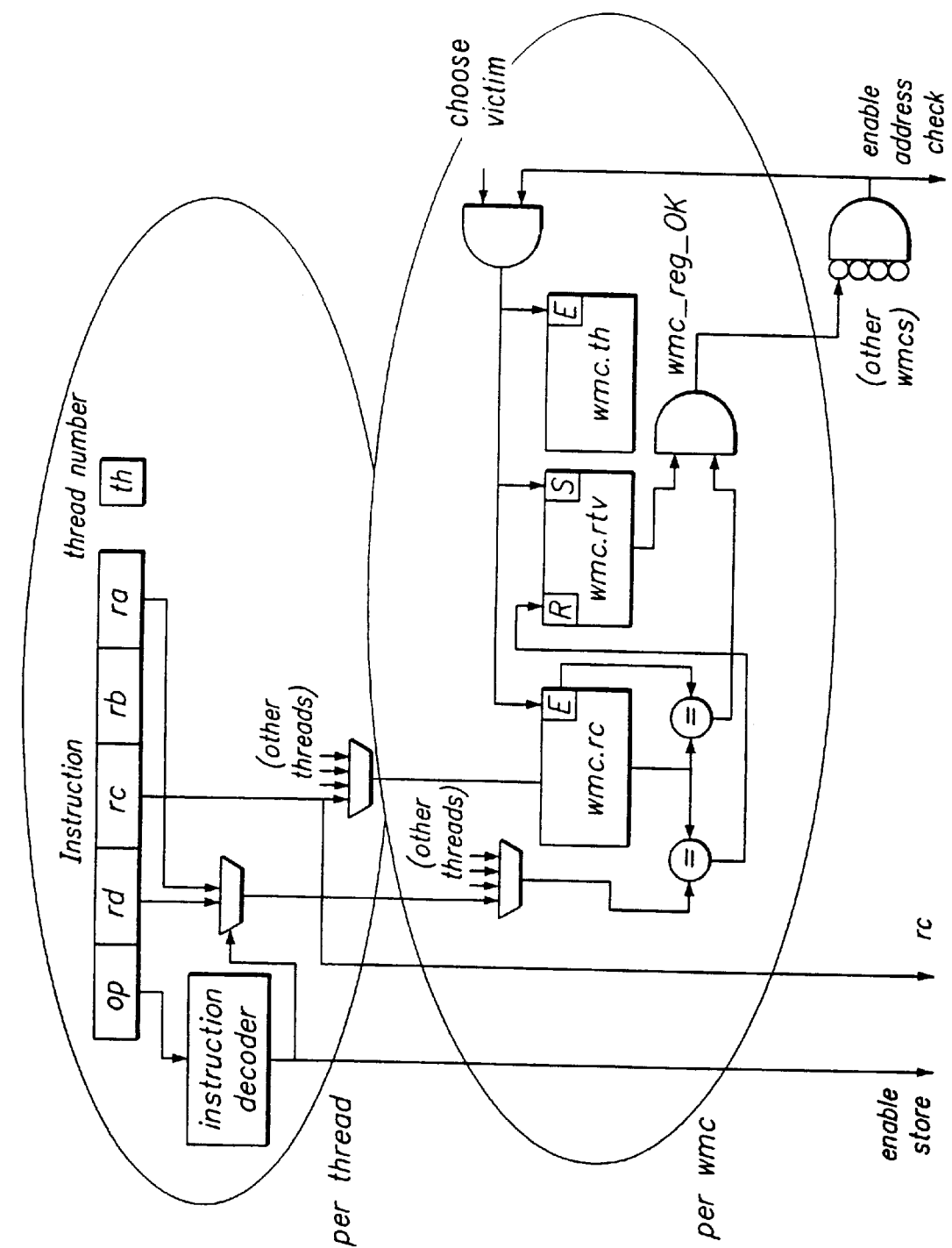
FIGS. 10 and 11 illustrate a Wide Microcache control in accordance with an exemplary embodiment of the present invention.
Figure 11:
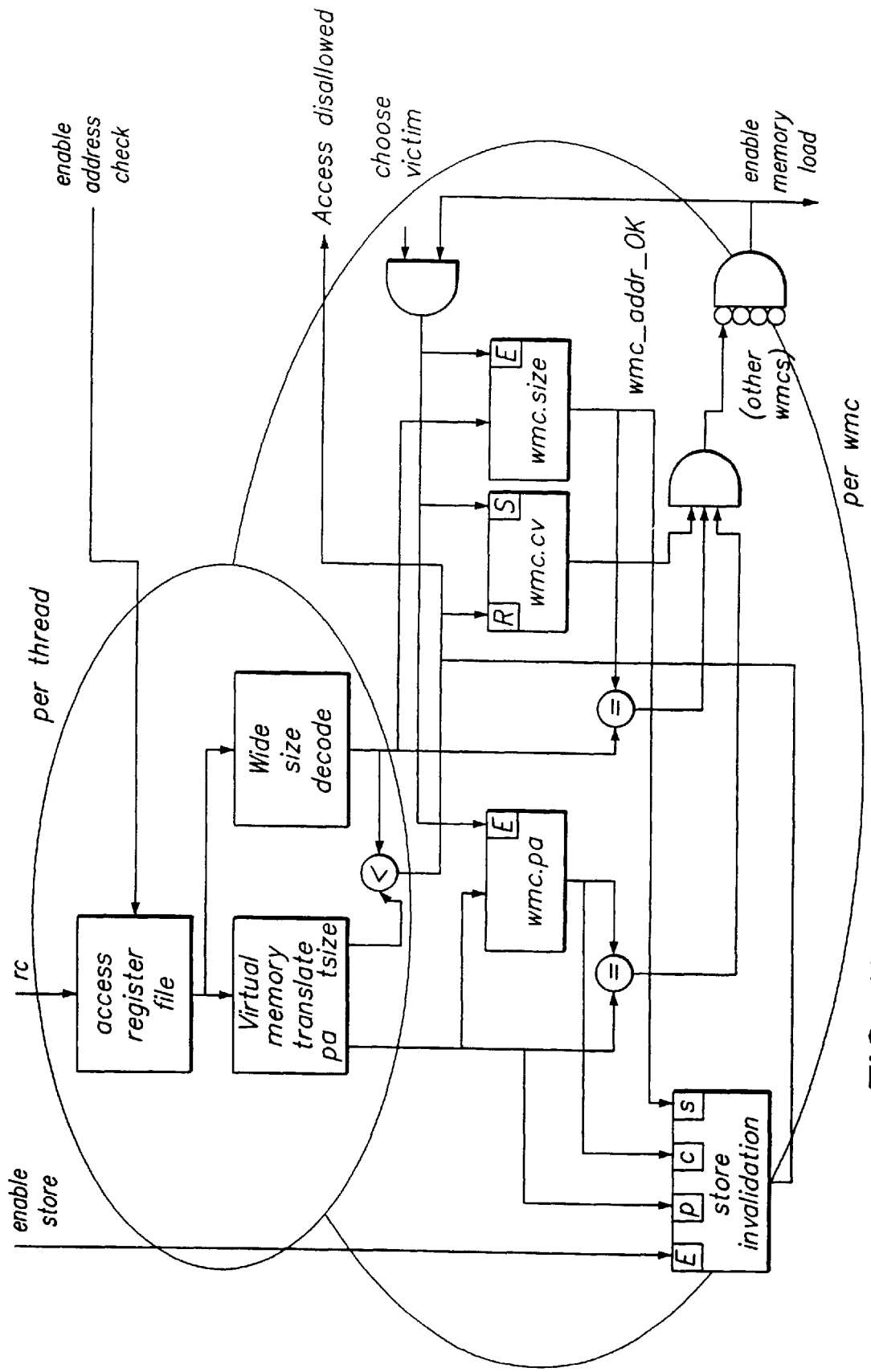

Referring next to FIGS. 10 and 11, which together show the operation of the microcache controller from a hardware standpoint, the operation of the microcache controller may be better understood. In the hardware implementation, it is clear that conditions which are indicated as sequential steps in FIGS. 8 and 9 above can be performed in parallel, reducing the delay for such wide operand checking. Further, a copy of the indicated hardware may be included for each wide microcache, and thereby all such microcaches as may be alternatively referenced by an instruction can be tested in parallel. It is believed that no further discussion of FIGS. 10 and 11 is required in view of the extensive discussion of FIGS. 8 and 9, above.

Various alternatives to the foregoing approach do exist for the use of wide operands, including an implementation in which a single instruction can accept two wide operands, partition the operands into symbols, multiply corresponding symbols together, and add the products to produce a single scalar value or a vector of partitioned values of width of the register file, possibly after extraction of a portion of the sums. Such an instruction can be valuable for detection of motion or estimation of motion in video compression. A further enhancement of such an instruction can incrementally update the dedicated storage if the address of one wide operand is within the range of previously specified wide operands in the dedicated storage, by loading only the portion not already within the range and shifting the in-range portion as required. Such an enhancement allows the operation to be performed over a "sliding window" of possible values. In such an instruction, one wide operand is aligned and supplies the size and shape information, while the second wide operand, updated incrementally, is not aligned.

Another alternative embodiment of the present invention can define additional instructions where the result operand is a wide operand. Such an enhancement removes the limit that a result can be no larger than the size of a general register, further enhancing performance. These wide results can be cached locally to the functional unit that created them, but must be copied to the general memory system before the storage can be reused and before the virtual memory system alters the mapping of the address of the wide result. Data paths must be added so that load operations and other wide operations can read these wide results—forwarding of a wide result from the output of a functional unit back to its input is relatively easy, but additional data paths may have to be introduced if it is desired to forward wide results back to other functional units as wide operands.

As previously discussed, a specification of the size and shape of the memory operand is included in the low-order bits of the address. In a presently preferred implementation, such memory operands are typically a power of two in size and aligned to that size. Generally, one half the total size is added (or inclusively or'ed, or exclusively or'ed) to the memory address, and one half of the data width is added (or inclusively or'ed, or exclusively or'ed) to the memory address. These bits can be decoded and stripped from the memory address, so that the controller is made to step through all the required addresses. This decreases the number of distinct operands required for these instructions, as the size, shape and address of the memory operand are combined into a single register operand value.

The following table illustrates the arithmetic and descriptive notation used in the pseudocode in the Figures referenced hereinafter:

| | |
|---|---|
| $x + y$ | two's complement addition of x and y. Result is the same size as the operands, and operands must be of equal size. |
| $x - y$ | two's complement subtraction of y from x. Result is the same size as the operands, and operands must be of equal size. |
| $x * y$ | two's complement multiplication of x and y. Result is the same size as the operands, and operands must be of equal size. |
| $x / y$ | two's complement division of x by y. Result is the same size as the operands, and operands must be of equal size. |
| $x \& y$ | bitwise and of x and y. Result is same size as the operands, and operands must be of equal size. |
| $x \mid y$ | bitwise or of x and y. Result is same size as the operands, and operands must be of equal size. |
| $x \wedge y$ | bitwise exclusive-of x and y. Result is same size as the operands, and operands must be of equal size. |
| $\sim x$ | bitwise inversion of x. Result is same size as the operand. |

-continued

| | |
|---|---|
| $x = y$ | two's complement equality comparison between x and y. Result is a single bit, and operands must be of equal size. |
| $x \ne y$ | two's complement inequality comparison between x and y. Result is a single bit, and operands must be of equal size. |
| $x < y$ | two's complement less than comparison between x and y. Result is a single bit, and operands must be of equal size. |
| $x \ge y$ | two's complement greater than or equal comparison between x and y. Result is a single bit, and operands must be of equal size. |
| $\sqrt{\phantom{x}}$ | floating-point square root of x |
| $x \parallel y$ | concatenation of bit field x to left of bit field y |
| $x^y$ | binary digit x repeated, concatenated y times. Size of result is y. |
| $x_y$ | extraction of bit y (using little-endian bit numbering) from value x. Result is a single bit. |
| $x_{y \ldots z}$ | extraction of bit field formed from bits y through z of value x. Size of result is - z + 1; if z > y, result is an empty string, |
| $x?y:z$ | value of y, if x is true, otherwise value of z. Value of x is a single bit. |
| $x \leftarrow y$ | bitwise assignment of x to value of y |
| $x.y$ | subfield of structured bitfield x |
| Sn | signed, two's complement, binary data format of n bytes |
| Un | unsigned binary data format of n bytes |
| Fn | floating-point data format of n bytes |

Wide Operations

Particular examples of wide operations which are defined by the present invention include the Wide Switch instruction that performs bit-level switching; the Wide Translate instruction which performs byte (or larger) table lookup; Wide Multiply Matrix; Wide Multiply Matrix Extract and Wide Multiply Matrix Extract Immediate (discussed below), Wide Multiply Matrix Floating-point, and Wide Multiply Matrix Galois (also discussed below). While the discussion below focuses on particular sizes for the exemplary instructions, it will be appreciated that the invention is not limited to a particular width.

Wide Switch

An exemplary embodiment of the Wide Switch instruction is shown in FIGS. 12A–12D. In an exemplary embodiment, the Wide Switch instruction rearranges the contents of up to two registers (256 bits) at the bit level, producing a full-width (128 bits) register result. To control the rearrangement, a wide operand specified by a single register, consisting of eight bits per bit position is used. For each result bit position, eight wide operand bits for each bit position select which of the 256 possible source register bits to place in the result. When a wide operand size smaller than 128 bytes is specified, the high order bits of the memory operand are replaced with values corresponding to the result bit position, so that the memory operand specifies a bit selection within symbols of the operand size, performing the same operation on each symbol.

Figure 12A:
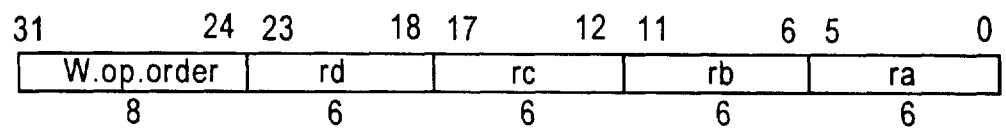

In an exemplary embodiment, these instructions take an address from a general register to fetch a large operand from memory, a second operand from a general register, perform a group of operations on partitions of bits in the operands, and catenate the results together, placing the result in a general register. An exemplary embodiment of the format 1210 of the Wide Switch instruction is shown in FIG. 12A.

Figure 12B:
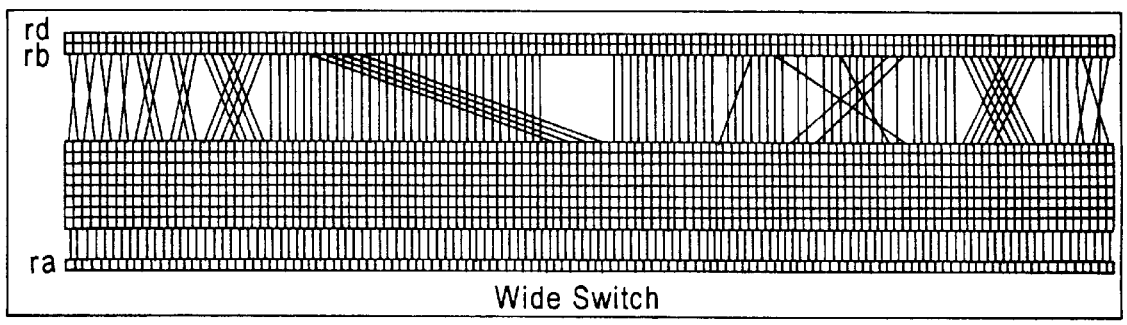

An exemplary embodiment of a schematic 1230 of the Wide Switch instruction is shown in FIG. 12B. In an exemplary embodiment, the contents of register rc specifies a virtual address apd optionally an operand size, and a value of specified size is loaded from memory. A second value is the catenated contents of registers rd and rb. Eight corresponding bits from the memory value are used to select a single result bit from the second value, for each corresponding bit position. The group of results is catenated and placed in register ra.

In an exemplary embodiment, the virtual address must either be aligned to 128 bytes, or must be the sum of an aligned address and one-half of the size of the memory operand in bytes. An aligned address must be an exact multiple of the size expressed in bytes. The size of the memory operand must be 8, 16, 32, 64, or 128 bytes. If the address is not valid an "access disallowed by virtual address" exception occurs. When a size smaller than 128 bits is specified, the high order bits of the memory operand are replaced with values corresponding to the bit position, so that the same memory operand specifies a bit selection within symbols of the operand size, and the same operation is performed on each symbol.

In an exemplary embodiment, a wide switch (W.SWITCH.L or W.SWITCH.B) instruction specifies an 8-bit location for each result bit from the memory operand, that selects one of the 256 bits represented by the catenated contents of registers rd and rb.

An exemplary embodiment of the pseudocode 1250 of the Wide Switch instruction is shown in FIG. 12C. An exemplary embodiment of the exceptions 1280 of the Wide Switch instruction is shown in FIG. 12D.

Wide Translate

An exemplary embodiment of the Wide Translate instruction is shown in FIGS. 13A–13D. In an exemplary embodiment, the Wide Translate instructions use a wide operand to specify a table of depth up to 256 entries and width of up to 128 bits. The contents of a register is partitioned into operands of one, two, four, or eight bytes, and the partitions are used to select values from the table in parallel. The depth and width of the table can be selected by specifying the size and shape of the wide operand as described above.

In an exemplary embodiment, these instructions take an address from a general register to fetch a large operand from memory, a second operand from a general register, perform a group of operations on partitions of bits in the operands, and catenate the results together, placing the result in a general register. An exemplary embodiment of the format 1310 of the Wide Translate instruction is shown in FIG. 13A.

Figure 13B:
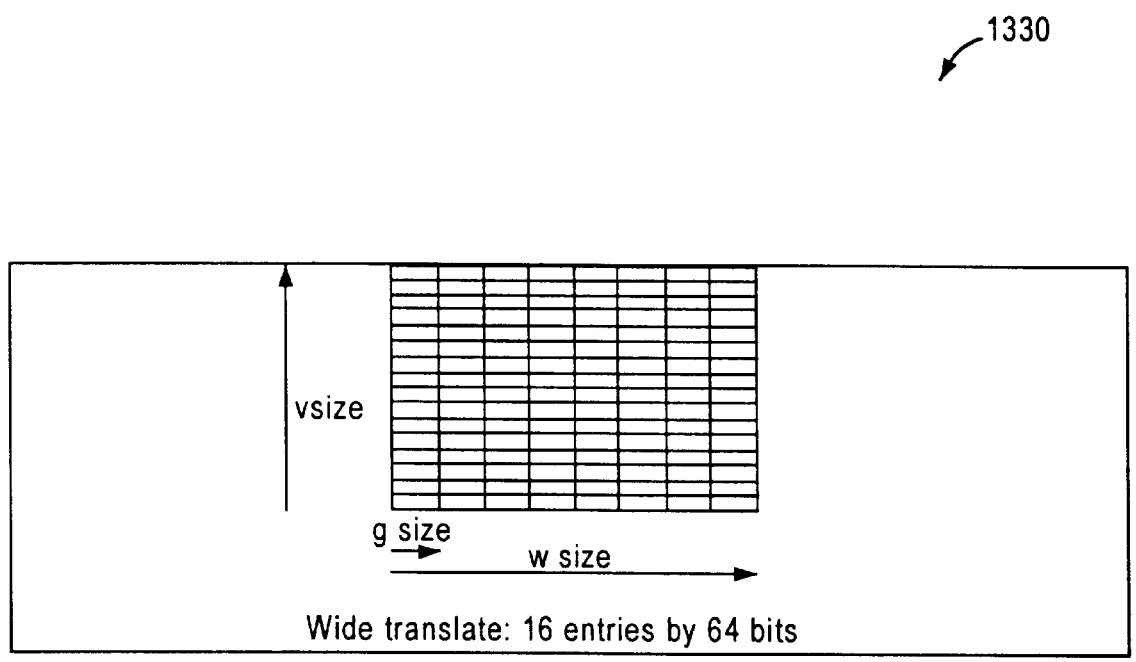

An exemplary embodiment of the schematic 1330 of the Wide Translate instruction is shown in FIG. 13B. In an exemplary embodiment, the contents of register rc is used as a virtual address, and a value of specified size is loaded from memory. A second value is the contents of register rb. The values are partitioned into groups of operands of a size specified. The low-order bytes of the second group of values are used as addresses to choose entries from one or more tables constructed from the first value, producing a group of values. The group of results is catenated and placed in register rd.

In an exemplary embodiment, by default, the total width of tables is 128 bits, and a total table width of 128, 64, 32, 16 or 8 bits, but not less than the group size may be specified by adding the desired total table width in bytes to the specified address: 16, 8, 4, 2, or 1. When fewer than 128 bits are specified, the tables repeat to fill the 128 bit width.

In an exemplary embodiment, the default depth of each table is 256 entries, or in bytes is 32 times the group size in bits. An operation may specify 4, 8, 16, 32, 64, 128 or 256 entry tables, by adding one half of the memory operand size to the address. Table index values are masked to ensure that only the specified portion of the table is used. Tables with just 2 entries cannot be specified; if 2-entry tables are desired, it is recommended to load the entries into registers and use G.MUX to select the table entries.

In an exemplary embodiment, failing to initialize the entire table is a potential security hole, as an instruction in with a small-depth table could access table entries previously initialized by an instruction with a large-depth table. This security hole may be closed either by initializing the entire table, even if extra cycles are required, or by masking the index bits so that only the initialized portion of the table is used. An exemplary embodiment may initialize the entire table with no penalty in cycles by writing to as many as 128 table entries at once. Initializing the entire table with writes to only one entry at a time requires writing 256 cycles, even when the table is smaller. Masking the index bits is the preferred solution.

In an exemplary embodiment, masking the index bits suggests that this instruction, for tables larger than 256 entries, may be extended to a general-purpose memory translate function where the processor performs enough independent load operations to fill the 128 bits. Thus, the 16, 32, and 64 bit versions of this function perform equivalent of 8, 4, 2 withdraw, 8, 4, or 2 load-indexed and 7, 3, or 1 group-extract instructions. In other words, this instruction can be as powerful as 23, 11, or 5 previously existing instructions. The 8-bit version is a single cycle operation replacing 47 existing instructions, so these extensions are not as powerful, but nonetheless, this is at least a 50% improvement on a 2-issue processor, even with one cycle per load timing. To make this possible, the default table size would become 65536, 2^32 and 2^64 for 16, 32 and 64-bit versions of the instruction.

In an exemplary embodiment, for the big-endian version of this instruction, in the definition below, the contents of register rb is complemented. This reflects a desire to organize the table so that the lowest. addressed table entries are selected when the index is zero. In the logical implementation, complementing the index can be avoided by loading the table memory differently for big-endian and little-endian versions; specifically by loading the table into memory so that the highest-addressed table entries are selected when the index is zero for a big-endian version of the instruction. In an exemplary embodiment of the logical implementation, complementing the index can be avoided by loading the table memory differently for big-endian and little-endian versions. In order to avoid complementing the index, the table memory is loaded differently for big-endian versions of the instruction by complementing the addresses at which table entries are written into the table for a big-endian version of the instruction.

In an exemplary embodiment, the virtual address must either be aligned to 4096 bytes, or must be the sum of an aligned address and one-half of the size of the memory operand in bytes and/or the desired total table width in bytes. An aligned address must be an exact multiple of the size expressed in bytes. The size of the memory operand must be a power of two from 4 to 4096 bytes, but must be at least 4 times the group size and 4 times the total table width. If the address is not valid an "access disallowed by virtual address" exception occurs.

In an exemplary embodiment, a wide translate (W.TRANSLATE.8.L or W.TRANSLATE.8.B) instruction specifies a translation table of 16 entries (vsize=16) in depth, a group size of 1 byte (gsize=8 bits), and a width of 8 bytes (wsize=64 bits). The address specifies a total table size (msize=1024 bits=vsize*wsize) and a table width (wsize=64 bits) by adding one half of the size in bytes of the table (64) and adding the size in bytes of the table width (8) to the table address in the address specification. The instruction will create duplicates of this table in the upper and lower 64 bits of the data path so that 128 bits of operand are processed at once, yielding a 128 bit result.

An exemplary embodiment of the pseudocode 1350 of the Wide Translate instruction is shown in FIG. 13C. An exemplary embodiment of the exceptions 1380 of the Wide Translate instruction is shown in FIG. 13D.

Wide Multiply Matrix

An exemplary embodiment of the Wide Multiply Matrix instruction is shown in FIGS. 14A–14E. In an exemplary embodiment, the Wide Multiply Matrix instructions use a wide operand to specify a matrix of values of width up to 64 bits (one half of register file and data path width) and depth of up to 128 bits/symbol size. The contents of a general register (128 bits) is used as a source operand, partitioned into a vector of symbols, and multiplied with the matrix, producing a vector of width up to 128 bits of symbols of twice the size of the source operand symbols. The width and depth of the matrix can be selected by specifying the size and shape of the wide operand as described above. Controls within the instruction allow specification of signed, mixed signed, unsigned, complex, or polynomial operands.

In an exemplary embodiment, these instructions take an address from a general register to fetch a large operand from memory, a second operand from a general register, perform a group of operations on partitions of bits in the operands, and catenate the results together, placing the result in a general register. An exemplary embodiment of the format 1410 of the Wide Multiply Matrix instruction is shown in FIG. 14A.

Figure 14B:
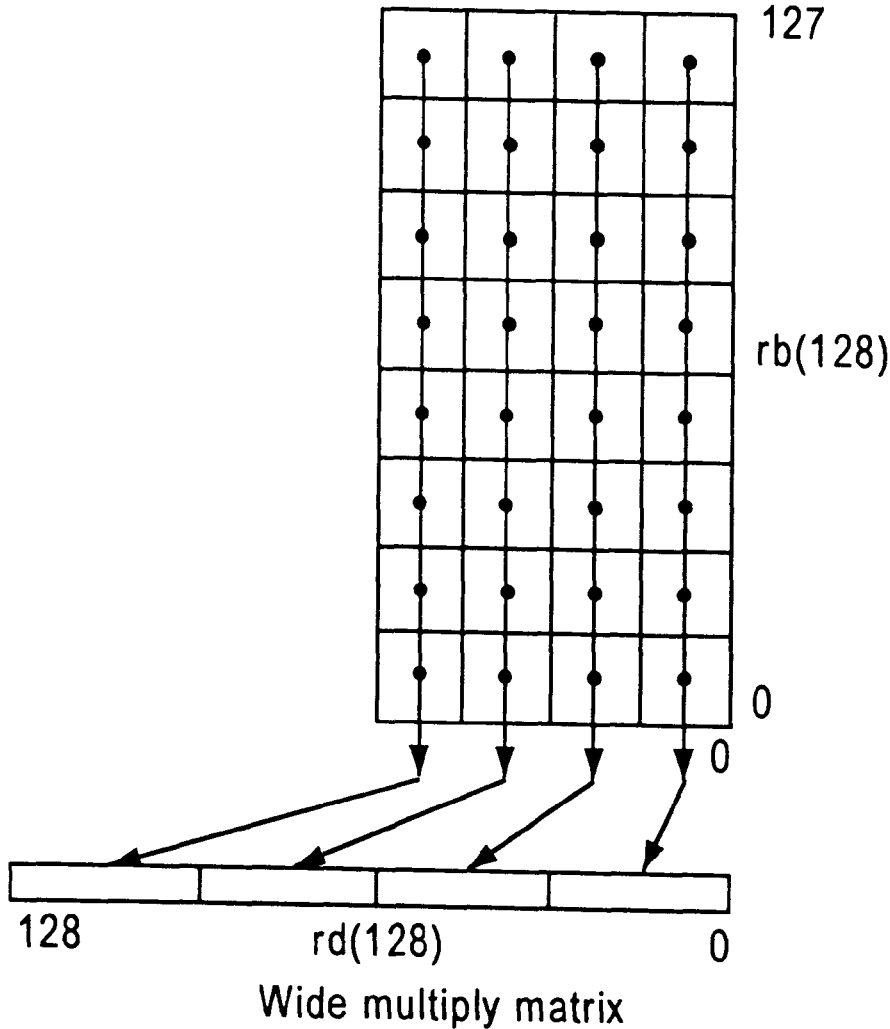
Figure 14C:
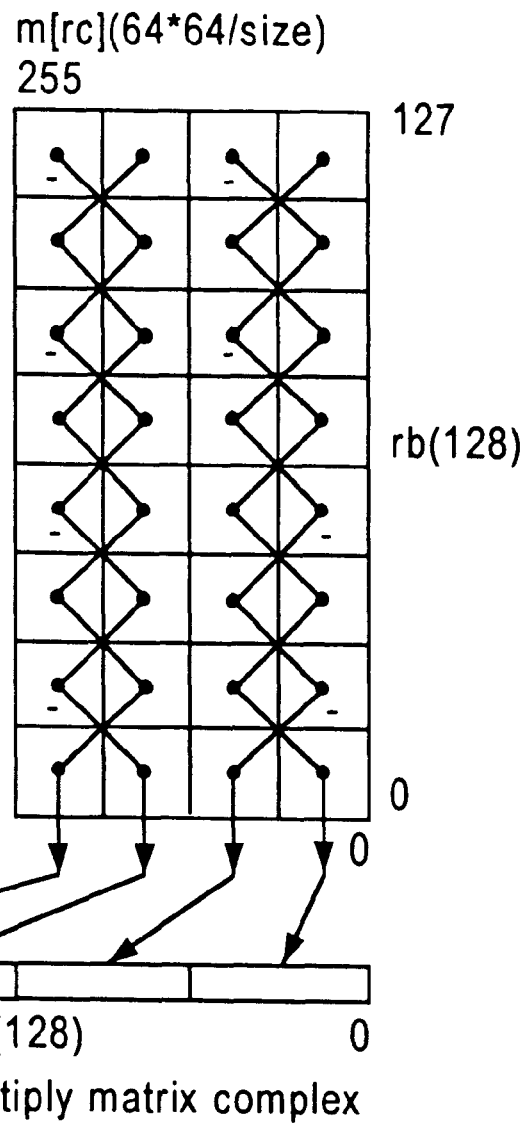

An exemplary embodiment of the schematics 1430 and 1460 of the Wide Multiply Matrix instruction is shown in FIGS. 14B and 14C. In an exemplary embodiment, the contents of register rc is used as a virtual address, and a value of specified size is loaded from memory. A second value is the contents of register rb. The values are partitioned into groups of operands of the size specified. The second values are multiplied with the first values, then summed, producing a group of result values. The group of result values is catenated and placed in register rd.

In an exemplary embodiment, the memory multiply instructions (W.MUL.MAT, W.MUL.MAT.C, W.MUL.MAT.M, W.MUL.MAT.P, W.MUL.MAT.U) perform a partitioned array multiply of up to 8192 bits, that is 64×128 bits. The width of the array can be limited to 64, 32, or 16 bits, but not smaller than twice the group size, by adding one half the desired size in bytes to the virtual address operand: 4, 2, or 1. The array can be limited vertically to 128, 64, 32, or 16 bits, but not smaller than twice the group size, by adding one-half the desired memory operand size in bytes to the virtual address operand.

In an exemplary embodiment, the virtual address must either be aligned to 1024/gsize bytes (or 512/gsize for W.MUL.MAT.C) (with gsize measured in bits), or must be the sum of an aligned address and one half of the size of the memory operand in bytes and/or one quarter of the size of the result in bytes. An aligned address must be an exact multiple of the size expressed in bytes. If the address is not valid an "access disallowed by virtual address" exception occurs.

In an exemplary embodiment, a wide multiply octlets instruction (W.MUL.MAT.type.64, type=NONE M U P) is not implemented and causes a reserved instruction exception, as an ensemble-multiply-sum-octlets instruction (E.MUL.SUM.type.64) performs the same operation except that the multiplier is sourced from a 128-bit register rather than memory. Similarly, instead of wide-multiply-complex-quadlets instruction (W.MUL.MAT.C.32), one should use an ensemble-multiply-complex-quadlets instruction (E.MUL.SUM.C.32).

As shown in FIG. 14B, an exemplary embodiment of a wide-multiply-doublets instruction (W.MUL.MAT, W.MUL.MAT.M, W.MUL.MAT.P, W.MUL.MAT.U) multiplies memory [m31 m30 . . . m1 m0] with vector [h g f e d c b a], yielding products [hm31+gm27+ . . . +bm7+am3 . . . hm28+gm24+ . . . +bm4+am0].

As shown in FIG. 14C, an exemplary embodiment of a wide-multiply-matrix-complex-doublets instruction (W.MUL.MAT.C) multiplies memory [m15 m14 . . . m1 m0] with vector [h g f e d c b a], yielding products [hm14+gm15+ . . . +bm2+am3 . . . hm12+gm13+ . . . +bm0+am1 hm13+gm12+ . . . bm1+am0].

An exemplary embodiment of the pseudocode 1480 of the Wide Multiply Matrix instruction is shown in FIG. 14D. An exemplary embodiment of the exceptions 1490 of the Wide Multiply Matrix instruction is shown in FIG. 14E.

Wide Multiply Matrix Extract

An exemplary embodiment of the Wide Multiply Matrix Extract instruction is shown in FIGS. 15A–15F. In an exemplary embodiment, the Wide Multiply Matrix Extract instructions use a wide operand to specify a matrix of value of width up to 128 bits (full width of register file and data path) and depth of up to 128 bits/symbol size. The contents of a general register (128 bits) is used as a source operand, partitioned into a vector of symbols, and multiplied with the matrix, producing a vector of width up to 256 bits of symbols of twice the size of the source operand symbols plus additional bits to represent the sums of products without overflow. The results are then extracted in a manner described below (Enhanced Multiply Bandwidth by Result Extraction), as controlled by the contents of a general register specified by the instruction. The general register also specifies the format of the operands: signed, mixed-signed, unsigned, and complex as well as the size of the operands, byte (8 bit), doublet (16 bit), quadlet (32 bit), or hexlet (64 bit).

Figure 15A:
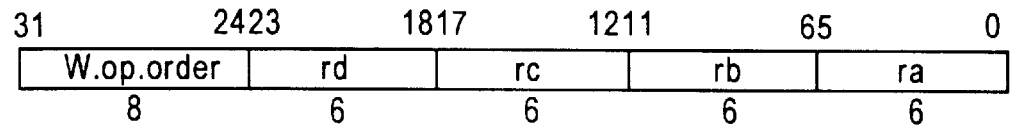

In an exemplary embodiment, these instructions take an address from a general register to fetch a large operand from memory, a second operand from a general register, perform a group of operations on partitions of bits in the operands, and catenate the results together, placing the result in a general register. An exemplary embodiment of the format 1510 of the Wide Multiply Matrix Extract instruction is shown in FIG. 15A.

Figure 15C:
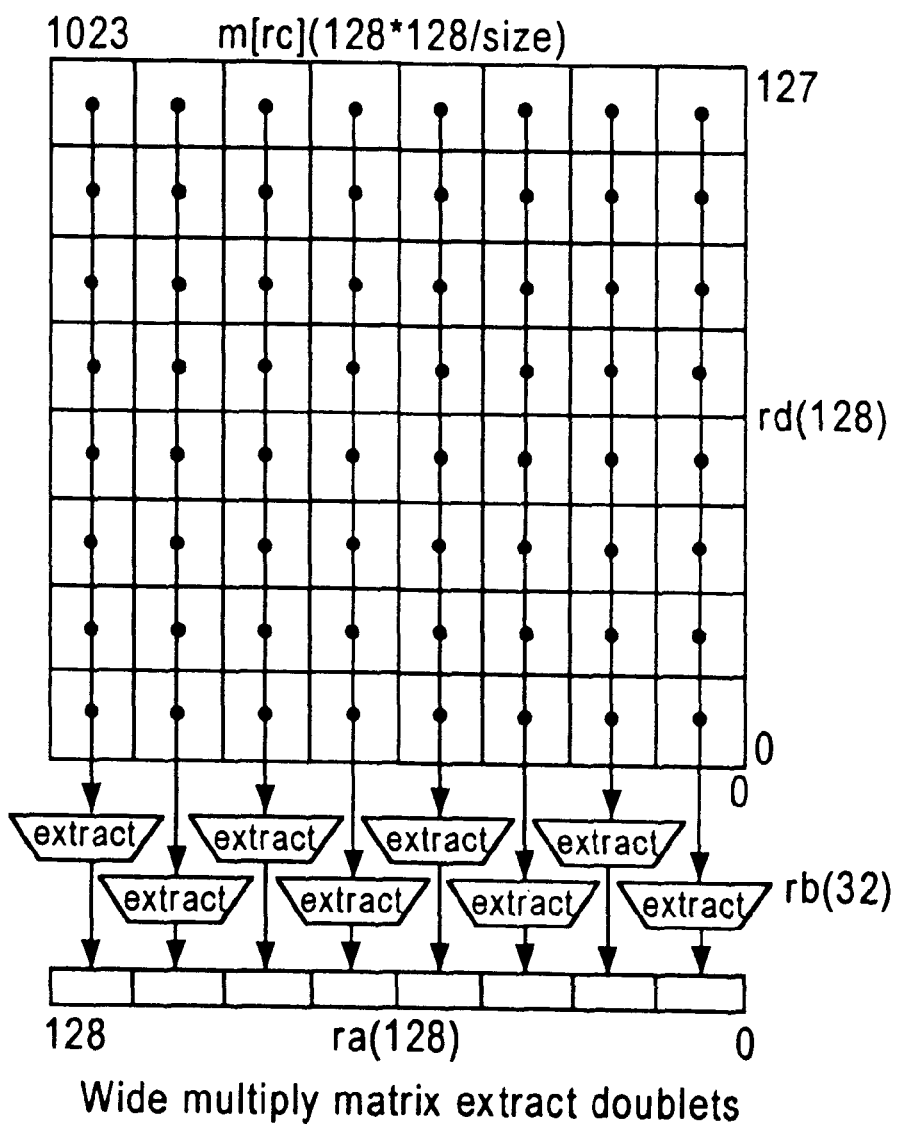

An exemplary embodiment of the schematics 1530 and 1560 of the Wide Multiply Matrix Extract instruction is shown in FIGS. 15C and 14D. In an exemplary embodiment, the contents of register rc is used as a virtual address, and a value of specified size is loaded from memory. A second value is the contents of register rd. The group size and other parameters are specified from the contents of register rb. The values are partitioned into groups of operands of the size specified and are multiplied and summed, producing a group of values. The group of values is rounded, and limited as specified, yielding a group of results which is the size specified. The group of results is catenated and placed in register ra.

In an exemplary embodiment, the size of this operation is determined from the contents of register rb. The multiplier usage is constant, but the memory operand size is inversely related to the group size. Presumably this can be checked for cache validity.

In an exemplary embodiment, low order bits of re are used to designate a size, which must be consistent with the group size. Because the memory operand is cached, the size can also be cached, thus eliminating the time required to decode the size, whether from rb or from rc.

In an exemplary embodiment, the wide multiply matrix extract instructions (W.MUL.MAT.X.B, W.MUL.MAT.X.L) perform a partitioned array multiply of up to 16384 bits, that is 128×128 bits. The width of the array can be limited to 128, 64, 32, or 16 bits, but not smaller than twice the group size, by adding one half the desired size in bytes to the virtual address operand: 8, 4, 2, or 1. The array can be limited vertically to 128, 64, 32, or 16 bits, but not smaller than twice the group size, by adding one half the desired memory operand size in bytes to the virtual address operand.

As shown in FIG. 15B, in an exemplary embodiment, bits 31 . . . 0 of the contents of register rb specifies several parameters which control the manner in which data is extracted. The position and default values of the control fields allow for the source position to be added to a fixed control value for dynamic computation, and allow for the lower 16 bits of the control field to be set for some of the simpler extract cases by a single GCOPYI instruction.

In an exemplary embodiment, the table below describes the meaning of each label:

| label | bits | meaning |
| --- | --- | --- |
| fsize | 8 | field size |
| dpos | 8 | destination position |
| x | 1 | reserved |
| s | 1 | signed vs. unsigned |
| n | 1 | complex vs. real multiplication |
| m | 1 | mixed-sign vs. same-sign multiplication |
| l | 1 | saturation vs. truncation |
| rnd | 2 | rounding |
| gssp | 9 | group size and source position |

In an exemplary embodiment, the 9 bit gssp field encodes both the group size, gsize, and source position, spos, according to the formula gssp=512 4*gsize+spos. The group size, gsize, is a power of two in the range 1 . . . 128. The source position, spos, is in the range 0 . . . (2*gsize) 1.

In an exemplary embodiment, the values in the s, n, m, t, and rnd fields have the following meaning:

| values | s | n | m | l | rnd |
| --- | --- | --- | --- | --- | --- |
| 0 | unsigned | real | same-sign | truncate | F |
| 1 | signed | complex | mixed-sign | saturate | Z |
| 2 | | | | | N |
| 3 | | | | | C |

In an exemplary embodiment, the virtual address must be aligned, that is, it must be an exact multiple of the operand size expressed in bytes. If the address is not aligned an "access disallowed by virtual address" exception occurs.

In an exemplary embodiment, Z (zero) rounding is not defined for unsigned extract operations, and a ReservedInstruction exception is raised if attempted. F (floor) rounding will properly round unsigned results downward.

As shown in FIG. 15C, an exemplary embodiment of a wide-multiply-matrix-extract-doublets instruction (W.MUL.MAT.X.B or W.MUL.MAT.X.L) multiplies memory [m63 m62 m61 . . . m2 m1 m0] with vector [h g f e d c b a], yielding the products [am7+bm15+cm23+dm31+em39+fm47+gm55+hm63 . . . am2+bm10+cm18+dm26+em34+fm42+gm50+hm58 am1+bm9+cm17+dm25+em33+fm41+gm49+hm57 am0+bm8+cm16+dm24+em32+fm40+gm48+hm56], rounded and limited as specified.

Figure 15D:
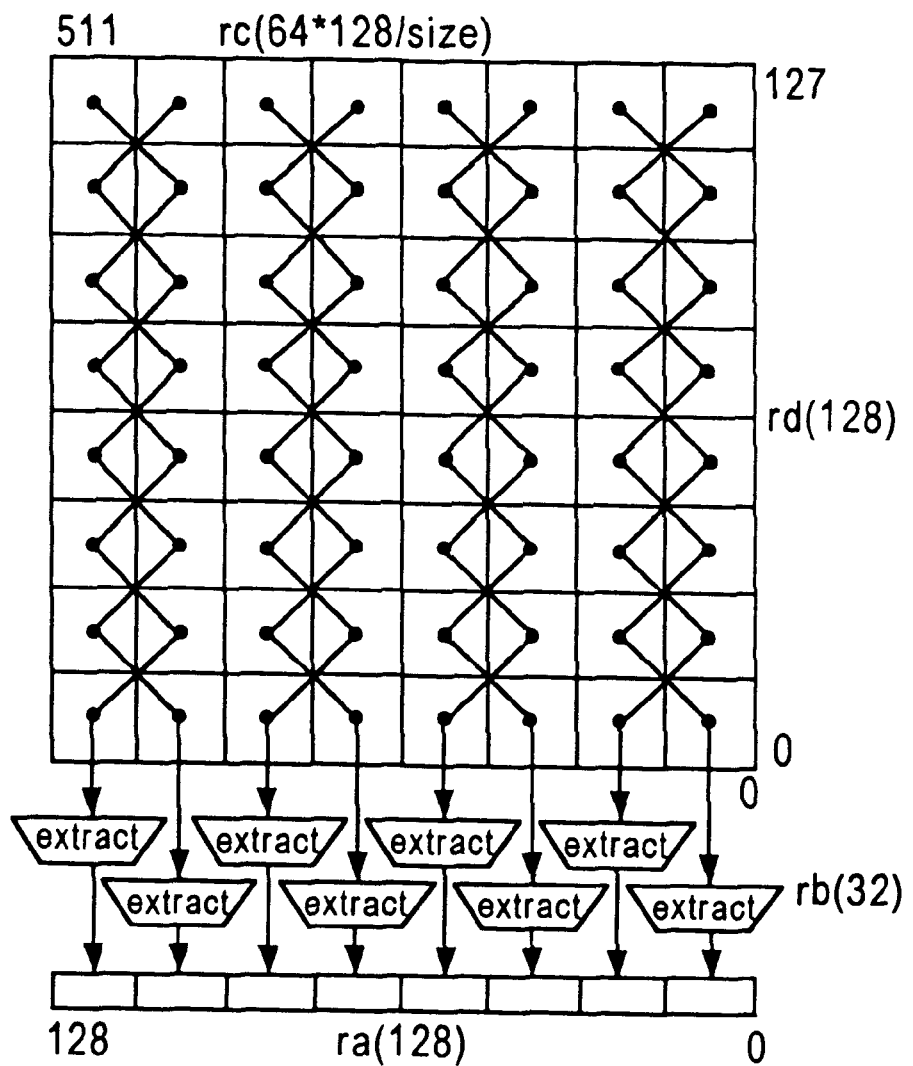

As shown in FIG. 15D, an exemplary embodiment of a wide-multiply-matrix-extract-complex-doublets instruction (W.MUL.MAT.X with n set in rb) multiplies memory [m31 m30 m29 . . . m2 m1 m0] with vector [h g f e d c b a], yielding the products [am7+bm6+cm15+dm14+em23+fm22+gm31+hm30 . . . am2-bm3+cm10-dm11+em18-fm19+gm26-hm27 am1+bm0+cm9+dm8+em17+fm16+gm25+hm24 am0-bm1+cm8-dm9+em16-f17+gm24 hm25], rounded and limited as specified.

An exemplary embodiment of the pseudocode 1580 of the Wide Multiply Matrix Extract instruction is shown in FIG. 15E. An exemplary embodiment of the exceptions 1590 of the Wide Multiply Matrix Extract instruction is shown in FIG. 15F.

Wide Multiply Matrix Extract Immediate

An exemplary embodiment of the Wide Multiply Matrix Extract Immediate instruction is shown in FIGS. 16A–16E. In an exemplary embodiment, the Wide Multiply Matrix Extract Immediate instructions perform the same function as above, except that the extraction, operand format and size is controlled by fields in the instruction. This form encodes common forms of the above instruction without the need to initialize a register with the required control information. Controls within the instruction allow specification of signed, mixed signed, unsigned, and complex operands.

In an exemplary embodiment, these instructions take an address from a general register to fetch a large operand from memory, a second operand from a general register, perform a group of operations on partitions of bits in the operands, and catenate the results together, placing the result in a general register. An exemplary embodiment of the format 1610 of the Wide Multiply Matrix Extract Immediate instruction is shown in FIG. 16A.

Figure 16B:
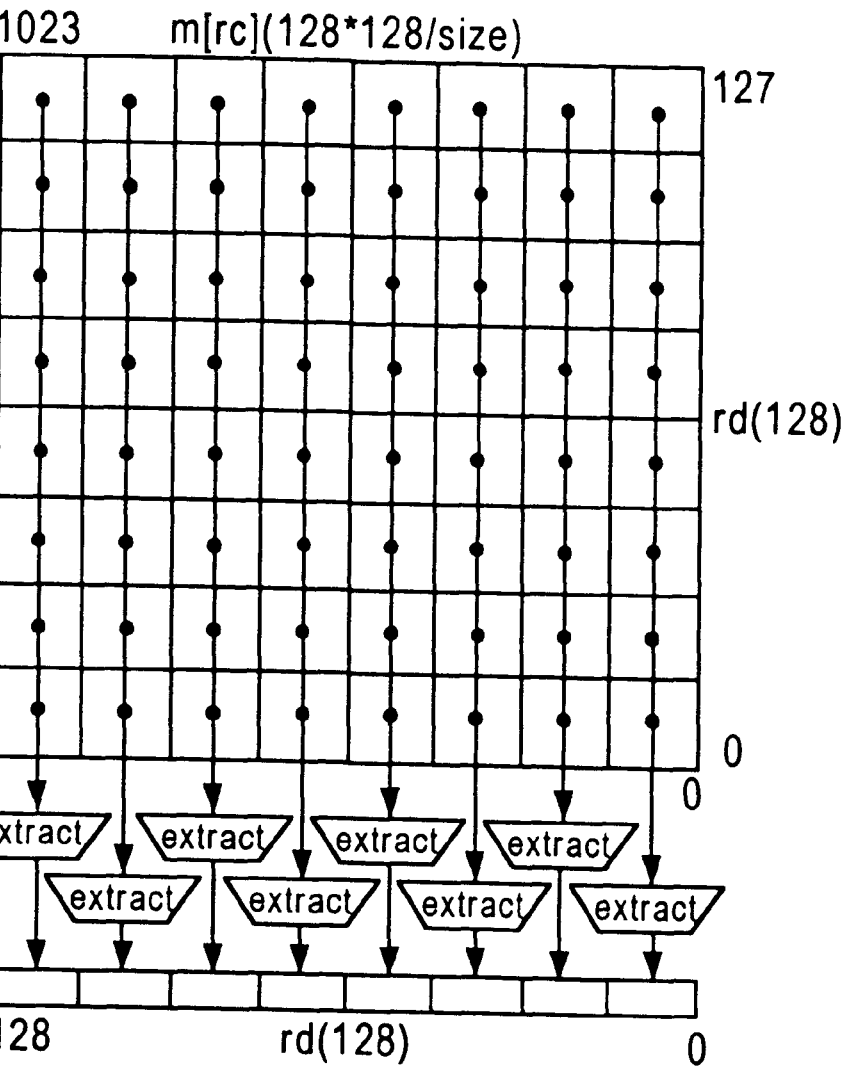
Figure 16C:
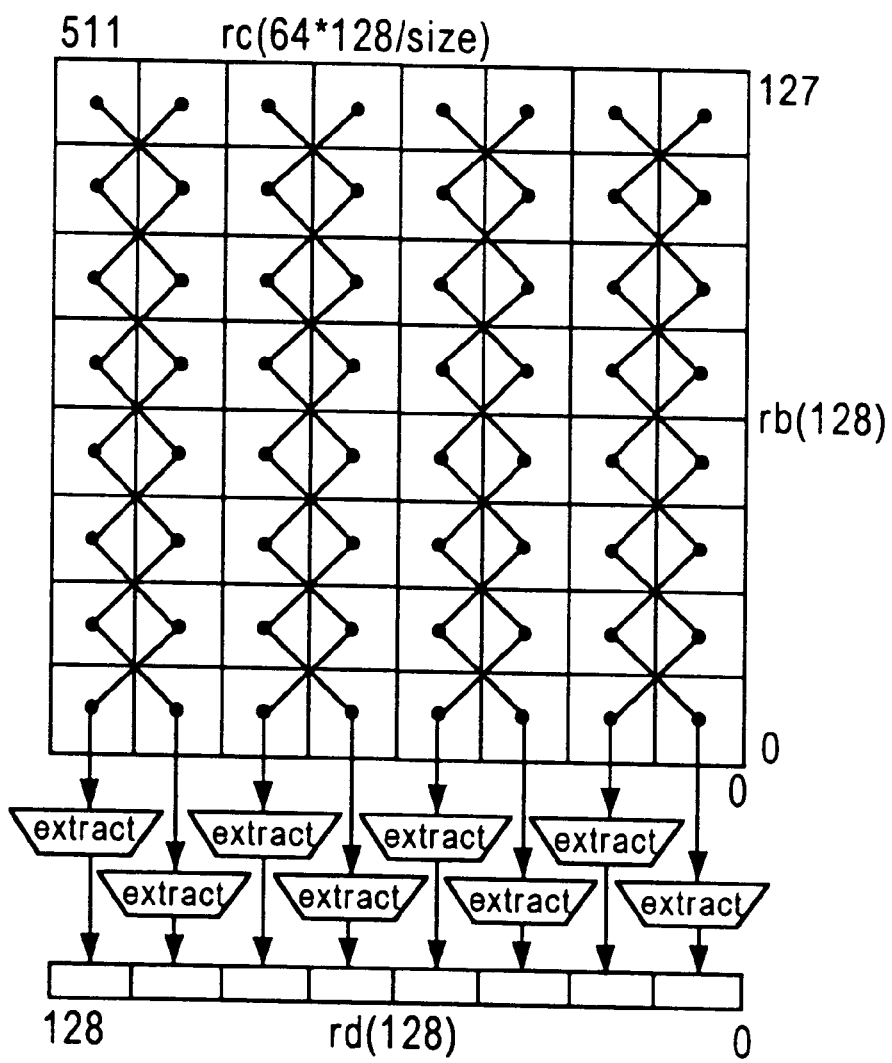

An exemplary embodiment of the schematics 1630 and 1660 of the Wide Multiply Matrix Extract Immediate instruction is shown in FIGS. 16B and 16C. In an exemplary embodiment, the contents of register rc is used as a virtual address, and a value of specified size is loaded from memory. A second value is the contents of register rb. The values are partitioned into groups of operands of the size specified and are multiplied and summed in columns, producing a group of sums. The group of sums is rounded, limited, and extracted as specified, yielding a group of results, each of which is the size specified. The group of results is catenated and placed in register rd. All results are signed, N (nearest) rounding is used, and all results are limited to maximum representable signed values.

In an exemplary embodiment, the wide-multiply-extract-immediate-matrix instructions (W.MUL.MAT.X.I, W.MUL.MAT.X.I.C) perform a partitioned array multiply of up to 16384 bits, that is 128×128 bits. The width of the array can be limited to 128, 64, 32, or 16 bits, but not smaller than twice the group size, by adding one-half the desired size in bytes to the virtual address operand: 8, 4, 2, or 1. The array can be limited vertically to 128, 64, 32, or 16 bits, but not smaller than twice the group size, by adding one half the desired memory operand size in bytes to the virtual address operand.

In an exemplary embodiment, the virtual address must either be aligned to 2048/gsize bytes (or 1024/gsize for W.MUL.MAT.X.I.C), or must be the sum of an aligned address and one-half of the size of the memory operand in bytes and/or one half of the size of the result in bytes. An aligned address must be an exact multiple of the size expressed in bytes. If the address is not valid an "access disallowed by virtual address" exception occurs.

As shown in FIG. 16B, an exemplary embodiment of a wide-multiply-extract-immediate-matrix-doublets instruction (W.MUL.MAT.X.1.16) multiplies memory [m63 m62 m6 . . . m2 m1 m0] with vector [h g f e d c b a], yielding the products [am7+bm15+cm23+dm31+em39+fm47+gm55+hm63 . . . am2+bm10+cm18+dm26+em34+fm42+gm50+hm58 am1+bm9+cm17+dm25+em33+fm41+gm49+hm57 am0+bm8+cm16+dm24+em32+fm40+gm48+hm56], rounded and limited as specified.

As shown in FIG. 16C, an exemplary embodiment of a wide-multiply-matrix-extract-immediate-complex-doublets instruction (W.MUL.MAT.X.I.C.16) multiplies memory [m31 m30 m29 . . . m2 m1 m0] with vector [h g f e d c b a], yielding the products [am7+bm6+cm15+dm14+em23+fm22+gm31+hm30 . . . am2−bm3+cm10−dm11+em18−fm19+gm26−hm27 am1+bm0+cm9+dm8+em17+fm16+gm25+hm24 am0−bm1+cm8−dm9+em16−f17+gm24−hm25], rounded and limited as specified.

An exemplary embodiment of the pseudocode 1680 of the Wide Multiply Matrix Extract Immediate instruction is shown in FIG. 16D. An exemplary embodiment of the exceptions 1590 of the Wide Multiply Matrix Extract Immediate instruction is shown in FIG. 16E.

Wide Multiply Matrix Floating-point

An exemplary embodiment of the Wide Multiply Matrix Floating-point instruction is shown in FIGS. 17A–17E. In an exemplary embodiment, the Wide Multiply Matrix Floating-point instructions perform a matrix multiply in the same form as above, except that the multiplies and additions are performed in floating-point arithmetic. Sizes of half (16-bit), single (32-bit), double (64-bit), and complex sizes of half, single and double can be specified within the instruction.

In an exemplary embodiment, these instructions take an address from a general register to fetch a large operand from memory, a second operand from a general register, perform a group of operations on partitions of bits in the operands, and catenate the results together, placing the result in a general register. An exemplary embodiment of the format 1710 of the Wide Multiply Matrix Floating point instruction is shown in FIG. 17A.

Figure 17B:
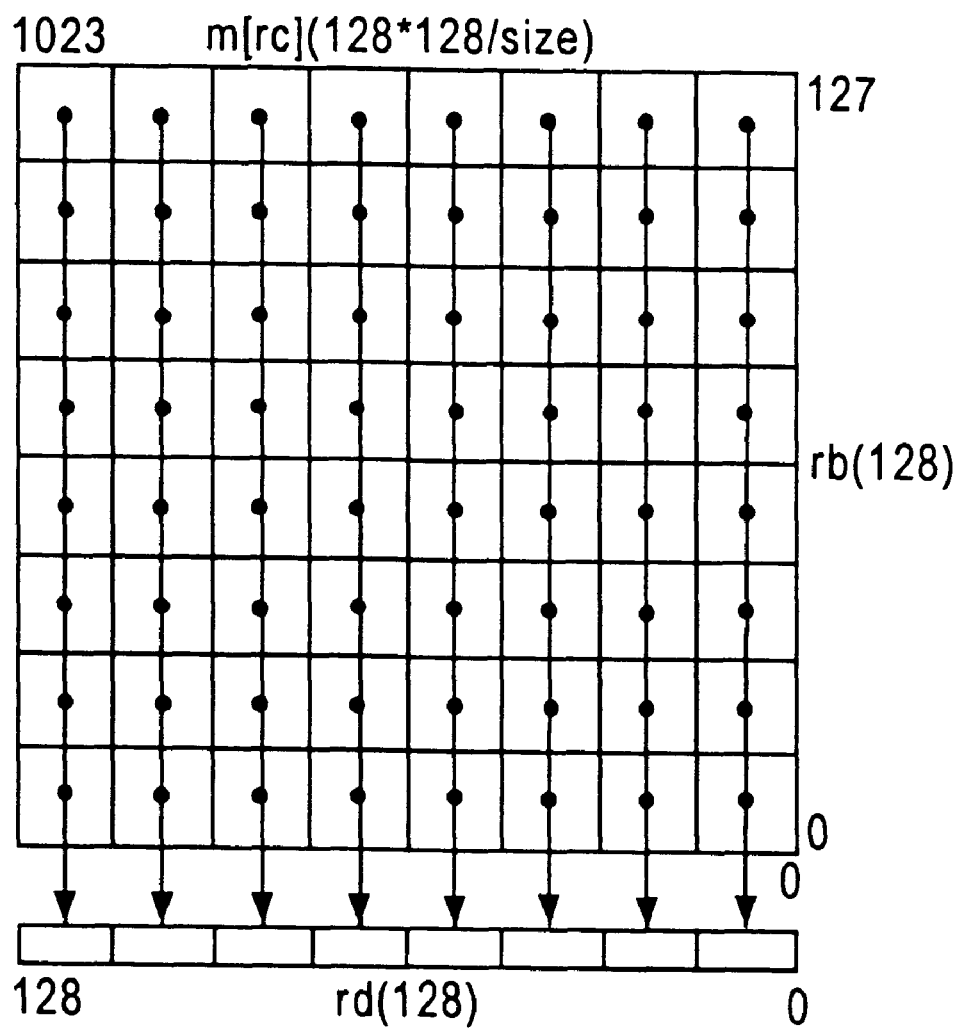
Figure 17C:
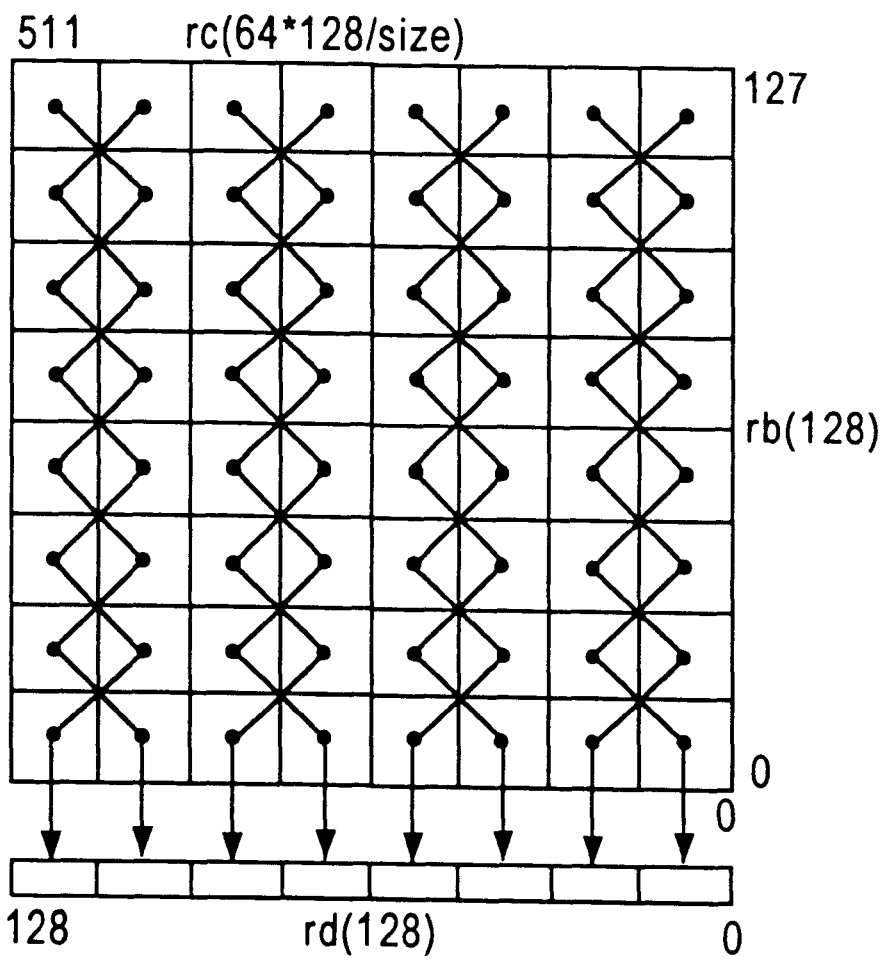

An exemplary embodiment of the schematics 1730 and 1760 of the Wide Multiply Matrix Floating-point instruction is shown in FIGS. 17B and 17C. In an exemplary embodiment, the contents of register rc is used as a virtual address, and a value of specified size is loaded from memory. A second value is the contents of register rb. The values are partitioned into groups of operands of the size specified. The second values are multiplied with the first values, then summed, producing a group of result values. The group of result values is catenated and placed in register rd.

In an exemplary embodiment, the wide-multiply-matrix-floating-point instructions (W.MUL.MAT.F, W.MUL.MAT.C.F) perform a partitioned array multiply of up to 16384 bits, that is 128×128 bits. The width of the array can be limited to 128, 64, 32 bits, but not smaller than twice the group size, by adding one-half the desired size in bytes to the virtual address operand: 8, 4, or 2. The array can be limited vertically to 128, 64, 32, or 16 bits, but not smaller than twice the group size, by adding one-half the desired memory operand size in bytes to the virtual address operand.

In an exemplary embodiment, the virtual address must either be aligned to 2048/gsize bytes (or 1024/gsize for W.MUL.MAT.C.F), or must be the sum of an aligned address and one half of the size of the memory operand in bytes and/or one-half of the size of the result in bytes. An aligned address must be an exact multiple of the size expressed in bytes. If the address is not valid an "access disallowed by virtual address" exception occurs.

As shown in FIG. 17B, an exemplary embodiment of a wide-multiply-matrix-floating-point-half instruction (W.MUL.MAT.F) multiplies memory [m31 m3 . . . m1 m0] with vector [h g f e d c b a], yielding products [hm31+gm27+ . . . +bm7+am3 . . . hm28+gm24+ . . . +bm4+am0].

As shown in FIG. 17C, an exemplary embodiment of a wide-multiply-matrix-complex-floating-point-half instruction (W.MUL.MAT.F) multiplies memory [m15 m14 . . . m1 m0] with vector [h g f e d c b a], yielding products [hm14+gm15+ . . . +bm2+am3 . . . hm12+gm13+ . . . +bm0+am1−hm13+gm12+ . . . −bm1+am0].

An exemplary embodiment of the pseudocode 1780 of the Wide Multiply Matrix Floating-point instruction is shown in FIG. 17D. Additional pseudocode functions used by this and other floating point instructions is shown in FIG. FLOAT-1. An exemplary embodiment of the exceptions 1790 of the Wide Multiply Matrix Floating-point instruction is shown in FIG. 17E.

Wide Multiply Matrix Galois

An exemplary embodiment of the Wide Multiply Matrix Galois instruction is shown in FIGS. 18A–18D. In an exemplary embodiment, the Wide Multiply Matrix Galois instructions perform a matrix multiply in the same form as above, except that the multiples and additions are performed in Galois field arithmetic. A size of 8 bits can be specified within the instruction. The contents of a general register specify the polynomial with which to perform the Galois field remainder operation. The nature of the matrix multiplication is novel and described in detail below.

In an exemplary embodiment, these instructions take an address from a general register to fetch a large operand from memory, second and third operands from general registers, perform a group of operations on partitions of bits in the operands, and catenate the results together, placing the result in a general register. An exemplary embodiment of the format 1810 of the Wide Multiply Matrix Galois instruction is shown in FIG. 18A.

Figure 18B:
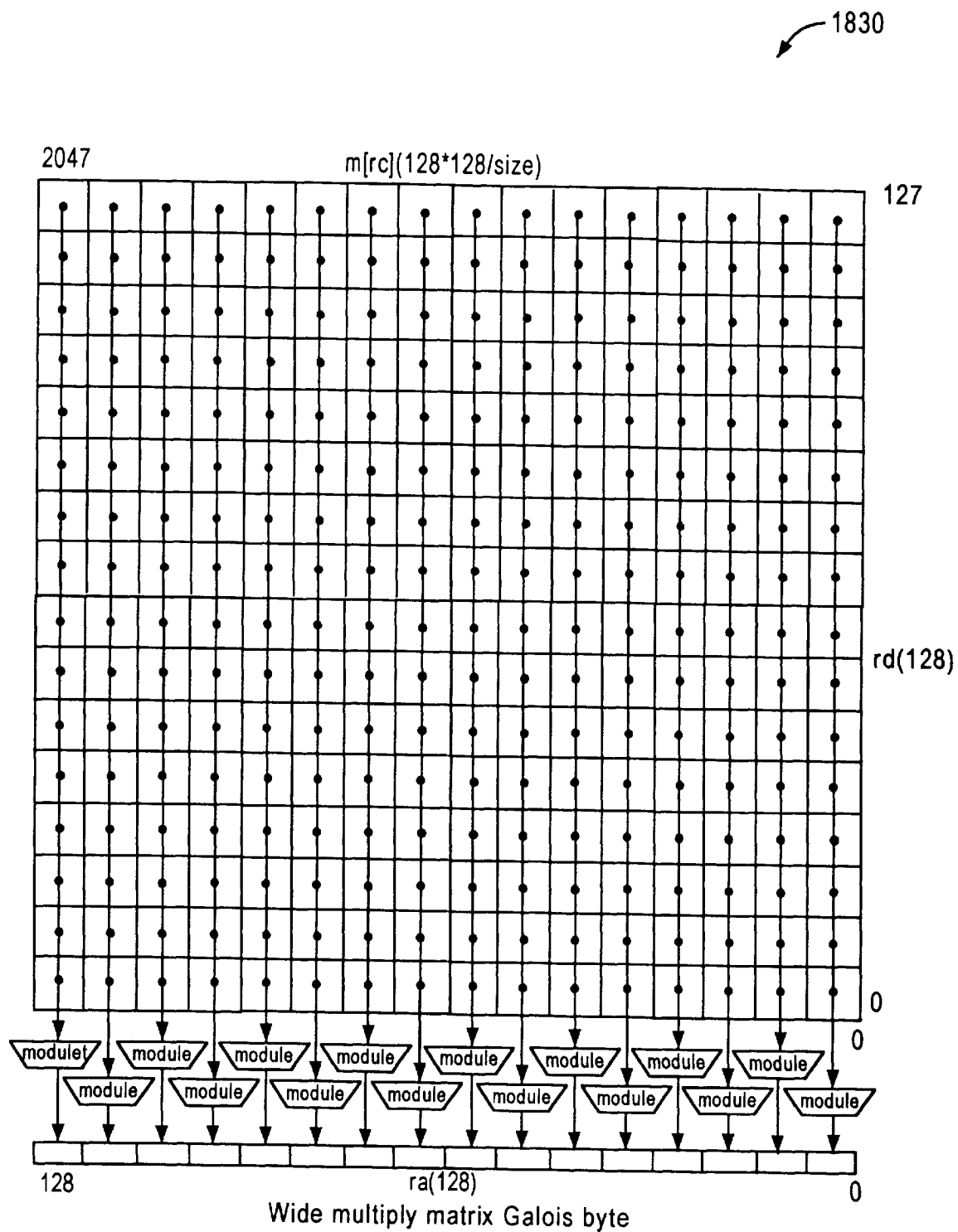

An exemplary embodiment of the schematic 1830 of the Wide Multiply Matrix Galois instruction is shown in FIG. 18B. In an exemplary embodiment, the contents of register re is used as a virtual address, and a value of specified size is loaded from memory. Second and third values are the contents of registers rd and rb. The values are partitioned into groups of operands of the size specified. The second values are multiplied as polynomials with the first value, producing a result which is reduced to the Galois field specified by the third value, producing a group of result values. The group of result values is catenated and placed in register ra.

In an exemplary embodiment, the wide-multiply-matrix-Galois-bytes instruction (W.MUL.MAT.G.8) performs a partitioned array multiply of up to 16384 bits, that is 128×128 bits. The width of the array can be limited to 128, 64, 32, or 16 bits, but not smaller than twice the group size of 8 bits, by adding one-half the desired size in bytes to the virtual address operand: 8, 4, 2, or 1. The array can be limited vertically to 128, 64, 32, or 16 bits, but not smaller than twice the group size of 8 bits, by adding one-half the desired memory operand size in bytes to the virtual address operand.

In an exemplary embodiment, the virtual address must either be aligned to 256 bytes, or must be the sum of an aligned address and one-half of the size of the memory operand in bytes and/or one-half of the size of the result in bytes. An aligned address must be an exact multiple of the size expressed in bytes. If the address is not valid an "access disallowed by virtual address" exception occurs.

As shown in FIG. 18B, an exemplary embodiment of a wide-multiply-matrix-Galois-byte instruction (W.MUL.MAT.G.8) multiplies memory [m255 m254 . . . m1 m0] with vector [p o n m l k j i h g f e d c b a], reducing the result modulo polynomial [q], yielding products [(pm255+ om247+ ... +bm31+am15 mod q) (pm254+om246+ ... +bm30+am14 mod q) ... (pm248+om240+ ... +bm16+am0 mod q)].

An exemplary embodiment of the pseudocode 1860 of the Wide Multiply Matrix Galois instruction is shown in FIG. 18C. An exemplary embodiment of the exceptions 1890 of the Wide Multiply Matrix Galois instruction is shown in FIG. 18D.

Memory Operands of Either Little-Endian or Big-Endian Conventional Byte Ordering In another aspect of the invention, memory operands of either little-endian or big-endian conventional byte ordering are facilitated. Consequently, all Wide operand instructions are specified in two forms, one for little-endian byte ordering and one for big-endian byte ordering, as specified by a portion of the instruction. The byte order specifies to the memory system the order in which to deliver the bytes within units of the data path width (128 bits), as well as the order to place multiple memory words (128 bits) within a larger Wide operand.

Extraction of a High Order Portion of a Multiplier Product or Sum of Products

Another aspect of the present invention addresses extraction of a high order portion of a multiplier product or sum of products, as a way of efficiently utilizing a large multiplier array. Related U.S. Pat. No. 5,742,840 and U.S. Pat. No. 5,953,241 describe a system and method for enhancing the utilization of a multiplier array by adding specific classes of instructions to a general-purpose processor. This addresses the problem of making the most use of a large multiplier array that is fully used for high-precision arithmetic—for example a 64×64 bit multiplier is fully used by a 64-bit by 64-bit multiply, but only one quarter used for a 32-bit by 32-bit multiply) for (relative to the multiplier data width and registers) low-precision arithmetic operations. In particular, operations that perform a great many low-precision multiplies which are combined (added) together in various ways are specified. One of the overriding considerations in selecting the set of operations is a limitation on the size of the result operand. In an exemplary embodiment, for example, this size might be limited to on the order of 128 bits, or a single register, although no specific size limitation need exist.

The size of a multiply result, a product, is generally the sum of the sizes of the operands, multiplicands and multiplier. Consequently, multiply instructions specify operations in which the size of the result is twice the size of identically-sized input operands. For our prior art design, for example, a multiply instruction accepted two 64-bit register sources and produces a single 128-bit register-pair result, using an entire 64×64 multiplier array for 64-bit symbols, or half the multiplier array for pairs of 32-bit symbols, or one quarter the multiplier array for quads of 16-bit symbols. For all of these cases, note that two register sources of 64 bits are combined, yielding a 128-bit result.

In several of the operations, including complex multiplies, convolve, and matrix multiplication, low-precision multiplier products are added together. The additions further increase the required precision. The sum of two products requires one additional bit of precision; adding four products requires two, adding eight products requires three, adding sixteen products requires four. In some prior designs, some of this precision is lost, requiring scaling of the multiplier operands to avoid overflow, further reducing accuracy of the result.

The use of register pairs creates an undesirable complexity, in that both the register pair and individual register values must be bypassed to subsequent instructions. As a result, with prior art techniques only half of the source operand 128-bit register values could be employed toward producing a single-register 128-bit result.

In the present invention, a high-order portion of the multiplier product or sum of products is extracted, adjusted by a dynamic shift amount from a general register or an adjustment specified as part of the instruction, and rounded by a control value from a register or instruction portion as round-to-nearest/even, toward zero, floor, or ceiling. Overflows are handled by limiting the result to the largest and smallest values that can be accurately represented in the output result.

Extract Controlled by a Register

In the present invention, when the extract is controlled by a register, the size of the result can be specified, allowing rounding and limiting to a smaller number of bits than can fit in the result. This permits the result to be scaled to be used in subsequent operations without concern of overflow or rounding, enhancing performance.

Also in the present invention, when the extract is controlled by a register, a single register value defines the size of the operands, the shift amount and size of the result, and the rounding control. By placing all this control information in a single register, the size of the instruction is reduced over the number of bits that such a instruction would otherwise require, improving performance and enhancing flexibility of the processor.

The particular instructions included in this aspect of the present invention are Ensemble Convolve Extract, Ensemble Multiply Extract, Ensemble Multiply Add Extract and Ensemble Scale Add Extract.

Ensemble Extract Inplace

An exemplary embodiment of the Ensemble Extract Inplace instruction is shown in FIGS. 19A–19G. In an exemplary embodiment, several of these instructions (Ensemble Convolve Extract, Ensemble Multiply Add Extract) are typically available only in forms where the extract is specified as part of the instruction. An alternative embodiment can incorporate forms of the operations in which the size of the operand, the shift amount and the rounding can be controlled by the contents of a general register (as they are in the Ensemble Multiply Extract instruction). The definition of this kind of instruction for Ensemble Convolve Extract, and Ensemble Multiply Add Extract would require four source registers, which increases complexity by requiring additional general-register read ports.

Figure 19A:
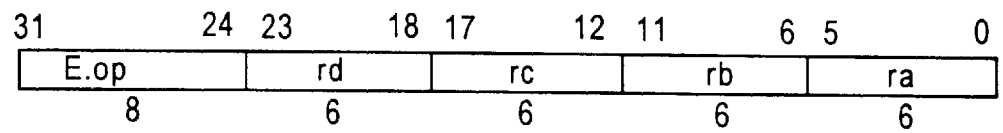

In an exemplary embodiment, these operations take operands from four registers, perform operations on partitions of bits in the operands, and place the concatenated results in a fourth register. An exemplary embodiment of the format and operation codes 1910 of the Ensemble Extract Inplace instruction is shown in FIG. 19A.

An exemplary embodiment of the schematics 1930, 1945, 1960, and 1975 of the Ensemble Extract Inplace instruction is shown in FIGS. 19C, 19D, 19E, and 19F. In an exemplary embodiment, the contents of registers rd, rc, rb, and ra are fetched. The specified operation is performed on these operands. The result is placed into register rd.

In an exemplary embodiment, for the E.CON.X instruction, the contents of registers rd and rc are catenated, as c d, and used as a first value. A second value is the contents of register rb. The values are partitioned into groups of operands of the size specified and are convolved, producing a group of values. The group of values is rounded, limited and extracted as specified, yielding a group of results that is the size specified. The group of results is catenated and placed in register rd.

In an exemplary embodiment, for the E.MUL.ADD.X instruction, the contents of registers rc and rb are partitioned into groups of operands of the size specified and are multiplied, producing a group of values to which are added the partitioned and extended contents of register rd. The group of values is rounded, limited and extracted as specified, yielding a group of results that is the size specified. The group of results is catenated and placed in register rd.

As shown in FIG. 19B, in an exemplary embodiment, bits 31 . . . 0 of the contents of register ra specifies several parameters that control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction. The control fields are further arranged so that if only the low order 8 bits are non-zero, a 128-bit extraction with truncation and no rounding is performed.

In an exemplary embodiment, the table below describes the meaning of each label:

| label | bits | meaning |
| --- | --- | --- |
| fsize | 8 | field size |
| dpos | 8 | destination position |
| x | 1 | extended vs. group size result |
| s | 1 | signed vs. unsigned |
| n | 1 | complex vs. real multiplication |
| m | 1 | mixed-sign vs. same-sign multiplication |
| l | 1 | limit: saturation vs. truncation |
| rnd | 2 | rounding |
| gssp | 9 | group size and source position |

In an exemplary embodiment, the 9-bit gssp field encodes both the group size, gsize, and source position, spos, according to the formula gssp=512−4*gsize+spos. The group size, gsize, is a power of two in the range 1 . . . 128. The source position, spos, is in the range 0. . . (2*gsize)−1.

In an exemplary embodiment, the values in the x, s, n, m, l, and rnd fields have the following meaning:

| values | x | s | n | m | l | rnd |
| --- | --- | --- | --- | --- | --- | --- |
| 0 | group | unsigned | real | same-sign | truncate | F |
| 1 | extended | signed | complex | mixed-sign | saturate | Z |
| 2 | | | | | | N |
| 3 | | | | | | C |

Ensemble Multiply Add Extract

Figure 19C:
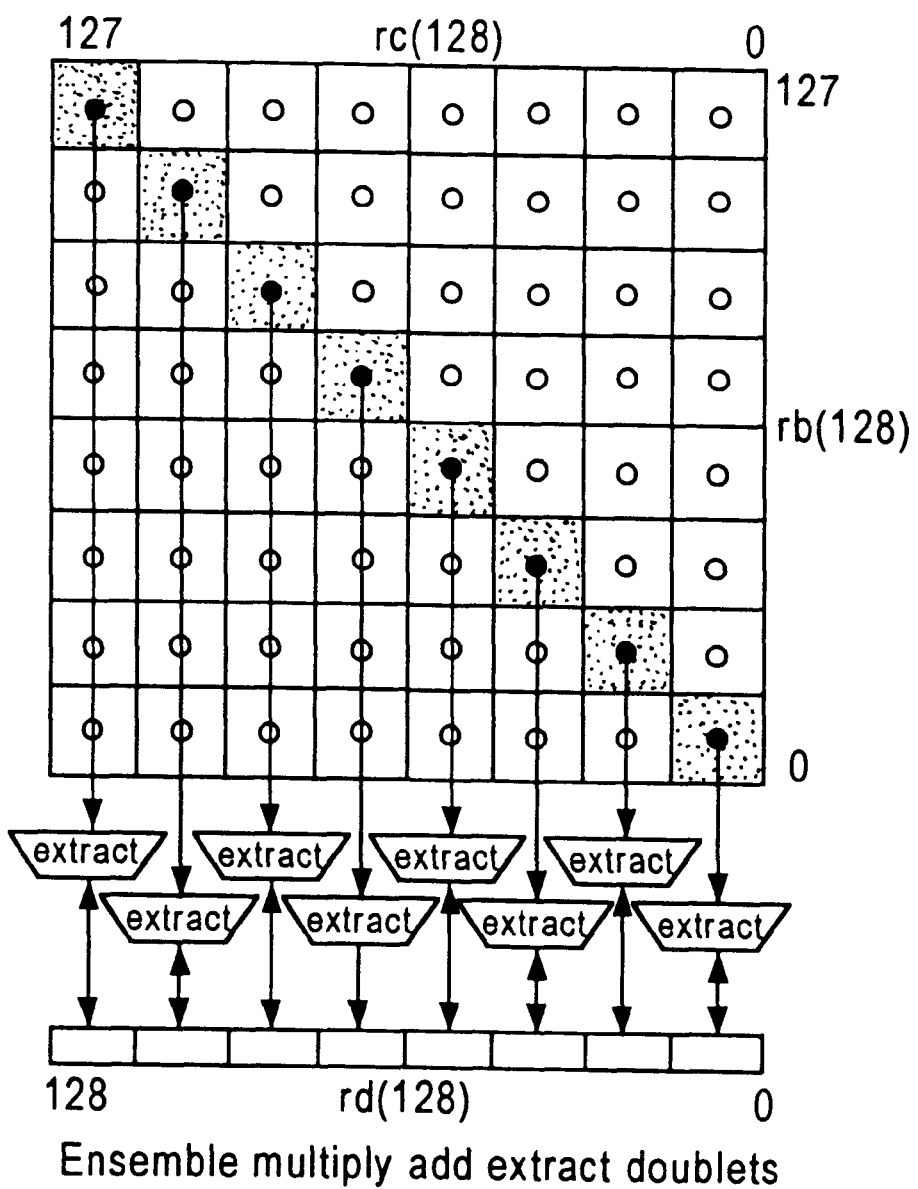

As shown in FIG. 19C, an exemplary embodiment of an ensemble-multiply-add-extract-doublets instruction (E.MULADDX) multiplies vector rc [h g f e d c b a] with vector rb [p o n m l k j i], and adding vector rd [x w v u t s r q], yielding the result vector rd [hp+x go+w fn+v em+u dl+t ck+s bj+r ai+q], rounded and limited as specified by ra31 . . . 0.

Figure 19D:
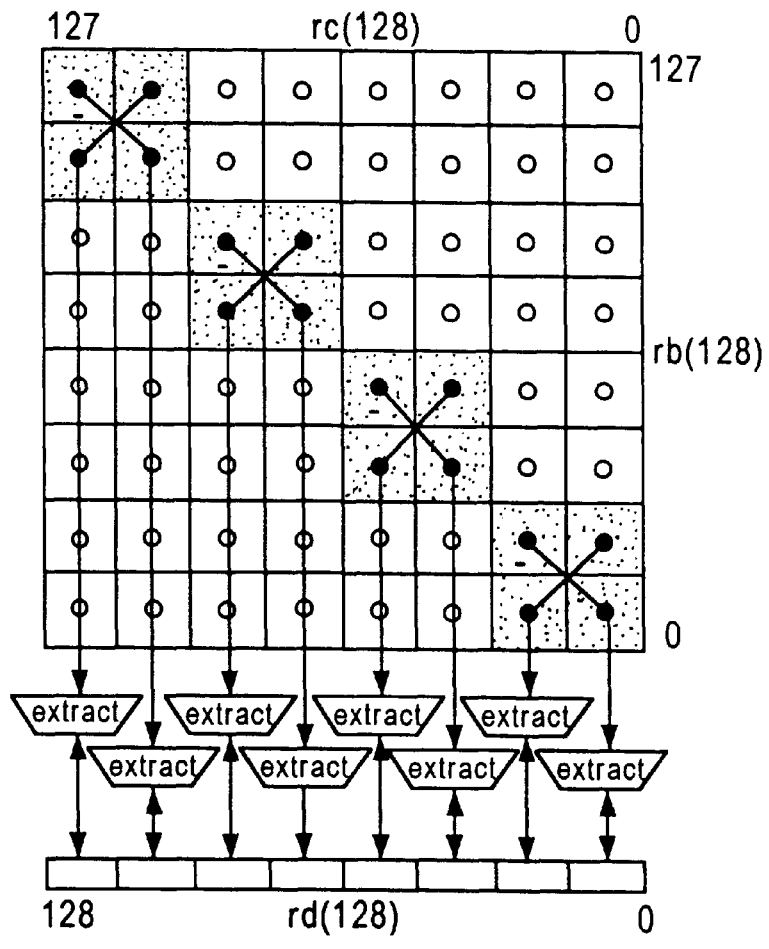

As shown in FIG. 19D, an exemplary embodiment of an ensemble-multiply-add-extract-doublets-complex instruction (E.MUL.X with n set) multiplies operand vector rc [h g f e d c b a] by operand vector rb [p o n m l k j i], yielding the result vector rd [gp+ho go−hp en+fm em−fn cl+dk ck−dl aj+bi ai−bj], rounded and limited as specified by ra31 . . . 0. Note that this instruction prefers an organization of complex numbers in which the real part is located to the right (lower precision) of the imaginary part.

Ensemble Convolve Extract

Figure 19E:
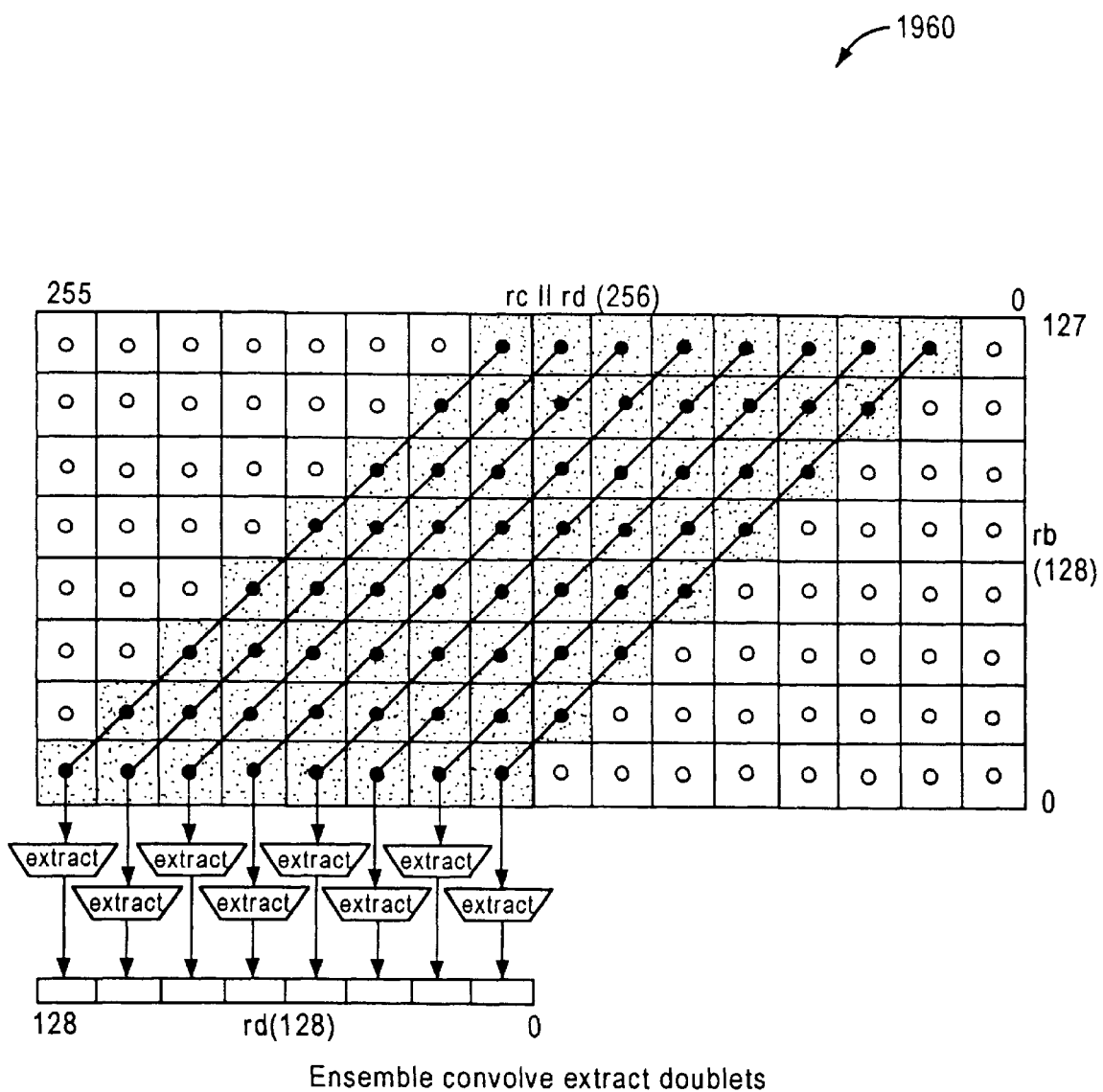

As shown in FIG. 19E, an exemplary embodiment of an ensemble-convolve-extract-doublets instruction (ECON.X with n=0) convolves vector rc r d [x w v u t s r q p o n m l k j i] with vector rb [h g f e d c b a], yielding the products vector rd [ax+bw+cv+du+et+fs+gr+hq . . . as+br+cq+dp+ eo+fn+gm+hl ar+bq+cp+do+en+fm+gl+hk aq+bp+co+dn+ em+fl+gk+hj], rounded and limited as specified by $ra_{31\ldots0}$.

Figure 19F:
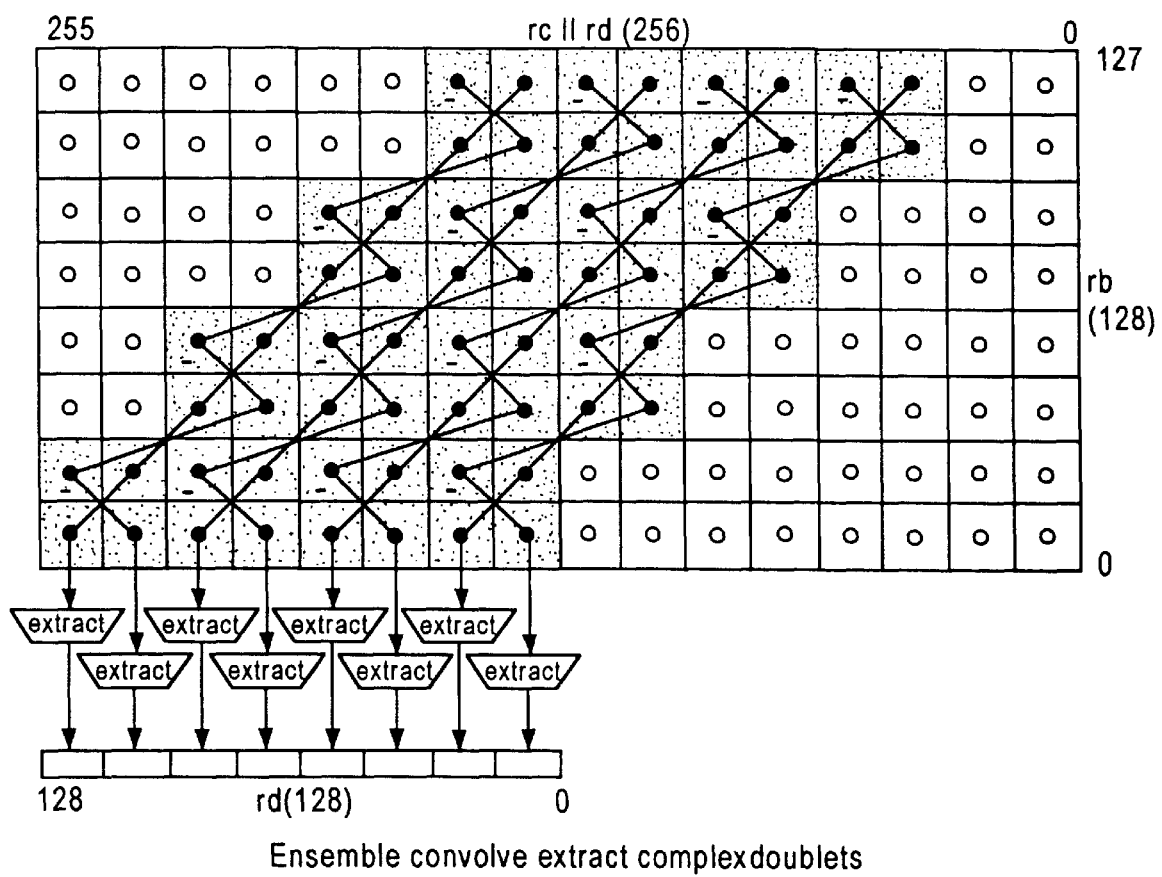

As shown in FIG. 19F, an exemplary embodiment of an ensemble-convolve-extract-complex-doublets instruction (ECON.X with n=1) convolves vector rd rc [x w v u t s r q p o n m l k j i] with vector rb [h g f e d c b a], yielding the products vector rd [ax+bw+cv+du+et+fs+gr+hq . . . as−bt+ cq−dr+eo−fp+gm−hn ar+bq+cp+do+en+fm+gl+hk aq−br+ co−dp+em−fn+gk+hl], rounded and limited as specified by ra31 . . . 0.

An exemplary embodiment of the pseudocode 1990 of Ensemble Extract Inplace instruction is shown in FIG. 19G. In an exemplary embodiment, there are no exceptions for the Ensemble Extract Inplace instruction.

Ensemble Extract

Figure 20A:
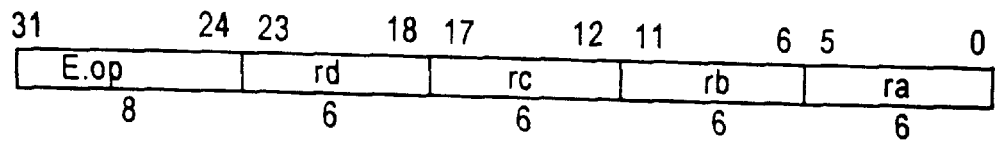

An exemplary embodiment of the Ensemble Extract instruction-is shown in FIGS. 20A–20J. In an exemplary embodiment, these operations take operands from three registers, perform operations on partitions of bits in the operands, and place the catenated results in a fourth register. An exemplary embodiment of the format and operation codes 2010 of the Ensemble Extract instruction is shown in FIG. 20A.

An exemplary embodiment of the schematics 2020, 2030, 2040, 2050, 2060, 2070, and 2080 of the Ensemble Extract Inplace instruction is shown in FIGS. 20C, 20D, 20E, 20F, 20G, 20H, and 20I. In an exemplary embodiment, the contents of registers rd, rc, and rb are fetched. The specified operation is performed on these operands. The result is placed into register ra.

Figure 20B:
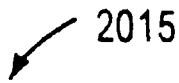

As shown in FIG. 20B, in an exemplary embodiment, bits 31 . . . 0 of the contents of register rb specifies several parameters that control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction. The control fields are further arranged so that if only the low order 8 bits are non-zero, a 128-bit extraction with truncation and no rounding is performed.

In an exemplary embodiment, the table below describes the meaning of each label:

| label | bits | meaning |
| --- | --- | --- |
| fsize | 8 | field size |
| dpos | 8 | destination position |
| x | 1 | extended vs. group size result |
| s | 1 | signed vs. unsigned |
| n | 1 | complex vs. real multiplication |
| m | 1 | merge vs. extract or mixed-sign vs. same-sign multiplication |
| l | 1 | limit: saturation vs. truncation |
| rnd | 2 | rounding |
| gssp | 9 | group size and source position |

In an exemplary embodiment, the 9-bit gssp field encodes both the group size, gsize, and source position, spos, according to the formula gssp=512 4*gsize+spos. The group size, gsize, is a power of two in the range 1 ... 128. The source position, spos, is in the range 0 ... (2*gsize)−1.

In an exemplary embodiment, the values in the x, s, n, m, l, and rnd fields have the following meaning:

| values | x | s | n | m | l | rnd |
| --- | --- | --- | --- | --- | --- | --- |
| 0 | group | unsigned | real | extract/same-sign | truncate | F |
| 1 | extended | signed | complex | merge/mixed-sign | saturate | Z |
| 2 |   |   |   |   |   | N |
| 3 |   |   |   |   |   | C |

In an exemplary embodiment, for the E.SCAL.ADD.X instruction, bits 127 ... 64 of the contents of register rb specifies the multipliers for the multiplicands in registers rd and rc. Specifically, bits 64+2*gsize−1 ... 64+gsize is the multiplier for the contents of register rd, and bits 64+gsize−1 ... 64 is the multiplier for the contents of register rc.

Ensemble Multiply Extract

Figure 20C:
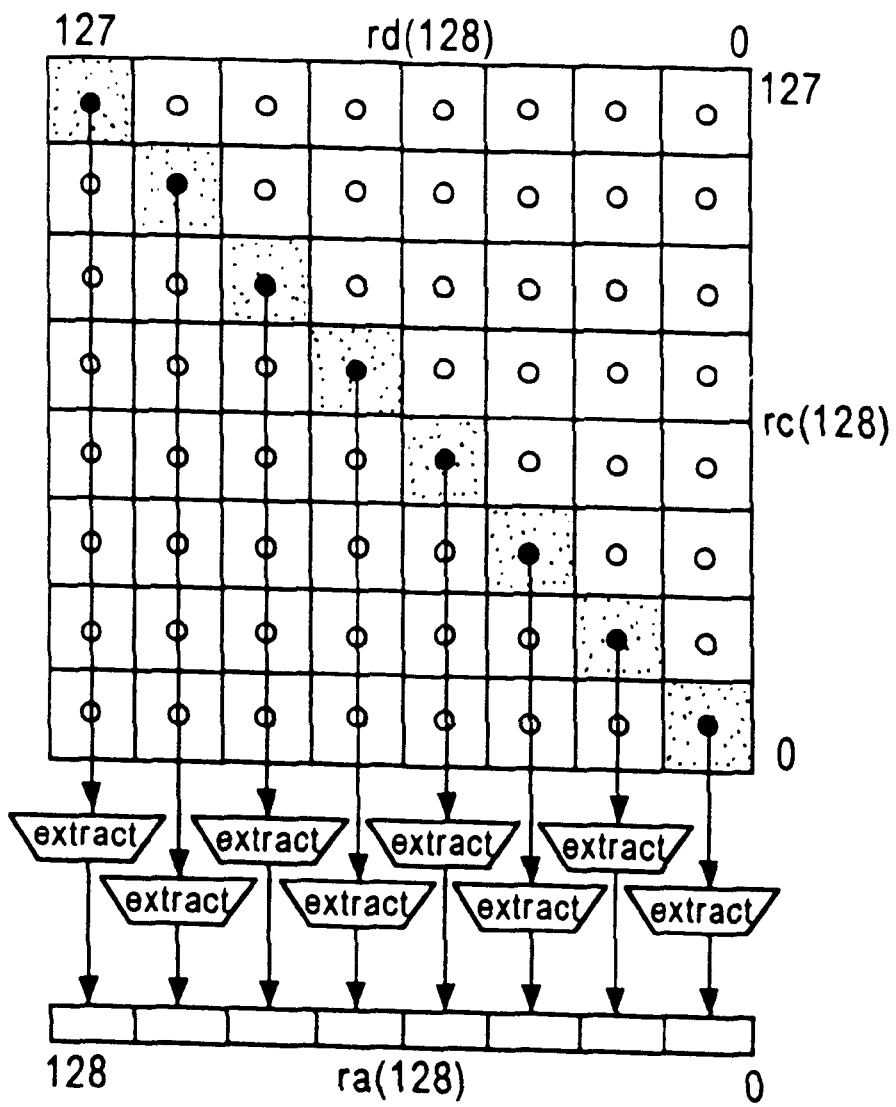

As shown in FIG. 20C, an exemplary embodiment of an ensemble-multiply-extract-doublets instruction (E.MULX) multiplies vector rd [h g f e d c b a] with vector rc [p o n m l k j i], yielding the result vector ra [hp go fn em dl ck bj ai], rounded and limited as specified by $rb_{31\ldots0}$.

Figure 20D:
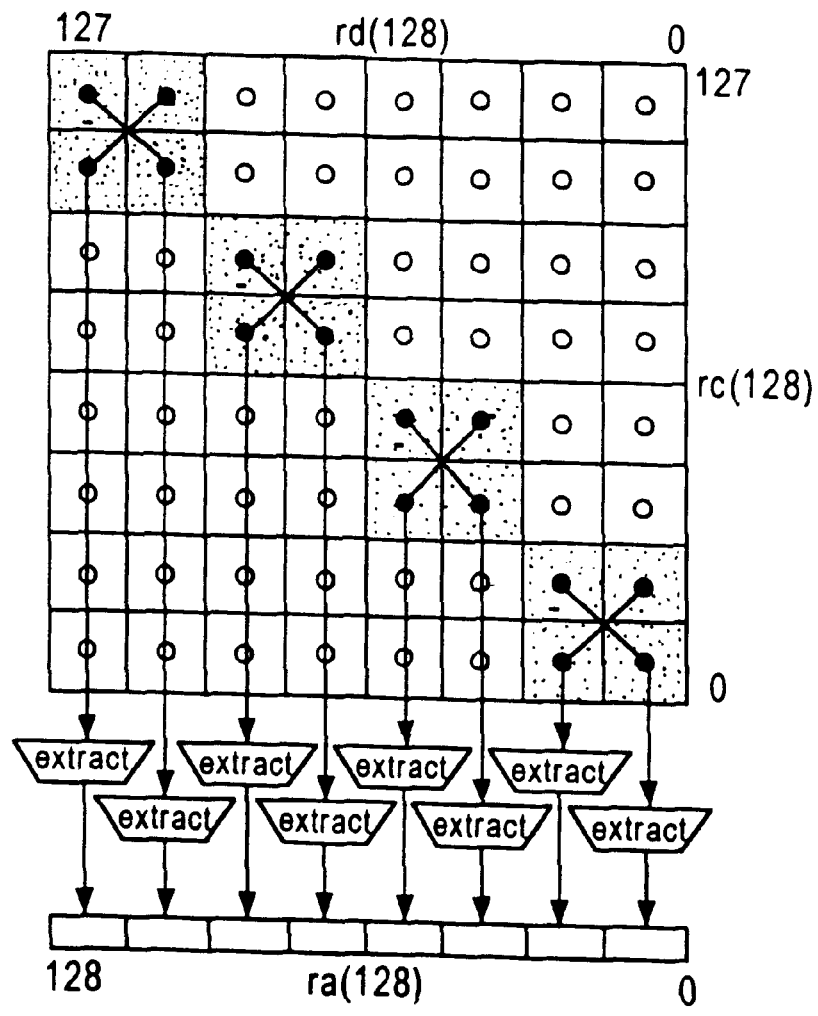

As shown in FIG. 20D, an exemplary embodiment of an ensemble-multiply-extract-doublets-complex instruction (E.MUL.X with n set) multiplies vector rd [h g f e d c b a] by vector rc [p o n m l k j i], yielding the result vector ra [gp+ho go−hp en+fm em−fn cl+dk ck−dl aj+bi ai−bj], rounded.and limited as specified by $rb_{31\ldots0}$. Note that this instruction prefers an organization of complex numbers in which the real part is located to the right (lower precision) of the imaginary part.

Ensemble Scale Add Extract

An aspect of the present invention defines the Ensemble Scale Add Extract instruction, that combines the extract control information in a register along with two values that are used as scalar multipliers to the contents of two vector multiplicands.

This combination reduces the number of registers that would otherwise be required, or the number of bits that the instruction would otherwise require, improving performance. Another advantage of the present invention is that the combined operation may be performed by an exemplary embodiment with sufficient internal precision on the summation node that no intermediate rounding or overflow occurs, improving the accuracy over prior art operation in which more than one instruction is required to perform this computation.

Figure 20E:
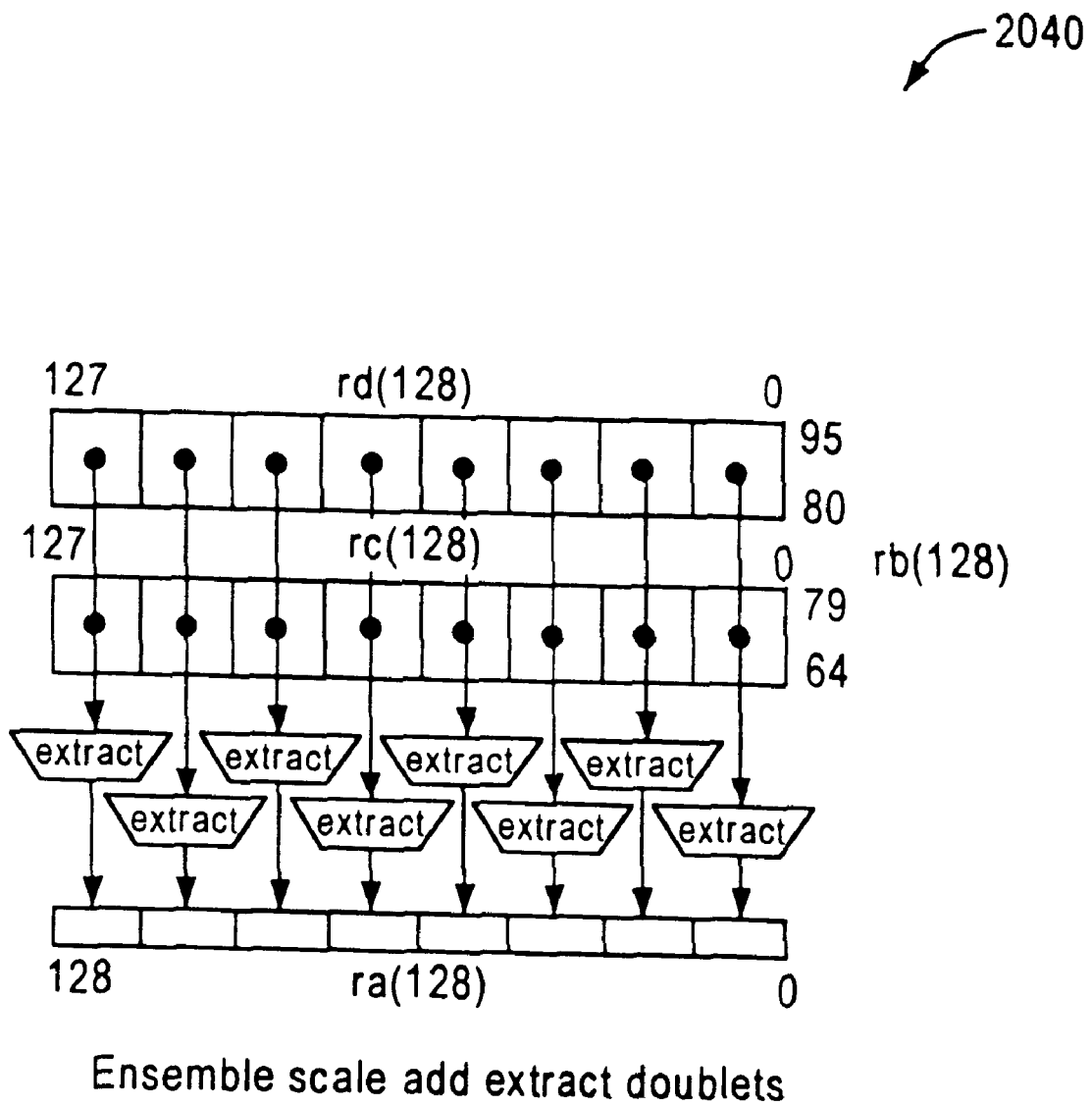

As shown in FIG. 20E, an exemplary embodiment of an ensemble-scale-add-extract-doublets instruction (E.SCAL.ADD.X) multiplies vector rd [h g f e d c b a] with $rb_{95\ldots80}$ [r] and adds the product to the product of vector rc [p o n m l k j i] with $rb_{79\ldots64}$ [q], yielding the result [hr+pq gr+oq fr+nq er+mq dr+lq cr+kq br+jq ar+iq], rounded and limited as specified by $rb_{31\ldots0}$.

Figure 20F:
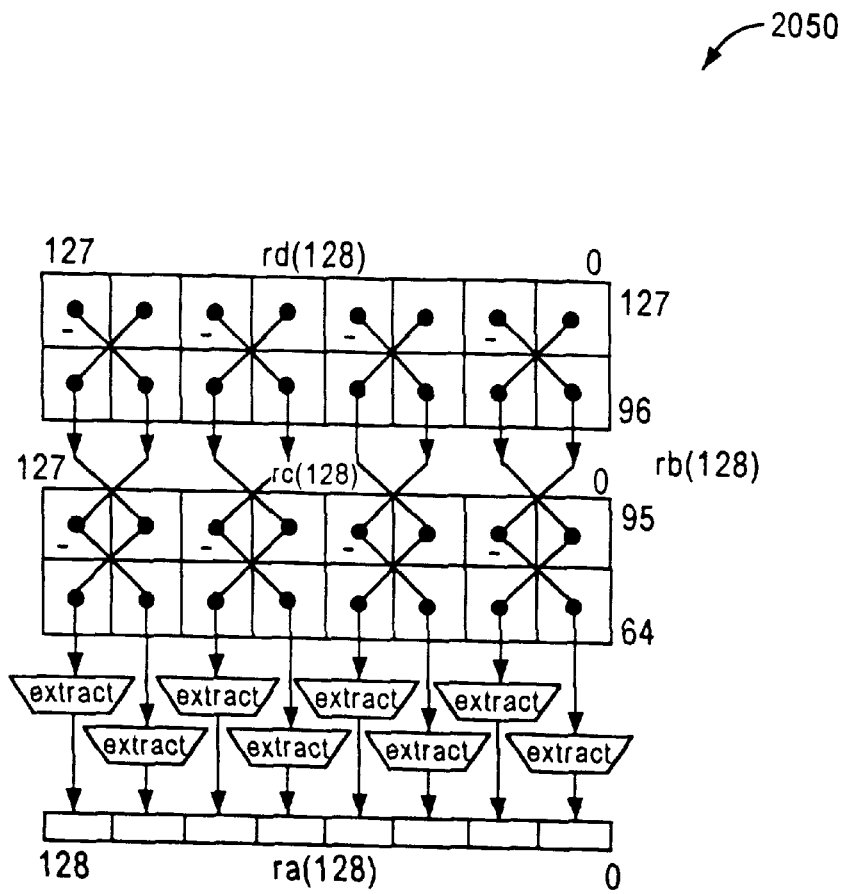

As shown in FIG. 20F, an exemplary embodiment of an ensemble-scale-add-extract-doublets-complex instruction (E.SCLADD.X with n set) multiplies vector rd [h g f e d c b a] with $rb_{127\ldots96}$ [t s] and adds the product to the product of vector rc [p o n m l k j i] with $rb_{95\ldots64}$ [r q], yielding the result [hs+gt+pq+or gs−ht+oq−pr fs+et+nq+mr es−ft+mq−nr ds+ct+lq+kr cs−dt+kq−lr bs+at+jq+ir as−bt+iq−jr], rounded and limited as specified by $rb_{31\ldots0}$.

Ensemble Extract

Figure 20G:
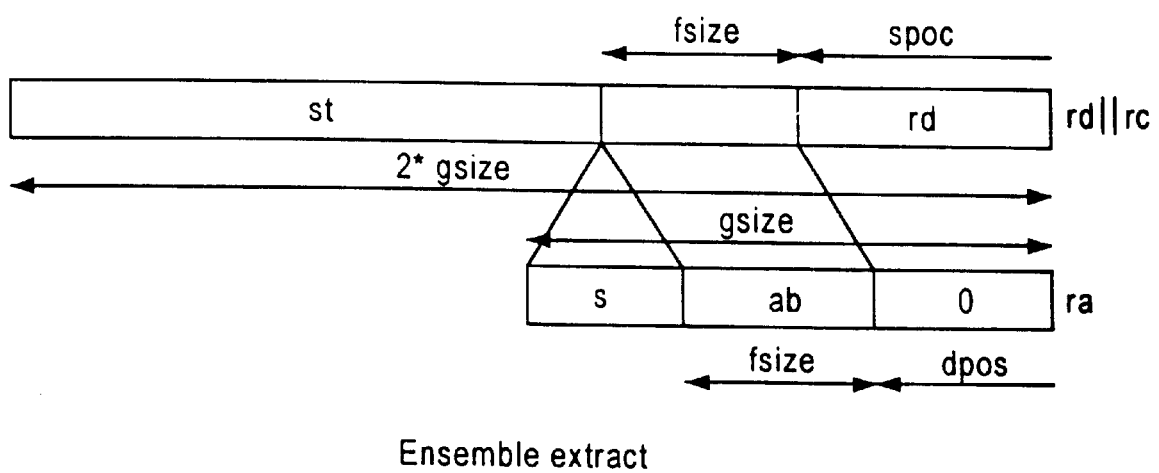

As shown in FIG. 20G, in an exemplary embodiment, for the E.EXTRACT instruction, when m=0 and x=0, the parameters specified by the contents of register rb are interpreted to select fields from double size symbols of the catenated contents of registers rd and rc, extracting values which are catenated and placed in register ra.

Figure 20H:
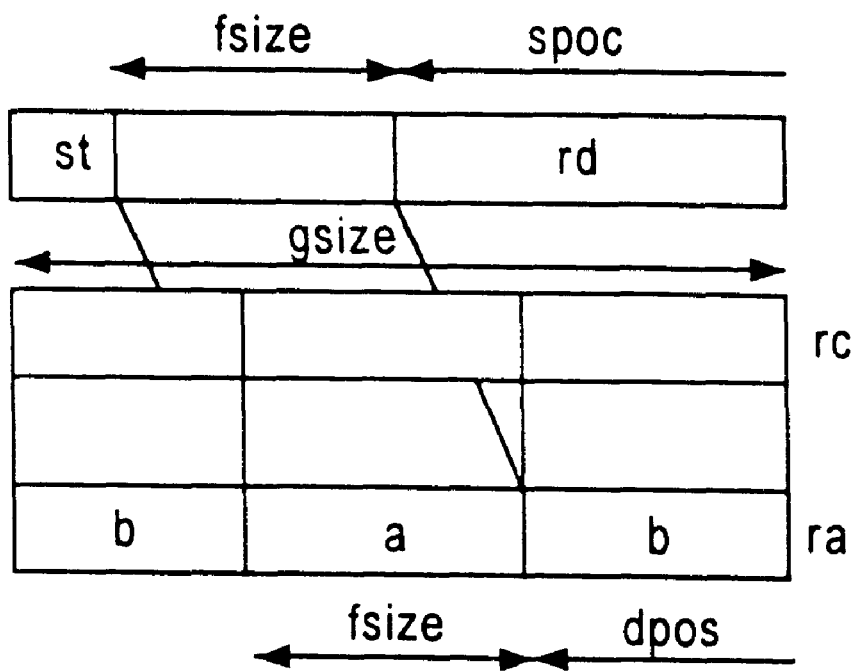

As shown in FIG. 20H, in an exemplary embodiment, for an ensemble-merge-extract (E.EXTRACT when m=1), the parameters specified by the contents of register rb are interpreted to merge fields from symbols of the contents of register rd with the contents of register rc. The results are catenated and placed in register ra. The x field has no effect when m=1.

Figure 20I:
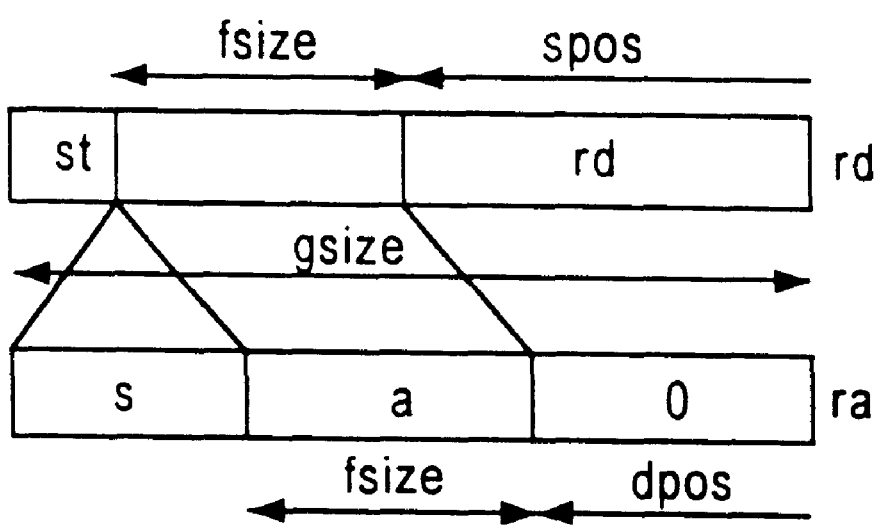

As shown in FIG. 20I, in an exemplary embodiment, for an ensemble-expand-extract (E.EXTRACT when m=0 and x=1), the parameters specified by the contents of register rb are interpreted to extract fields from symbols of the contents of register rd. The results are catenated and placed in register ra. Note that the value of rc is not used.

An exemplary embodiment of the pseudocode 2090 of Ensemble Extract instruction is shown in FIG. 20J. In an exemplary embodiment, there are no exceptions for the Ensemble Extract instruction.

Reduction of Register Read Ports

Another alternative embodiment can reduce the number of register read ports required for implementation of instructions in which the size, shift and rounding of operands is controlled by a register. The value of the extract control register can be fetched using an additional cycle on an initial execution and retained within or near the functional unit for subsequent executions, thus reducing the amount of hardware required for implementation with a small additional performance penalty. The value retained would be marked invalid, causing a re-fetch of the extract control register, by instructions that modify the register, or alternatively, the retained value can be updated by such an operation. A re-fetch of the extract control register would also be required if a different register number were specified on a subsequent execution. It should be clear that the properties of the above two alternative embodiments can be combined.

Galois Field Arithmetic

Another aspect of the invention includes Galois field arithmetic, where multiplies are performed by an initial binary polynomial multiplication (unsigned binary multiplication with carries suppressed), followed by a polynomial modulo/remainder operation (unsigned binary division with carries suppressed). The remainder operation is relatively expensive in area and delay. In Galois field arithmetic, additions are performed by binary addition with carries suppressed, or equivalently, a bitwise exclusive or operation. In this aspect of the present invention, a matrix multiplication is performed using Galois field arithmetic, where the multiplies and additions are Galois field multiples and additions.

Using prior art methods, a 16 byte vector multiplied by a 16×16 byte matrix can be performed as 256 8-bit Galois field multiplies and 16*15=240 8-bit Galois field additions. Included in the 256 Galois field multiplies are 256 polynomial multiplies and 256 polynomial remainder operations.

By use of the present invention, the total computation is reduced significantly by performing 256 polynomial multiplies, 240 16-bit polynomial additions, and 16 polynomial remainder operations. Note that the cost of the polynomial additions has been doubled compared with the Galois field additions, as these are now 16-bit operations rather than 8-bit operations, but the cost of the polynomial remainder finctions has been reduced by a factor of 16. Overall, this is a favorable tradeoff, as the cost of addition is much lower than the cost of remainder.

Decoupled Access from Execution Pipelines and Simultaneous Multithreading

Figure 4:
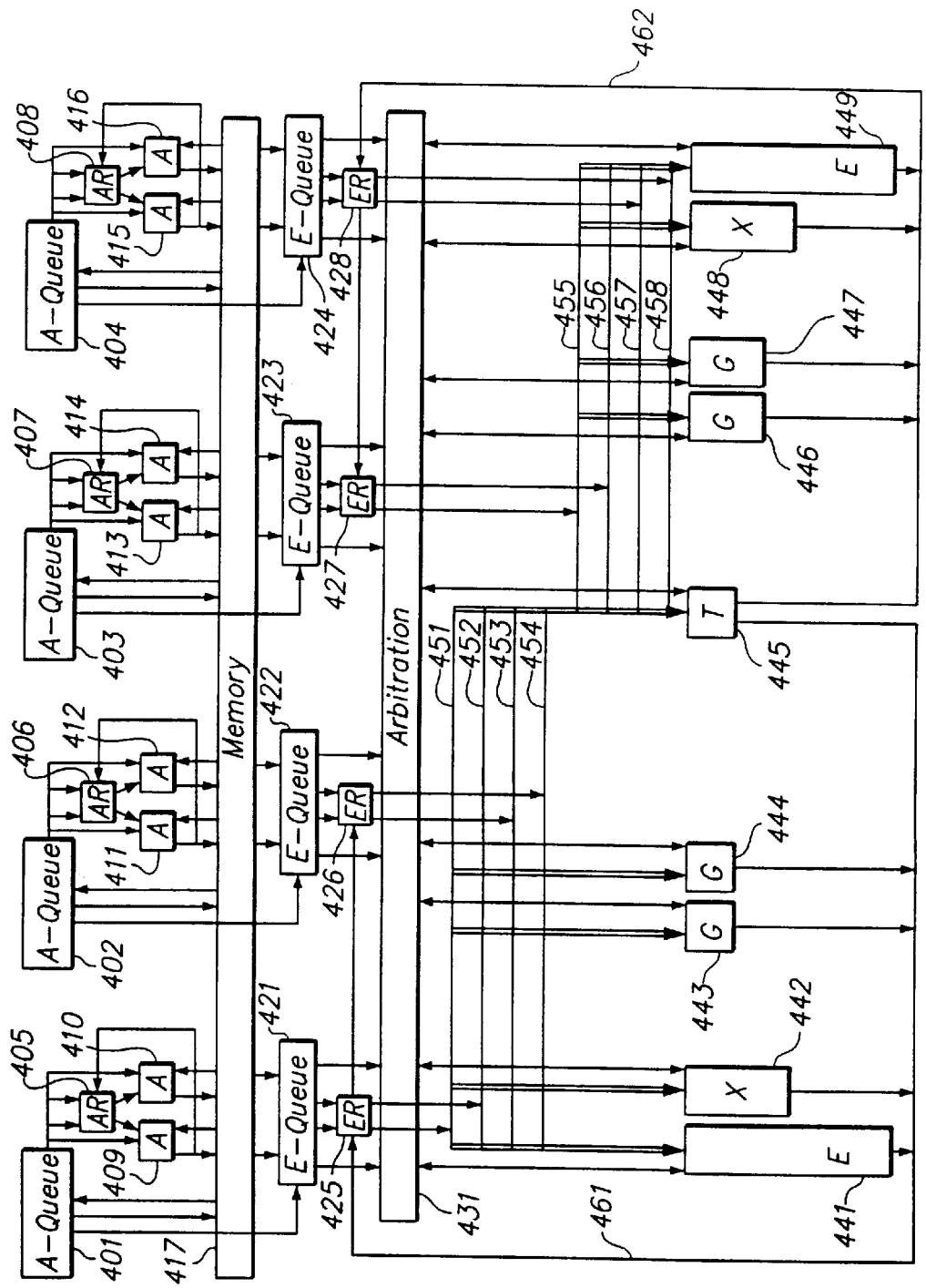
FIG. 4 is a system level diagram showing the functional blocks of a system incorporating a combined Simultaneous Multi Threading and Decoupled Access from Execution processor in accordance with an exemplary embodiment of the present invention.

In yet another aspect of the present invention, best shown in FIG. 4, the present invention employs both decoupled access from execution pipelines and simultaneous multithreading in a unique way. Simultaneous Multithreaded pipelines have been employed in prior art to enhance the utilization of data path units by allowing instructions to be issued from one of several execution threads to each functional unit (e.g. Dean M. Tullsen, Susan J. Eggers, and Henry M. Levy, "Simultaneous Multithreading: Maximizing On Chip Parallelism," Proceedings of the 22nd Annual International Symposium on Computer Architecture, Santa Margherita Ligure, Italy, June, 1995).

Decoupled access from execution pipelines have been employed in prior art to enhance the utilization of execution data path units by buffering results from an access unit, which computes addresses to a memory unit that in turn fetches the requested items from memory, and then presenting them to an execution unit (e.g. J. E. Smith, "Decoupled Access/Execute Computer Architectures", Proceedings of the Ninth Annual International Symposium on Computer Architecture, Austin, Texas (Apr. 26 29, 1982), pp. 112–119).

Compared to conventional pipelines, the Eggers prior art used an additional pipeline cycle before instructions could be issued to functional units, the additional cycle needed to determine which threads should be permitted to issue instructions. Consequently, relative to conventional pipelines, the prior art design had additional delay, including dependent branch delay.

The present invention contains individual access data path units, with associated register files, for each execution thread. These access units produce addresses, which are aggregated together to a common memory unit, which fetches all the addresses and places the memory contents in one or more buffers. Instructions for execution units, which are shared to varying degrees among the threads are also buffered for later execution. The execution units then perform operations from all active threads using functional data path units that are shared.

For instructions performed by the execution units, the extra cycle required for prior art simultaneous multithreading designs is overlapped with the memory data access time from prior art decoupled access from execution cycles, so that no additional delay is incurred by the execution functional units for scheduling resources. For instructions performed by the access units, by employing individual access units for each thread the additional cycle for scheduling shared resources is also eliminated.

This is a favorable tradeoff because, while threads do not share the access functional units, these units are relatively small compared to the execution functional units, which are shared by threads.

With regard to the sharing of execution units, the present invention employs several different classes of functional units for the execution unit, with varying cost, utilization, and performance. In particular, the G units, which perform simple addition and bitwise operations is relatively inexpensive (in area and power) compared to the other units, and its utilization is relatively high. Consequently, the design employs four such units, where each unit can be shared between two threads. The X unit, which performs a broad class of data switching functions is more expensive and less used, so two units are provided that are each shared among two threads. The T unit, which performs the Wide Translate instruction, is expensive and utilization is low, so the single unit is shared among all four threads. The E unit, which performs the class of Ensemble instructions, is very expensive in area and power compared to the other functional units, but utilization is relatively high, so we provide two such units, each unit shared by two threads.

In FIG. 4, four copies of an access unit are shown, each with an access instruction fetch queue A-Queue 401–404, coupled to an access register file AR 405–408, each of which is, in turn, coupled to two access functional units A 409–416. The access units function independently for four simultaneous threads of execution. These eight access functional units A 409–416 produce results for access register files AR 405–408 and addresses to a shared memory system 417. The memory contents fetched from memory system 417 are combined with execute instructions not performed by the access unit and entered into the four execute instruction queues E-Queue 421–424. Instructions and memory data from E-queue 421–424 are presented to execution register files 425–428, which fetches execution register file source operands. The instructions are coupled to the execution unit arbitration unit Arbitration 431, that selects which instructions from the four threads are to be routed to the available execution units E 441 and 449, X 442 and 448, G 443–444 and 446–447, and T 445. The execution register file source operands ER 425–428 are coupled to the execution units 441–445 using source operand buses 451–454 and to the execution units 445–449 using source operand buses 455–458. The function unit result operands from execution units 441–445 are coupled to the execution register file using result bus 461 and the function units result operands from execution units 445–449 are coupled to the execution register file using result bus 462.

Improved Interprivilege Gateway

In a still further aspect of the present invention, an improved interprivilege gateway is described which involves increased parallelism and leads to enhanced performance. In related U.S. patent application Ser. No. 08/541, 416, a system and method is described for implementing an instruction that, in a controlled fashion, allows the transfer of control (branch) from a lower privilege level to a higher privilege level. The present invention is an improved system and method for a modified instruction that accomplishes the same purpose but with specific advantages.

Many processor resources, such as control of the virtual memory system itself, input and output operations, and system control functions are protected from accidental or malicious misuse by enclosing them in a protective, privileged region. Entry to this region must be established only though particular entry points, called gateways, to maintain the integrity of these protected regions.

Prior art versions of this operation generally load an address from a region of memory using a protected virtual memory attribute that is only set for data regions that contain valid gateway entry points, then perform a branch to an address contained in the contents of memory. Basically, three steps were involved: load, then branch and check. Compared to other instructions, such as register to register computation instructions and memory loads and stores, and register based branches, this is a substantially longer operation, which introduces delays and complexity to a pipelined implementation.

In the present invention, the branch-gateway instruction performs two operations in parallel: 1) a branch is performed to the Contents of register 0 and 2) a load is performed using the contents of register 1, using a specified byte order (little-endian) and a specified size (64 bits). If the value loaded from memory does not equal the contents of register 0, the instruction is aborted due to an exception. In addition, 3) a return address (the next sequential instruction address following the branch-gateway instruction) is written into register 0, provided the instruction is not aborted. This approach essentially uses a first instruction to establish the requisite permission to allow user code to access privileged code, and then a second instruction is permitted to branch directly to the privileged code because of the permissions issued for the first instruction.

In the present invention, the new privilege level is also contained in register 0, and the second parallel operation does not need to be performed if the new privilege level is not greater than the old privilege level. When this second operation is suppressed, the remainder of the instruction performs an identical function to a branch-link instruction, which is used for invoking procedures that do not require an increase in privilege. The advantage that this feature brings is that the branch-gateway instruction can be used to call a procedure that may or may not require an increase in privilege.

The memory load operation verifies with the virtual memory system that the region that is loaded has been tagged as containing valid gateway data. A further advantage of the present invention is that the called procedure may rely on the fact that register 1 contains the address that the gateway data was loaded from, and can use the contents of register 1 to locate additional data or addresses that the procedure may require. Prior art versions of this instruction required that an additional address be loaded from the gateway region of memory in order to initialize that address in a protected manner—the present invention allows the address itself to be loaded with a "normal" load operation that does not require special protection.

The present invention allows a "normal" load operation to also load the contents of register 0 prior to issuing the branch-gateway instruction. The value may be loaded from the same memory address that is loaded by the branch-gateway instruction, because the present invention contains a virtual memory system in which the region may be enabled for normal load operations as well as the special "gateway" load operation performed by the branch-gateway instruction.

Improved Interprivilege Gateway—System and Privileged Library Calls

Figure 21A:
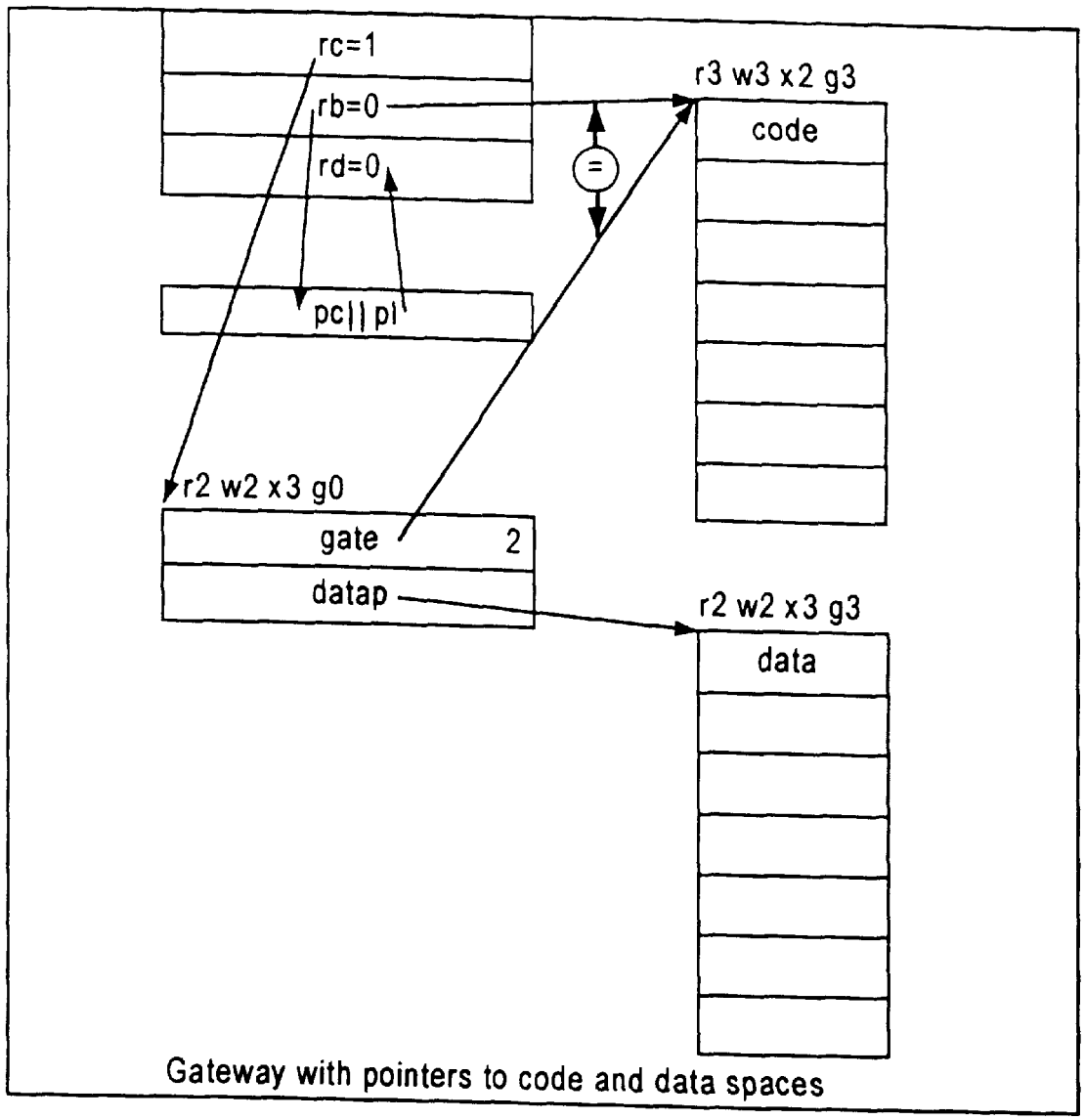

An exemplary embodiment of the System and Privileged Library Calls is shown in FIGS. 21A–21B. An exemplary embodiment of the schematic 2110 of System and Privileged Library Calls is shown in FIG. 21A. In an exemplary embodiment, it is an objective to make calls to system facilities and privileged libraries as similar as possible to normal procedure calls as described above. Rather than invoke system calls as an exception, which involves significant latency and complication, a modified procedure call in which the process privilege level is quietly raised to the required level is used. To provide this mechanism safely, interaction with the virtual memory system is required.

In an exemplary embodiment, such a procedure must not be entered from anywhere other than its legitimate entry point, to prohibit entering a procedure after the point at which security checks are performed or with invalid register contents, otherwise the access to a higher privilege level can lead to a security violation. In addition, the procedure generally must have access to memory data, for which addresses must be produced by the privileged code. To facilitate generating these addresses, the branch-gateway instruction allows the privileged code procedure to rely on the fact that a single register has been verified to contain a pointer to a valid memory region.

In an exemplary embodiment, the branch-gateway instruction ensures both that the procedure is invoked at a proper entry point, and that other registers such as the data pointer and stack pointer can be properly set. To ensure this, the branch-gateway instruction retrieves a "gateway" directly from the protected virtual memory space. The gateway contains the virtual address of the entry point of the procedure and the target privilege level. A gateway can only exist in regions of the virtual address space designated to contain them, and can only be used to access privilege levels at or below the privilege level at which the memory region can be written to ensure that a gateway cannot be forged.

In an exemplary embodiment, the branch-gateway instruction ensures that register 1 (dp) contains a valid pointer to the gateway for this target code address by comparing the contents of register 0 (ep) against the gateway retrieved from memory and causing an exception trap if they do not match. By ensuring that register 1 points to the gateway, auxiliary information, such as the data pointer and stack pointer can be set by loading values located by the contents of register 1. For example, the eight bytes following the gateway may be used as a pointer to a data region for the procedure.

In an exemplary embodiment, before executing the branch-gateway instruction, register 1 must be set to point at the gateway, and register 0 must be set to the address of the target code address plus the desired privilege level. A "L.I.64.L.A r0=r1,0" instruction is one way to set register 0, if register 1 has already been set, but any means of getting the correct value into register 0 is permissible.

In an exemplary embodiment, similarly, a return from a system or privileged routine involves a reduction of privilege. This need not be carefully controlled by architectural facilities, so a procedure may freely branch to a less-privileged code address. Normally, such a procedure restores the stack frame, then uses the branch-down instruction to return.

An exemplary embodiment of the typical dynamic-linked, inter-gateway calling sequence 2130 is shown in FIG. 21B. In an exemplary embodiment, the calling sequence is identical to that of the inter-module calling sequence shown above, except for the use of the B.GATE instruction instead of a B.LINK instruction. Indeed, if a B.GATE instruction is used when the privilege level in the lp register is not higher than the current privilege level, the B.GATE instruction performs an identical function to a B.LINK.

In an exemplary embodiment, the callee, if it uses a stack for local variable allocation, cannot necessarily trust the value of the sp passed to it, as it can be forged. Similarly, any pointers which the callee provides should not be used directly unless it they are verified to point to regions which the callee should be permitted to address. This can be avoided by defining application programming interfaces (APIs) in which all values are passed and returned in registers, or by using a trusted, intermediate privilege wrapper routine to pass and return parameters. The method described below can also be used.

In an exemplary embodiment, it can be useful to have highly privileged code call less-privileged routines. For example, a user may request that errors in a privileged routine be reported by invoking a user-supplied error-logging routine. To invoke the procedure, the privilege can be reduced via the branch-down instruction. The return from the procedure actually requires an increase in privilege, which must be carefully controlled. This is dealt with by placing the procedure call within a lower-privilege procedure wrapper, which uses the branch-gateway instruction to return to the higher privilege region after the call through a secure re-entry point. Special care must be taken to ensure that the less-privileged routine is not permitted to gain unauthorized access by corruption of the stack or saved registers, such as by saving all registers and setting up a new stack frame (or restoring the original lower-privilege stack) that may be manipulated by the less-privileged routine. Finally, such a technique is vulnerable to an unprivileged routine attempting to use the re-entry point directly, so it may be appropriate to keep a privileged state variable which controls permission to enter at the re-entry point.

Improved Interprivilege Gateway—Branch Gateway

An exemplary embodiment of the Branch Gateway instruction is shown in FIGS. 21C–21F. In an exemplary embodiment, this operation provides a secure means to call a procedure, including those at a higher privilege level. An exemplary embodiment of the format and operation codes 2160 of the Branch Gateway instruction is shown in FIG. 21C.

Figure 21D:
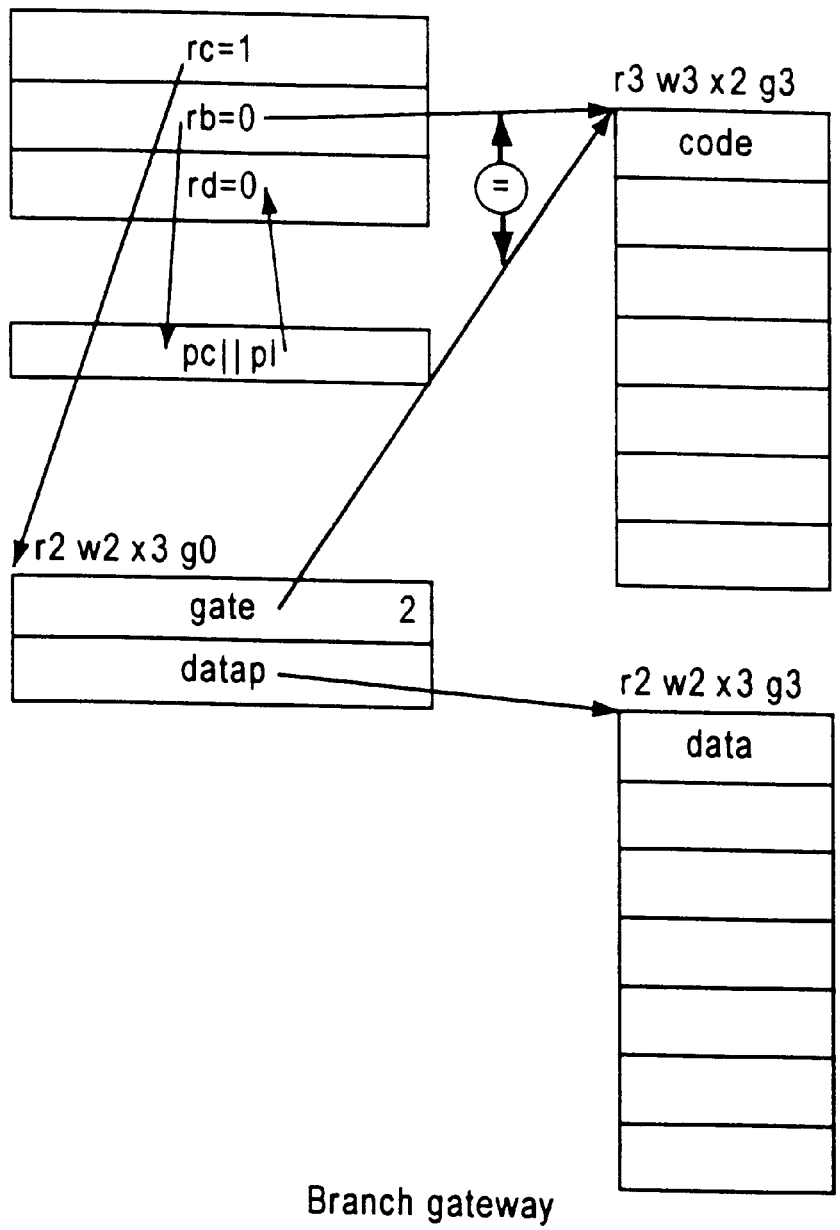

An exemplary embodiment of the schematic 2170 of the Branch Gateway instruction is shown in FIG. 21D. In an exemplary embodiment, the contents of register rb is a branch address in the high-order 62 bits and a new privilege level in the low-order 2 bits. A branch and link occurs to the branch address, and the privilege level is raised to the new privilege level. The high-order 62 bits of the successor to the current program counter is catenated with the 2-bit current execution privilege and placed in register 0.

In an exemplary embodiment, if the new privilege level is greater than the current privilege level, an octet of memory data is fetched from the address specified by register 1, using the little-endian byte order and a gateway access type. A GatewayDisallowed exception occurs if the original contents of register 0 do not equal the memory data.

In an exemplary embodiment, if the new privilege level is the same as the current privilege level, no checking of register 1 is performed.

In an exemplary embodiment, an AccessDisallowed exception occurs if the new privilege level is greater than the privilege level required to write the memory data, or if the old privilege level is lower than the privilege required to access the memory data as a gateway, or if the access is not aligned on an 8-byte boundary.

In an exemplary embodiment, a ReservedInstruction exception occurs if the rc field is not one or the rd field is not zero.

In an exemplary embodiment, in the example in FIG. 21D, a gateway from level 0 to level 2 is illustrated. The gateway pointer, located by the contents of register rc (1), is fetched from memory and compared against the contents of register rb (0). The instruction may only complete if these values are equal. Concurrently, the contents of register rb (0) is placed in the program counter and privilege level, and the address of the next sequential address and privilege level is placed into register rd (0). Code at the target of the gateway locates the data pointer at an offset from the gateway pointer (register 1), and fetches it into register 1, making a data region available. A stack pointer may be saved and fetched using the data region, another region located from the data region, or a data region located as an offset from the original gateway pointer.

In an exemplary embodiment, this instruction gives the target procedure the assurances that register 0 contains a valid return address and privilege level, that register 1 points to the gateway location, and that the gateway location is octlet aligned. Register 1 can then be used to securely reach values in memory. If no sharing of literal pools is desired, register 1 may be used as a literal pool pointer directly. If sharing of literal pools is desired, register 1 may be used with an appropriate offset to load a new literal pool pointer; for example, with a one cache line offset from the register 1. Note that because the virtual memory system operates with cache line granularity, that several gateway locations must be created together.

In an exemplary embodiment, software must ensure that an attempt to use any octlet within the region designated by virtual memory as gateway either functions properly or causes a legitimate exception. For example, if the adjacent octlets contain pointers to literal pool locations, software should ensure that these literal pools are not executable, or that by virtue of being aligned addresses, cannot raise the execution privilege level. If register 1 is used directly as a literal pool location, software must ensure that the literal pool locations that are accessible as a gateway do not lead to a security violation.

In an exemplary embodiment, register 0 contains a valid return address and privilege level, the value is suitable for use directly in the Branch down (B.DOWN) instruction to return to the gateway callee.

An exemplary embodiment of the pseudocode 2190 of the Branch Gateway instruction is shown in FIG. 21E. An exemplary embodiment of the exceptions 2199 of the Branch Gateway instruction is shown in FIG. 21F.

Group Add

In accordance with one embodiment of the invention, the processor handles a variety fix-point, or integer, group operations. For example, FIG. 26A presents various examples of Group Add instructions accommodating different operand sizes, such as a byte (8 bits), doublet (16 bits), quadlet (32 bits), octlet (64 bits), and hexlet (128 bits). FIGS. 26B and 26C illustrate an exemplary embodiment of a format and operation codes that can be used to perform the various Group Add instructions shown in FIG. 26A. As shown in FIGS. 26B and 26C, in this exemplary embodiment, the contents of registers rc and rb are partitioned into groups of operands of the size specified and added, and if specified, checked for overflow or limited, yielding a group of results, each of which is the size specified. The group of results is catenated and placed in register rd. While the use of two operand registers and a different result register is described here and elsewhere in the present specification, other arrangements, such as the use of immediate values, may also be implemented.

In the present embodiment, for example, if the operand size specified is a byte (8 bits), and each register is 128-bit wide, then the content of each register may be partitioned into 16 individual operands, and 16 different individual add operations may take place as the result of a single Group Add instruction. Other instructions involving groups of operands may perform group operations in a similar fashion.

Group Set and Group Subtract

Figure 27B:
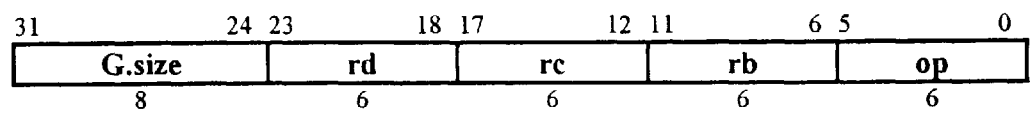

Similarly, FIG. 27A presents various examples of Group Set instructions and Group Subtract instructions accommodating different operand sizes. FIGS. 27B and 27C illustrate an exemplary embodiment of a format and operation codes that can be used to perform the various Group Set instructions and Group Subtract instructions. As shown in FIGS. 27B and 27C, in this exemplary embodiment, the contents of registers rc and rb are partitioned into groups of operands of the size specified and for Group Set instructions are compared for a specified arithmetic condition or for Group Subtract instructions are subtracted, and if specified, checked for overflow or limited, yielding a group of results, each of which is the size specified. The group of results is catenated and placed in register rd.

Ensemble Convolve, Divide, Multiply, Multiply Sum

In the present embodiment, other fix-point group operations are also available. FIG. 28A presents various examples of Ensemble Convolve, Ensemble Divide, Ensemble Multiply, and Ensemble Multiply Sum instructions accommodating different operand sizes. FIGS. 28B and 28C illustrate an exemplary embodiment of a format and operation codes that can be used to perform the various Ensemble Convolve, Ensemble Divide, Ensemble Multiply and Ensemble Multiply Sum instructions. As shown in FIGS. 28B and 28C, in this exemplary embodiment, the contents of registers rc and rb are partitioned into groups of operands of the size specified and convolved or divided or multiplied, yielding a group of results, or multiplied and summed to a single result. The group of results is catenated and placed, or the single result is placed, in register rd.

Ensemble Floating-Point Add, Divide, Multiply, and Subtract

In accordance with one embodiment of the invention, the processor also handles a variety floating-point group operations accommodating different operand sizes. Here, the different operand sizes may represent floating point operands of different precisions, such as half-precision (16 bits), single-precision (32 bits), double-precision (64 bits), and quad-precision (128 bits). FIG. 29 illustrates exemplary functions that are defined for use within the detailed instruction definitions in other sections and figures. In the functions set forth in FIG. 29, an internal format represents infinite-precision floating-point values as a four-element structure consisting of (1) s (sign bit): 0 for positive, 1 for negative, (2) t (type): NORM, ZERO, SNAN, QNAN, INFINITY, (3) e (exponent), and (4) f: (fraction). The mathematical interpretation of a normal value places the binary point at the units of the fraction, adjusted by the exponent: $(-1)^{s}*(2^{e})*f$. The function F converts a packed IEEE floating-point value into internal format. The function PackF converts an internal format back into IEEE floating-point format, with rounding and exception control.

Figure 30B:
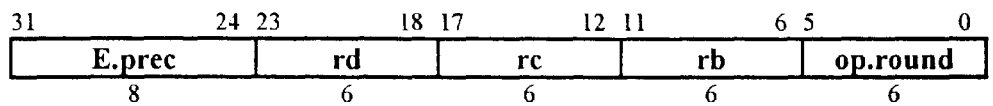

FIGS. 30A and 31A present various examples of Ensemble Floating Point Add, Divide, Multiply, and Subtract instructions. FIGS. 30B–C and 31B–C illustrate an exemplary embodiment of formats and operation codes that can be used to perform the various Ensemble Floating Point Add, Divide, Multiply, and Subtract instructions. In these examples, Ensemble Floating Point Add, Divide, and Multiply instructions have been labeled as "EnsembleFloating-Point." Also, Ensemble Floating-Point Subtract instructions have been labeled as "EnsembleReversedFloatingPoint." As shown in FIGS. 30B–C and 31B–C, in this exemplary embodiment, the contents of registers rc and rb are partitioned into groups of operands of the size specified, and the specified group operation is performed, yielding a group of results. The group of results is catenated and placed in register rd.

In the present embodiment, the operation is rounded using the specified rounding option or using round-to-nearest if not specified. If a rounding option is specified, the operation raises a floating-point exception if a floating-point invalid operation, divide by zero, overflow, or underflow occurs, or when specified, if the result is inexact. If a rounding option is not specified, floating-point exceptions are not raised, and are handled according to the default rules of IEEE 754.

Ensemble Scale-Add Floating-point

A novel instruction, Ensemble-Scale-Add improves processor performance by performing two sets of parallel multiplications and pairwise summing the products. This improves performance for operations in which two vectors must be scaled by two independent values and then summed, providing two advantages over nearest prior art operations of a fused-multiply-add. To perform this operation using prior art instructions, two instructions would be needed, an ensemble-multiply for one vector and one scaling value, and an ensemble-multiply-add for the second vector and second scaling value, and these operations are clearly dependent. In contrast, the present invention fuses both the two multiplies and the addition for each corresponding elements of the vectors into a single operation. The first advantage achieved is improved performance, as in an exemplary embodiment the combined operation performs a greater number of multiplies in a single operation, thus improving utilization of the partitioned multiplier unit. The second advantage achieved is improved accuracy, as an exemplary embodiment may compute the fused operation with sufficient intermediate precision so that no intermediate rounding the products is required.

Figure 22B:

An exemplary embodiment of the Ensemble Scale-Add Floating-point instruction is shown in FIGS. 22A–22B. In an exemplary embodiment, these operations take three values from registers, perform a group of floating-point arithmetic operations on partitions of bits in the operands, and place the concatenated results in a register. An exemplary embodiment of the format 2210 of the Ensemble Scale-Add Floating-point instruction is shown in FIG. 22A.

In an exemplary embodiment, the contents of registers rd and rc are taken to represent a group of floating-point operands. Operands from register rd are multiplied with a floating-point operand taken from the least-significant bits of the contents of register rb and added to operands from register rc multiplied with a floating-point operand taken from the next least-significant bits of the contents of register rb. The results are rounded to the nearest representable floating-point value in a single floating-point operation. Floating-point exceptions are not raised, and are handled according to the default rules of IEEE 754. The results are catenated and placed in register ra.

An exemplary embodiment of the pseudocode 2230 of the Ensemble Scale-Add Floating-point instruction is shown in FIG. 22B. In an exemplary embodiment, there are no exceptions for the Ensemble Scale-Add Floating-point instruction.

Performing a Three-Input Bitwise Boolean Operation in a Single Instruction (Group Boolean)

In a further aspect of the present invention, a system and method is provided for performing a three-input bitwise Boolean operation in a single instruction. A novel method is used to encode the eight possible output states of such an operation into only seven bits, and decoding these seven bits back into the eight states.

An exemplary embodiment of the Group Boolean instruction is shown in FIGS. 23A–23C. In an exemplary embodiment, these operations take operands from three registers, perform boolean operations on corresponding bits in the operands, and place the concatenated results in the third register. An exemplary embodiment of the format 2310 of the Group Boolean instruction is shown in FIG. 23A.

An exemplary embodiment of a procedure 2320 of Group Boolean instruction is shown in FIG. 23B. In an exemplary embodiment, three values are taken from the contents of registers rd, rc and rb. The ih and il fields specify a function of three bits, producing a single bit result. The specified function is evaluated for each bit position, and the results are catenated and placed in register rd. In an exemplary embodiment, register rd is both a source and destination of this instruction.

In an exemplary embodiment, the function is specified by eight bits, which give the result for each possible value of the three source bits in each bit position:

| | |
|---|---|
| d | 1 1 1 1 0 0 0 0 |
| c | 1 1 0 0 1 1 0 0 |
| b | 1 0 1 0 1 0 1 0 |
| f(d, c, b) | $f_7$ $f_6$ $f_5$ $f_4$ $f_3$ $f_2$ $f_1$ $f_0$ |

In an exemplary embodiment, a function can be modified by rearranging the bits of the immediate value. The table below shows how rearrangement of immediate value $f_7 \ldots f_0$ can reorder the operands d,c,b for the same function.

| operation | immediate |
|---|---|
| f(d, c, b) | $f_7$ $f_6$ $f_5$ $f_4$ $f_3$ $f_2$ $f_1$ $f_0$ |
| f(c, d, b) | $f_7$ $f_6$ $f_3$ $f_2$ $f_5$ $f_4$ $f_1$ $f_0$ |
| f(d, b, c) | $f_7$ $f_5$ $f_6$ $f_4$ $f_3$ $f_1$ $f_2$ $f_0$ |
| f(b, c, d) | $f_7$ $f_3$ $f_5$ $f_1$ $f_6$ $f_2$ $f_4$ $f_0$ |
| f(c, b, d) | $f_7$ $f_5$ $f_3$ $f_1$ $f_6$ $f_4$ $f_2$ $f_0$ |
| f(b, d, c) | $f_7$ $f_3$ $f_6$ $f_2$ $f_5$ $f_1$ $f_4$ $f_0$ |

In an exemplary embodiment, by using such a rearrangement, an operation of the form: b=$f$(d,c,b) can be recoded into a legal form: b=$f$(b,d,c). For example, the function: b=$f$(d,c,b)=d?c:b cannot be coded, but the equivalent function: d=c?b:d can be determined by rearranging the code for d=$f$(d, c, b)=d?c: b, which is 11001010, according to the rule for $f$(d,c,b) $f$(c,b,d), to the code 11011000.

Encoding

In an exemplary embodiment, some special characteristics of this rearrangement is the basis of the manner in which the eight function specification bits are compressed to seven immediate bits in this instruction. As seen in the table above, in the general case, a rearrangement of operands from $f$(d,c,b) to $f$(d,b,c).(interchanging rc and rb) requires interchanging the values of $f_6$ and $f_5$ and the values of $f_2$ and $f_1$.

In an exemplary embodiment, among the 256 possible functions which this instruction can perform, one quarter of them (64 functions) are unchanged by this rearrangement. These functions have the property that $f_6=f_5$ and $f_2=f_1$. The values of rc and rb (Note that rc and rb are the register specifiers, not the register contents) can be freely interchanged, and so are sorted into rising or falling order to indicate the value of $f_2$. (A special case arises when rc=rb, so the sorting of rc and rb cannot convey information. However, as only the values $f_7$, $f_4$, $f_3$, and $f_0$ can ever result in this case, $f_6$, $f_5$, $f_2$, and $f_1$ need not be coded for this case, so no special handling is required.) These functions are encoded by the values of $f_7$, $f_6$, $f_4$, $f_3$, and $f_0$ in the immediate field and $f_2$ by whether rc>rb, thus using 32 immediate values for 64 functions.

In an exemplary embodiment, another quarter of the functions have $f_6=1$ and $f_5=0$. These functions are recoded by interchanging rc and rb, $f_6$ and $f_5$, $f_2$ and $f_1$. They then share the same encoding as the quarter of the functions where $f_6=0$ and $f_5=1$, and are encoded by the values of $f_7$, $f_4$, $f_3$, $f_2$, $f_1$, and $f_0$ in the immediate field, thus using 64 immediate values for 128 functions.

In an exemplary embodiment, the remaining quarter of the functions have $f_6=f_5$ and $f_2$ $f_1$. The half of these in which $f_2=1$ and $f_1=0$ are recoded by interchanging rc and rb, $f_6$ and $f_5$, $f_2$ and $f_1$. They then share the same encoding as the eighth of the functions where $f_2=0$ and $f_1=1$, and are encoded by the values of $f_7$, $f_6$, $f_4$, $f_3$, and $f_0$ in the immediate field, thus using 32 immediate values for 64 functions.

In an exemplary embodiment, the function encoding is summarized by the table:

| $f_7$ | $f_6$ | $f_5$ | $f_4$ | $f_3$ | $f_2$ | $f_1$ | $f_0$ | trc > trb | ih | $il_5$ | $il_4$ | $il_3$ | $il_2$ | $il_1$ | $il_0$ | rc | rb |
|---|---|---|---|---|---|---|---|---|---|---|---|---|---|---|---|---|---|
| | $f_6$ | | | | $f_2$ | | $f_2$ | | 0 | 0 | $f_6$ | $f_7$ | $f_4$ | $f_3$ | $f_0$ | trc | trb |
| | $f_6$ | | | | $f_2$ | | ~$f_2$ | | 0 | 0 | $f_6$ | $f_7$ | $f_4$ | $f_3$ | $f_0$ | trb | trc |
| | $f_6$ | | | | | 0 | 1 | | | 0 | 1 | $f_6$ | $f_7$ | $f_4$ | $f_3$ | $f_0$ | trc | trb |
| | $f_6$ | | | | | 1 | 0 | | | 0 | 1 | $f_6$ | $f_7$ | $f_4$ | $f_3$ | $f_0$ | trb | trc |
| | 0 | 1 | | | | | | | | 1 | $f_2$ | $f_1$ | $f_7$ | $f_4$ | $f_3$ | $f_0$ | trc | trb |
| | 1 | 0 | | | | | | | | 1 | $f_1$ | $f_2$ | $f_7$ | $f_4$ | $f_3$ | $f_0$ | trb | trc |

In an exemplary embodiment, the function decoding is summarized by the table:

| ih | il$_5$ | il$_4$ | il$_3$ | il$_2$ | il$_1$ | il$_0$ | rc > rb | f$_7$ | f$_6$ | f$_5$ | f$_4$ | f$_3$ | f$_2$ | f$_1$ | f$_0$ |
|---|---|---|---|---|---|---|---|---|---|---|---|---|---|---|---|
| 0 | 0 | | | | | | 0 | il$_3$ | il$_4$ | il$_4$ | il$_2$ | il$_1$ | 0 | 0 | il$_0$ |
| 0 | 0 | | | | | | 1 | il$_3$ | il$_4$ | il$_4$ | il$_2$ | il$_1$ | 1 | 1 | il$_0$ |
| 0 | 1 | | | | | | | il$_3$ | il$_4$ | il$_4$ | il$_2$ | il$_1$ | 0 | 1 | il$_0$ |
| 1 | | | | | | | | il$_3$ | 0 | 1 | il$_2$ | il$_1$ | il$_5$ | il$_4$ | il$_0$ |

From the foregoing discussion, it can be appreciated that an exemplary embodiment of a piler or assembler producing the encoded instruction performs the steps above to encode the truction, comparing the f6 and f5 values and the f2 and f1 values of the immediate field to determine which one of several means of encoding the immediate field is to be employed, and that the placement of the trb and trc register specifiers into the encoded instruction depends on values of f2 (or f1) and f6 (or f5).

An exemplary embodiment of the pseudocode 2330 of the Group Boolean instruction is shown in FIG. 23C. It can be appreciated from the code that an exemplary embodiment of a circuit that decodes this instruction produces the f2 and f1 values, when the immediate bits ih and il5 are zero, by an arithmetic comparison of the register specifiers rc and rb, producing a one (1) value for f2 and f1 when rc>rb. In an exemplary embodiment, there are no exceptions for the up Boolean instruction.

Improving the Branch Prediction of Simple Repetitive Loops of Code

In yet a further aspect to the present invention, a system and method is described for improving the branch prediction of simple repetitive loops of code. In such a simple loop, the end of the loop is indicated by a conditional branch backward to the beginning of the loop. The condition branch of such a loop is taken for each iteration of the loop except the final iteration, when it is not taken. Prior art branch prediction systems have employed finite state machine operations to attempt to properly predict a majority of such conditional branches, but without specific information as to the number of times the loop iterates, will make an error in prediction when the loop terminates.

The system and method of the present invention includes providing a count field for indicating how many times a branch is likely to be taken before it is not taken, which enhances the ability to properly predict both the initial and final branches of simple loops when a compiler can determine the number of iterations that the loop will be performed. This improves performance by avoiding misprediction of the branch at the end of a loop when the loop terminates and instruction execution is to continue beyond the loop, as occurs in prior art branch prediction hardware.

Branch Hint

An exemplary embodiment of the Branch Hint instruction is shown in FIGS. 24A–24C. In an exemplary embodiment, this operation indicates a future branch location specified by a register.

In an exemplary embodiment, this instruction directs the instruction fetch unit of the processor that a branch is likely to occur count times at simm instructions following the current successor instruction to the address specified by the contents of register rd. An exemplary embodiment of the format 2410 of the Branch Hint instruction is shown in FIG. 24A.

In an exemplary embodiment, after branching count times, the instruction fetch unit presumes that the branch at simm instructions following the current successor instruction is not likely to occur. If count is zero, this hint directs the instruction fetch unit that the branch is likely to occur more than 63 times.

In an exemplary embodiment, an Access disallowed exception occurs if the contents of register rd is not aligned on a quadlet boundary.

An exemplary embodiment of the pseudocode 2430 of the Branch Hint instruction is shown in FIG. 24B. An exemplary embodiment of the exceptions 2460 of the Branch Hint instruction is shown in FIG. 24C.

Incorporating Floating Point Information into Processor Instructions

In a still further aspect of the present invention, a technique is provided for incorporating floating point information into processor instructions. In related U.S. Pat. No. 581,2439, a system and method are described for incorporating control of rounding and exceptions for floating-point instructions into the instruction itself. The present invention extends this invention to include separate instructions in which rounding is specified, but default handling of exceptions is also specified, for a particular class of floating-point instructions.

Ensemble Sink Floating-point

In an exemplary embodiment, a Ensemble Sink Floating-point instruction, which converts floating-point values to integral values, is available with control in the instruction that include all previously specified combinations (default-near rounding and default exceptions, Z—round-toward-zero and trap on exceptions, N—round to nearest and trap on exceptions, F—floor rounding (toward minus infinity) and trap on exceptions, C—ceiling rounding (toward plus infinity) and trap on exceptions, and X—trap on inexact and other exceptions), as well as three new combinations (Z.D—round toward zero and default exception handling, F.D—floor rounding and default exception handling, and C.D—ceiling rounding and default exception handling). (The other combinations: N.D is equivalent to the default, and X.D—trap on inexact but default handling for other exceptions is possible but not particularly valuable).

Figures 2, 25A:
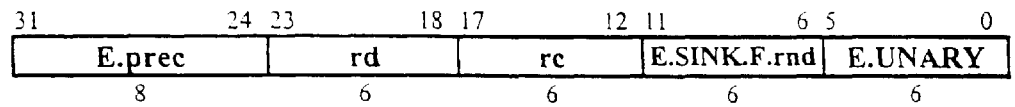

An exemplary embodiment of the Ensemble Sink Floating-point instruction is shown in FIGS. 25A–25C. In an exemplary embodiment, these operations take one value from a register, perform a group of floating-point arithmetic conversions to integer on partitions of bits in the operands, and place the concatenated results in a register. An exemplary embodiment of the operation codes, selection, and format 2510 of Ensemble Sink Floating-point instruction is shown in FIG. 25A.

In an exemplary embodiment, the contents of register rc is partitioned into floating-point operands of the precision specified and converted to integer values. The results are catenated and placed in register rd.

In an exemplary embodiment, the operation is rounded using the specified rounding option or using round-to-nearest if not specified. If a rounding option is specified, unless default exception handling is specified, the operation raises a floating-point exception if a floating-point invalid operation, divide by zero, overflow, or underflow occurs, or when specified, if the result is inexact. If a rounding option is not specified or if default exception handling is specified, floating-point exceptions are not raised, and are handled according to the default rules of IEEE 754.

An exemplary embodiment of the pseudocode 2530 of the Ensemble Sink Floating-point instruction is shown in FIG. 25B. An exemplary embodiment of the exceptions 2560 of the Ensemble Sink Floating-point instruction is shown in FIG. 25C.

An exemplary embodiment of the pseudocode 2570 of the Floating-point instructions is shown in FIG. 25D.

Crossbar Compress, Expand, Rotate, and Shift

In one embodiment of the invention, crossbar switch units such as units 142 and 148 perform data handling operations, as previously discussed. As shown in FIG. 32A, such data handling operations may include various examples of Crossbar Compress, Crossbar Expand, Crossbar Rotate, and Crossbar Shift operations. FIGS. 32B and 32C illustrate an exemplary embodiment of a format and operation codes that can be used to perform the various Crossbar Compress, Crossbar Rotate, Crossbar Expand, and Crossbar Shift instructions. As shown in FIGS. 32B and 32C, in this exemplary embodiment, the contents of register rc are partitioned into groups of operands of the size specified, and compressed, expanded, rotated or shifted by an amount specified by a portion of the contents of register rb, yielding a group of results. The group of results is catenated and placed in register rd.

Figure 32D:
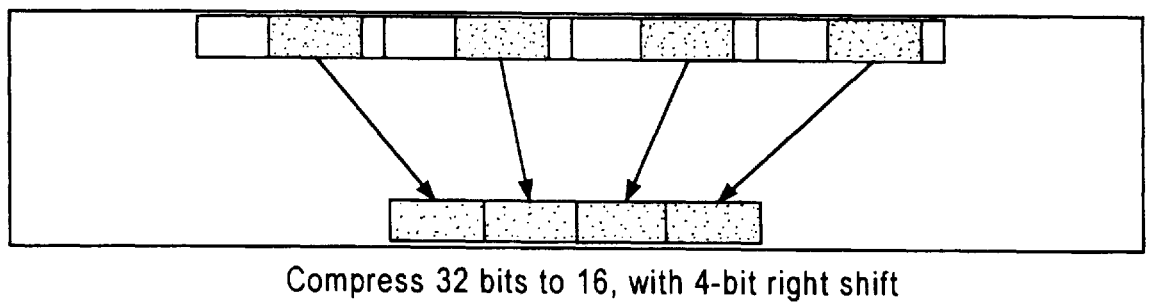

Various Group Compress operations may convert groups of operands from higher precision data to lower precision data. An arbitrary half-sized sub-field of each bit field can be selected to appear in the result. For example, FIG. 32D shows an X.COMPRESS rd=rc,16,4 operation, which performs a selection of bits 19 . . . 4 of each quadlet in a hexlet. Various Group Shift operations may allow shifting of groups of operands by a specified number of bits, in a specified direction, such as shift right or shift left. As can be seen in FIG. 32C, certain Group Shift Left instructions may also involve clearing (to zero) empty low order bits associated with the shift, for each operand. Certain Group Shift Right instructions may involve clearing (to zero) empty high order bits associated with the shift, for each operand. Further, certain Group Shift Right instructions may involve filling empty high order bits associated with the shift with copies of the sign bit, for each operand.

Extract

In one embodiment of the invention, data handling operations may also include a Crossbar Extract instruction. FIGS. 33A and 33B illustrate an exemplary embodiment of a format and operation codes that can be used to perform the Crossbar Extract instruction. As shown in FIGS. 33A and 33B, in this exemplary embodiment, the contents of registers rd, rc, and rb are fetched. The specified operation is performed on these operands. The result is placed into register ra.

The Crossbar Extract instruction allows bits to be extracted from different operands in various ways. Specifically, bits 31 . . . 0 of the contents of register rb specifies several parameters which control the manner in which data is extracted, and for certain operations, the manner in which the operation is performed. The position of the control fields allows for the source position to be added to a fixed control value for dynamic computation, and allows for the lower 16 bits of the control field to be set for some of the simpler extract cases by a single GCOPYI.128 instruction (see appendix). The control fields are further arranged so that if only the low order 8 bits are non-zero, a 128-bit extraction with truncation and no rounding is performed.:

| 31 | 24 | 23 | 16 | 15 | 14 | 13 | 12 | 11 | 10 | 9 | 8 | 0 |
|---|---|---|---|---|---|---|---|---|---|---|---|---|
| fsize | | dpos | | x | s | n | m | l | | rnd | gssp | |
| 8 | | 8 | | 1 | 1 | 1 | 1 | 1 | | 2 | 9 | |

The table below describes the meaning of each label:

| label | bits | meaning |
|---|---|---|
| fsize | 8 | field size |
| dpos | 8 | destination position |
| x | 1 | reserved |
| s | 1 | signed vs. unsigned |
| n | 1 | reserved |
| m | 1 | merge vs. extract |
| l | 1 | reserved |
| rnd | 2 | reserved |
| gssp | 9 | group size and source position |

The 9-bit gssp field encodes both the group size, gsize, and source position, spos, according to the formula gssp= 512−4*gsize+spos. The group size, gsize, is a power of two in the range 1 . . . 128. The source position, spos, is in the range 0 . . . (2*gsize)−1.

The values in the s, n, m, l, and rnd fields have the following meaning:

| values | s | n | m | l | rnd |
|---|---|---|---|---|---|
| 0 | unsigned | | extract | | |
| 1 | signed | | merge | | |
| 2 | | | | | |
| 3 | | | | | |

Figure 33C:
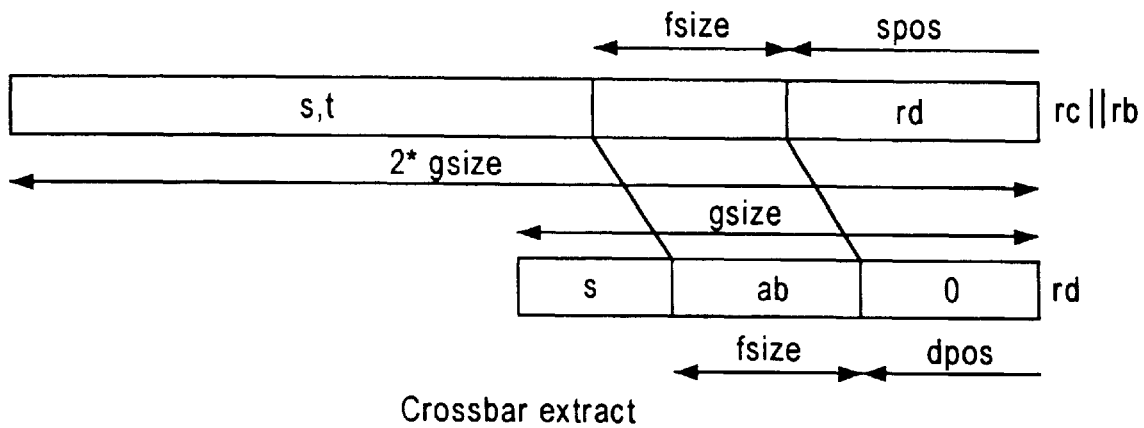
Figure 33D:
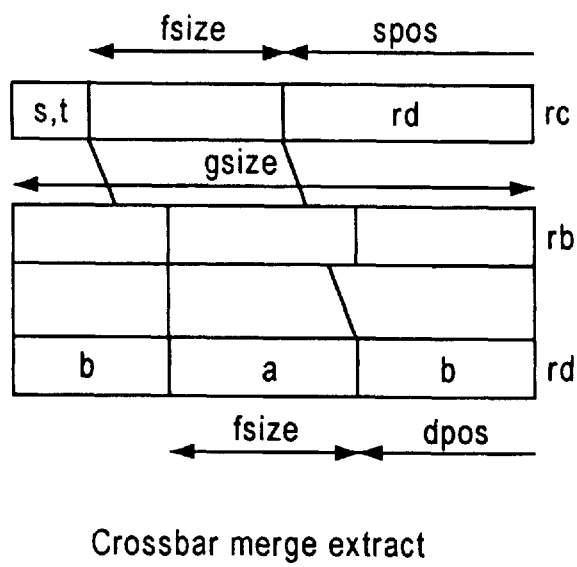

As shown in FIG. 33C, for the X.EXTRACT instruction, when m=0, the parameters are interpreted to select a fields from the catenated contents of registers rd and rc, extracting values which are catenated and placed in register ra. As shown in FIG. 33D, for a crossbar-merge-extract (X.EXTRACT when m=1), the parameters are interpreted to merge a fields from the contents of register rd with the contents of register rc. The results are catenated and placed in register ra.

Shuffle

As shown in FIG. 34A, in one embodiment of the invention, data handling operations may also include various Shuffle instructions, which allow the contents of registers to be partitioned into groups of operands and interleaved in a variety of ways. FIGS. 34B and 34C illustrate an exemplary embodiment of a format and operation codes that can be used to perform the various Shuffle instructions. As shown in FIGS. 34B and 34C, in this exemplary embodiment, one of two operations is performed, depending on whether the rc and rb fields are equal. Also, FIG. 34B and the description below illustrate the format of and relationship of the rd, rc, rb, op, V, W, h, and size fields.

In the present embodiment, if the rc and rb fields are equal, a 128-bit operand is taken from the contents of register rc. Items of size v are divided into w piles and shuffled together, within groups of size bits, according to the value of op. The result is placed in register rd.

Further, if the rc and rb fields are not equal, the contents of registers rc and rb are catenated into a 256-bit operand. Items of size v are divided into w piles and shuffled together, according to the value of op. Depending on the value of h, a sub-field of op, the low 128 bits (h=0), or the high 128 bits (h=1) of the 256-bit shuffled contents are selected as the result. The result is placed in register rd.

Figure 34D:
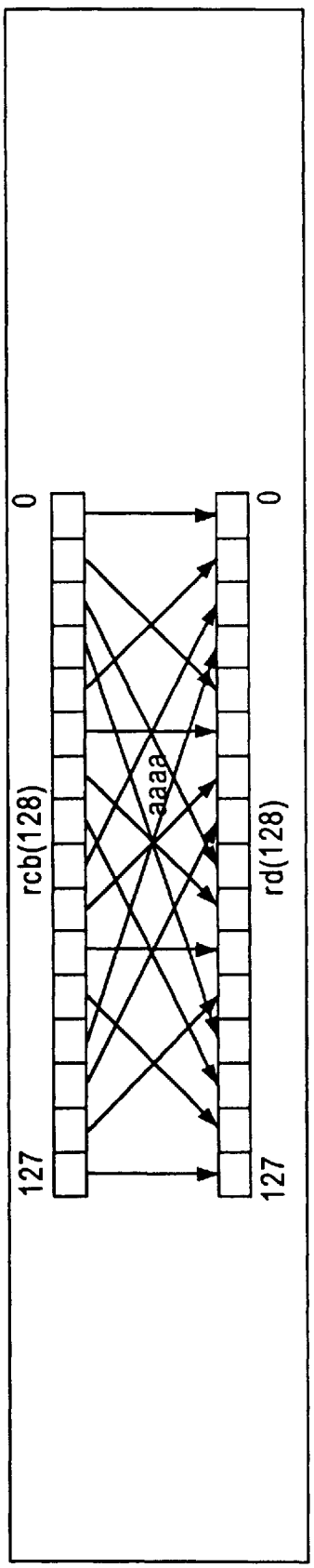
Figure 34E:
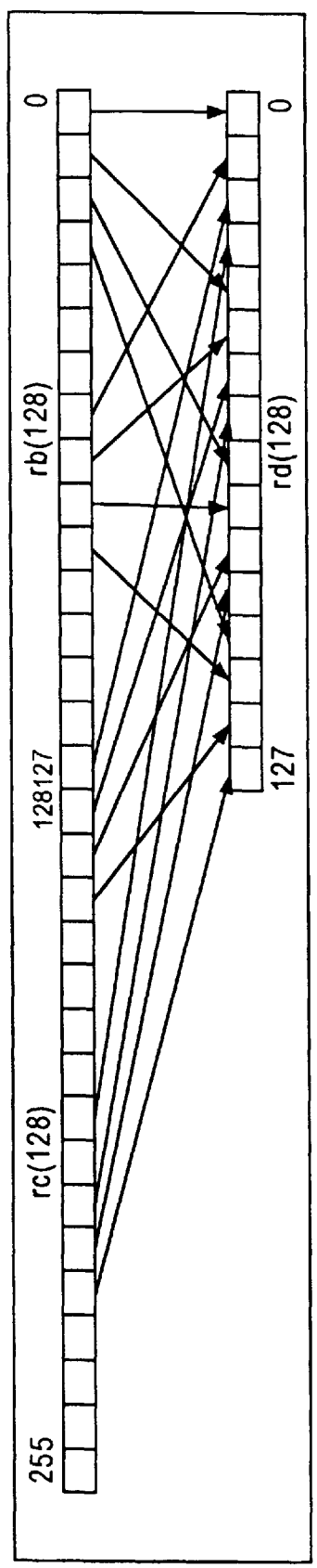

As shown in FIG. 34D, an example of a crossbar 4-way shuffle of bytes within hexlet instruction (X.SHUFFLE.128 rd=rcb,8,4) may divide the 128-bit operand into 16 bytes and partitions the bytes 4 ways (indicated by varying shade in the diagram below). The 4 partitions are perfectly shuffled, producing a 128-bit result. As shown in FIG. 33E, an example of a crossbar 4-way shuffle of bytes within triclet instruction (X.SHUFFLE.256 rd=rc,rb,8,4,0) may catenate the contents of rc and rb, then divides the 256-bit content into 32 bytes and partitions the bytes 4 ways (indicated by varying shade in the diagram below). The low-order halves of the 4 partitions are perfectly shuffled, producing a 128-bit result.

Changing the last immediate value h to 1 (X.SHUFFLE.256 rdsrc,rb,8,4,1) may modify the operation to perform the same function on the high-order halves of the 4 partitions. When rc and rb are equal, the table below shows the value of the op field and associated values for size, v, and w.

| op | size | v | w |
|---|---|---|---|
| 0 | 4 | 1 | 2 |
| 1 | 8 | 1 | 2 |
| 2 | 8 | 2 | 2 |
| 3 | 8 | 1 | 4 |
| 4 | 16 | 1 | 2 |
| 5 | 16 | 2 | 2 |
| 6 | 16 | 4 | 2 |
| 7 | 16 | 1 | 4 |
| 8 | 16 | 2 | 4 |
| 9 | 16 | 1 | 8 |
| 10 | 32 | 1 | 2 |
| 11 | 32 | 2 | 2 |
| 12 | 32 | 4 | 2 |
| 13 | 32 | 8 | 2 |
| 14 | 32 | 1 | 4 |
| 15 | 32 | 2 | 4 |
| 16 | 32 | 4 | 4 |
| 17 | 32 | 1 | 8 |
| 18 | 32 | 2 | 8 |
| 19 | 32 | 1 | 16 |
| 20 | 64 | 1 | 2 |
| 21 | 64 | 2 | 2 |
| 22 | 64 | 4 | 2 |
| 23 | 64 | 8 | 2 |
| 24 | 64 | 16 | 2 |
| 25 | 64 | 1 | 4 |
| 26 | 64 | 2 | 4 |
| 27 | 64 | 4 | 4 |
| 28 | 64 | 8 | 4 |
| 29 | 64 | 1 | 8 |
| 30 | 64 | 2 | 8 |
| 31 | 64 | 4 | 8 |
| 32 | 64 | 1 | 16 |
| 33 | 64 | 2 | 16 |
| 34 | 64 | 1 | 32 |
| 35 | 128 | 1 | 2 |
| 36 | 128 | 2 | 2 |
| 37 | 128 | 4 | 2 |
| 38 | 128 | 8 | 2 |
| 39 | 128 | 16 | 2 |
| 40 | 128 | 32 | 2 |
| 41 | 128 | 1 | 4 |
| 42 | 128 | 2 | 4 |
| 43 | 128 | 4 | 4 |
| 44 | 128 | 8 | 4 |
| 45 | 128 | 16 | 4 |
| 46 | 128 | 1 | 8 |
| 47 | 128 | 2 | 8 |
| 48 | 128 | 4 | 8 |
| 49 | 128 | 8 | 8 |
| 50 | 128 | 1 | 16 |
| 51 | 128 | 2 | 16 |
| 52 | 128 | 4 | 16 |
| 53 | 128 | 1 | 32 |
| 54 | 128 | 2 | 32 |
| 55 | 128 | 1 | 64 |

When rc and rb are not equal, the table below shows the value of the $op_{4\ldots 0}$ field and associated values for size, v, and w: $Op_5$ is the value of h, which controls whether the low-order or high-order half of each partition is shuffled into the result.

| $op_{4\ldots 0}$ | size | v | w |
|---|---|---|---|
| 0 | 256 | 1 | 2 |
| 1 | 256 | 2 | 2 |
| 2 | 256 | 4 | 2 |
| 3 | 256 | 8 | 2 |
| 4 | 256 | 16 | 2 |
| 5 | 256 | 32 | 2 |
| 6 | 256 | 64 | 2 |
| 7 | 256 | 1 | 4 |
| 8 | 256 | 2 | 4 |
| 9 | 256 | 4 | 4 |
| 10 | 256 | 8 | 4 |
| 11 | 256 | 16 | 4 |
| 12 | 256 | 32 | 4 |
| 13 | 256 | 1 | 8 |
| 14 | 256 | 2 | 8 |
| 15 | 256 | 4 | 8 |
| 16 | 256 | 8 | 8 |
| 17 | 256 | 16 | 8 |
| 18 | 256 | 1 | 16 |
| 19 | 256 | 2 | 16 |
| 20 | 256 | 4 | 16 |
| 21 | 256 | 8 | 16 |
| 22 | 256 | 1 | 32 |
| 23 | 256 | 2 | 32 |
| 24 | 256 | 4 | 32 |
| 25 | 256 | 1 | 64 |
| 26 | 256 | 2 | 64 |
| 27 | 256 | 1 | 128 |

Conclusion

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

We claim:

1. A programmable media processor comprising:
    a general purpose processor architecture, capable of operation independent of another host processor, having a virtual memory addressing unit, an instruction path and a data path;
    an external interface operable to receive data from an external source and communicate the received data over the data path;
    a cache operable to retain data communicated between the external interface and the data path;

at least one register file configurable to receive and store data from the data path and to communicate the stored data to the data path; and a multi-precision execution unit coupled to the data path, the multi-precision execution unit configurable to dynamically partition data received from the data path to account for an elemental width of the data wherein the elemental width of the data is equal to or narrower than the data path, the multi-precision execution unit being capable of performing group floating-point operations on multiple operands in partitioned fields of operand registers and returning catenated results.

2. The media processor of claim 1 wherein the multi-precision execution unit is capable of performing group add, group subtract and group multiply arithmetic operations on catenated floating-point data and, for each such group operation, returning catenated results of the operation to a register.

3. The media processor of claim 2 wherein at least some of the group add, group subtract and group multiply arithmetic operations perform arithmetic operations on floating-point data stored in first and second operand registers and return the catenated result to a result register.

4. The media processor of claim 3 wherein the result register is a different register than either the first or second operand registers.

5. The media processor of claim 1 wherein the multi-precision execution unit is capable of executing a first plurality of group floating-point operations on floating-point data of a first precision and a second plurality of group floating-point operations on floating-point data of a second precision that is a higher precision than the first precision and wherein a number of data elements stored in partitioned fields of the operand registers for the first and second plurality of group floating-point operations is inversely related to the precision of the data elements.

6. The media processor of claim 1 wherein the multi-precision execution unit is capable of executing group floating point operations that operate on 32-bit data elements and group floating-point operations that operate on 64-bit data elements and wherein a number of data elements stored in partitioned fields of operand registers used for the operations that operate on 32-bit data elements is twice as many as a number of data elements stored in partitioned fields of operand registers used for the operations that operate on 64-bit data elements.

7. The media processor of claim 1 wherein, when performing at least some of the group floating-point operations, the multi-precision execution unit operates on partitioned fields of operand registers in parallel and returns the catenated results to a register.

8. The media processor of claim 1 wherein the multi-precision execution unit is capable of executing a plurality of group floating-point operations on floating-point data of a first precision and a plurality of group floating-point operations on floating-point data of a second precision that is a higher precision than the first precision and wherein, when performing at least one of the group floating-point operations on floating-point data of the first precision, the multi-precision execution unit operates on at least two partitioned operands in parallel.

9. The media processor of claim 1 wherein the multi-precision execution unit is capable of performing group floating-point operations on catenated data having a total aggregate width of 128 bits.

10. The media processor of claim 1 wherein the multi-precision execution unit is capable of performing group floating-point operations on floating-point data of more than one precision.

11. The media processor of claim 1 wherein the multi-precision execution unit is capable of performing group integer operations on multiple operands in partitioned fields of operand registers and returning catenated results to a register.

12. The media processor of claim 11 wherein the multi-precision execution unit is capable of performing group add, group subtract and group multiply arithmetic operations on catenated integer data and, for each such group operation, returning catenated results of the operation to a register.

13. The media processor of claim 12 wherein at least some of the group add, group subtract and group multiply arithmetic operations perform arithmetic operations on integer data stored in first and second operand registers and return the catenated result to a result register.

14. The media processor of claim 11 wherein the multi-precision execution unit is capable of executing a first plurality of group integer operations on integer data of a first precision and a second plurality of group integer operations on integer data of a second precision that is a higher precision than the first precision and wherein a number of data elements stored in partitioned fields of the operand registers for the first and second plurality of group integer operations is inversely related to the precision of the data elements.

15. The media processor of claim 11 wherein, when performing at least some of the group integer operations, the multi-precision execution unit operates on partitioned fields of operand registers in parallel and returns the catenated results to a register.

16. The media processor of claim 11 wherein the multi-precision execution unit is capable of executing a plurality of group integer operations on integer data of a first precision and a plurality of group integer operations on integer data of a second precision that is a higher precision than the first precision and wherein, when performing at least one of the group integer operations on integer data of the first precision, the multi-precision execution unit operates on at least two partitioned operands in parallel.

17. The media processor of claim 1 wherein the multi-precision execution unit is capable of performing one or more group data handling operations that operate on multiple operands in partitioned fields of one or more operand registers and returning catenated results to a register.

18. The media processor of claim 17 wherein the one or more group data handling operations comprises a first group operation that converts a plurality of n-bit data elements in a first operand register and a plurality of n-bit data elements in a second operand register into a plurality of n/2-bit data elements in a result register.

19. The media processor of claim 18 wherein the first group operation shifts each of the plurality of n/2-bit data elements by a specified number of bits during the conversion.

20. The media processor of claim 17 wherein the one or more group data handling operations comprises a second group operation that interleaves a plurality of data elements selected from a first operand register with a plurality of data elements selected from a second operand register and catenates the data elements into a result register.

21. The media processor of claim 17 wherein the one or more data handling operations comprises a group shift left operation that shifts bits of individual data elements catenated in an operand register to the left and clears empty low order bits of the individual data elements to zero.

22. The media processor of claim 17 wherein the one or more data handling operations comprises a group shift right operation that shifts bits of individual data elements catenated in an operand register to the right and fills empty high order bits of the individual data elements with a value equal to a value stored in a sign bit of the individual data element.

23. The media processor of claim 17 wherein the one or more data handling operations comprises a group shift right operation that shifts bits of individual data elements catenated in an operand register to the right and clears empty high order bits of the individual data elements to zero.

24. The media processor of claim 17 wherein the multi-precision execution unit is capable of executing a first plurality of group data handling operations on data of a first precision and a second plurality of group data handling operations on data of a second precision that is a higher precision than the first precision and wherein a number of data elements stored in partitioned fields of the operand registers for the first and second plurality of group data handling operations is inversely related to the precision of the data elements.

25. The media processor of claim 17 wherein, when performing at least some of the group data handling operations, the multi-precision execution unit operates on partitioned fields of operand registers in parallel and returns the catenated results to a register.

26. The media processor of claim 17 wherein the multi-precision execution unit is capable of executing a plurality of group data handling operations on data of a first precision and a plurality of data handling operations on data of a second precision that is a higher precision than the first precision and wherein, when performing at least one of the group data handling operations on data of the first precision, the multi-precision execution unit operates on at least two partitioned operands in parallel.

27. The media processor of claim 1 wherein the multi-precision execution unit comprises a plurality of functional units.

28. The media processor of claim 1 wherein the at least one register file comprises a plurality of registers that can be used to store operands and results for the group floating-point operations.

29. The media processor of claim 1 wherein the multi-precision execution unit returns the catenated results to a register.

30. The media processor of claim 1 wherein the at least one register file comprises a plurality of general purpose registers that can be used as operand and result registers for group floating-point operations.

* * * * *

(12) INTER PARTES REEXAMINATION CERTIFICATE (0272nd)
United States Patent
Hansen et al.

(10) Number: US 6,643,765 C1
(45) Certificate Issued: Jun. 7, 2011

(54) PROGRAMMABLE PROCESSOR WITH GROUP FLOATING POINT OPERATIONS

(75) Inventors: Craig Hansen, Los Altos, CA (US); John Moussouris, Palo Alto, CA (US)

(73) Assignee: Microunity Systems Engineering, Inc., Sunnyvale, CA (US)

Reexamination Request:
No. 95/000,089, Apr. 15, 2005

Reexamination Certificate for:
Patent No.: 6,643,765
Issued: Nov. 4, 2003
Appl. No.: 09/534,745
Filed: Mar. 24, 2000

Related U.S. Application Data

(60) Continuation of application No. 09/382,402, filed on Aug. 24, 1999, now Pat. No. 6,295,599, which is a continuation-in-part of application No. 09/169,963, filed on Oct. 13, 1998, now Pat. No. 6,006,318, which is a continuation of application No. 08/754,827, filed on Nov. 22, 1996, now Pat. No. 5,822,603, which is a division of application No. 08/516,036, filed on Aug. 16, 1995, now Pat. No. 5,742,840.

(51) Int. Cl.
*G06F 15/00* (2006.01)
*G06F 15/76* (2006.01)

(52) U.S. Cl. .................. 712/32; 712/208; 712/28
(58) Field of Classification Search .............. None
See application file for complete search history.

(56) References Cited

U.S. PATENT DOCUMENTS

| | | | |
|---|---|---|---|
| 4,025,772 | A | 5/1977 | Constant |
| 4,489,393 | A | 12/1984 | Kawahara et al. |
| 4,509,119 | A | 4/1985 | Gumaer |
| 4,595,911 | A | 6/1986 | Kregness et al. |
| 4,701,875 | A | 10/1987 | Konishi et al. |
| 4,725,973 | A | 2/1988 | Matsuura et al. |
| 4,727,505 | A | 2/1988 | Konishi et al. |
| 4,734,877 | A | 3/1988 | Sakata et al. |
| 4,852,098 | A | 7/1989 | Brechard et al. |
| 4,875,161 | A | 10/1989 | Lahti et al. |

(Continued)

FOREIGN PATENT DOCUMENTS

| | | |
|---|---|---|
| CA | 1 323 451 C | 10/1993 |
| EP | 0 417 707 A2 | 3/1991 |
| EP | 0468820 A2 | 1/1992 |
| EP | 0474246 | 3/1992 |
| EP | 0 597 441 A1 | 5/1994 |

(Continued)

OTHER PUBLICATIONS

US 5,572,001, 11/1996, Dulong (withdrawn)
European Patent Application No. EP 07 11 1349 Partial European Search Report (Apr. 28, 2009).
Wang, Yulun., et al. "The 3DP: A processor Architecture for Three–Dimensional Applications." Computer, IEEE Computer Society, vol. 25, No. 1, 1992, pp. 25–36, XP000287832, ISSN: 0018–9162.

(Continued)

*Primary Examiner*—Joseph R. Pokrzywa

(57) ABSTRACT

A programmable processor that comprises a general purpose processor architecture, capable of operation independent of another host processor, having a virtual memory addressing unit, an instruction path and a data path; an external interface; a cache operable to retain data communicated between the external interface and the data path; at least one register file configurable to receive and store data from the data path and to communicate the stored data to the data path; and a multi-precision execution unit coupled to the data path. The multi-precision execution unit is configurable to dynamically partition data received from the data path to account for an elemental width of the data and is capable of performing group floating-point operations on multiple operands in partitioned fields of operand registers and returning catenated results. In other embodiments the multi-precision execution unit is additionally configurable to execute group integer and/or group datahandling operations.

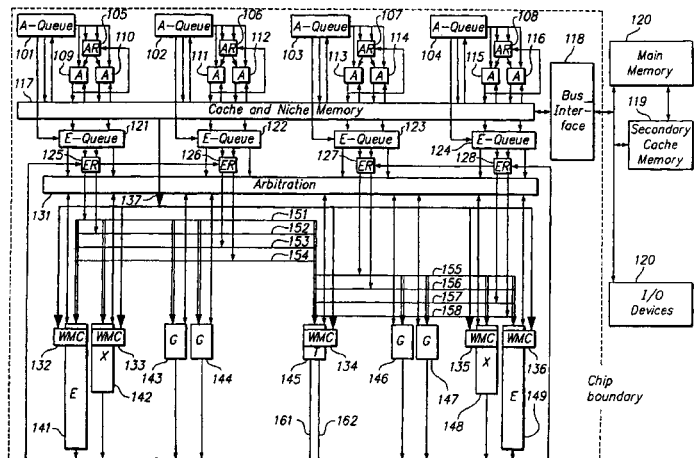

U.S. PATENT DOCUMENTS

| | | |
|---|---|---|
| 4,876,660 A | 10/1989 | Owen et al. |
| 4,893,267 A | 1/1990 | Alsup et al. |
| 4,943,919 A | 7/1990 | Aslin |
| 4,949,294 A | 8/1990 | Wambergue et al. |
| 4,953,073 A | 8/1990 | Moussouris et al. |
| 4,956,801 A | 9/1990 | Priem et al. |
| 4,959,779 A | 9/1990 | Weber et al. |
| 4,969,118 A | 11/1990 | Montoye et al. |
| 4,975,868 A | 12/1990 | Freerksen |
| 5,032,865 A | 7/1991 | Schlunt |
| 5,043,935 A | 8/1991 | Taniai et al. |
| 5,081,698 A | 1/1992 | Kohn |
| 5,113,506 A | 5/1992 | Moussouris et al. |
| 5,132,898 A | 7/1992 | Sakamura et al. |
| 5,155,816 A | 10/1992 | Kohn |
| 5,157,388 A | 10/1992 | Kohn |
| 5,161,247 A | 11/1992 | Murakami et al. |
| 5,179,651 A | 1/1993 | Taaffe et al. |
| 5,201,056 A | 4/1993 | Daniel et al. |
| 5,208,914 A | 5/1993 | Wilson |
| 5,231,646 A | 7/1993 | Heath et al. |
| 5,233,690 A | 8/1993 | Sherlock et al. |
| 5,241,636 A | 8/1993 | Kohn |
| 5,253,342 A | 10/1993 | Blount |
| 5,256,994 A | 10/1993 | Langendorf |
| 5,268,855 A | 12/1993 | Mason et al. |
| 5,268,995 A | 12/1993 | Diefendorff et al. |
| 5,280,598 A | 1/1994 | Osaki et al. |
| 5,287,327 A | 2/1994 | Takasugi |
| 5,325,495 A | 6/1994 | McLellan |
| 5,327,369 A | 7/1994 | Ashkenazi |
| 5,327,570 A | 7/1994 | Foster |
| 5,347,643 A | 9/1994 | Kondo et al. |
| 5,371,772 A | 12/1994 | Al-Khairi |
| 5,375,208 A | 12/1994 | Pitot |
| 5,390,135 A | 2/1995 | Lee |
| 5,408,581 A | 4/1995 | Suzuki et al. |
| 5,410,682 A | 4/1995 | Sites et al. |
| 5,412,728 A | 5/1995 | Besnard et al. |
| 5,423,051 A | 6/1995 | Fuller et al. |
| 5,426,600 A | 6/1995 | Nakagawa et al. |
| 5,430,660 A | 7/1995 | Lueker et al. |
| 5,448,509 A | 9/1995 | Lee |
| 5,467,131 A | 11/1995 | Bhaskaran |
| 5,471,628 A | 11/1995 | Phillips et al. |
| 5,477,181 A | 12/1995 | Li |
| 5,487,024 A | 1/1996 | Girardeau, Jr. |
| 5,500,811 A | 3/1996 | Corry |
| 5,515,520 A | 5/1996 | Hatta et al. |
| 5,517,438 A | 5/1996 | Dao-Trong et al. |
| 5,519,842 A | 5/1996 | Atallah et al. |
| 5,522,054 A | 5/1996 | Gunlock |
| 5,530,960 A | 6/1996 | Parks |
| 5,533,185 A | 7/1996 | Lentz et al. |
| 5,541,865 A | 7/1996 | Ashkenazi |
| 5,557,724 A | 9/1996 | Sampat et al. |
| 5,579,253 A | 11/1996 | Lee et al. |
| 5,588,152 A | 12/1996 | Dapp et al. |
| 5,590,350 A | 12/1996 | Guttag |
| 5,590,365 A | 12/1996 | Ide et al. |
| 5,592,405 A | 1/1997 | Gove et al. |
| 5,598,362 A | 1/1997 | Adelman et al. |
| 5,600,814 A | 2/1997 | Gahan et al. |
| 5,636,351 A | 6/1997 | Lee |
| 5,640,543 A | 6/1997 | Farrell et al. |
| 5,642,306 A | 6/1997 | Mennemeier et al. |
| 5,666,298 A | 9/1997 | Peleg et al. |
| 5,669,010 A | 9/1997 | Duluk, Jr. |
| 5,673,407 A | 9/1997 | Poland et al. |
| 5,675,526 A | 10/1997 | Peleg et al. |
| 5,680,338 A | 10/1997 | Agarwal et al. |
| 5,721,892 A | 2/1998 | Peleg et al. |
| 5,734,874 A | 3/1998 | Van Hook et al. |
| 5,742,840 A | 4/1998 | Hansen et al. |
| 5,757,432 A | 5/1998 | Dulong et al. |
| 5,758,176 A | 5/1998 | Agarwal et al. |
| 5,768,546 A | 6/1998 | Kwon |
| 5,794,060 A | 8/1998 | Hansen et al. |
| 5,794,061 A | 8/1998 | Hansen et al. |
| 5,802,336 A | 9/1998 | Peleg et al. |
| 5,809,292 A | 9/1998 | Wilkinson et al. |
| 5,818,739 A | 10/1998 | Peleg et al. |
| 5,819,101 A | 10/1998 | Peleg |
| 5,822,603 A | 10/1998 | Hansen et al. |
| 5,825,677 A | 10/1998 | Agarwal et al. |
| 5,826,106 A | 10/1998 | Pang |
| 5,828,869 A | 10/1998 | Johnson |
| 5,835,782 A | 11/1998 | Lin et al. |
| 5,881,275 A | 3/1999 | Peleg |
| 5,883,824 A | 3/1999 | Lee |
| 5,886,732 A | 3/1999 | Humpleman |
| 5,887,183 A | 3/1999 | Agarwal et al. |
| 5,922,066 A | 7/1999 | Cho et al. |
| 5,983,257 A | 11/1999 | Dulong et al. |
| 5,996,057 A | 11/1999 | Scales, III et al. |
| 6,006,318 A | 12/1999 | Hansen et al. |
| 6,016,538 A | 1/2000 | Guttag et al. |
| 6,058,465 A | 5/2000 | Nguyen |
| 6,092,094 A | 7/2000 | Ireton |
| 6,295,599 B1 | 9/2001 | Hansen et al. |
| 6,381,690 B1 | 4/2002 | Lee |
| 6,401,194 B1 | 6/2002 | Nguyen et al. |
| 6,425,073 B2 | 7/2002 | Roussel et al. |
| 6,516,406 B1 | 2/2003 | Peleg et al. |
| 6,584,482 B1 | 6/2003 | Hansen et al. |
| 6,643,765 B1 | 11/2003 | Hansen et al. |
| 6,725,356 B2 | 4/2004 | Hansen et al. |
| 7,216,217 B2 | 5/2007 | Hansen et al. |

FOREIGN PATENT DOCUMENTS

| | | |
|---|---|---|
| EP | 0627682 A1 | 12/1994 |
| EP | 0 649 085 A1 | 4/1995 |
| EP | 0 651 321 A | 5/1995 |
| EP | 0 653 703 A1 | 5/1995 |
| EP | 0654733 | 5/1995 |
| EP | 0 654 733 A | 5/1995 |
| JP | S60-217435 | 10/1985 |
| JP | 3-98145 A | 4/1991 |
| JP | 3268024 | 11/1991 |
| JP | 6095843 | 4/1994 |
| JP | 6-149723 A | 5/1994 |
| JP | 7-114469 A | 5/1995 |
| WO | WO 93/01543 | 1/1993 |
| WO | WO 93/01565 | 1/1993 |
| WO | WO 93/11500 | 6/1993 |
| WO | WO 97/07450 | 2/1997 |

OTHER PUBLICATIONS

Diefendorff, K., et al. "Organization of the Motorola 88110 Superscalar Risc Microprocessor." IEEE Micro, vol. 12, No. 2, Apr. 1, 1992, XP000266192, ISSN: 0272–1732.

Undy et al., "A Low–Cost Graphics and Multimedia Workstation Chip Set," IEEE Micro, pp. 10–22 (Apr. 1994) (51056DOC002578–590).

Broughton et al., "The S–1 Project: Top–End Computer Systems for National Security Applications," (Oct. 24, 1985) (51056DOC057368–607).

Convex Data Sheet C4/XA Systems, Convex Computer Corporation (51056DOC059235–236).

Convex C4600 Assembly Language Manual, First Edition, May 1995 (51056DOC064728–5299).

Margulis, "i860 Microprocessor Architecture," Intel Corporation (1990) (51056DOC066610–7265 and 5156DOC069971–70626).

Paragon User's Guide, Intel Corporation (Oct. 1993) (51056DOC068802–9097).

Hwang, "Computer Architecture and Parallel Processing," McGraw Hill (1984) (51056DOC070166–1028).

Data General AviiON AV500, 550, 4500 and 5500 Servers.

Japanese Patent Application No. 2000–577552 Notice of Reasons of Rejection dated Feb. 10, 2009.

Potmesil, M. et al., The Pixel Machine: A Parallel Image Computer, 1989, ACM, pp. 69–78.

Blelloch, et al, Compiling Collection–Oriented Languages Onto Massively Parallel Computers, Nov. 28, 1988, IEEE, pp. 575–585.

Chart: MicroUnity Media Processor Patent Family (Apr. 2009).

Markoff, John, "Intel Settlement Revives a Fading Chip Designer," The New York Times (Oct. 20, 2005).

Intel Press Release, "Intel Announces Record Revenue of $9.96 Billion," Santa Clara, CA, Oct. 18, 2005.

U.S. Appl. No. 10/418,113 Continuation Application filed Apr. 18, 2003.

U.S. Appl. No. 10/418,113 Preliminary Amendment dated May 27, 2003.

U.S. Appl. No. 10/418,113 First Office Action dated Jun. 10, 2004.

U.S. Appl. No. 10/418,113 Examiner Interview Summary dated Sep. 24, 2004.

U.S. Appl. No. 10/418,113 First Office Action Response filed Nov. 10, 2004.

U.S. Appl. No. 10/418,113 Notice of Allowance and Issues Fee Due dated Mar. 16, 2005.

U.S. Appl. No. 10/418,113 Request for Continued Examiner filed Jun. 10, 2005.

U.S. Appl. No. 10/436,340 Continuation Application filed May 13, 2003.

U.S. Appl. No. 10/436,340 First Office Action dated Feb. 9, 2006.

U.S. Appl. No. 10/436,340 First Office Action Response filed Jul. 10, 2006.

U.S. Appl. No. 10/436,340 Notice of Allowance and Issue Fee Due dated Oct. 3, 2006.

U.S. Appl. No. 10/436,340 Response to Notice of Allowance and RCE filed Nov. 14, 2006.

U.S. Appl. No. 10/436,340 Second Office Action dated Feb. 21, 2007.

U.S. Appl. No. 10/436,340 Second Office Action Response filed Aug. 21, 2007.

U.S. Appl. No. 10/436,340 Declaration of Korbin Van Dyke filed Aug. 21, 2007.

U.S. Appl. No. 10/436,340 Third Office Action dated Nov. 21, 2007.

U.S. Appl. No. 10/436,340 Third Office Action Response filed Mar. 21, 2008.

U.S. Appl. No. 10/436,340 Third Office Action Response Supplemental filed Apr.18, 2008.

(U.S. Appl. No. 10/646,787) Continuation Application filed Aug. 25, 2003.

(U.S. Appl. No. 10/646,787) Preliminary Amendment filed Dec. 23, 2003.

(U.S. Appl. No. 10/646,787) First Office Action dated May 9, 2005.

(U.S. Appl. No. 10/646,787) First Office Action Response filed Nov. 9, 2005.

(U.S. Appl. No. 10/646,787) Second Office Action dated Jan. 12, 2006.

(U.S. Appl. No. 10/646,787) Second Office Action Response filed May 11, 2006.

(U.S. Appl. No. 10/646,787) notice of Allowance dated Jun. 2, 2006.

(U.S. Appl. No. 10/646,787) Issue Notification Apr. 18, 2007.

U.S. Appl. No. 10/757,836 Continuation Application filed Jan. 16, 2004.

U.S. Appl. No. 10/757,836 Preliminary Amendment filed May 14, 2004.

U.S. Appl. No. 10/757,836 Preliminary Amendment filed Jun. 18, 2004.

U.S. Appl. No. 10/757,836 First Office Action dated Jun. 19, 2006.

U.S. Appl. No. 10/757,836 First Office Action Response filed Sep. 10, 2006.

U.S. Appl. No. 10/757,836 Notice of Allowance and Fees Due dated Nov. 28, 2007.

U.S. Appl. No. 10/757,836 Request for Continued Examination filed Feb. 27, 2008.

U.S. Appl. No. 10/757,836 Second Office Action dated Jun. 6, 2008.

U.S. Appl. No. 10/757,836 Second Office Action Response filed Jun. 26, 2008.

U.S. Appl. No. 10/757,851 Continuation Application filed Jan. 16, 2004.

U.S. Appl. No. 10/757,851 Preliminary Amendment filed May 14, 2004.

U.S. Appl. No. 10/757,851 Preliminary Amendment filed Jun. 18, 2004.

U.S. Appl. No. 10/757,851 First Office Action dated May 23, 2006.

U.S. Appl. No. 10/757,851 First Office Action Response filed Nov. 21, 2006.

U.S. Appl. No. 10/757,851 Second Office Action dated Feb. 21, 2007.

U.S. Appl. No. 10/757,851 Second Office Action Response filed Aug. 21, 2007.

U.S. Appl. No. 10/757,851 Notice of Allowance and Issue Fees Due dated Nov. 16, 2007.

U.S. Appl. No. 10/757,851 Notice of Allowance and Issue Fees Due dated Feb. 12, 2008.

U.S. Appl. No. 10/757,851 Request for Continued Examination filed Feb. 19, 2008.

U.S. Appl. No. 10/757,851 Third Office Action dated May 9, 2008.

U.S. Appl. No. 10/757,851 Third Office Action Response filed Jun. 26, 2008.

U.S. Appl. No. 11/511,466 Continuation Application filed Aug. 29, 2006.

U.S. Appl. No. 11/511,466 Preliminary Amendment filed Aug. 29, 2006.

U.S. Appl. No. 11/878,803 Continuation Application filed Jul. 27, 2007.

U.S. Appl. No. 11/878,804 Continuation Application filed Jul. 27, 2007.

U.S. Appl. No. 11/878,805 Continuation Application filed Jul. 27, 2007.

U.S. Appl. No. 11/878,814 Continuation Application filed Jul. 27, 2007.
(U.S. Appl. No. 08/516,036) Transmittal of Application filed Aug. 16, 1995.
(U.S. Appl. No. 08/516,036) First Office Action dated Oct. 15, 1996.
(U.S. Appl. No. 08/516,036) First Office Action Response filed Nov. 14, 1996.
(U.S. Appl. No. 08/516,036) Second Office Action dated Jan. 28, 1997.
(U.S. Appl. No. 08/516,036) Second Office Action Response dated May 28, 1997.
(U.S. Appl. No. 08/516,036) Examiner Interview Summary dated Aug. 4, 1997.
(U.S. Appl. No. 08/516,036) Notice of Allowance and Issue Fee Due dated Aug. 4, 1997.
(Control U.S. Appl. No. 90/007,583) Reexam Request filed Jun. 13, 2005.
(Control U.S. Appl. No. 90/007,583) Office Action Granting Reexam dated Jul. 13, 2005.
(Control U.S. Appl. No. 90/007,583) First Office Action dated Dec. 22, 2006.
(Control U.S. Appl. No. 90/007,583) First Office Action Response filed Feb. 22, 2007.
(Control U.S. Appl. No. 90/007,583) Examiner Interview Summary dated Jun. 13, 2007.
(Control U.S. Appl. No. 90/007,583) Response to Examiner Interview Summary filed Jun. 22, 2007.
(Control U.S. Appl. No. 90/007,583) Office Action (Final) dated Aug. 9, 2007.
(Control U.S. Appl. No. 90/007,583) Final Office Action Response filed Oct. 9, 2007.
(Control U.S. Appl. No. 90/007,583) Dr. V. Thomas Rhyne Declaration dated Oct. 4, 2007.
(Control U.S. Appl. No. 90/007,583) Examiner Interview Summary dated Jan. 28, 2008.
(Control U.S. Appl. No. 90/007,583) Response to Examiner Interview Summary filed Feb. 28, 2008.
(U.S. Appl. No. 08/754,826) Divisional Application under C.F.R. 1.60 filed Nov. 22, 1996.
(U.S. Appl. No. 08/754,826) First Office Action dated Oct. 23, 1997.
(U.S. Appl. No. 08/754,826) First Office Action Response filed Feb. 11, 1998.
(U.S. Appl. No. 08/754,826) Examiner Interview Summary dated Apr. 28, 1998.
(U.S. Appl. No. 08/754,826) Notice of Allowance and Issue Fee Due dated Apr. 28, 1998.
(U.S. Appl. No. 08/754,826) Notice of *Ex Parte* Reexamination dated Jun. 17, 2005 (U.S. Appl. No. 90/007,593).
(Control U.S. Appl. No. 90/007,593) Reexam Request Filed Jun. 17, 2005.
(Control U.S. Appl. No. 90/007,593) Office Action Granting Reexam dated Jul. 12, 2005.
(Control U.S. Appl. No. 90/007,593) First Office Action dated Dec. 22, 2006.
(Control U.S. Appl. No. 90/007,593) First Office Action Response filed Feb. 22, 2007.
(Control U.S. Appl. No. 90/007,593) Office Action (Final) dated Sep. 1, 2007.
(Control U.S. Appl. No. 90/007,593) Office Action Response filed Nov. 1, 2007.
(Control U.S. Appl. No. 90/007,593) Amendment Entered by Examiner dated Apr. 30, 2008.
(Control U.S. Appl. No. 90/007,593) Office Action dated May 6, 2008.
(Control U.S. Appl. No. 90/007,593) Office Action response filed Jul. 7, 2008.
(Control U.S. Appl. No. 90/007,593) Declaration of Dr. John Moussouris dated Jul. 3, 2008.
(Control U.S. Appl. No. 90/007,593) Declaration of Craig Hansen dated Jul. 7, 2008.
(U.S. Appl. No. 08/754,829) Divisional Application under C.F.R. 1.60 filed Nov. 22, 1996.
(U.S. Appl. No. 08/754,829) First Office Action dated Sep. 11, 1997.
(U.S. Appl. No. 08/754,829) First Office Action Response filed Feb. 11, 1998.
(U.S. Appl. No. 08/754,829) Notice of Allowance and Issue Fee Due dated Apr. 28, 1998.
(U.S. Appl. No. 08/754,829) Notice of *Ex Parte* Reexamination dated May 26, 2005.
(Control U.S. Appl. No. 90/007,563) Reexam Request Filed May 26, 2005.
(Control U.S. Appl. No. 90/007,563) Office Action Granting Reexam dated Jul. 7, 2005.
(Control U.S. Appl. No. 90/007,563) First Office Action dated Dec. 22, 2006.
(Control U.S. Appl. No. 90/007,563) First Office Action Response filed Feb. 22, 2007.
(Control U.S. Appl. No. 90/007,563) Dr. John Moussouris Declaration dated Feb. 22, 2007.
(Control U.S. Appl. No. 90/007,563) Craig Hansen Declaration dated Feb. 22, 2007.
(Control U.S. Appl. No. 90/007,563) Examiner Interview Summary dated Jun. 13, 2007.
(Control U.S. Appl. No. 90/007,563) Response to Examiner Interview Summary dated Jun. 22, 2007.
(Control U.S. Appl. No. 90/007,563) Office Action (Final) dated Sep. 1, 2007.
(Control U.S. Appl. No. 90/007,563) Office Action Response filed Nov. 1, 2007.
(Control U.S. Appl. No. 90/007,563) Dr. V. Thomas Rhyne Declaration dated Oct. 4, 2007.
(Control U.S. Appl. No. 90/007,563) Dr. John Moussouris Declaration dated Nov. 1, 2007.
(Control U.S. Appl. No. 90/007,563) Korbin Van Dyke Declaration dated Nov. 1, 2007.
(U.S. Appl. No. 09/377,182) Continuation Application under 35 C.F.R. 1.53(b) filed Aug. 19, 1999.
(U.S. Appl. No. 09/377,182) Preliminary Amendment filed Sep. 20, 1999.
(U.S. Appl. No. 09/377,182) First Office Action dated Aug 8, 2002.
(U.S. Appl. No. 09/377,182) First Office Action Response (draft) filed Jan. 13, 2003.
(U.S. Appl. No. 09/377,182) Examiner Interview Summary dated Jan. 16, 2003.
(U.S. Appl. No. 09/377,182) First Office Action Response filed Feb. 4, 2003.
(U.S. Appl. No. 09/377,182) Notice of Allowance and Fee(s) Due dated Feb. 28, 2003.
(U.S. Appl. No. 09/377,182) Supplemental Notice of Allowability dated Mar. 5, 2003.
(U.S. Appl. No. 09/377,182) Notice of *Ex Parte* Reexamination dated May 4, 2005 (U.S. Appl. No. 90/007,532).
(Control U.S. Appl. No. 90/007,532) Reexam Request filed May 4, 2005.

(Control U.S. Appl. No. 90/007,532) Office Action Granting Reexam dated Jun. 13, 2005.
(Control U.S. Appl. No. 90/007,532) First Office Action dated Jul. 3, 2006.
(Control U.S. Appl. No. 90/007,532) First Office Action Response filed Sep. 5, 2006.
(Control U.S. Appl. No. 90/007,532) Second Office Action dated Sep. 18, 2007.
(Control U.S. Appl. No. 90/007,532) Second Office Action Response filed Nov. 19, 2007.
(Control U.S. Appl. No. 90/007,532) Final Office Action dated Apr. 1, 2008.
(Control U.S. Appl. No. 90/007,532) Final Office Action Response filed Jun. 2, 2008.
(Control U.S. Appl. No. 90/007,532) Notice of Intent to Issue dated Jun. 17, 2008.
(U.S. Appl. No. 09/922,319) Continuation Application filed Aug. 2, 2001.
(U.S. Appl. No. 09/922,319) First Office Action dated Sep. 23, 2002.
(U.S. Appl. No. 09/922,319) First Office Action Response filed Mar. 24, 2003.
(U.S. Appl. No. 09/922,319) Craig Hansen Declaration of Incorporated Subject Matter filed Mar. 24, 2003.
(U.S. Appl. No. 09/922,319) Supplemental Amendment filed May 21, 2003.
(U.S. Appl. No. 09/922,319) Second Supplemental Amendment filed May 29, 2003.
(U.S. Appl. No. 09/922,319) Notice of Allowance and Issue Fee(s) Due dated Jun. 26, 2003.
(U.S. Appl. No. 09/922,319) Comments in Response to Reasons for Allowance filed Jul. 10, 2003.
(U.S. Appl. No. 09/922,319) Notice of *Inter Partes* Reexamination dated Jun. 28, 2005 (U.S. Appl. No. 95/000,100).
(Control U.S. Appl. No. 95/000,100) Reexam Request Filed Jun. 28, 2005.
(Control U.S. Appl. No. 95/000,100) Office Action Granting Reexam dated Sep. 8, 2005.
(Control U.S. Appl. No. 95/000,100) First Office Action dated Sep. 8, 2005.
(Control U.S. Appl. No. 95/000,100) Supplement to First Office Action dated Sep. 26, 2005.
(Control U.S. Appl. No. 95/000,100) First Office Action Response filed Dec. 8, 2005.
(Control U.S. Appl. No. 95/000,100) Dr. John Moussouris Declaration dated Dec. 7, 2005.
(Control U.S. Appl. No. 95/000,100) Ronald Alepin Declaration dated Dec. 7, 2005.
(Control U.S. Appl. No. 95/000,100) Korbin Van Dyke Declaration dated Dec. 5, 2005.
(Control U.S. Appl. No. 95/000,100) Second Office Action dated May 3, 2006.
(Control U.S. Appl. No. 95/000,100) Second Office Action Response filed Jun. 30, 2006.
(Control U.S. Appl. No. 95/000,100) Dr. John Moussouris Declaration dated Jun. 30, 2006.
(Control U.S. Appl. No. 95/000,100) Korbin Van Dyke Declaration dated Jun. 30, 2006.
IEEE Draft Standard for "Scalable Coherent Interface–Low–Voltage Differential Signal Specifications and Packet Encoding", IEEE Standards Department, P1596.3/D0.15 (Mar. 1992) (50006DOC018530–563).

IEEE Draft Standard for "High–Bandwidth Memory Interface Based on SCI Signaling Technology (RamLink)," IEEE Standards Department, Draft 1.25 IEEE P1596.4–199X (May 1995) (50006DOC018413–529).
Gerry Kane et al., "MIPS RISC Architecture," Prentice Hall (1995) (50006DOC018576–848).
IBM, "The PowerPC Architecture: A Specification For A New Family of RISC Processors," 2nd Ed., Morgan Kaufmann Publishers, Inc., (1994) (50006DOC019229–767).
Hewlett–Packard Co., "PA–RISC 1.1 Architecture and Instruction Set," Manual Part No. 09740–90039, (1990) (50006DOC018849–19228).
MIPS Computer Systems, Inc., "MIPS R4000 User's Manual," Mfg. Part No. M8–00040, (1990) (50006DOC017026–621).
i860™ Microprocessor Architecture, Neal Margulis, Foreword by Les Kohn.
Gove, "The MVP: A Highly–Integrated Video Compression Chip," IEEE Data Compression Conference, pp. 215–224 (Mar. 1994) (51056DOC000891–900).
Gove, "The Multimedia Video Processor (MVP): A Chip Architecture for Advanced DSP Applications," IEEE DSP Workshop, pp. 27–30 (Oct. 2–5, 1994) (51056DOC015452–455).
Guttag et al., "A Single–Chip Multiprocessor for Multimedia: The MVP," IEEE Computer Graphics & Applications, pp. 53–64 (Nov. 1992) (51056DOC000913–924).
Lee et al., "MediaStation 5000: Integrating Video and Audio," IEEE Multimedia pp. 50–61 (Summer 1994) (51056DOC000901–912).
TMS320C80 (MVP) Parallel Processor User's Guide, Texas Instruments (Mar. 1995) (51056DOC003744–4437).
TMS320C80 (MVP) Master Processor User's Guide, Texas Instruments (Mar. 1995) (51056DOC000925–957).
Bass et al., "The PA 7100LC Microprocessor: A Case Study of IC Design Decisions in a Competitive Environment," Hewlett–Packard Journal, vol. 2, pp. 12–22 (Apr. 1995) (51056DOC059283–289).
Bowers et al., "Development of a Low–Cost, High Performance, Multiuser Business Server System," Hewlett–Packard Journal, vol. 46, No. 2, p. 79 (Apr. 1995) (51056DOC059277–282).
Gwennap, "New PA–RISC Processor Decodes MPEG Video: Hewlett–Packard's PA–7100LC Uses New Instructions to Eliminate Decoder Chip," Microprocessor Report, pp. 16–17 (Jan. 24, 1994) (51056DOC002140–141).
Gwennap, "Digital MIPS Add Multimedia Extensions," Microdesign Resources, pp. 24–28 (Nov. 18, 1996) (51056DOC003454–459).
Kurpanek et al., "PA7200: A PA–RISC Processor with Integrated High Performance MP Bus Interface," IEEE COMPCON '94, pp. 375–382 (Feb. 28–Mar. 4, 1994) (51056DOC002149–156).
Lee et al., "Pathlength Reduction Features in the PA–RISC Architecture," IEEE COMPCON, pp. 129–135 (Feb. 24–28, 1992) (51056DOC068161–167).
Lee et al., "Real–Time Software MPEG Video Decoder on Multimedia–Enhanced PA 7100LC Processors," Hewlett–Packard Journal, vol. 46, No. 2, pp. 60–68 (Apr. 1995) (51056DOC013549–557).
Lee , "Realtime MPEG Video via Software Decompression on a PA–RISC Processors," IEEE, pp. 186–192 (1995) (51056DOC007345–351).

Martin, "An Integrated Graphics Accelerator for a Low–Cost Multimedia Workstation," Hewlett–Packard Journal, vol. 46, No. 2, pp. 43–50 (Apr. 1995) (51056DOC072083–090).

Undy et al., "A Low–Cost Graphics and Multimedia Workstation Chip Set," IEEE Micro, pp. 10–22 (Apr. 1994) (51056DOC002578–590).

HP 9000 Series 700 Workstations Technical Reference Manual: Model 712, Hewlett–Packard (Jan. 1994) (51056DOC068048–141).

PA–RISC 1.1 Architecture and Instruction Set Reference Manual, Third Edition, Hewlett–Packard (Feb. 1994) (51056DOC002157–176).

Ang, "StarT Next Generation: Integrating Global Caches and Dataflow Architecture," Proceedings of the ISCA 1992 Dataflow Workshop (1992) (51056DOC071743–776).

Beckerle, "Overview of the StarT (*T) Multithreaded Computer," IEEE COMPCON '93, pp. 148–156 (Feb. 22–26, 1993) (51056DOC002511–519).

Diefendorff et al., "The Motorola 88110 Superscalar RISC Microprocessor," IEEE pp. 157–162 (1992) (51056DOC008746–751).

Gipper, "Designing Systems for Flexibility, Functionality, and Performance with the 88110 Symmetric Superscalar Microprocessors," IEEE (1992) (51056DOC008758–763).

Nikkhil et al., "*T: A Multithreaded Massively Parallel Architecture," Computation Structures Group Memo 325–2, Laboratory for Computer Science, Massachusetts Institute of Technology (Mar. 5, 1999) (51056DOC002464–476).

Papadopoulos et al., "*T: Integrated Building Blocks for Parallel Computing," ACM, pp. 624–635 (1993) (51056DOC007278–289).

Patterson, "Motorola Announces First High Performance Single Board Computer Using Superscalar Chip," Motorola Computer Group (Sep. 1992) (51056DOC069260–262).

M. Phillip, "Performance Issues for 88110 RISC Microprocessor," IEEE, 1992 (51056DOC008752–757).

M. Smotherman et al., "Instruction Scheduling for the Motorola 88110," IEEE, 1993 (51056DOC008784–789).

R. Mueller, "The MC88110 Instruction Sequencer," Northcon, 1992 (51056DOC009735–738).

J. Arends, "88110: Memory System and Bus Interface," Northcon, 1992 (51056DOC009739–742).

K. Pepe, "The MC88110's High Performance Load/Store Unit," Northcon, 1992 (51056DOC009743–747).

J. Maguire, "MC88110: Datpath," Northcon, 1992 (51056DOC010059–063).

Abel et al., "Extensions to FORTRAN for Array Processing," ILLIAC IV Document No. 235, Department of Computer Science, University of Illinois at Urbana–Champaign (Sep. 1, 1970) (51056DOC001630–646).

Barnes et al., "The ILLIAC IV Computer," IEEE Transactions on Computers, vol. C–17, No. 8, pp. 746–757 (Aug. 1968) (51056DOC012650–661).

Knapp et al., "Bulk Storage Applications in the ILLIAC IV System," ILLIAC IV Document No. 250, Center for Advanced Computation, University of Illinois at Arbana–Champaign (Aug. 3, 1971) (51056DOC001647–656).

Awaga et al., "The µ VP 64–bit Vector Coprocessor: A New Implementation of High–Performance Numerical Computation," IEEE Micro, vol. 13, No. 5, pp. 24–36 (Oct. 1993) (51056DOC011921–934).

Takahashi et al., "A 289 MFLOPS Single Chip Vector Processing Unit," The Institute of Electronics, Information, and Communication Engineers Technical Research Report, pp. 17–22 (May 28, 1992) (51056DOC009798–812).

Uchiyama et al., "The Gmicro/500 Superscalar Microprocessor with Branch Buffers," IEEE Micro (Oct. 1993) (51056DOC000185–194).

Broughton et al., "The S–1 Project: Top–End Computer Systems for National Security Applications," (Oct. 24, 1985) (51056DOC057368–607).

Farmwald et al., "Signal Processing Aspects of the S–1 Multiprocessor Project," SPIE vol. 241, Real–Time Signal Processing (1980) (51056DOC072280–291).

Farmwald, "High Bandwidth Evaluation of Elementary Functions," IEEE Proceedings, 5th Symposium on Computer Arithmetic (1981) (51056DOC071029–034).

Gilbert, "An Investigation of the Partitioning of Algorithms Across an MIMD Computing System," (Feb. 1980) (51056DOC072244–279).

Widdoes, "The S–1 Project: Developing High–Performance Digital Computers," IEEE Computer Society COMPCON Spring 1980 (Dec. 11, 1979) (51056DOC071574–585).

Cornell, S–1 Uniprocessor Architecture SMA–4 (51056DOC056505–895).

The S–1 Project, Jan. 1985, S–1 Technical Staff (51056DOC057368–607).

S–1 Architecture and Assembler SMA–4 Manual, Dec. 19, 1979 (Preliminary Version) (51056DOC057608–918).

Michielse, "Performing the Convex Exemplar Series SPP System," Proceedings of Parallel Scientific Computing, First Intl Workshop, PARA '94, pp. 375–382 (Jun. 20–23, 1994) (51056DOC020754–758).

Wadleigh et al., "High Performance FFT Algorithms for the Convex C4/XA Supercomputer," Poster, Conference on Supercomputing, Washington, D.C. (Nov. 1994) (51056DOC068618).

C4 Technical Overview (Sep. 23, 1993) (51056DOC017111–157).

Saturn Assembly Level Performance Tuning Guide (Jan. 1, 1994) (51056DOC017369–376).

Saturn Differences from C Series (Feb. 6, 1994) (51056DOC017150–157).

"Convex Adds GaAs System," Electronic News (Jun. 20, 1994) (51056DOC019388–390).

Convex Architecture Reference Manual, Sixth Edition (1992) (51056DOC016599–993).

Convex Assembly Language Reference Manual, First Edition (Dec. 1991) (51056DOC015996–6598).

Convex Data Sheet C4/XA Systems, Convex Computer Corporation (51056DOC059235–236).

Saturn Overview (Nov. 12, 1993) (51056DOC017111–157).

Convex Notebook containing various "Machine Descriptions" 51056DOC016994–7510).

"Convex C4/XA Offer 1 GFLOPS from GaAs Uniprocessor," Computergram International, Jun. 15, 1994 (51056DOC019383).

Excerpt from Convex C4600 Assembly Language Manual, 1995 (51056DOC061441–443).

Excerpt from "Advanced Computer Architectures—A Design Space Approach," Chapter 14.8, "The Convex C4/XA System" (51056DOC061453–459).

Convex C4600 Assembly Language Manual, First Edition, May 1995 (51056DOC064728–5299).

Alvarez et al., "A 450MHz PowerPC Microprocessor with Enhanced Instruction Set and Copper Interconnect," ISSCC (Feb. 1999) (51056DOC071393–394).

Tyler et al., "AltiVec™: Bringing Vector Technology to the PowerPC™ Processor Family," IEEE (Feb. 1999) (51056DOC071035–042).

AltiVec™ Technology Programming Environments Manual (1998) (51056DOC071043–392).

Atkins, "Performance and the i860 Microprocessor," IEEE Micro, pp. 24–27, 72–78 (Oct. 1991) (5156DOC070655–666).

Grimes et al., "A New Processor with 3–D Graphics Capabilities," NCGA '89 Conference Proceedings vol. 1, pp. 275–284 (Apr. 17–20, 1989) (5156DOC070711–717).

Grimes et al., "The Intel i860 64–Bit Processor: A General–Purpose CPU with 3D Graphics Capabilities," IEEE Computer Graphics & Applications, pp. 85–94 (Jul. 1989) (5156DOC070701–710).

Kohn et al., "A 1,000,000 Transistor Microprocessor," 1989 IEEE International Solid–State Circuits Conference Digest of Technical Papers, pp. 54–55, 290 (Feb. 15, 1989) (51056DOC072091–094).

Kohn et al., "A New Microprocessor with Vector Processing Capabilities," Electro/89 Conference Record, pp. 1–6 (Apr. 11–13, 1989) (5156DOC070672–678).

Kohn et al., "Introducing the Intel i860 64–Bit Microprocessor," IEEE Micro, pp. 15–30 (Aug. 1989) (5156DOC070627–642).

Kohn et al., "The i860 64–Bit Supercomputing Microprocessor," AMC, pp. 450–456 (1989) (51056DOC000330–336).

Margulis, "i860 Microprocessor Architecture," Intel Corporation (1990) (51056DOC066610–7265 and 5156DOC069971–70626).

Mittal et al., "MMX Technology Architecture Overview," Intel Technology Journal Q3 '97, pp. 1–12 (1997) (5156DOC070689–700).

Patel et al., "Architecture Features of the i860—Microprocessor RISC Core and On–Chip Caches," IEEE, pp. 385–390 (1989)(5156DOC070679–684).

Rhodehamel, "The Bus Interface and Paging Units of the i860 Microprocessor," IEEE, pp. 380–384 (1989) (5156DOC070643–647).

Perry, "Intel's Secret is Out," IEEE Spectrum, pp. 22–28 (Apr. 1989) (5156DOC070648–654).

Sit et al., "An 80 MFLOPS Floating–Point Engine in the Intel i860 Processor," IEEE, pp. 374–379 (1989) (51056DOC072095–101).

i860 XP Microprocessor Data Book, Intel Corporation (May 1991) (51056DOC067266–427).

Paragon User's Guide, Intel Corporation (Oct. 1993) (51056DOC068802–9097).

N15 Micro Architecture Specification, dated Apr. 29, 1991 (50781DOC000001–982).

N15 External Architecture Specification, dated Oct. 17, 1990 (51056DOC017511–551).

N15 External Architecture Specification, dated Dec. 14, 1990 (50781DOC001442–509).

N15 Product Requirements Document, dated Dec. 21, 1990 (50781DOC001420–441).

N15 Product Implementation Plan, dated Dec. 21, 1990 (50781DOC001794–851).

N12 Performance Analysis document version 2.0, dated Sep. 21, 1990 (51056DOC072992–73027).

Hansen, "Architecture of a Broadband Mediaprocessor," IEEE COMPCON 96 (Feb. 25–29, 1996) (MU0013276–283 and 51057DOC001825–831).

Moussouris et al., "Architecture of a Broadband MediaProcessor," Microprocessor Forum (1995) (MU0048611–630).

Amould et al., "The Design of Nectar: A Network Backplane for Heterogeneous Multicomputers," ACM (1989) (51056DOC020947–958).

Bell, "Ultracomputers: A Teraflop Before Its Time," Communications of the ACM, (Aug. 1992) pp. 27–47 (51056DOC020903–923).

Broomell et al., "Classification Categories and Historical Development of Circuit Switching Topologies," Computing Surveys, vol. 15, No. 2, pp. 95–113 (Jun. 1983) (51056DOC003002–040).

Culler et al., "Analysis of Multithreaded Microprocessors Under Multiprogramming," Report No. UCB/CSD 92/687 (May 1992) (51056DOC069283–300).

Donovan et al., "Pixel Processing in a Memory Controller," IEEE Computer Graphics and Applications, pp. 51–61 (Jan. 1995) (51056DOC059635–645).

Fields, "Hunting for Wasted Computing Power: New Software for Computing Networks Puts Idle PC's to Work," Univ. of Wisconsin–Madison, http://www.cs.wisc.edu/condor/doc/WiscIdea.html (1993) (51056DOC068704–711).

Geist, "Cluster Computing: The Wave of the Future?," Oak Ridge National Laboratory, 84OR21400 (May 30, 1994) (51056DOC020924–929).

Ghafoor, "Systolic Architecture for Finite Field Exponentiation," IEEE Proceedings, vol. 136 (Nov. 1989) (51056DOC071700–705).

Giloi, "Parallel Programming Models and their Interdependence with Parallel Architectures," IEEE Proceedings (Sep. 1993) (51056DOC071792–801).

Hwang et al., "Parallel Processing for Supercomputers and Artificial Intelligence," (1993) (51056DOC059663–673).

Hwang, "Advanced Computer Architecture: Parallelism, Scalability, Programmability," (1993) (51056DOC059656–662).

Hwang, "Computer Architecture and Parallel Processing," McGraw Hill (1984) (51056DOC070166–1028).

Iwaki, "Architecture of a High Speed Reed–Solomon Decoder," IEEE Consumer Electronics (Jan. 1994) (51056DOC071687–694).

Jain et al., "Square–Root, Reciprocal, Sine/Cosine, Arctangent Cell for Signal and Image Processing," IEEE ICASSP '94, pp. II–521–II–524 (Apr. 1994) (51056DOC003070–073).

Laudon et al., "Architectural and Implementation Tradeoffs in the Design of Multiple–Context Processors," Technical Report: CSL–TR–92–523 (May 1992) (51056DOC069301–327).

Lawrie, "Access and Alignment of Data in an Array Processor," IEEE Transactions on Computers, vol. C–24, No. 12, pp. 99–109 (Dec. 1975) (51056DOC002932–942).

Le–Ngoc, "A Gate–Array–Based Programmable Reed–Solomon Codec: Structure–Implementation–Applications," IEEE Military Communications (1990) (51056DOC071695–699).

Litzkow et al., "Condor—A Hunter of Idle Workstation," IEEE (1988) (51056DOC068712–719).

Markstein, "Computation of Elemantary Functions on the IBM RISC System/6000 Processor," IBM J. Res. Develop., vol. 34, No. 1, pp. 111–119 (Jan. 1990) (51056DOC059620–628).

Nienhaus, "A Fast Square Rooter Combining Algorithmic and Table Lookup Techniques," IEEE Proceedings Southeastcon, pp. 1103–1105 (1989) (51056DOC061469–471).

Renwick, "Building a Practical HIPPI LAN," IEEE, pp. 355–360 (1992) (51056DOC020937–942).

Rohrbacher et al., "Image Processing with the Staran Parallel Computer," IEEE Computer, vol. 10, No. 8, pp. 54–59 (Aug. 1977) (reprinted version pp. 119–124) (51056DOC002943–948).

Ryne, "Advanced Computers and Simulation," IEEE, pp. 3229–33 (1993) (51056DOC020883–887).

Siegel, "Interconnection Networks for SIMD Machines," IEEE Computer, vol. 12, No. 6 (Jun. 1979) (reprinted version pp. 110 118) (51056DOC002949–957).

Singh et al., "A Programmable HIPPI Interface for a Graphics Supercomputer," ACM (1993) (51056DOC020888–896).

Smith, "Cache Memories," Computing Surveys, vol. 14, No. 3 (Sep. 1982) (51056DOC071586–643).

Tenbrink et al., "HIPPI: The First Standard for High–Performance Networking," Los Alamos Science (1994) (51056DOC020943–946).

Tolmie, "Gigabit LAN Issues: HIPPI, Fibre Channel, or ATM," Los Alamos National Laboratory Report No. LA–UR 94–3994 (1994) (51056DOC046599–609).

Tolmie, "HIPPI: It's Not Just for Supercomputers Anymore," Data Communications (May 8, 1995) (51056DOC071802–809).

Toyokura et al., "A Video DSP with a Macroblock–Level–Pipeline and a SIMD Type Vector–Pipelined Architecture for MPEG2 CODEC," ISSCC94, Section 4, Video and Communications Signal Processors, Paper WP 4.5, pp. 74–75 (1994) (51056DOC003659–660).

Tullsen et al., "Simultaneous Multithreading: Maximizing On–Chip Parallelism," Proceedings of the 22nd Annual International Symposium on Computer Architecture (Jun. 1995) (51056DOC071434–443).

Turcotte, "A Survey of Software Environments for Exploiting Networked Computing Resources," Engineering Research Center for Computational Field Simulation (Jun. 11, 1993) (51056DOC069098–256).

Vetter et al., "Network Supercomputing: Connecting Cray Supercomputers with a HIPPI Network Provides Impressively High Execution Rates," IEEE Network (May 1992) (51056DOC020930–936).

Wang, "Bit–Level Systolic Array for Fast Exponentiation in GF(2m)," IEEE Transactions on Computers, vol. 43, No. 7, pp. 838–841 (Jul. 1994) (51056DOC059407–410).

Ware et al., "64 Bit Monolithic Floating Point Processors," IEEE Journal of Solid–State Circuits, vol. Sc–17, No. 5 (Oct. 1982) (51056DOC059646–655).

"Bit Manipulator," IBM Technical Disclosure Bulletin, pp. 1575–1576 (Nov. 1974) (51056DOC010205–206).

Finney et al., "Using a Common Barrel Shifter for Operand Normalization, Operand Alignment and Operand Unpack and Pack in Floating Point," IBM Technical Disclosure Bulletin, pp. 699–701 (Jul. 1986) (51056DOC010207–209).

Data General A ViiON AV500, 550, 4500 and 5500 Servers.

Jovanovic et al., "Computational Science: Advances Through Collaboration," San Diego Supercomputer Center Science Report (1993) (51056DOC068769–779).

High Performance Computing and Communications: Toward a National Information Infrastructure, National Science Foundation (NSF) (1994) (51056DOC068791–801).

National Coordination Office for High Performance Computing and Communications, "High Performance Computing and Communications: Foundation for America's Information Future" (1996) (51056DOC072102–243).

Wilson, "The History of the Development of Parallel Computing," http://ei.cs.vt.edu/~history/Parallel.html (51056DOC068720–757).

IEEE Standard 754 (ANSI/IEEE Std. 754–1985) (51056DOC019304–323).

Intel Article, "*Intel Announces Record Revenue of 9.96 Billion*", Oct. 18, 2005.

The New York Times Article, "*Intel Posts 5% Profit Increase on Demand for Notebook Chips*", Oct. 19, 2005.

USA Today Article, "*Intel's Revenue Grew 18%In Robust Quarter for Tech*", Oct. 19, 2005.

The Wall Street Journal Article, "*Intel Says Chip Demand May Slow*", Oct. 19, 2005.

The New York Times Article, "*Intel Settlement Revives A Fading Chip Designer*", Oct. 20, 2005.

Advance Datasheet for MT48LC2M8S1(S) 2 Meg× 8SDRAM, Micron Semiconductor, Inc., 2–43 to 2–84 (1994).

Asprey et al., "Performance Features of the PA7100 Microprocessor," IEEE Micro, 22–35 (Jun. 1993).

BSP and BSP Customer Attributes, Inclosure 5, Burroughs Corporation (Aug. 1, 1977).

BSP Floating Point Arithmetic, Burroughs Corporation, (Dec. 1978).

BSP Implementation of Fortran, Burroughs Corporation (Feb. 1978).

BSP, Burroughs Scientific Process, Burroughs Corporation, 1–29 (Jun. 1977).

Bursky, "Synchronous DRAMs Clock At 100 MHz," Electronic Design, vol. 41, No. 4, 45–49 (Feb. 18, 1993).

D. D. Gajski and L. P. Rubinfeld, "Design of Arithmetic Elements for Borroughs Scientific Processor," Proceedings of the 4th Symposium on Computer Arithmetic, Santa Monica, CA, 245–56 (1978).

"System Architecture," ELXSI (2d Ed. Oct. 1983).

"System Foundation Guide," ELXSI (1st Ed. Oct. 1987).

L. Higbie, "Applications of Vector Processing," Computer Design, 139–45 (Apr. 1978).

Ide et al., "A 320–MFLOPS CMOS Floating–Point Processing Unit for Superscalar Processors," IEEE Journal of Solid–State Circuits, vol. 28, No. 3, 352–61 (Mar. 1993).

"IEEE Standard for Communicating Among Processors and Peripherals Using Shared Memory (Direct Memory Access—DMA)," IEEE (1994).

D.A. Kuck & R. Stokes, "The Burroughs Scientific Processor (BSP)," IEEE Transactions on Computers, vol. C–31, No. 5, 363–76 (May 1982).

Lee, "Accelerating Multimedia with Enhanced Microprocessors," IEEE Micro, vol. 15, No. 2, 22–32 (Apr. 1995).

Lion Extension Architecture (Oct. 12, 1991).

"MC88110 Second Generation RISC Microprocessor User's Manual," Motorola (1991).

Spaderna et al., "An Integrated Floating Point Vector Processor for DSP and Scientific Computing," IEEE International Conference on Computer Design: VLSI in Computers and Processors, 8–13 (Oct. 1989).

Sprunt et al., "Priority–Driven, Preemptive I/O Controllers for Real–Time Systems," IEEE (1988).

Thornton, "Design of a Computer—The Control Data 6600," Scott, Foresman and Company (1970).

Watkins et al., "A Memory Controller with an Integrated Graphics Processor," IEEE, 324–36 (1993).

Ide et al., "A 320 MFLOPS CMOS Floating–Point Processing Unit for Superscalar Processors," 1992, pp. 30.2.1–30.2.4, IEEE 1992 Custom Integrated Circuits Conference.

Wikipedia, "Virtual Memory," retrieved from http://en.wikipedia.org/wiki/Virtual_memory, page last modified Sep. 19, 2005.

Wikipedia, "MAC OS memory management," retrieved from http://en.wikipedia.org/wiki/Mac_OS_management, page last modified Sep. 13, 2005.

CPU Magazine (online), "MMU," retrieved from http://www.computerhope.com/jargon/m/mmu.htm.

Webopedia, "page fault," retrieved from http://www.webopedia.com/TERM/p/page_fault.html.

Agreed Terms, Claim Construction Hearing of Jun. 20, 2005, *MicroUnity Sys. Eng'g, Inc.* v. *Dell. Inc. and Intel Corp.*, (E.D. tex.), Case No. 2–04–CV–120(TJW).

Memorandum Opinion and Order, dated Aug. 26, 2005, *MicroUnity Sys. Eng'g Inc.* ,v. *Dell. Inc. and Intel Corp.* (E.D. Tex.), Case No. 2–04–CV–120(TJW).

Fuller et al., "The PowerPC 604™ Microprocessor—Multimedia Ready," *Circuits and Systems*, 1995, *Proceedings of the 38$^{th}$ Midwest Symposium on Rio de Janeiro, Brazil* (Aug. 13–16, 1995), *New York, NY*, IEEE, vol. 2, 1135–38 (Aug. 13, 1995) [XP010165331].

Gwennap, "MIPS R10000 Uses Decoupled Architecture—High–Performance Core Will Drive MIPS High–End for Years," *Microprocessor Report*, vol. 8, No. 14 (Oct. 24, 1994), MicroDesign Resources (1994) [XP002219607].

Murakami et al., "SIMP (Single Instruction Stream / Multiple Instruction Pipelining): A Novel High–Speed Single–Processor Architecture," *Computer Architecture News*, ACM, New York, NY, vol. 17, No. 3, 78–85 (Jun. 1, 1989) [XP000035291].

"UltraSPARC Multimedia Capabilities On–Chip Support for Real–Time Video and Advanced Graphics," Sun Microsystems, Inc., 1–8 (1994) [XP002177546].

P27838EP–D3–PCT Extended European Search Report dated Jul. 3, 2008 in Application No. / Patent No. 07111350.0–1243 / 1873654.

P27838EP–D6–PCT Extended European Search Report dated Jun. 27, 2008 in Application No. / Patent No. 07111348.4–1243 / 1873629.

Diefendorff et al., "The PowerPC User Instruction Set Architecture," *IEEE Micro*, No. 5, 30–41 (Oct. 1994) [XP000476678].

Greenley et al., "UltraSPARC™: The Next Generation Superscaler 64–bit SPARC," IEEE, 442–51 (1995) [XP000545452].

Gwennap, "UltraSparc Adds Multimedia Instructions," Microprocessor Report, vol. 8, No. 6, 1–3 (Dec. 5, 1994), MicroDesign Resources © (1994) [also XP000561690].

Laudon et al., "Interleaving: A Multithreading Technique Targeting Multiprocessors and Workstations," ACM Sigplan Notices, No. 11, 308–18 (Nov. 29, 1994) [XP000491743].

"MC88110 RISC Microprocessor User'Manual, Second Edition," Motorola, Inc. (1990), Sections 1 through 3 (148 pages) [XP002474804].

Sato et al., "Multiple Instruction Streams in a Highly Pipelined Processor," IEEE, 182–89 (1990) [XP010021363].

Wang et al., "The 3DP: A Processor Architecture for Three–Dimensional Applications," *Computer*, No. 1, 25–36 (Jan. 1992) [XP000287832].

Yamamoto et al., "Performance Estimation of Multi-streamed, Superscaler Processors," IEEE, 195–204 (1994) [XP010096943].

Zhou et al., "MPEG Video Decoding with the UltraSPARC Visual Instruction Set," IEEE, 470–75 (1995) [XP002472254].

P27838EP–D1–PCT Extended European Search Report dated May 2, 2008 in Application No. / Patent No. 07111352.6–1243.

P27838EP–D2–PCT Extended European Search Report dated Feb. 18, 2008 in Application No. / Patent No. 07111351.8–1243.

P27838EP–D4–PCT Extended European Search Report dated May 8, 2008 in Application No. / Patent No. 07111349.2–1243.

P27838EP–D5–PCT Extended European Search Report dated Apr. 23, 2008 in Application No. / Patent No. 07111344.3–1243.

P27838EP–D6–PCT Partial European Search Report dated Apr. 1, 2008 in Application No. / Patent No. 07111348.4–1243.

P27838EP–D7–PCT Extended European Search Report dated Mar. 10, 2008 in Application No. / Patent No. 07111473.0–1243.

P27838EP–D8–PCT Extended European Search Report dated May 27, 2008 in Application No. / Patent No. 07111476.3–1243.

P27838EP–D9–PCT Extended European Search Report dated Mar. 26, 2008 in Application No. / Patent No. 07111480.5–1243.

Office Action dated Sep. 18, 2007 received in the Reexamination of U.S. Patent No. 6,584,482 (Control No. 90/007,532) (*Note: References relied on by Examiner in this Office Action were previously cited as exhibits to the Request for Intel Partes Reexamination of 6,643,765 as follows: Ide et al. (Toshiba Article) as Exhibit PA–B,1; Spaderna et al. (Sharp Integrated Processor Article) as Exhibit PA–D; and Fukaya et al. / Hitachi JP3268024 published Nov. 28, 1991 (Fukaya/Hitachi Patent) as Exhibit PA–J*).

Amendment filed Nov. 19, 2007 in Response to Office Action Dated Sep. 18, 2007 with supporting Declaration of Korbin Van Dyke in the Reexamination of U.S. Patent No. 6,584,482 (Control No. 90/007,532).

Final Office Action dated Apr. 1, 2008 received in the Reexamination of U.S. Patent No. 6,584,482 (Control No. 90/007,532).

Amendment filed Jun. 2, 2008 in Response to Final Office Action Dated Apr. 1, 2008 in the Reexamination of U.S. Patent No. 6,584,482 (Control No. 90/007,532).

The AMD–K6 3D Processor: Revolutionary Multimedia Performance, Ed. H. Kalish and J. Isaac, Abacus (1998).

BIT Data Sheet—Product Summary: B3110/B3120/B2110/B2120 Floating Point Chip Set, Bipolar Integrated Technology, Inc. (Dec. 1986).

Colwell et al., "Architecture and Implementation of a VLIW Supercomputer," IEEE, 910–19 (1990).

Colwell et al., "A VLIW Architecture for a Trace Scheduling Compiler," *IEEE Transactions on Computers*, vol. 37, No. 8, 967–79 (Aug. 1988).

Foley, "The Mpact™ Media Processor Redefines the Multimedia PC," *Proceedings of COMPCON Spring '96,* IEEE, 311–18 (1996).

Hwang et al., *Computer Architecture and Parallel Processing,* McGraw Hill Book Co., Singapore (1998) (7 pages).

IEEE Standard for Scalable Coherent Interface (SCI), IEEE Std 1596–1992, © (1993).

"Intel MMX™ Technology Overview," Intel Corp. (Mar. 1996).

Lowney et al., "The Multiflow Trace Scheduling Compiler," (Oct. 30, 1992).

"MIPS Digital Media Extension" (MDMX), rev. 1.0, C–1 to C–40.

"Multimedia Extension Unit for the X86 Architecture," Compaq Computer Corp., Revision 0.8b (Jun. 20, 1995).

"PA–RISC 1.1 Architecture and Instruction Set Reference Manual," Third Edition, Hewlett–Packard Co. (Feb. 1994) (424 pages).

"PA–RISC 2.0 Architecture and Instruction Set Reference Manual," Hewlett–Packard Co. (1995).

Rathnam et al., "An Architecture Overview of the Programmable Multimedia Processor, TM–1," *Proceedings of COMPCON '96,* IEEE (Spring 1996).

Rubinfeld, et al., "Motion Video Instruction Extensions for Alpha," Semiconductor Eng'g Group (Oct. 18, 1996).

Shanley, *Pentium Pro Processor System Architecture,* MindShare, Inc., Addison–Wesley Developers Press (1997).

TM1000 Preliminary Data Book, TriMedia Product Group (1997).

"Trace/300 Series: F Board Architecture," *Multiflow Computer* (Dec. 9, 1988).

Ide et al., *A 320–MFLOPS CMOS Floating Point Processing Unit for Superscalar Processors, IEEE Journal of Solid–State Circuit* published in Mar. 1993 ("Toshiba 320–MFLOPS").

*MC 88110 Second Generation RISC Microprocessor User's Manual* published in 1991 (Motorola 88110 User Manual).

Shipnes, *Graphics Processing with the 88110 RISC Microprocessor* published in 1992 (Motorola Graphics Processing Article).

Spadema et al., *An Integrated Floating Point Vector Processor for DSP and Scientific Computing;* published with the proceedings on the 1989 *IEEE International Conference on Computer Design: VLSI in Computers and Processors,* ("Sharp Integrated Processor Article").

*ILLIAC IV System Characteristics and Programming Manual* published on Jun. 1, 1972 ("ILLIAC IV Programming Manual").

*ILLIAC IV Quarterly Progress Report* published on Jan. 15, 1970 ( ILLIAC Quarterly Progress Report ).

*Bulk Storage Applications in the ILLIAC IV System* published on Aug. 3, 1971 (ILLIAC Bulk Storage Article).

Manferdelli et al., *Signal Processing Aspects of the S–1 Multiprocessor Project, Annual SPIE International Technical Symposium* published on Jul. 29, 1980 ("S–1 Multiprocessor Article").

Lawrence Livermore Laboratory, *The S–1 Project 1979 Annual Report, Volume I: Architecture,* published at least as early as 1980 ("S–1 Annual Report–I").

Lawrence Livermore Laboratory, *The S–1 Project 1979 Annual Report, Volume II: Hardware,* published at least as early as 1980 ("S–1 Annual Report–II").

Farmwald, *On the Design of High Performance Digital Arithmetic Units,* (Ph.D. Thesis to Lawrence Livermore National Laboratory, University of California) Aug. 1981 ("S–1 Thesis").

Lawrence Livermore Laboratory, *S–1 Uniprocessor Architecture,* published on Apr. 21, 1983 ("S–1 Uniprocessor Architecture article").

*Convex 3400 Supercomputer System Overview,* published on Jul. 24, 1991 ("Convex C3400 Overview").

*Saturn Architecture Specification,* published Apr. 28, 1993 ("Convex Saturn Architecture reference").

Wadleigh et al. *High–Performance FFT Algorithms for the Convex C4/XA Supercomputer,* Journal of Computing published in 1005 ("Convex C4/XA Supercomputer article").

*C4/XA Architecture Overview* Convex Technical Marketing presentation dated Nov. 11, 1993 and Feb. 4, 1994 ("Convex C4/XA Presentation").

Asprey et al., *Performance Features of the PA7100 Microprocessor, IEEE Micro* published in Jun. 1993 ("HP 7100LC Performance Article").

Lee, *Accelerating Multimedia with Enhanced Microprocessors, IEEE Micro* published in Apr. 1995 ("HP 7100LC Multimedia Article").

Knebel, *HP's PA7100LC: A Low–Cost Superscalar PA–RISC Processor, IEEE Micro* published in 1993 ("HP 7100LC Low–Cost Article").

Kimura et al., *Development of G–Micro 32–bit Family of Microprocessors, Fujitsu Semiconductor Special,* vol. 43, No. 2, published on Feb. 1992 ("Fujitsu G–Micro Article").

Eisig, *The Design of a 64–bit Integer Multiplier/Divider Unit,* published in 1993 ("64–Bit Integer Multiplier/Divider Unit article").

Feng, *Data Manipulating Functions in Parallel Processors and Their Implementations, IEEE Transactions on Computers* published in Mar. 1974 ("Data Manipulating in Parallel Processors").

Watkins et al., *A Memory Controller with an Integrated Graphics Processor* published in 1993 ("Sun Integrated Graphics Processor Article").

Kissell, "The Dead Computer Society—The Passing of a Golden Age?" www.paralogos.com/DeadSuper/ (1998).

Hansen, *MicroUnity's MediaProcessor Architecture, IEEE Micro* published in Aug. 1996 ("MicroUnity's MediaProcessor Architecture").

Slater, *MicroUnity Lifts Veil on MediaProcessor, Microprocessor Report* published Oct. 23, 1995 ("MicroUnity Lifts Veil on MediaProcessor").

File Wrapper of U.S. Pat. No. 6,643,765.

Appendix to U.S. Pat. No. 6,643,765.

Cited References to U.S. Pat. No. 6,643,765 (see additional 2 Sheets of PTO–1449 forms for PAT–A,4).

Partial File Wrapper of U.S. Pat. No. 5,742,840, Amendment filed May 28, 1997.

Appendix to U.S. Pat. No. 5,742,840.

Appendix to U.S. Pat. No. 5,822,603.

Appendix to U.S. Pat. No. 6,006,318.

Partial File Wrapper of U.S. Pat. No. 6,295,599, Amendment filed Feb. 16, 2001.

Partial File Wrapper of U.S. Pat. No. 6,295,599, Certificate of Correction filed Sep. 23, 2003.

Appendix to U.S. Pat. No. 6,295,599.

International Patent Cooperation Treaty Application PCT/US99/19342.

Partial File Wrapper for International Patent Cooperation Treaty Application PCT/US99/19342, Patentee's Response.

Partial File Wrapper for International Patent Cooperation Treaty Application PCT/US99/19342, Invitation to Correct Priority Claim and International Search Report.

File Wrapper of U.S. Pat. No. 2004/0015533.

Claim Chart for PCT Published Application WO 97/07450 A1.

Claim Chart for the Toshiba 320-MFLOPS FPU Article.

Claim Chart for the Motorola User's Guide.

Claim Chart for the Sharp Integrated Processor Article.

Claim Chart for the ILLIAC IV Programming Manual.

Claim Chart for the S-1 Supercomputer references.

Claim Chart for the Convex Supercomputer references.

Claim Chart for the HP 7100 LC Performance Article.

Claim Chart for the Fujitsu references.

Joint Claim Construction and Prehearing Statement that includes MicroUnity's Proposed Claim Construction submitted in *MicroUnity Systems Engineering, Inc. v. Dell, Inc., et al.* No. 2:04–CV–120(TJW) (E.D. Tex 2004).

Selected portions of MicroUnity's Preliminary Infringement Contentions submitted in *MicroUnity Systems Engineering, Inc. v. Dell, Inc., et al.* No. 2:04–CV–120(TJW) (E.D. Tex 2004).

Illustration of the alleged patent family for U.S. Pat. No. 5,742,840.

MicroUnity System Engineering, Inc.'s Opening Brief Regarding Claim Construction submitted Apr. 11, 2005 in *MicroUnity Systems Engineering, Inc. v. Dell, Inc., et al.* No. 2:04–CV–120(TJW) (E.D. Tex 2004).

K. Diefendorff et al. "Organization of the Motorola 88110 Superscalar RISC Microprocessor" IEEE Micro. Apr. 1992. 40–63.

L. Gwennap. "IBM Regains Performance Lead with Power2" Microprocessor Report. Oct. 4, 1993. vol. 7. No. 13. 1,6–10.

L. Gwennap. "IBM Creates Power PC Processors for AS/400" Microprocessor Report. Jul. 31, 1995. 15–16.

L. Kohn et al. "The Visual Instruction Set (VIS) in UltraSPARC" IEEE. 1995. 462–469.

D. Shaver. "A General–Purpose Array Processor for Seismic Processing" (Nov.–Dec. 1984). Jan.–Mar. 1998. 15th Anniversary Issue. 5–26.

R. Lee. "Accelerating Multimedia with Enhanced Microprocessors" IEEE Micro. Apr. 1995. 22–32.

N. Margulis, "i860 Microprocessor Architecture" 1990. 8–10, 171–175, 182–183.

A. Levinthal et al. "Parallel Computers for Graphics Applications" 1987. 193–198.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-30 are confirmed.

* * * * *